US011932424B2

(12) United States Patent
Nawojczyk

(10) Patent No.: US 11,932,424 B2
(45) Date of Patent: Mar. 19, 2024

(54) UTTER SYSTEM FOR MULTIPLE USE OF THE SPACE-ROCKETS EQUIPPED WITH SPREADABLE-ARMS AND POSSIBLY MORE DEVICES, AND METHOD OF THESE SPACE-ROCKETS VERTICAL LANDING BY HANGING ON LANDING-STATION HAVING MOVABLE GANTRIES AND MORE APPARATUS

(71) Applicant: Roman Nawojczyk, Älmhult (SE)

(72) Inventor: Roman Nawojczyk, Älmhult (SE)

(73) Assignee: Roman Nawojczyk, Älmhult (SE)

( * ) Notice: Subject to any disclaimer, the term of this patent is extended or adjusted under 35 U.S.C. 154(b) by 541 days.

(21) Appl. No.: 16/988,615

(22) Filed: Aug. 8, 2020

(65) Prior Publication Data

US 2021/0047058 A1 Feb. 18, 2021

Related U.S. Application Data

(60) Provisional application No. 62/885,324, filed on Aug. 12, 2019.

(51) Int. Cl.
*B64G 1/62* (2006.01)
*B64G 1/00* (2006.01)
(Continued)

(52) U.S. Cl.
CPC ............... *B64G 1/62* (2013.01); *B64G 1/002* (2013.01); *B64G 1/222* (2013.01); *B64G 5/00* (2013.01)

(58) Field of Classification Search
CPC .. B64F 1/02; B64G 1/002; B64G 1/62; B64G 2005/005
See application file for complete search history.

(56) References Cited

U.S. PATENT DOCUMENTS 2,807,429 A * 9/1957 Hawkins, Jr. ....... B64C 29/0091 244/116
3,302,908 A * 2/1967 Lazareff ............. B64C 29/0091 342/411

(Continued)

FOREIGN PATENT DOCUMENTS

CN 105783610 A * 7/2016
CN 107514940 A * 12/2017

(Continued)

*Primary Examiner* — Joshua J Michener
*Assistant Examiner* — Michael B. Kreiner

(57) ABSTRACT

System for multiple use of space rockets equipped with spreadable arms and sliding engines covers, and for said space rockets a vertical landing method on two movable gantries situated on a specific sea ship or on a solid ground. Said space rockets comprise steering flaps and a dividable sectional load cover. The specific sea ship comprises specific joined hulls, two horizontally movable decks and tunnels with ballasting wagons. The specific sea ship has installed a landing station for the space rockets. The landing station comprises hangers, grasping wagons and two movable ship gantries. The hangers comprise rotating wedges. The gantries comprise damping wagons. The system comprises also two movable ground gantries and a specific movable ground crane all situated on a solid ground that together create a multi-task station for the space rockets hanging up, reloading, launching, and landing. The system allows that the space rockets can liftoff from two movable gantries while vertically hang on their spreadable arms.

14 Claims, 73 Drawing Sheets

(51) Int. Cl.
*B64G 1/22* (2006.01)
*B64G 5/00* (2006.01)

(56) References Cited

U.S. PATENT DOCUMENTS

| | | | | |
|---|---|---|---|---|
| 4,896,847 | A * | 1/1990 | Gertsch | B64G 1/62 428/116 |
| 5,328,132 | A * | 7/1994 | Shelby, Jr. | B64G 1/62 244/129.1 |
| 5,743,492 | A * | 4/1998 | Chan | B64G 1/401 102/378 |
| 5,799,900 | A * | 9/1998 | McDonnell | B64F 1/02 244/17.11 |
| 5,850,989 | A * | 12/1998 | Trudeau | F02K 9/343 244/116 |
| 5,871,173 | A * | 2/1999 | Frank | F42B 10/14 244/113 |
| 8,408,497 | B2 * | 4/2013 | Boelitz | B64G 1/002 244/158.9 |
| 8,424,808 | B2 * | 4/2013 | Boelitz | B64G 1/002 244/158.9 |
| 8,678,321 | B2 * | 3/2014 | Bezos | B64G 1/002 244/158.9 |
| 10,093,433 | B2 * | 10/2018 | Knudsen | B64G 5/00 |
| 10,703,513 | B2 * | 7/2020 | Park | B64G 5/00 |
| 10,800,545 | B2 * | 10/2020 | McDonnell | B64F 1/0297 |
| 10,822,122 | B2 * | 11/2020 | Grose | B64G 5/00 |
| 10,829,245 | B2 * | 11/2020 | Powers | B64F 1/04 |
| 11,046,456 | B2 * | 6/2021 | Fujita | B64F 1/02 |
| 2022/0081130 | A1 * | 3/2022 | Baekby Bjarnoe | B64G 1/002 |

FOREIGN PATENT DOCUMENTS

| | | | | |
|---|---|---|---|---|
| FR | 3088894 | B1 * | 12/2020 | |
| WO | WO-2019021036 | A1 * | 1/2019 | |

* cited by examiner

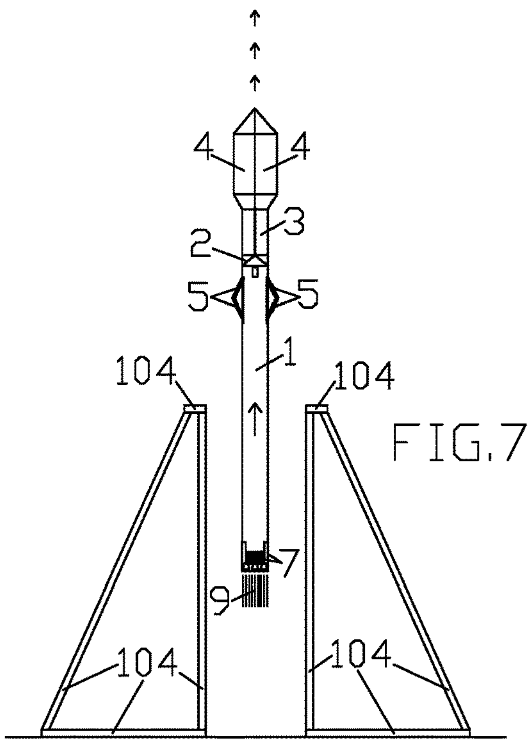
FIG.7
FIG.5
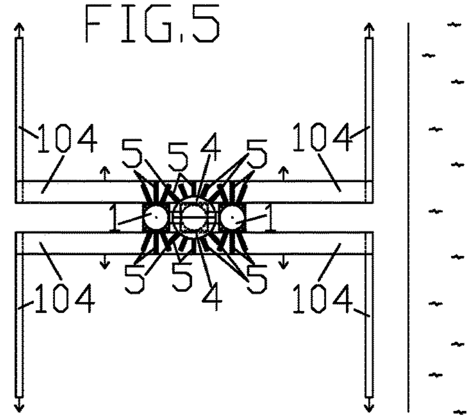
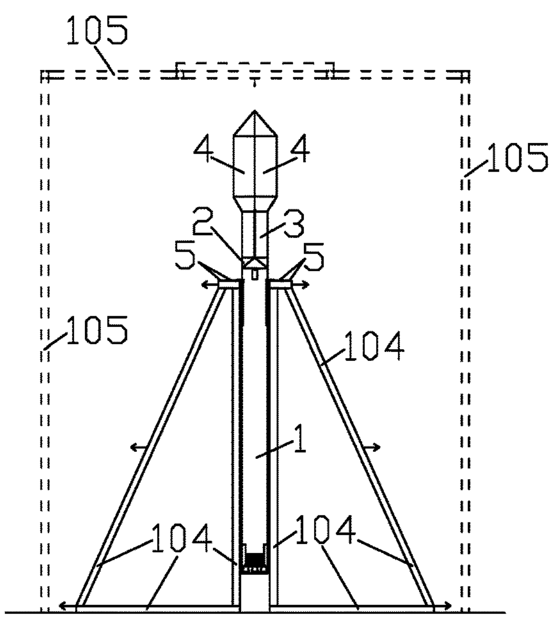
FIG.4
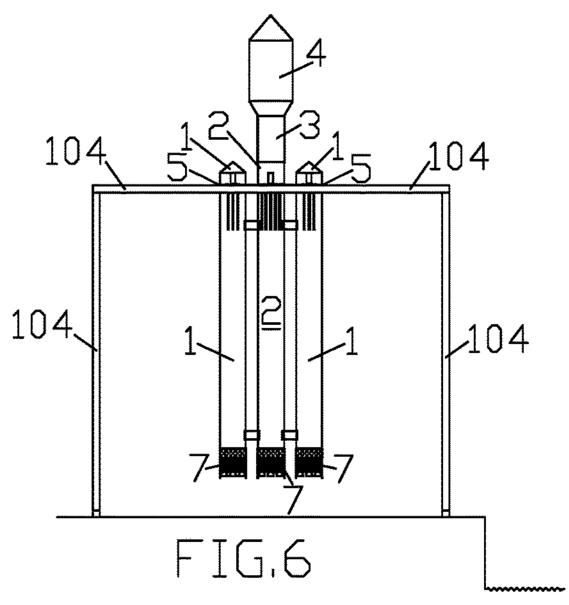
FIG.6

FIG.11
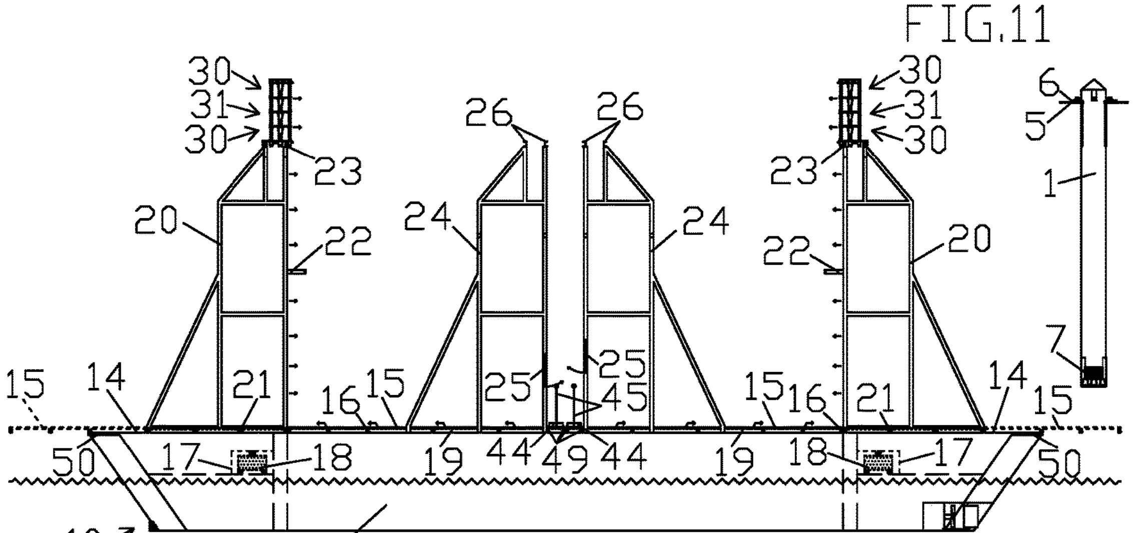
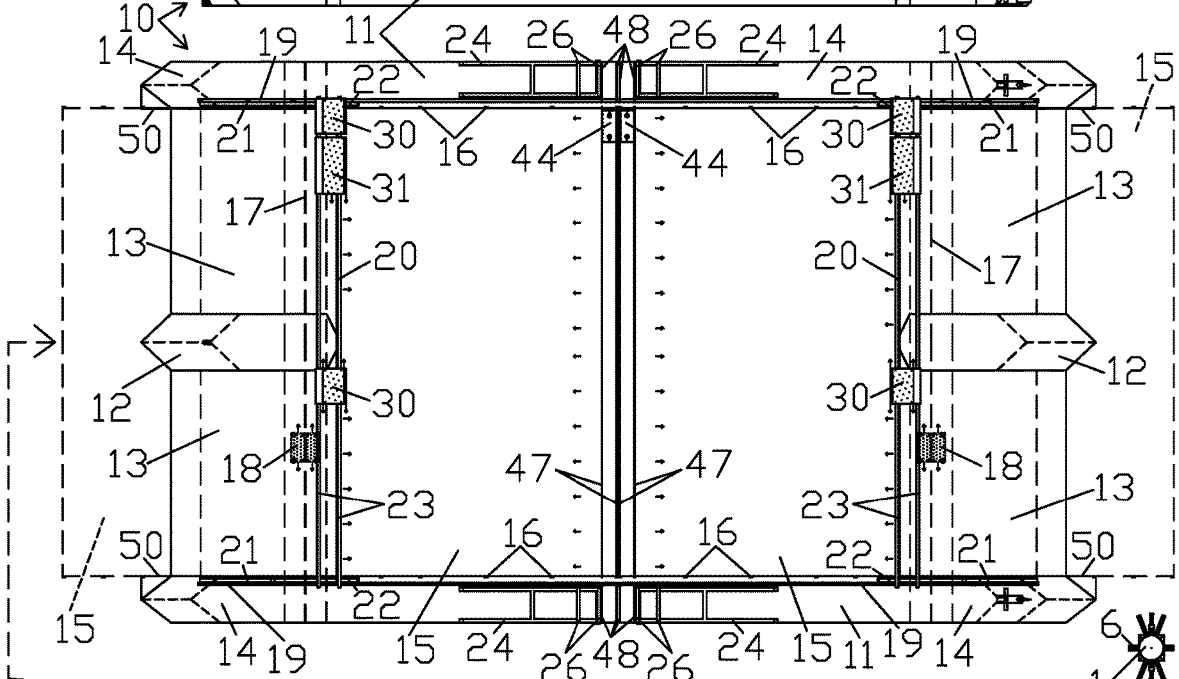
FIG.12
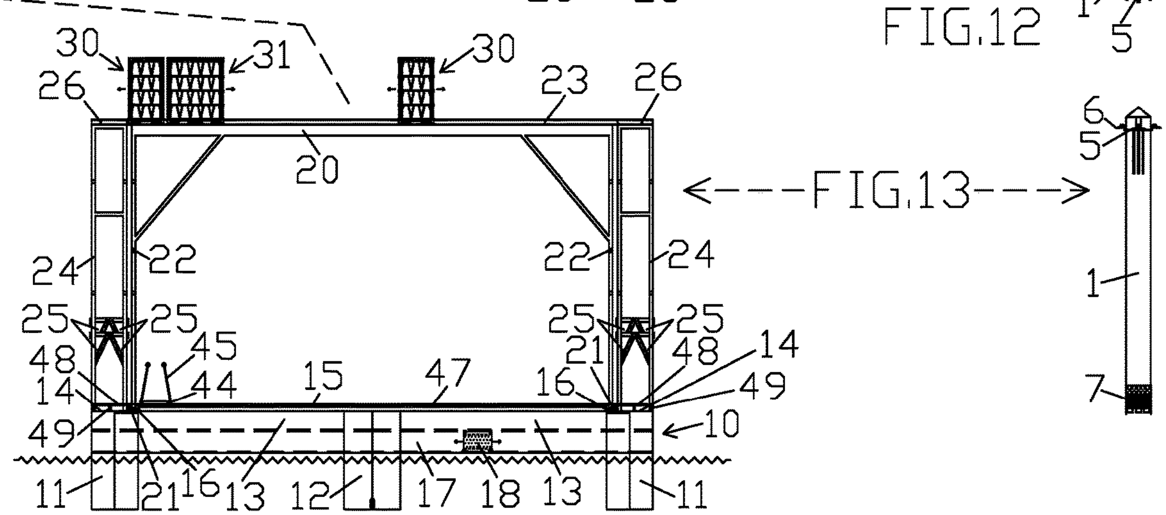
FIG.13

FIG.14
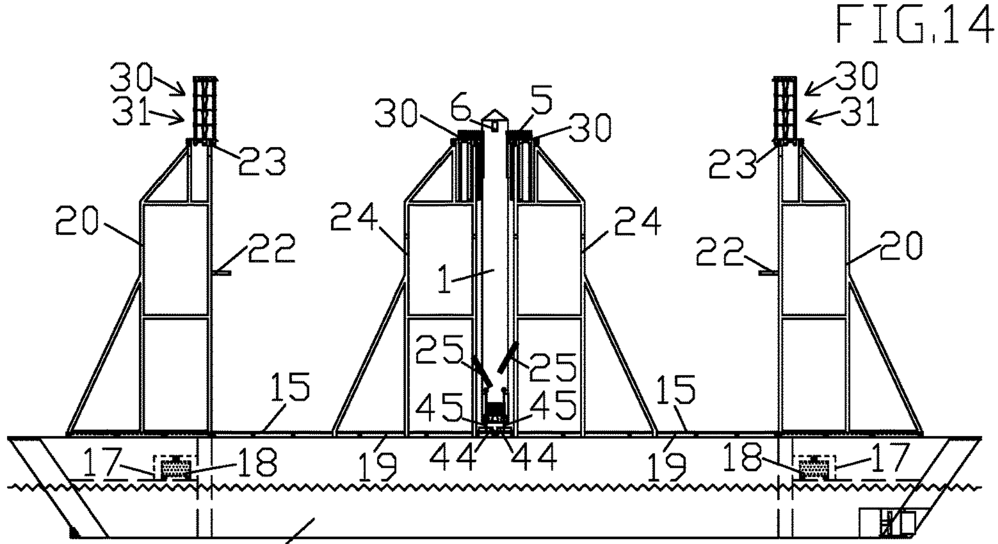
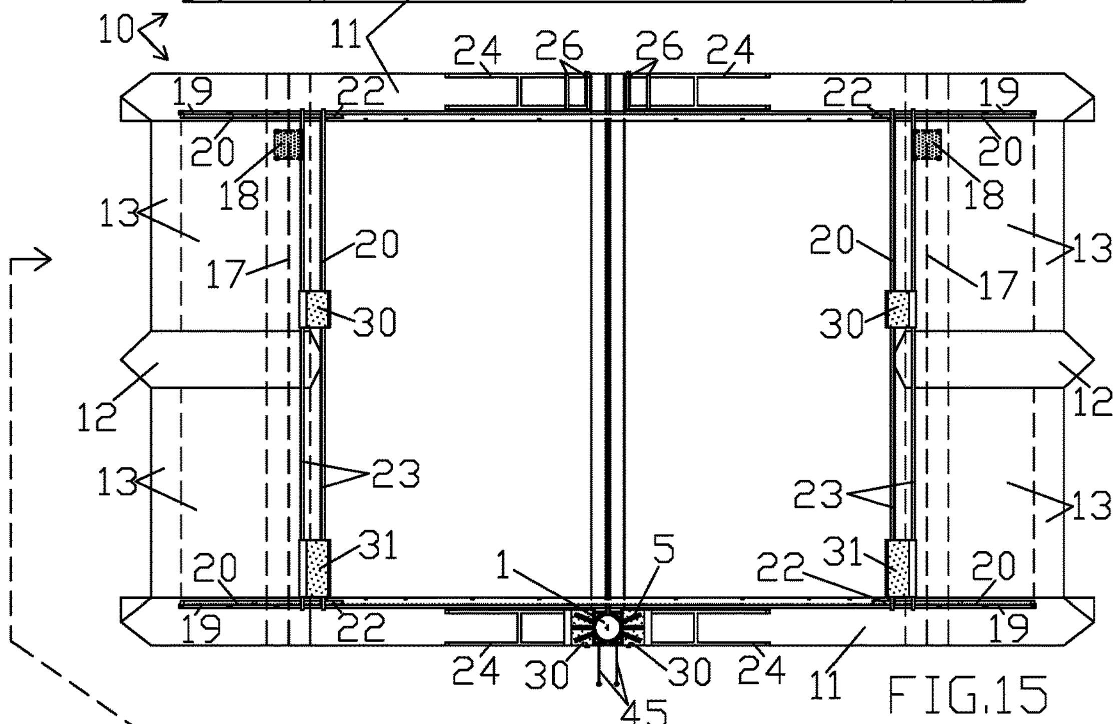
FIG.15
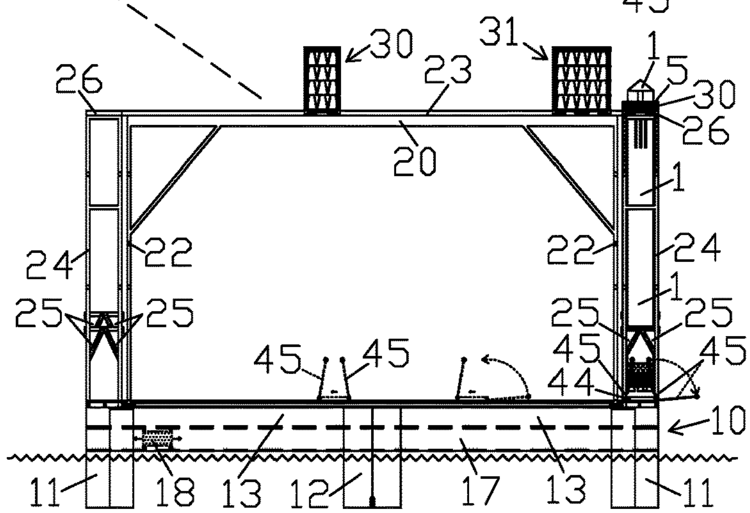
FIG.16

FIG.23
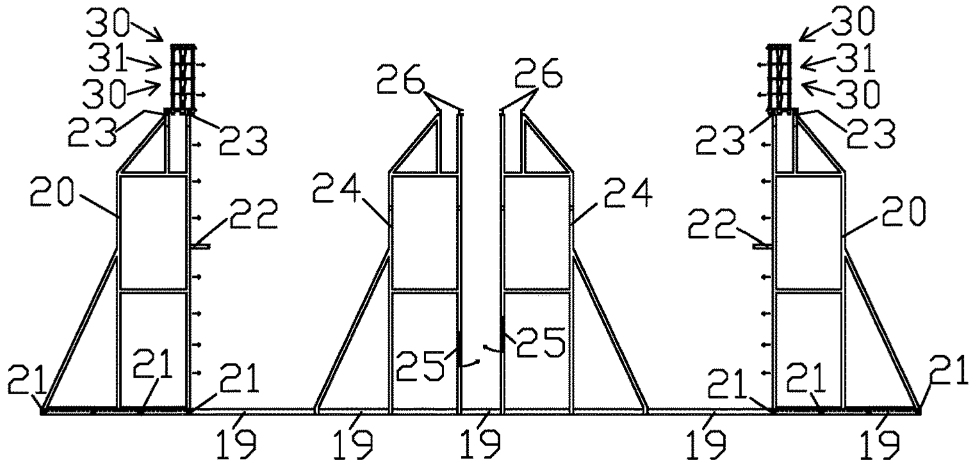
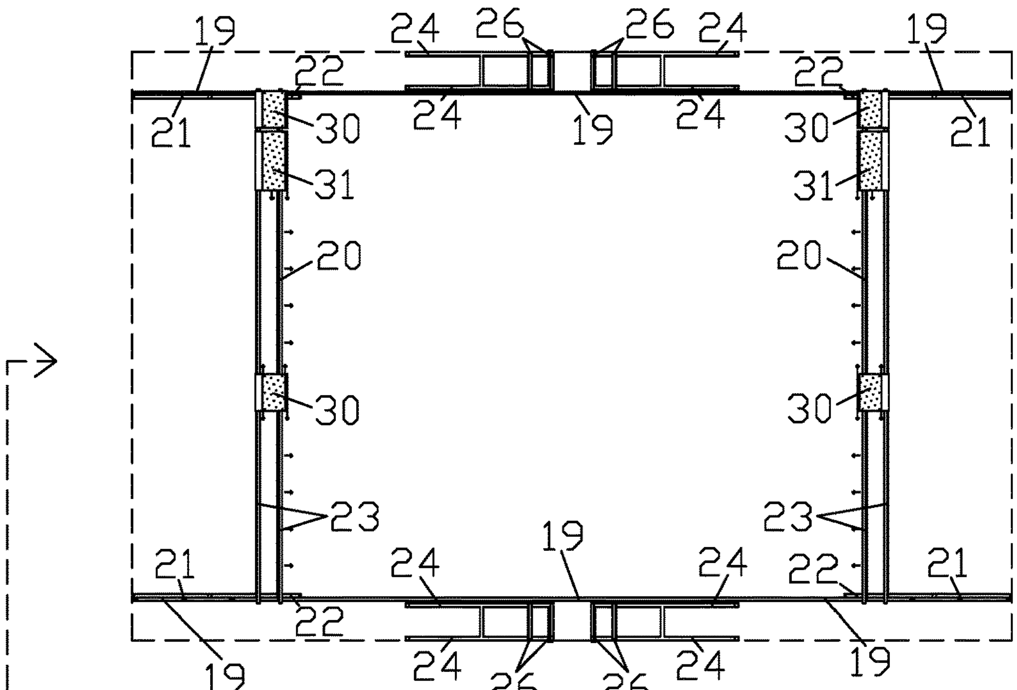
FIG.24
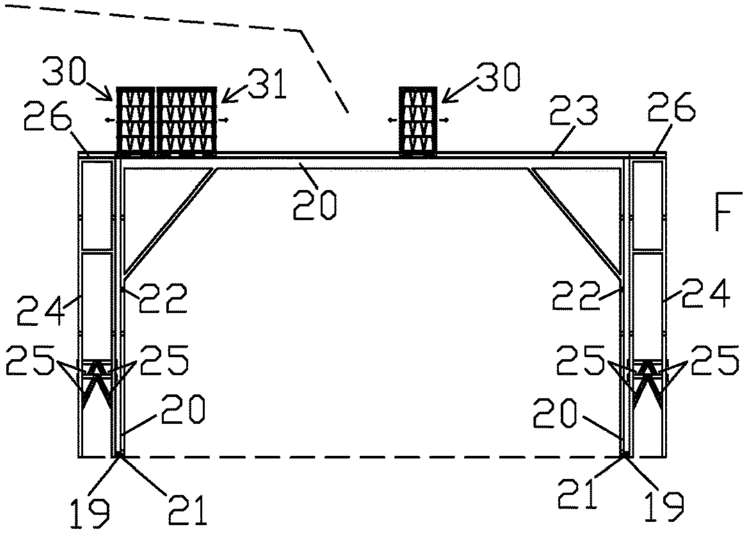
FIG.25

FIG.33
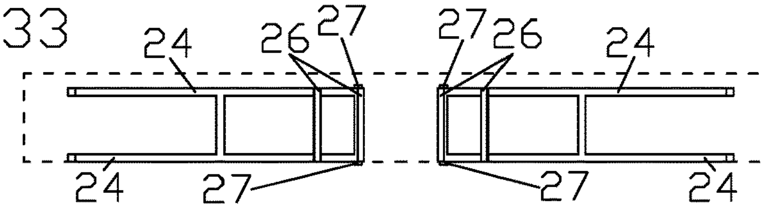
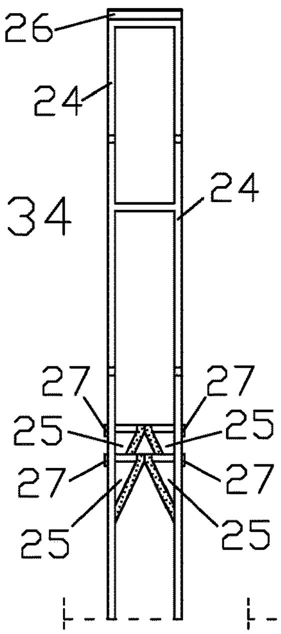
FIG.34
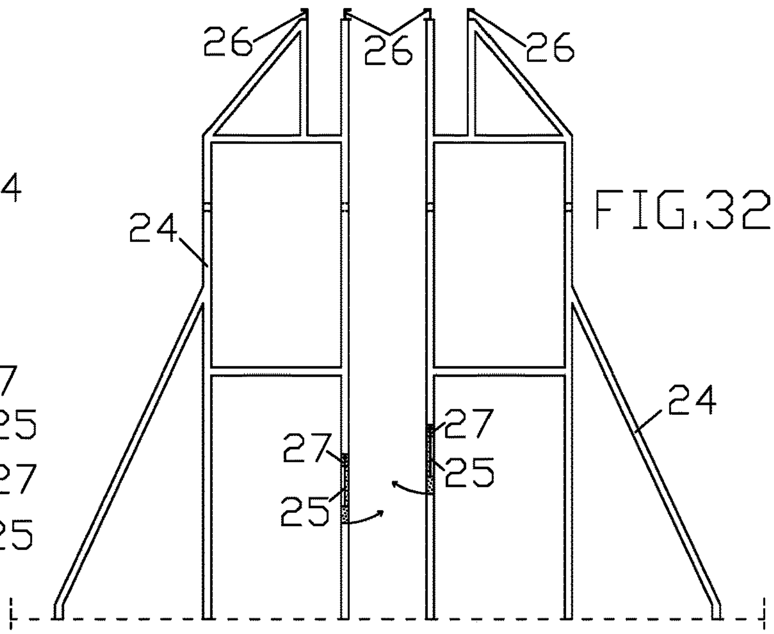
FIG.32
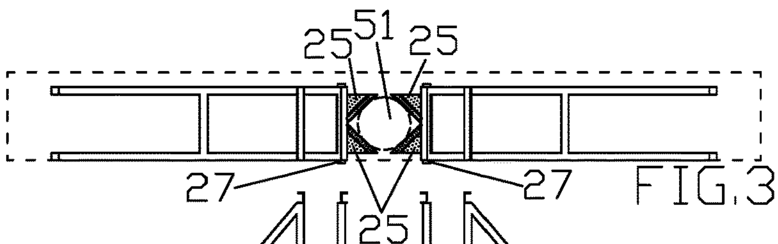
FIG.36
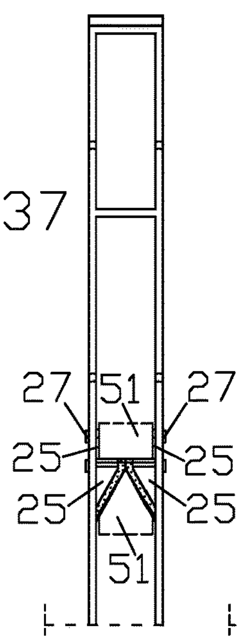
FIG.37
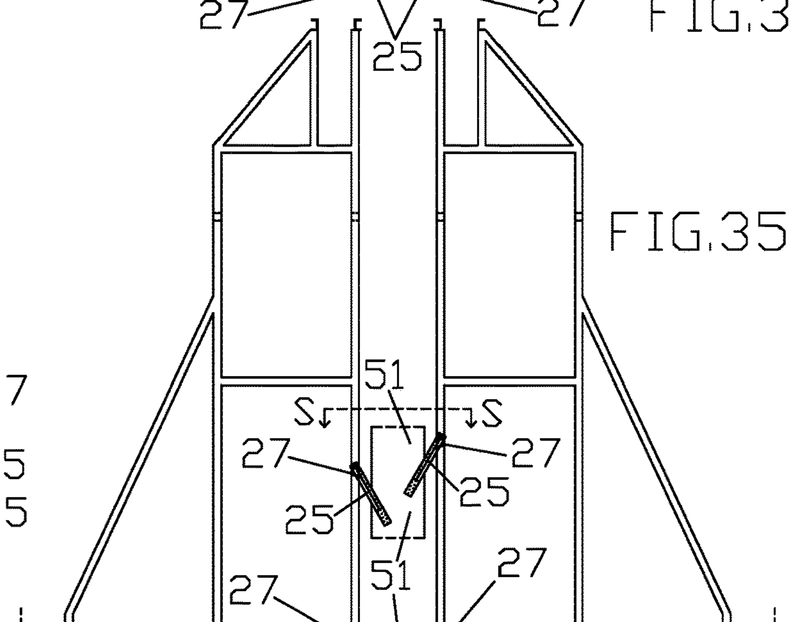
FIG.35
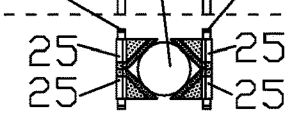
FIG.38
S-S FIG.51
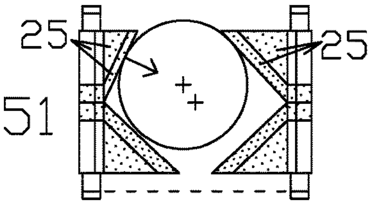
FIG.46
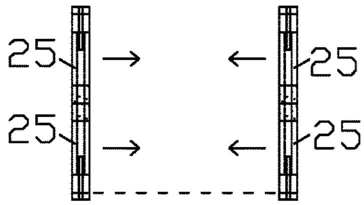
FIG.49
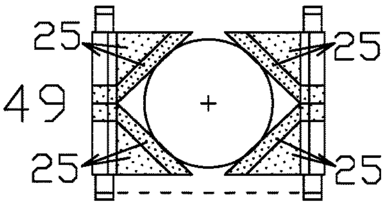
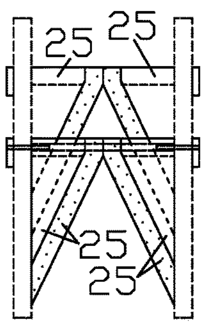
FIG.47
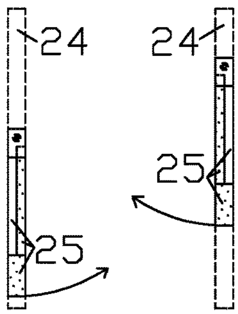
FIG.45
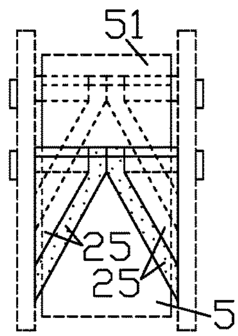
FIG.50
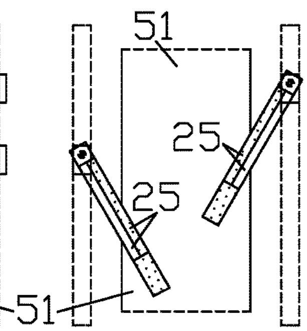
FIG.48
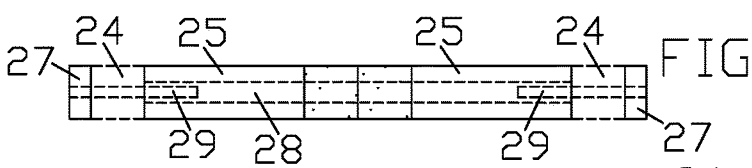
FIG.53
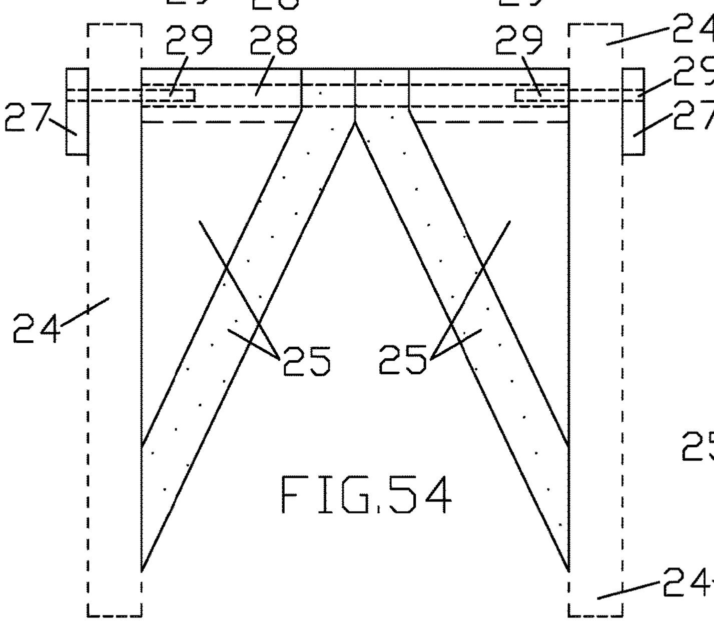
FIG.54
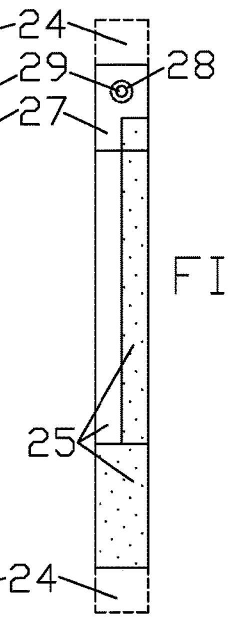
FIG.52

FIG.56
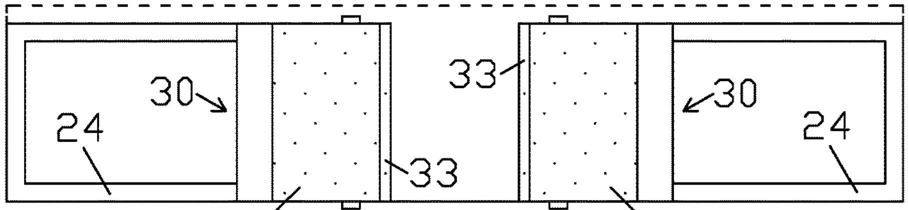
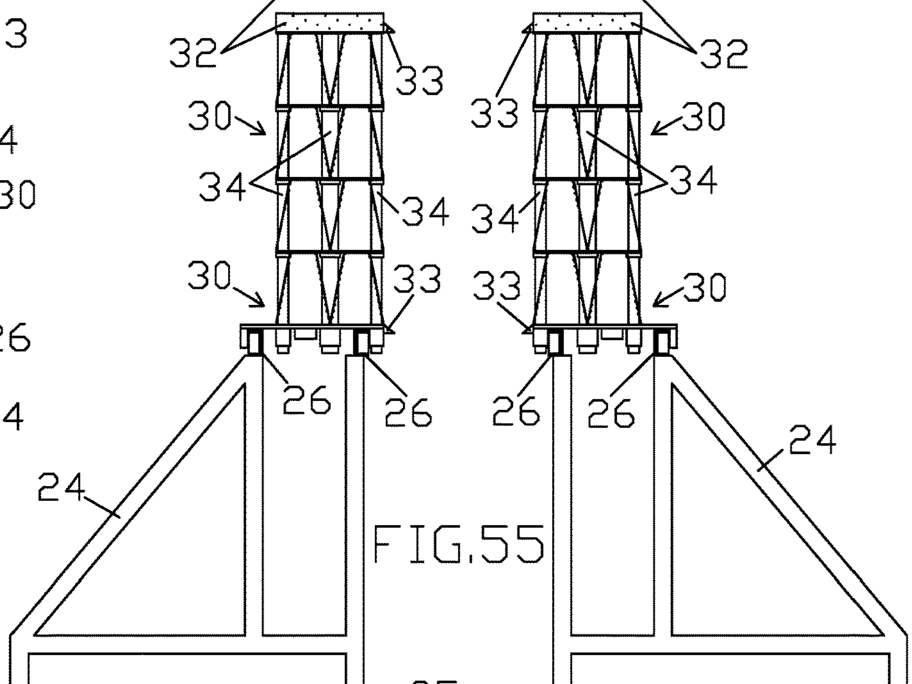
FIG.57
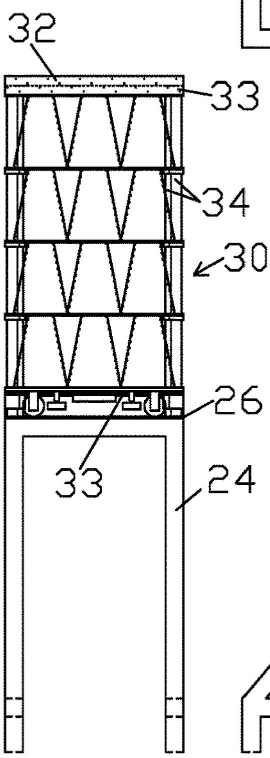
FIG.55
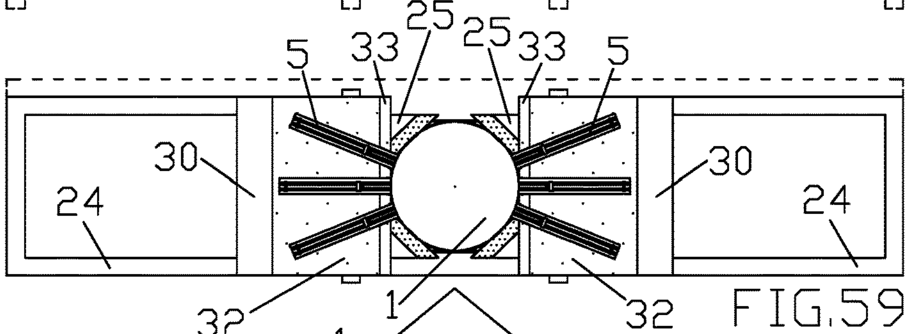
FIG.59
FIG.60
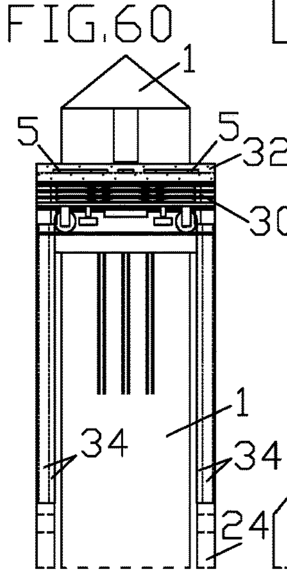
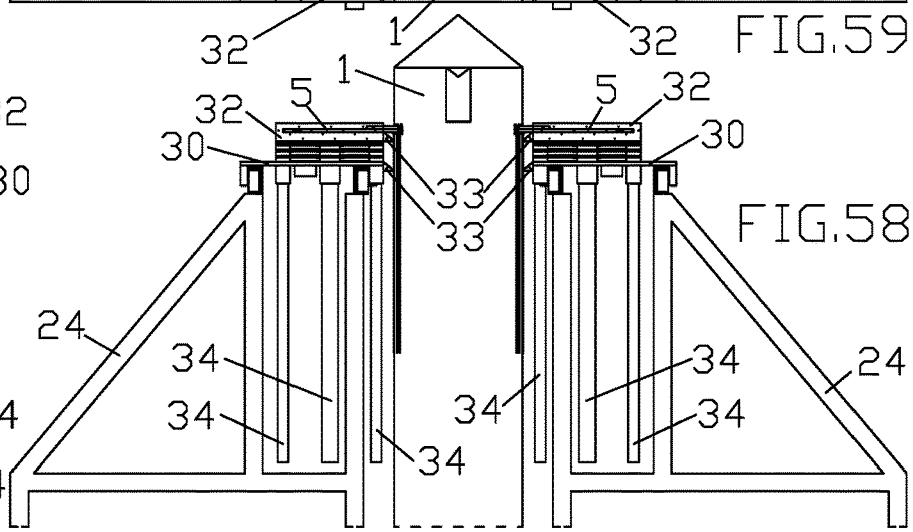
FIG.58

FIG.68
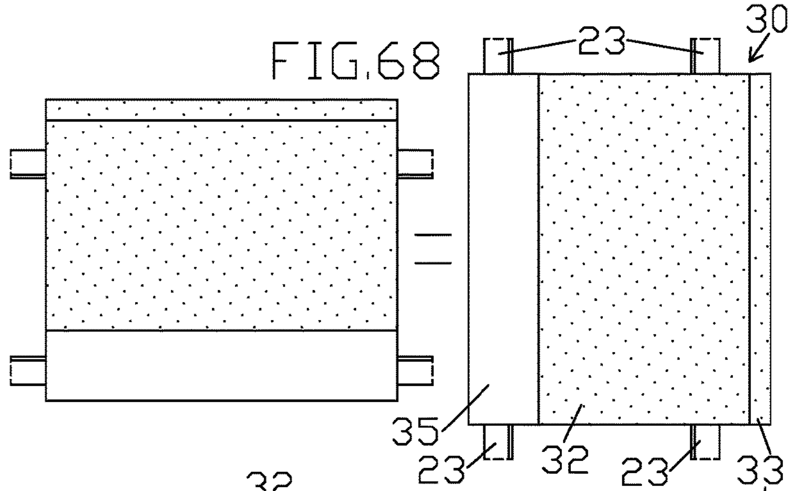
FIG.69
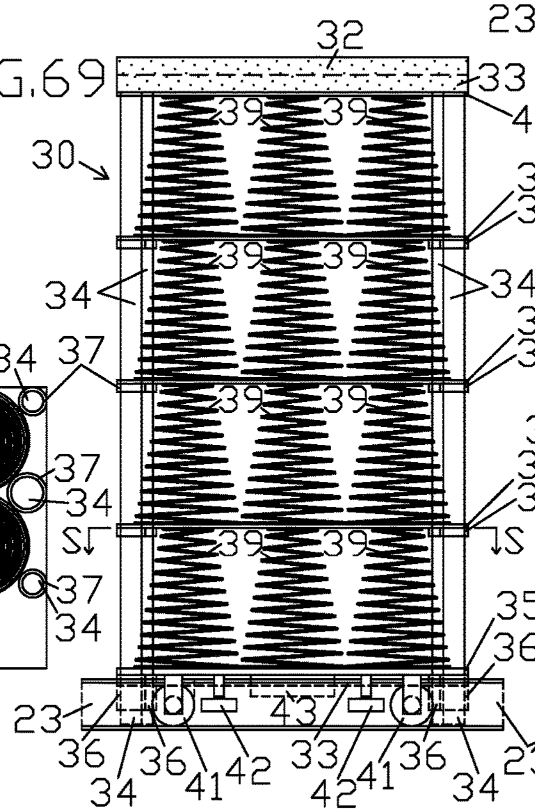
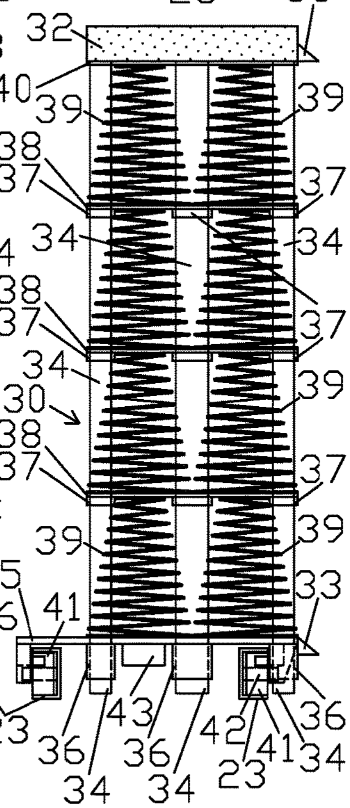
FIG.67
FIG.71
S-S
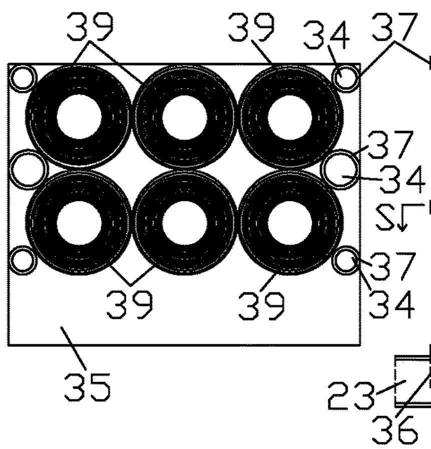
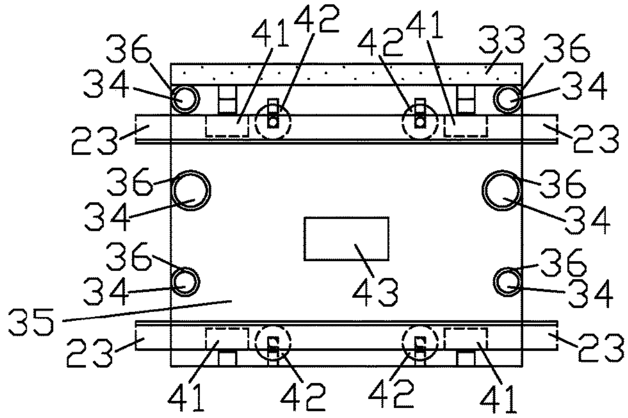
FIG.70

FIG.73
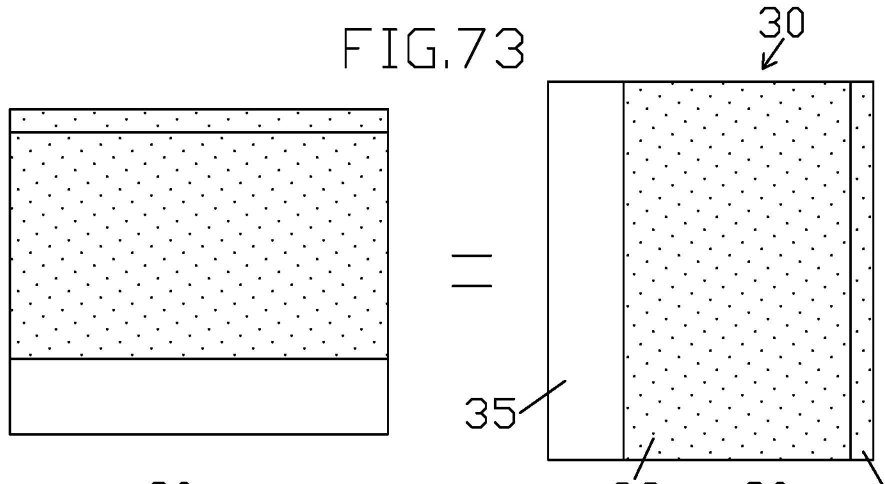
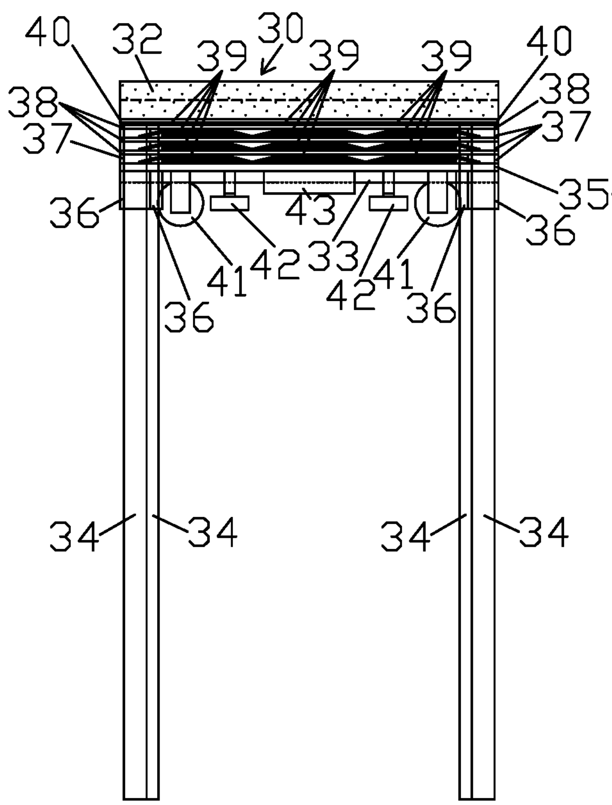
FIG.74
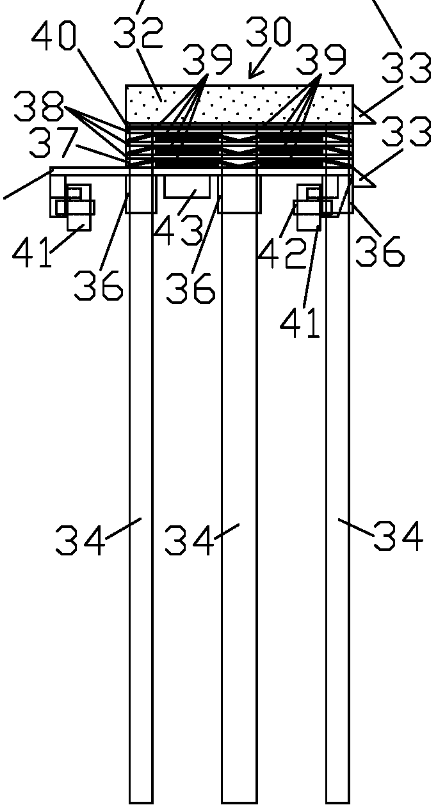
FIG.72

FIG. 79
S-S
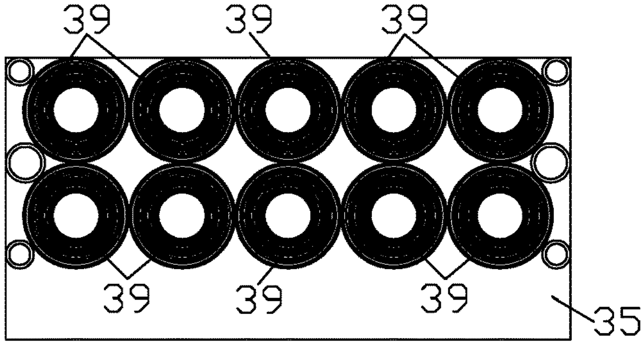
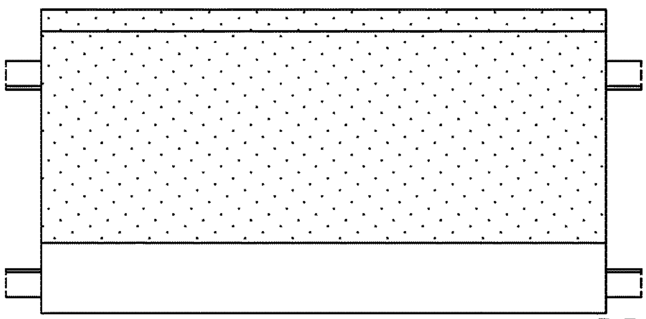
FIG. 76
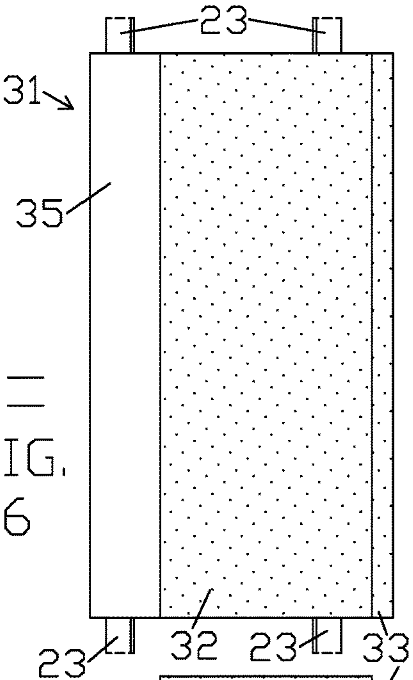
FIG. 77
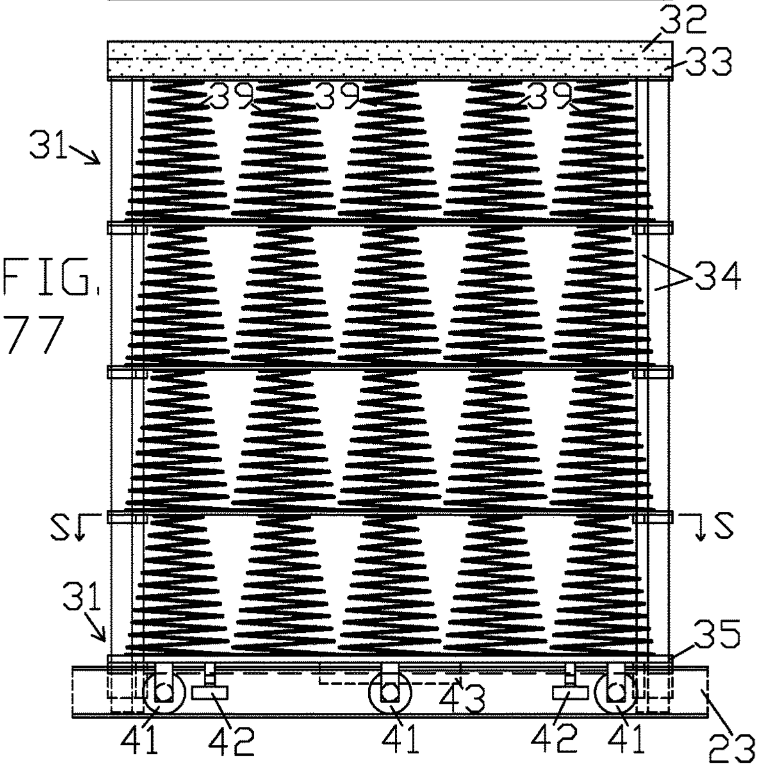
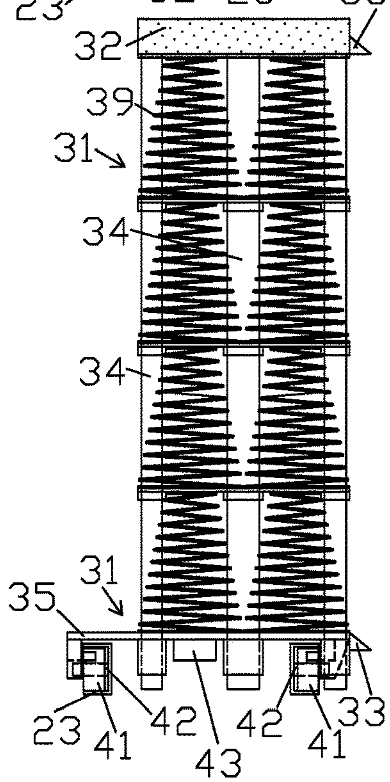
FIG. 75
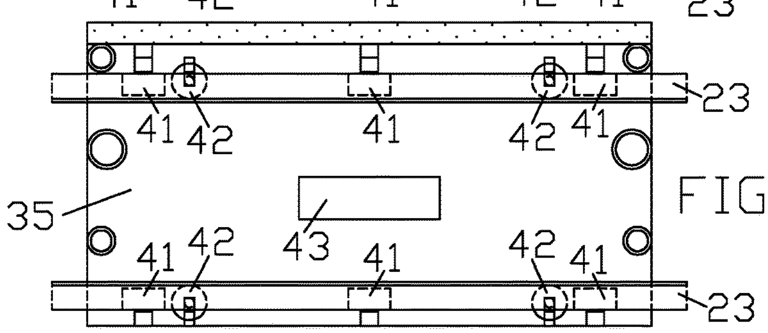
FIG. 78

FIG.80
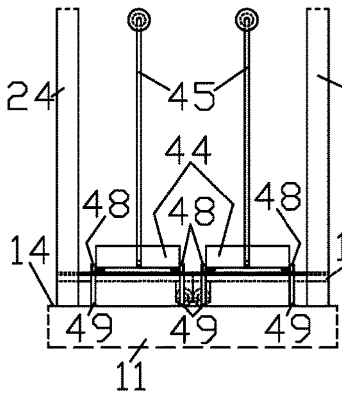
FIG.82
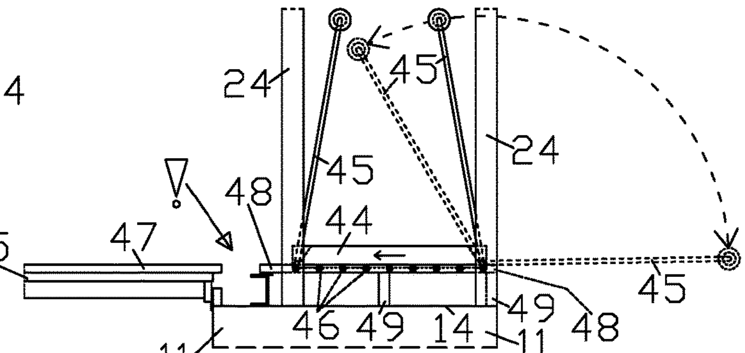
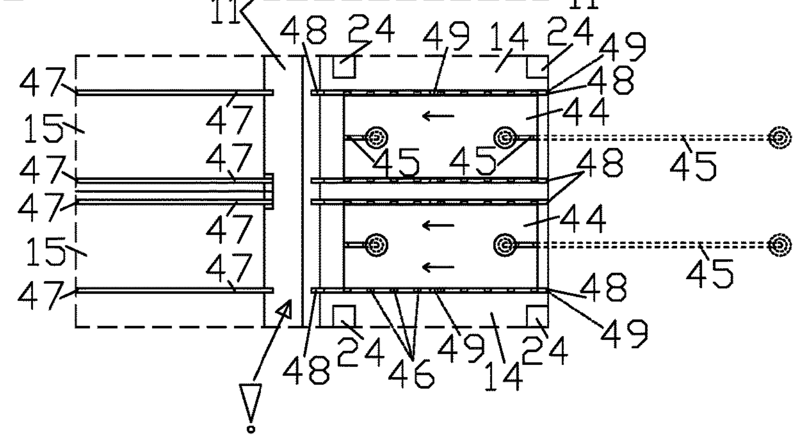
FIG.81
FIG.83
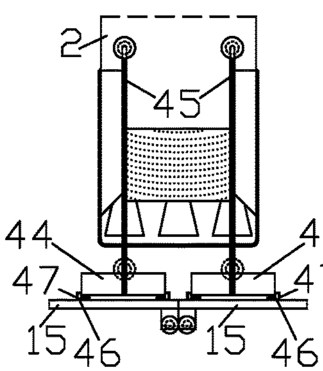
FIG.85
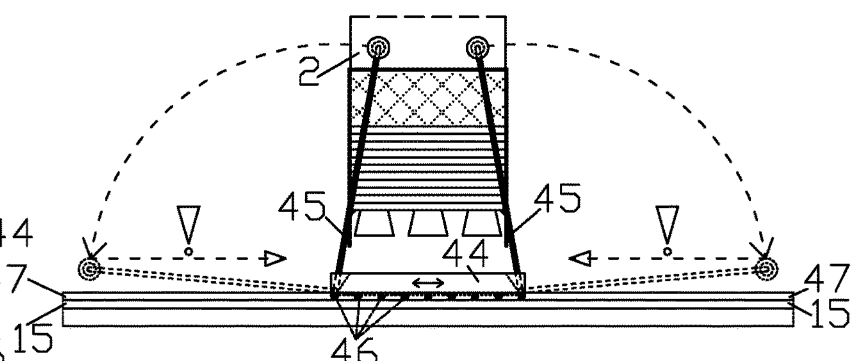
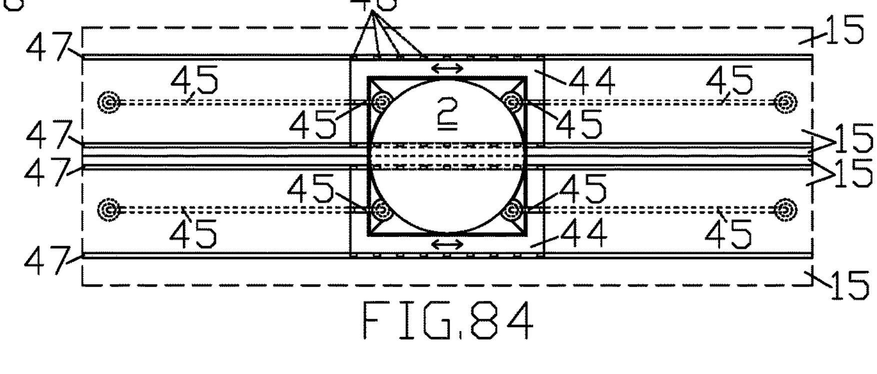
FIG.84

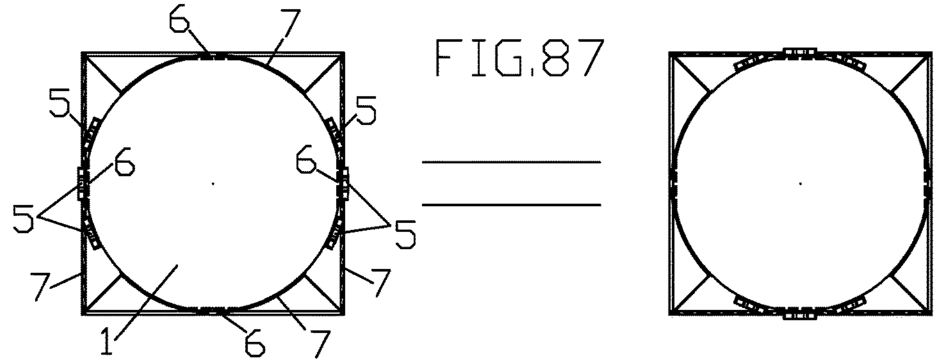
FIG.87
FIG.86A
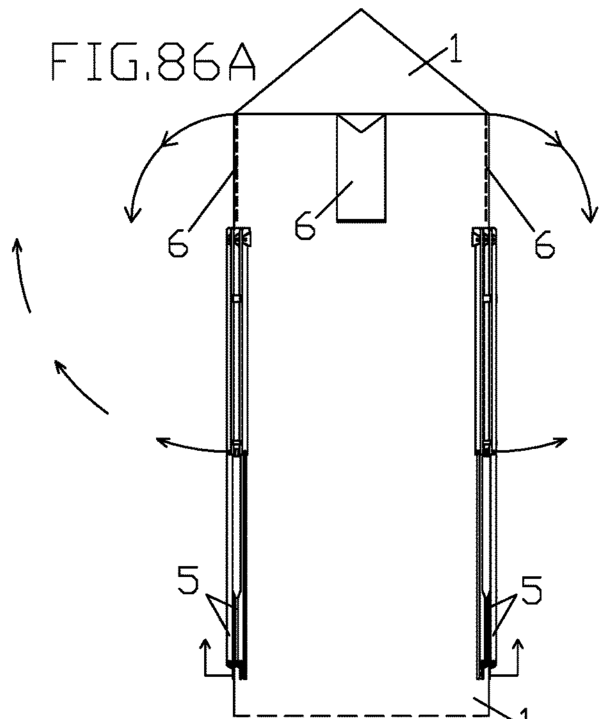
FIG.88A
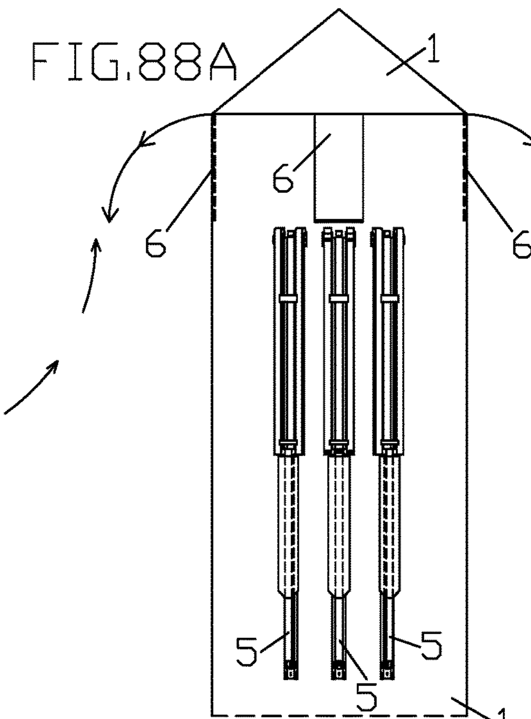
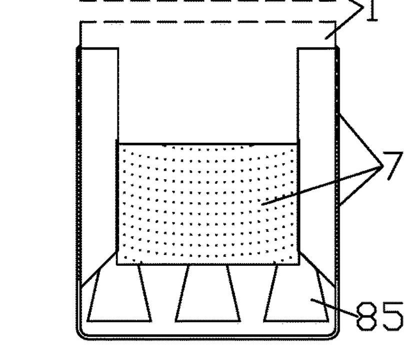
FIG.86B
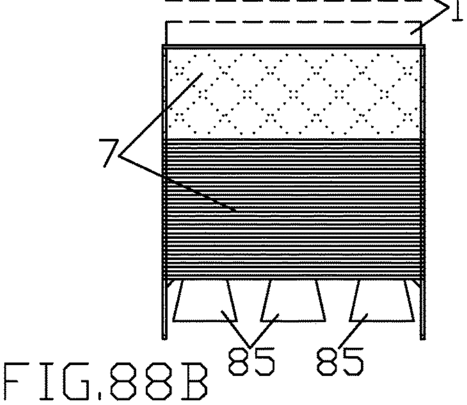
FIG.88B

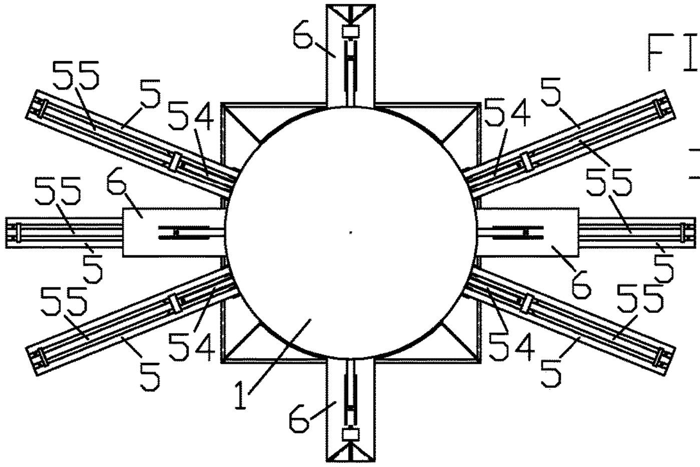
FIG.92
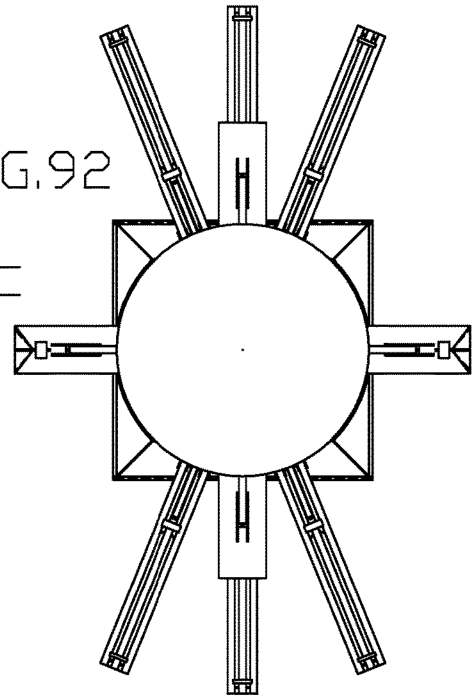
FIG.91A
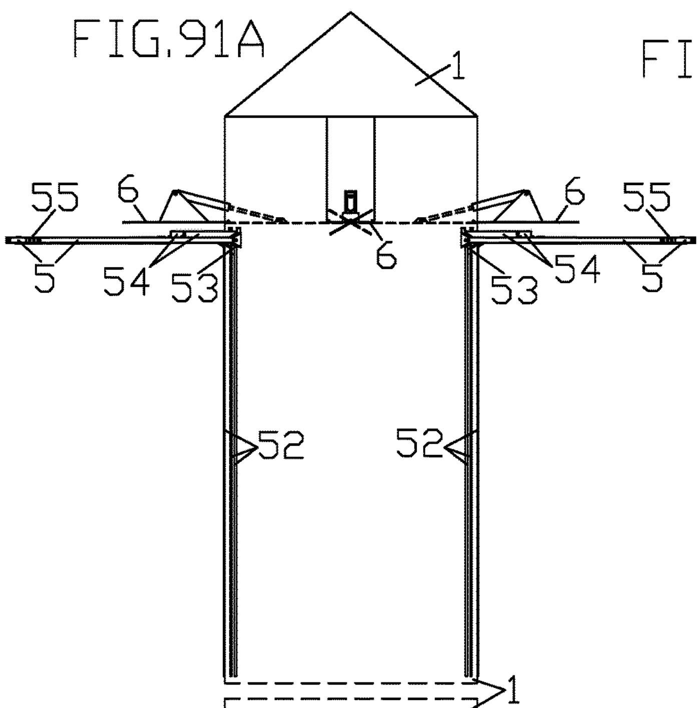
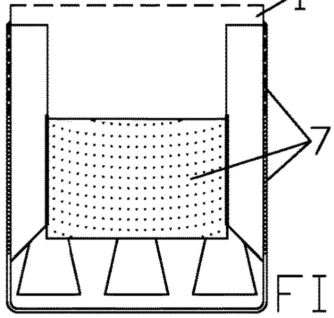
FIG.91B
FIG.93A
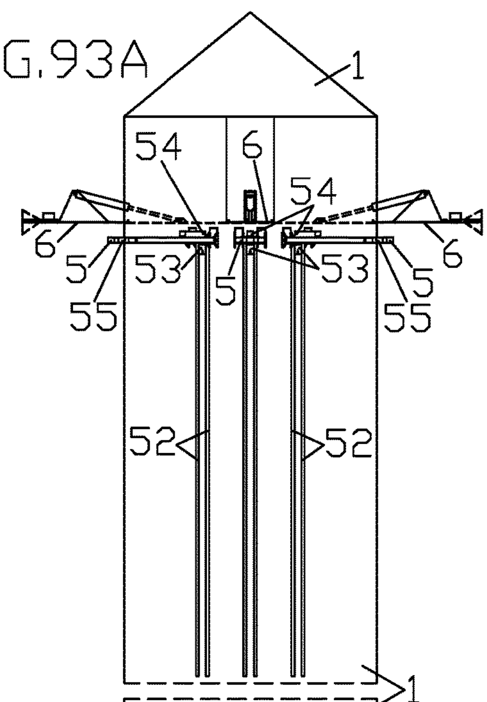
FIG.93B
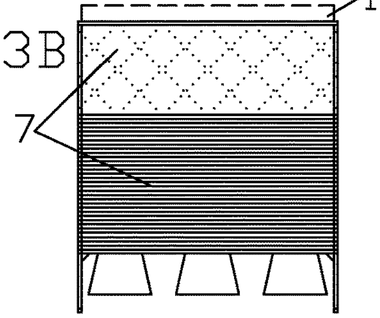

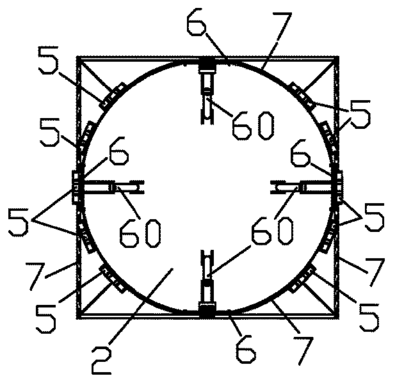
FIG.95
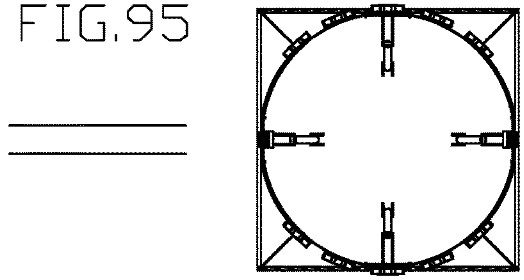
FIG.94A
FIG.96A
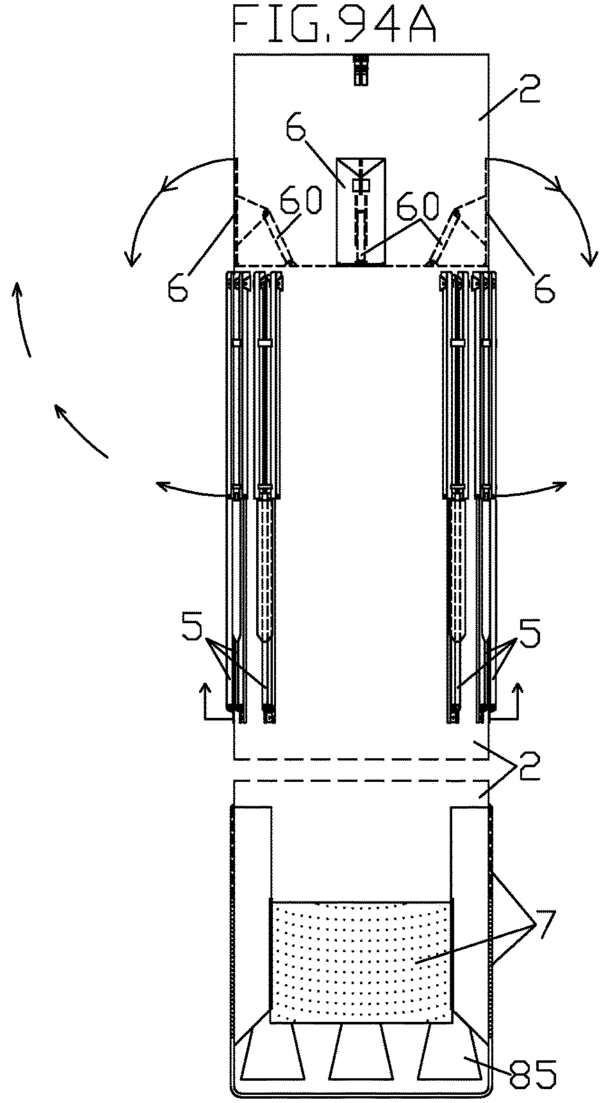
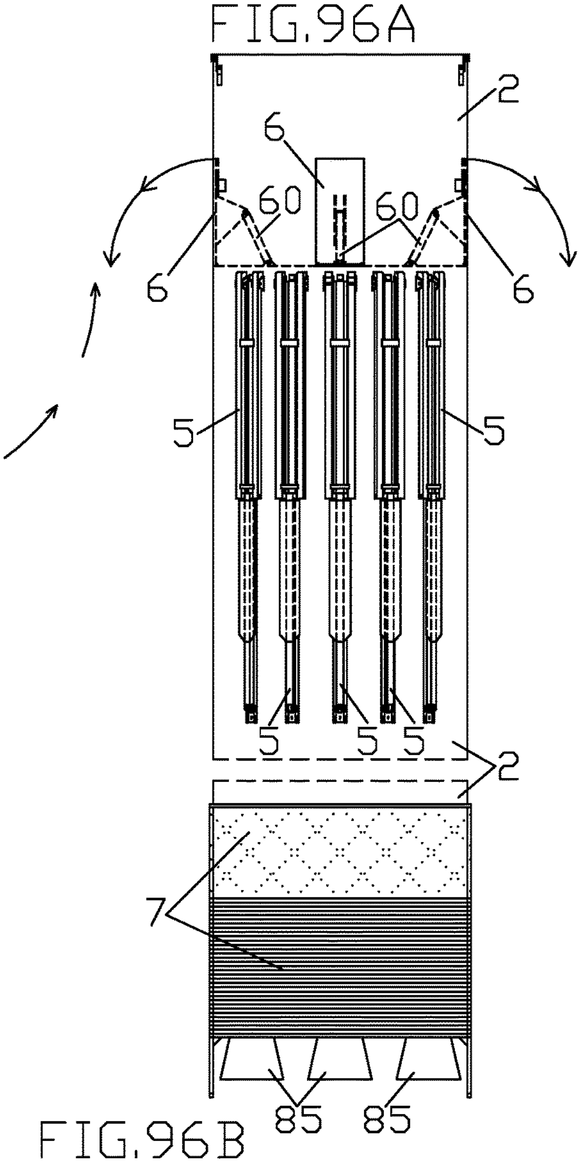
FIG.94B
FIG.96B FIG.98
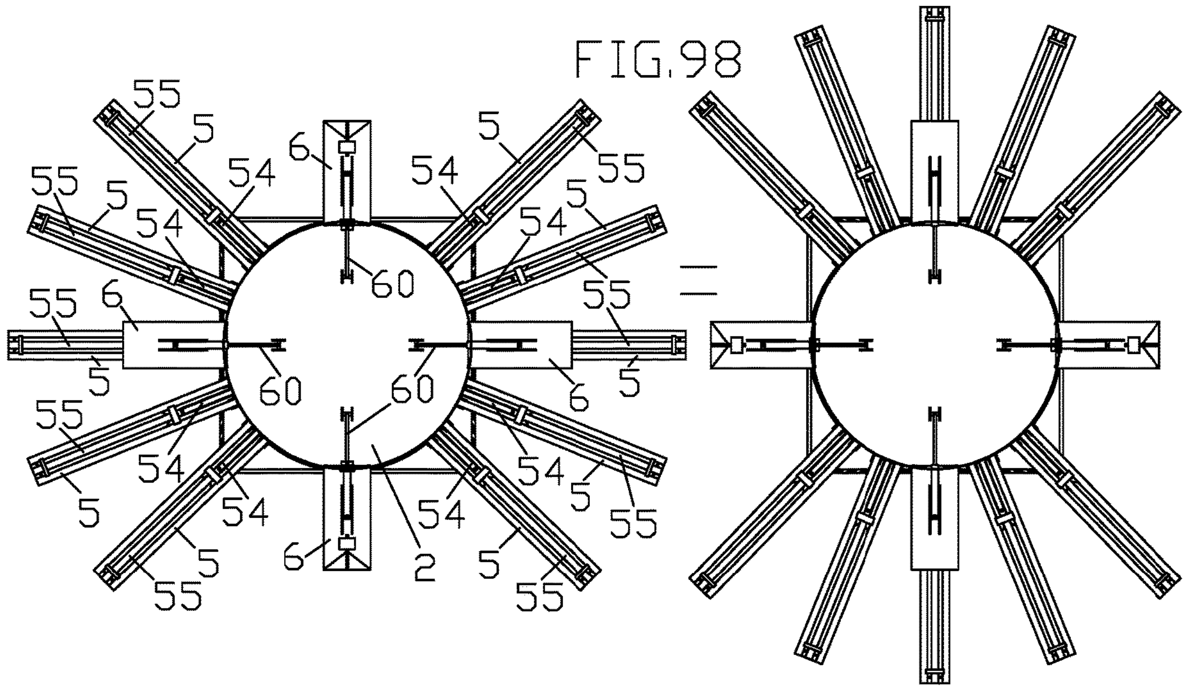
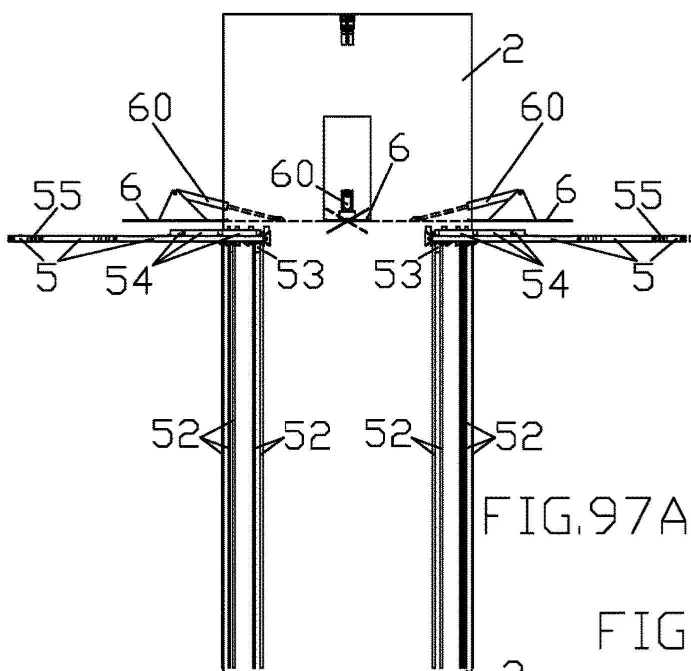
FIG.97A
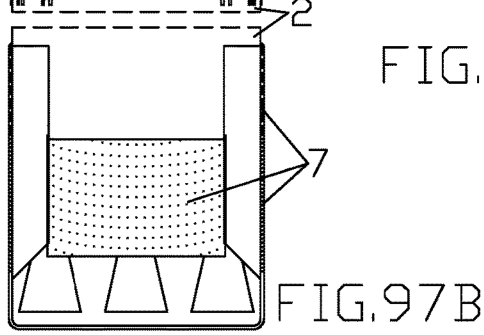
FIG.97B
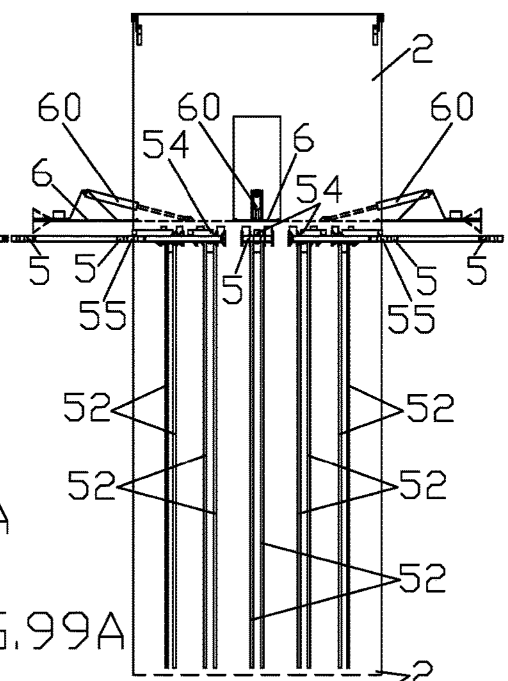
FIG.99A
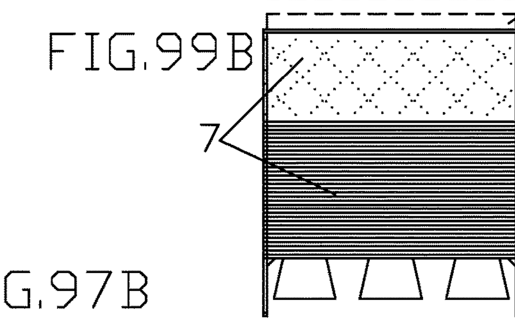
FIG.99B

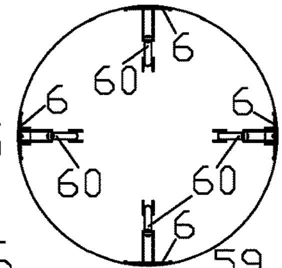
FIG.105
FIG.104
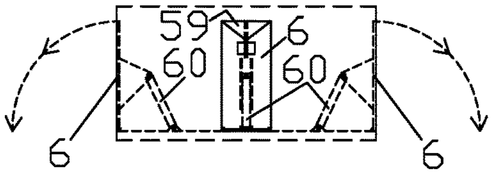
FIG.106
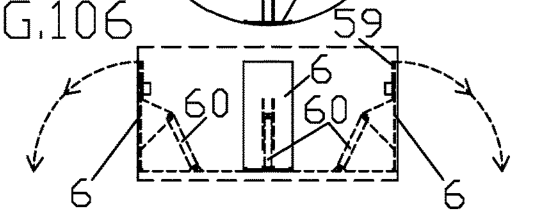
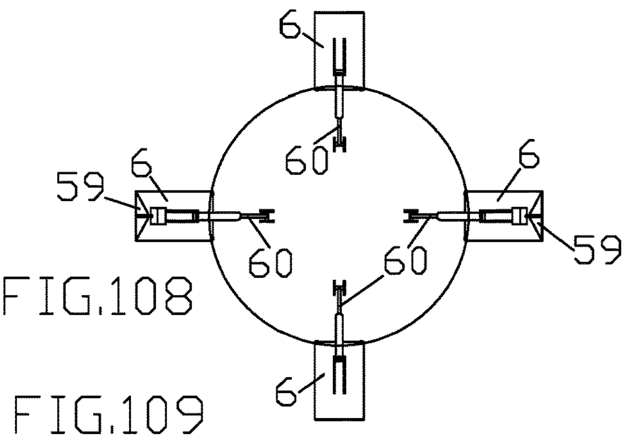
FIG.108
FIG.107
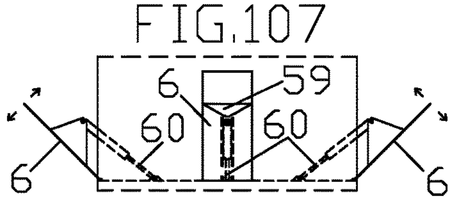
FIG.109
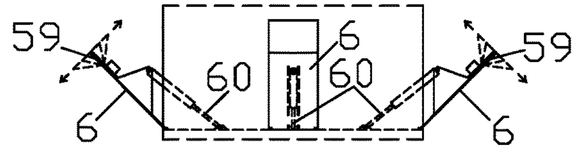
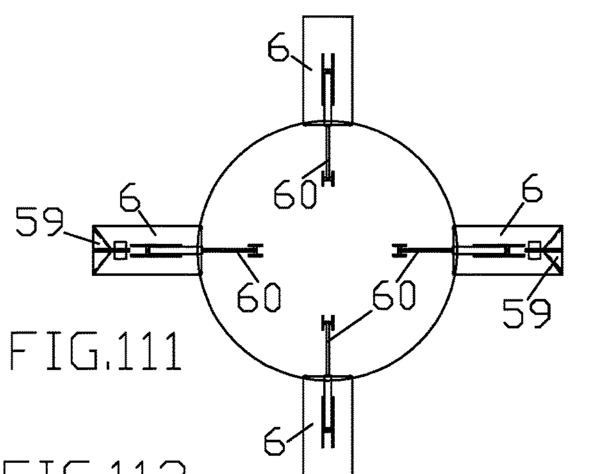
FIG.111
FIG.110
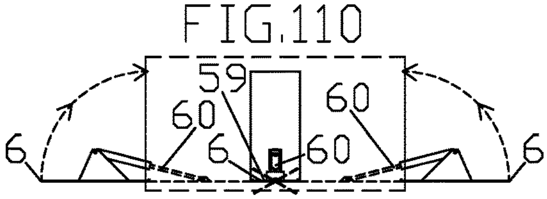
FIG.112
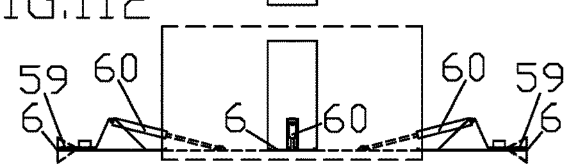

FIG.114
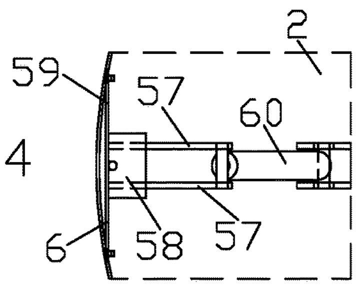
FIG.115
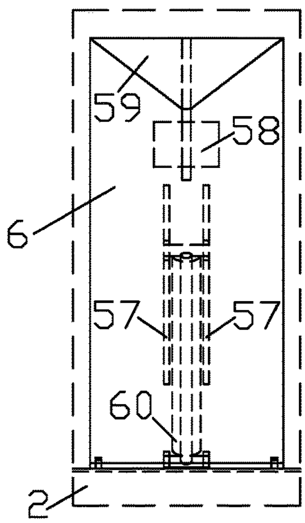
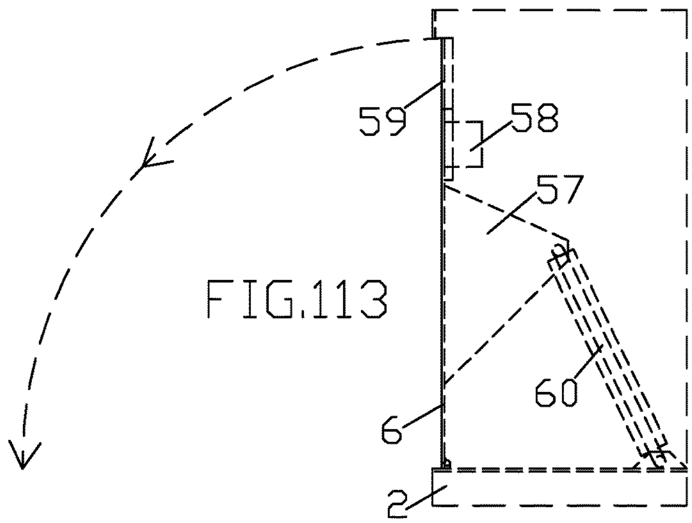
FIG.113
FIG.117
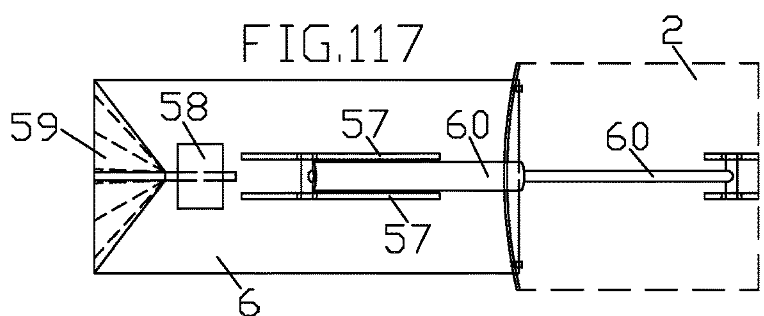
FIG.118
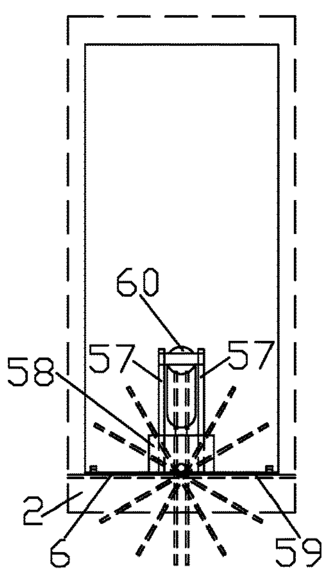
FIG.116
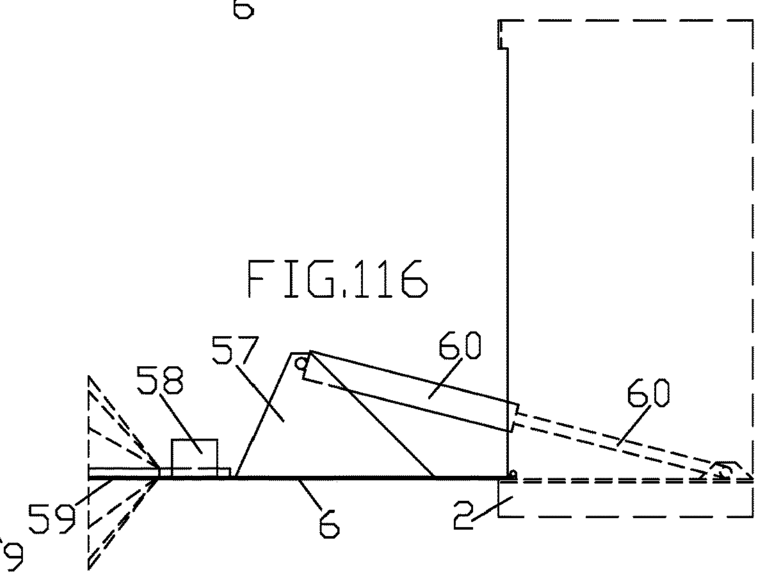

FIG.120
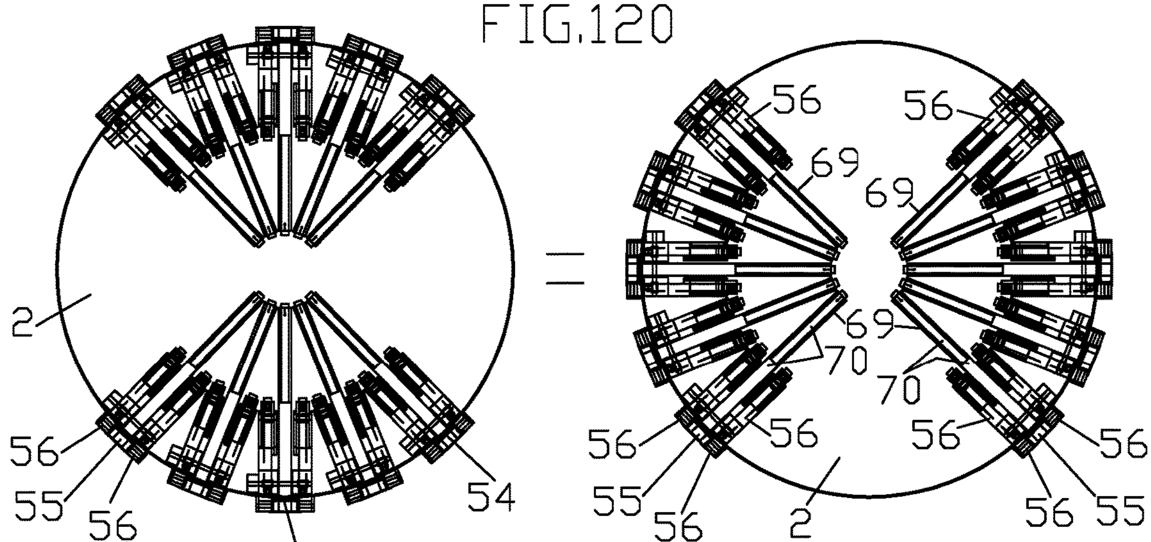
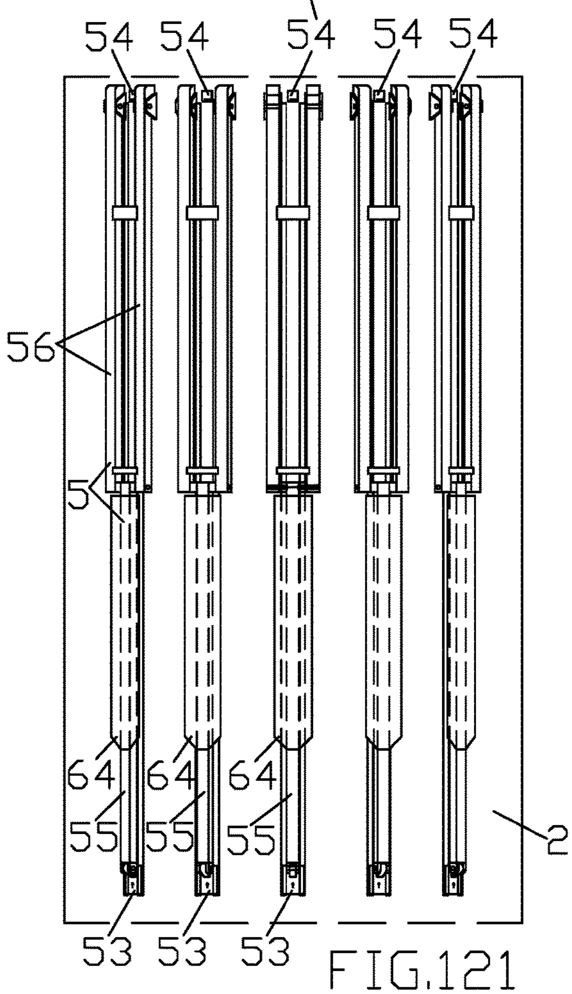
FIG.121
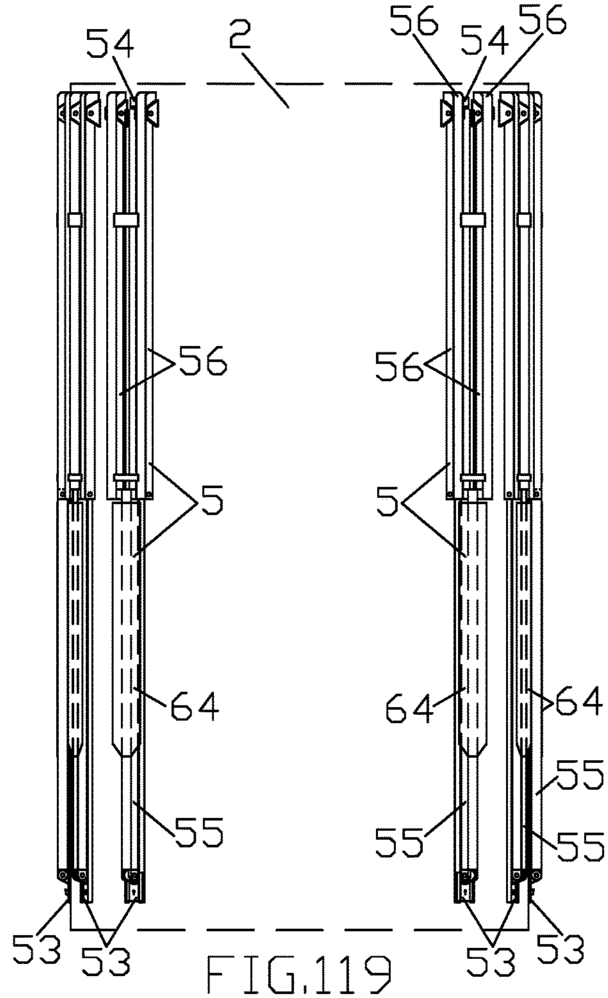
FIG.119

FIG.123
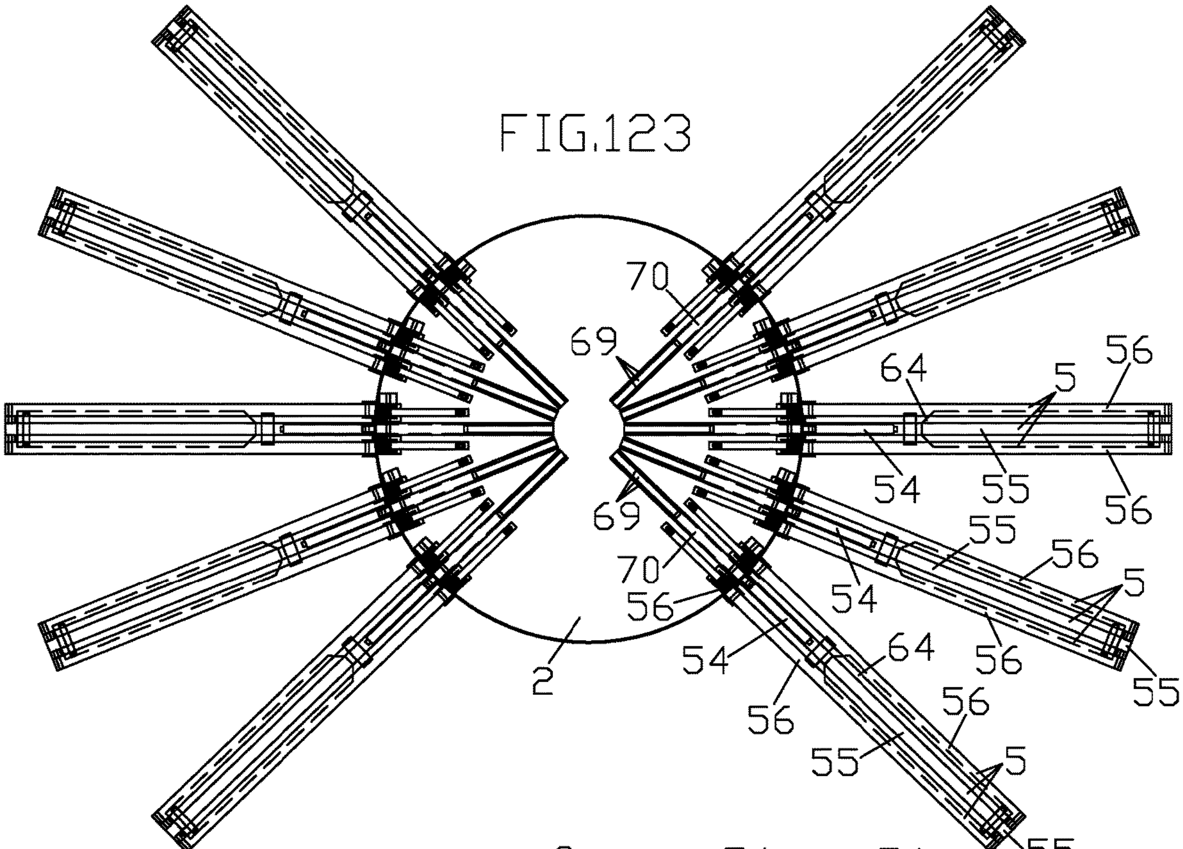
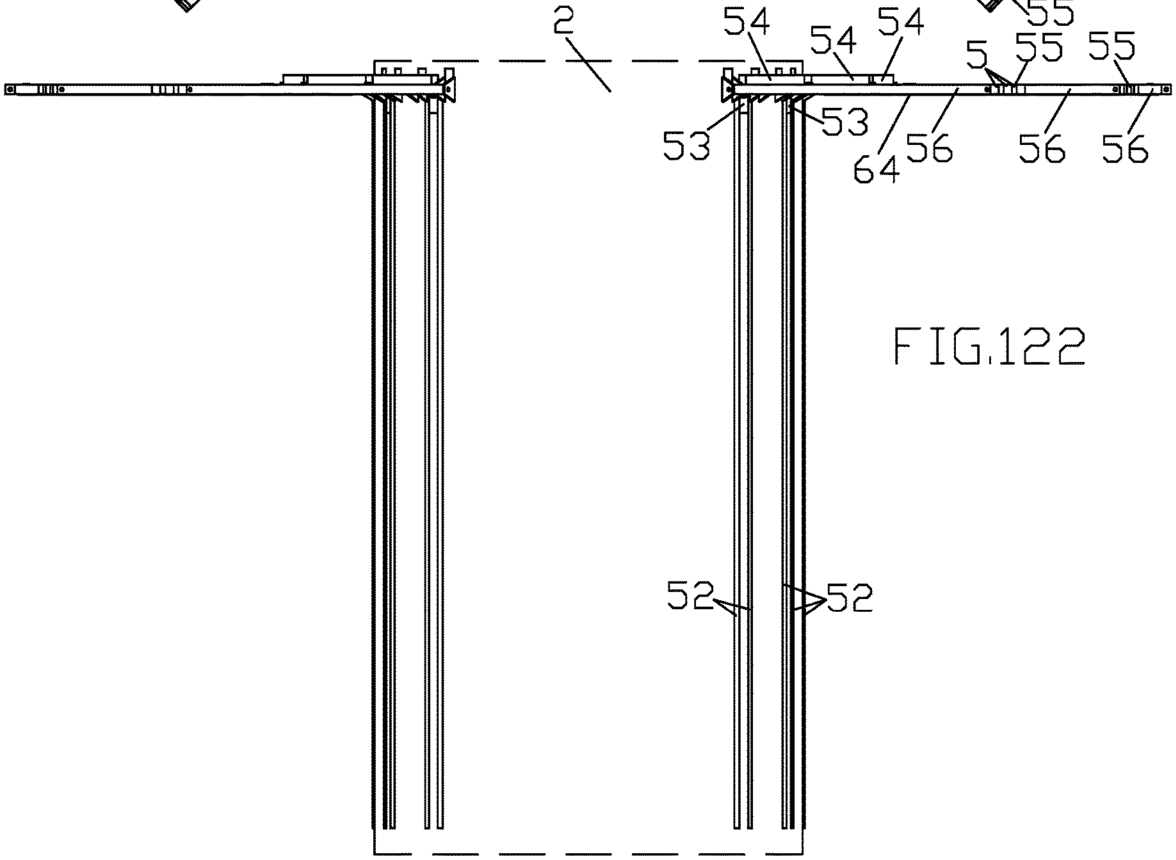
FIG.122

72
56
80
63
69
70
54
71
61
65
P1
64
52
55
67
68
66
53
81

FIG.133
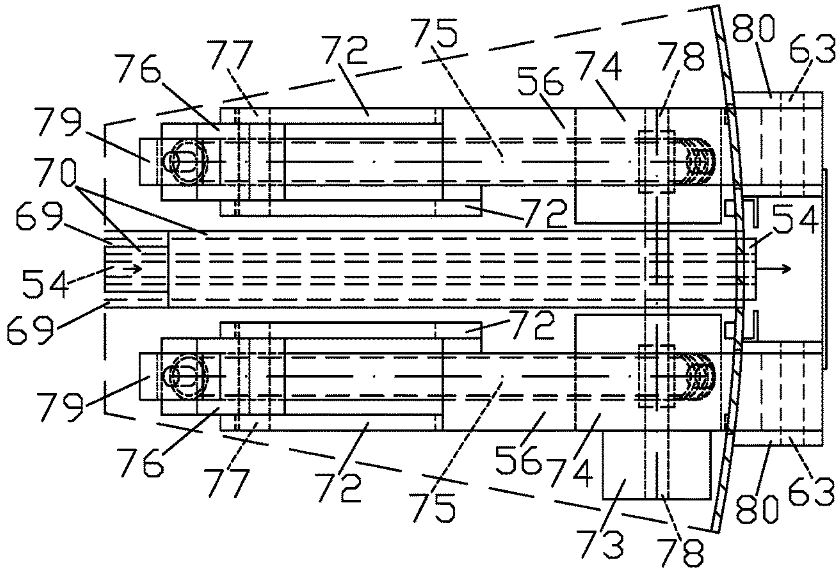
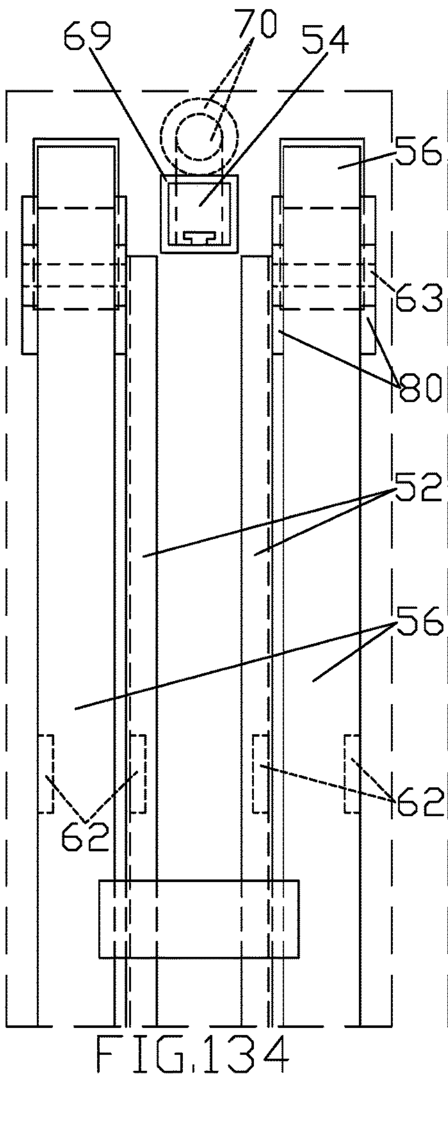
FIG.134
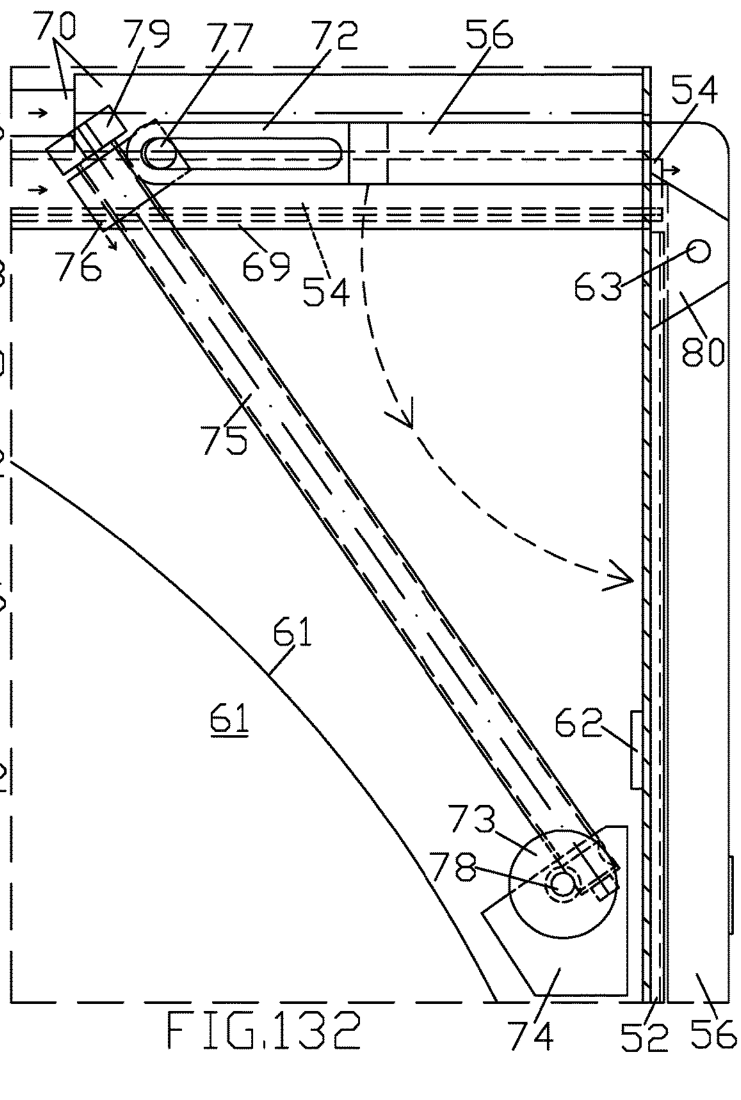
FIG.132

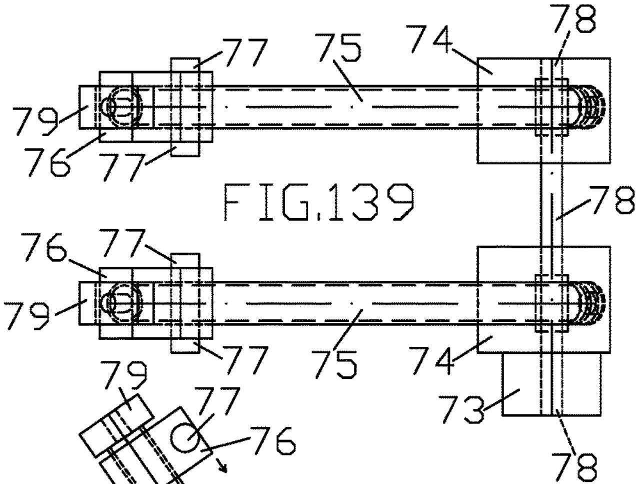
FIG.139
FIG.140
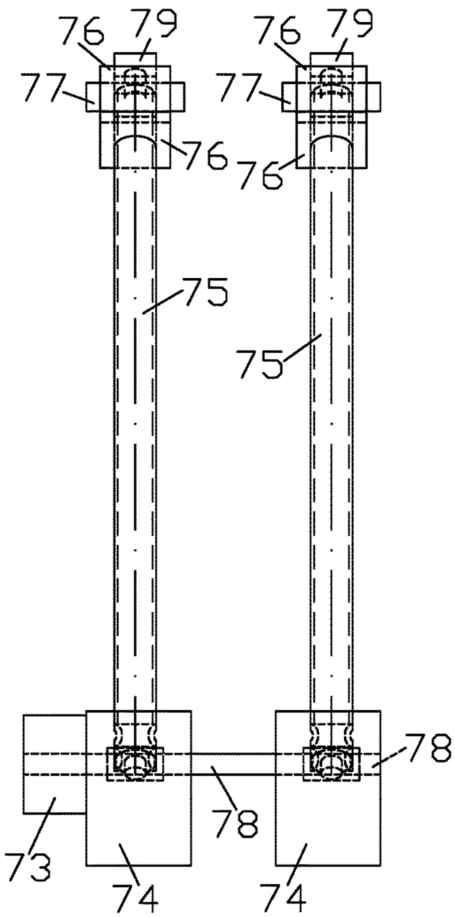
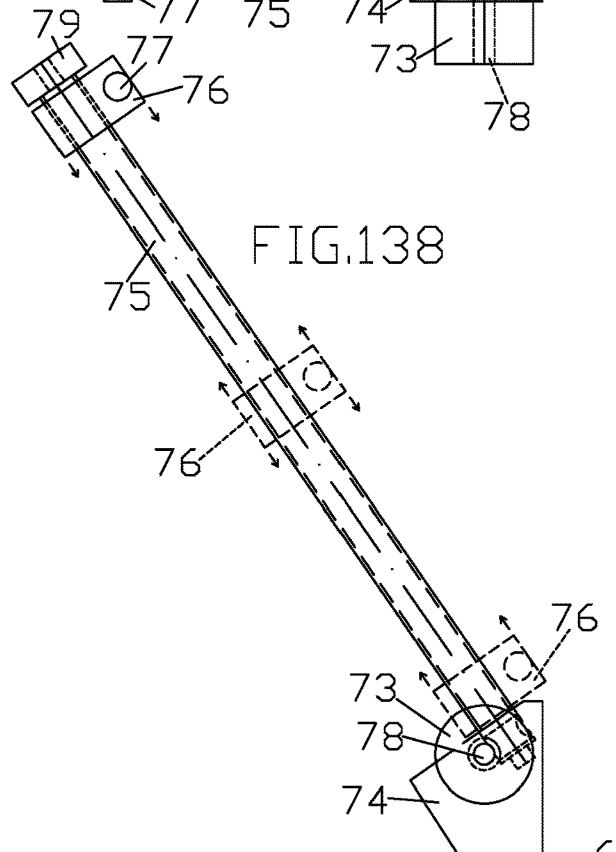
FIG.138
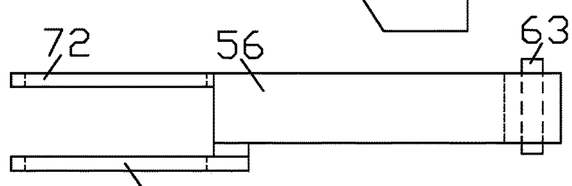
FIG.142
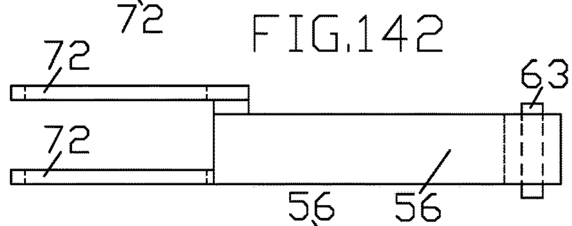
FIG.143
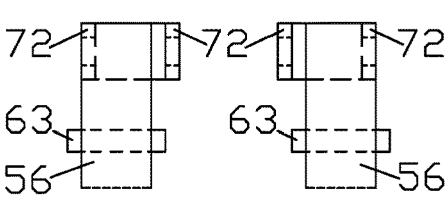
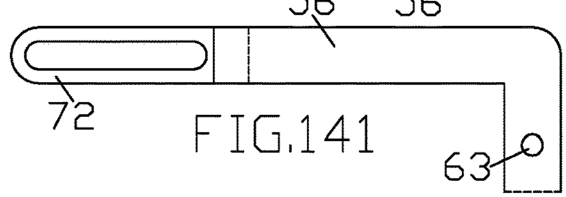
FIG.141

76
72
56
80
63
P2
64
81
55
54
65
61
75
P3
P4
P5
P6
P1
67
66
53
52

FIG.153
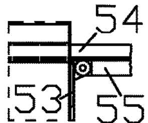
FIG.151
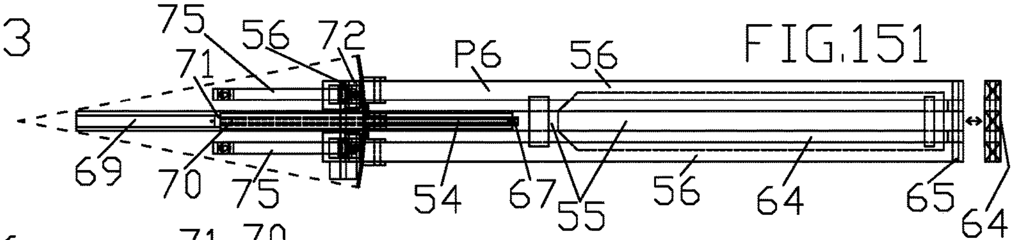
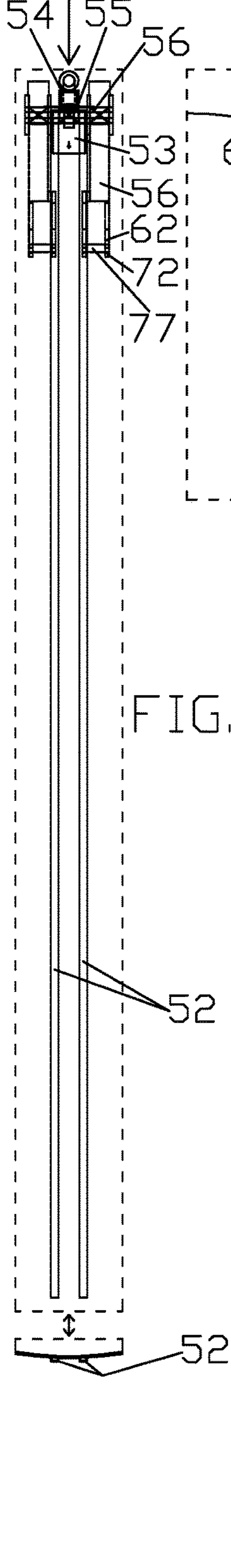
FIG.152
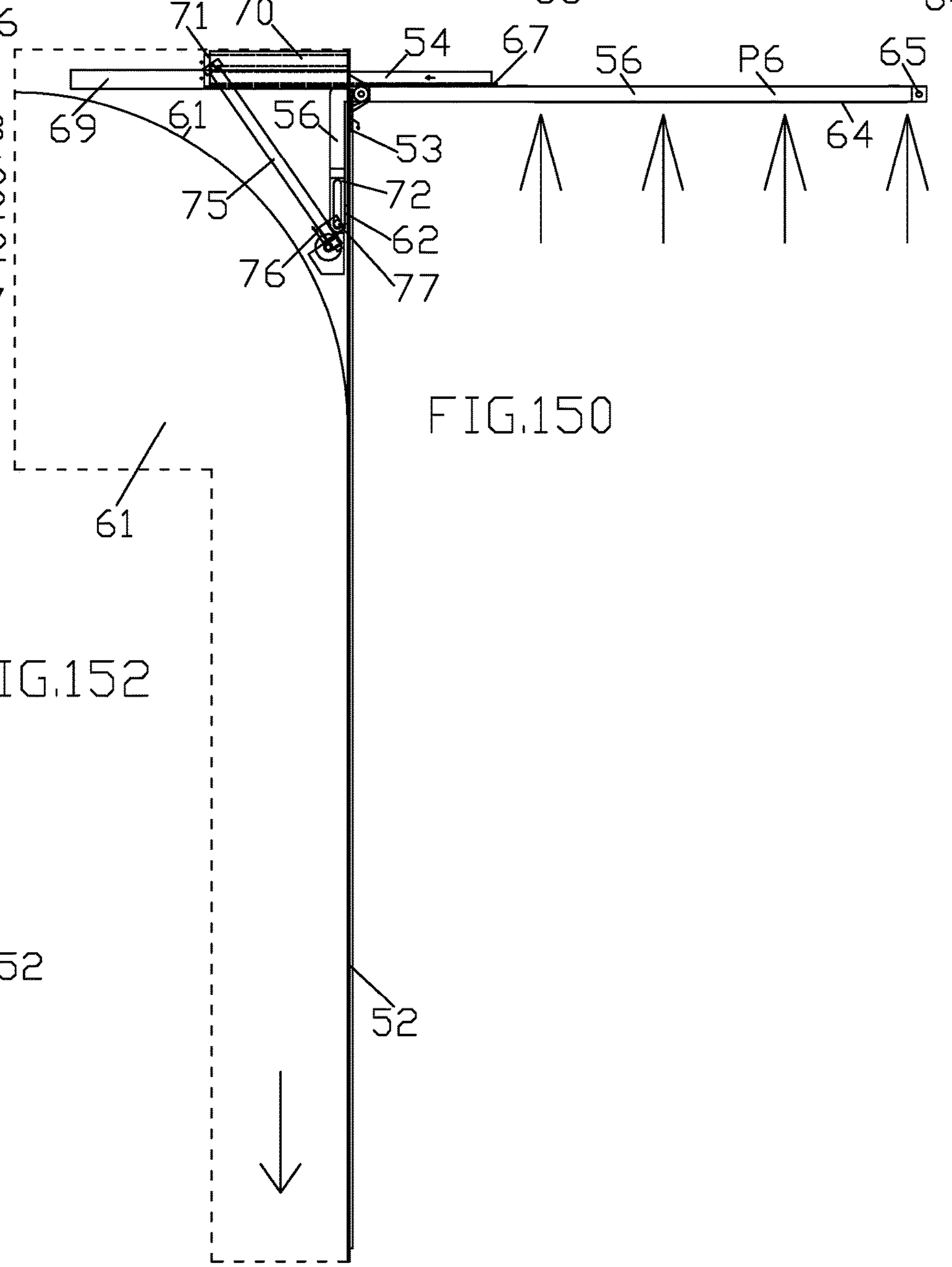
FIG.150

FIG.168
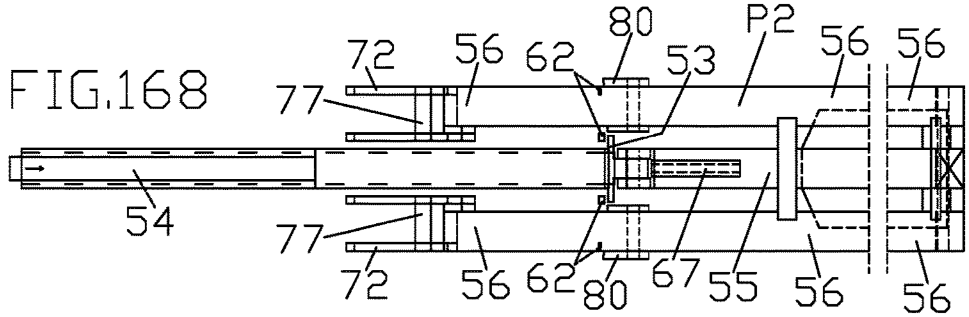
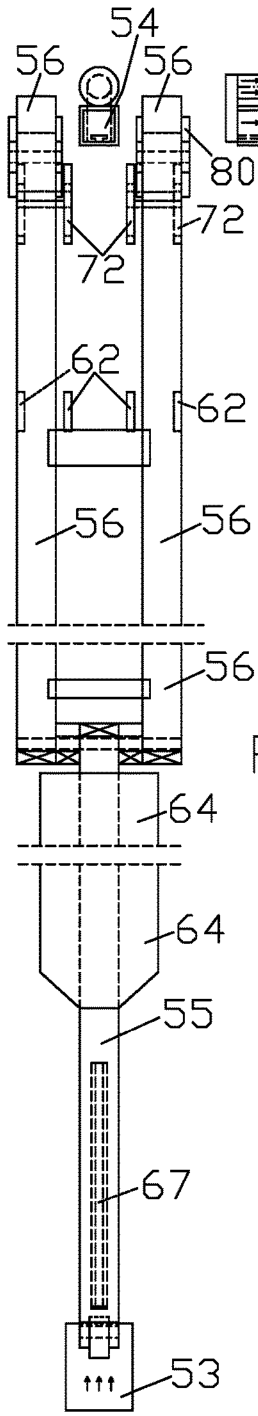
FIG.169
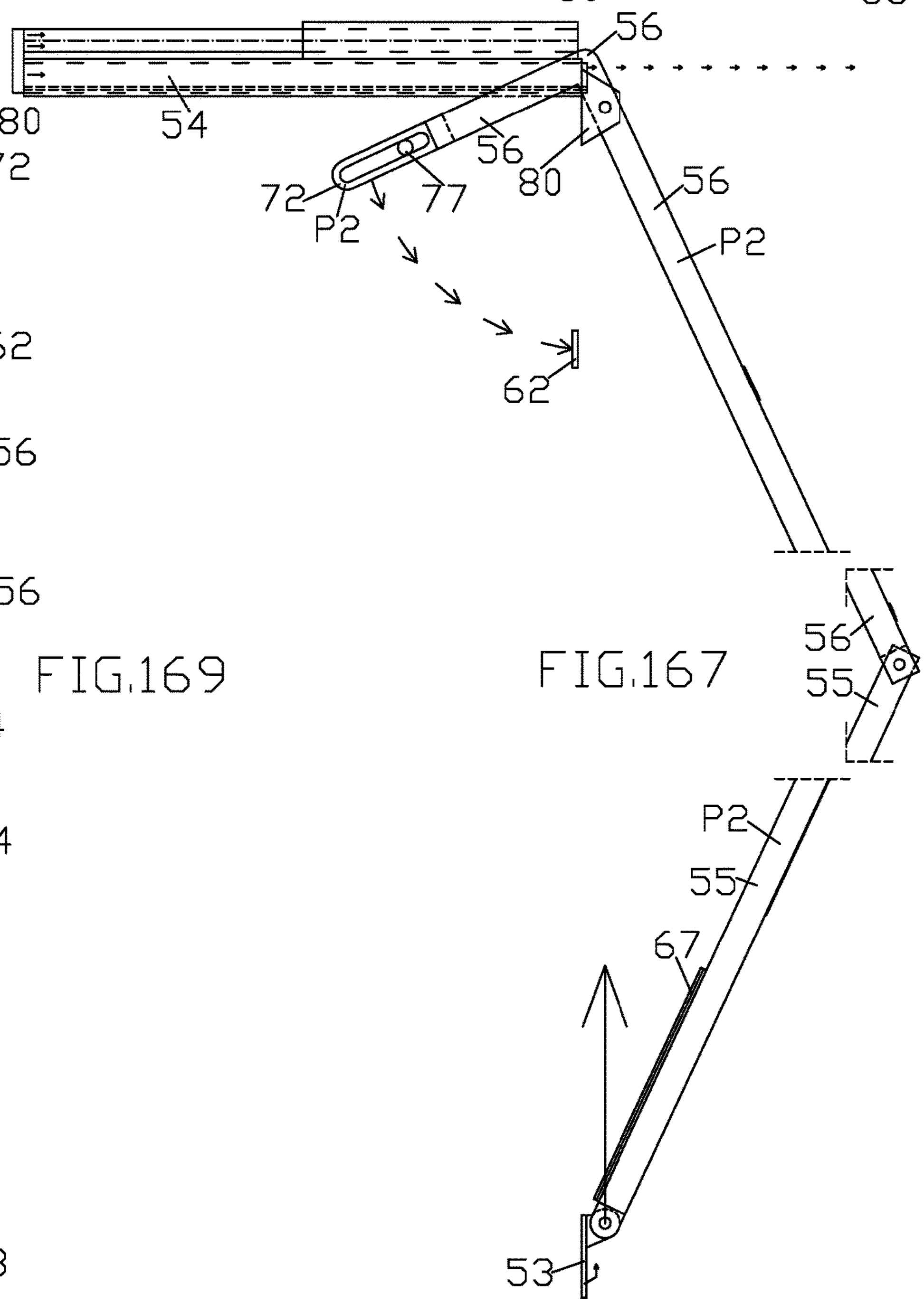
FIG.167

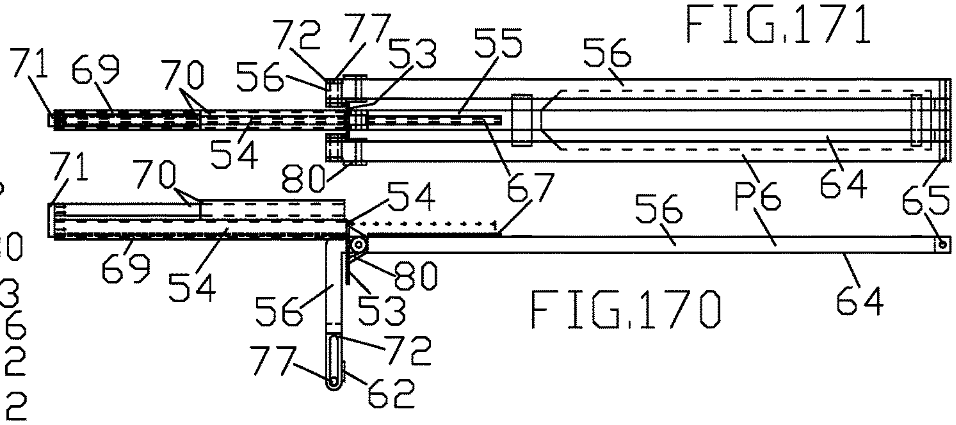
FIG.171
FIG.170
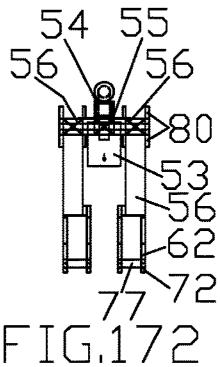
FIG.172
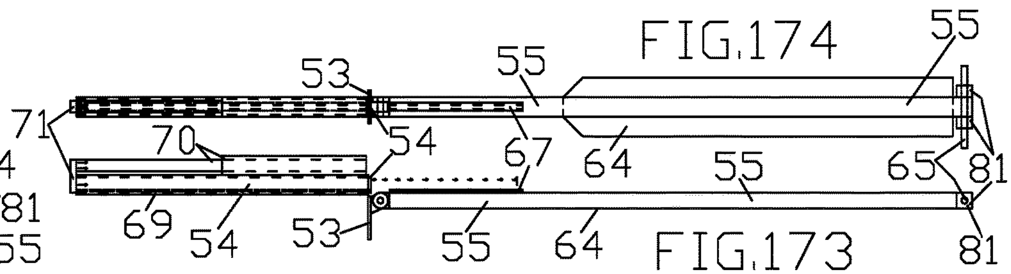
FIG.174
FIG.173
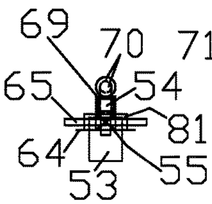
FIG.175
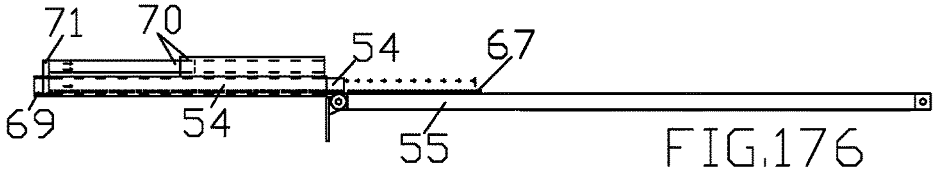
FIG.176
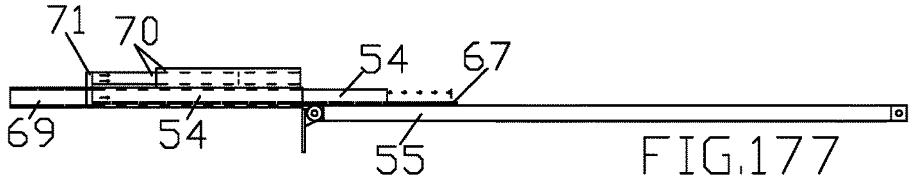
FIG.177
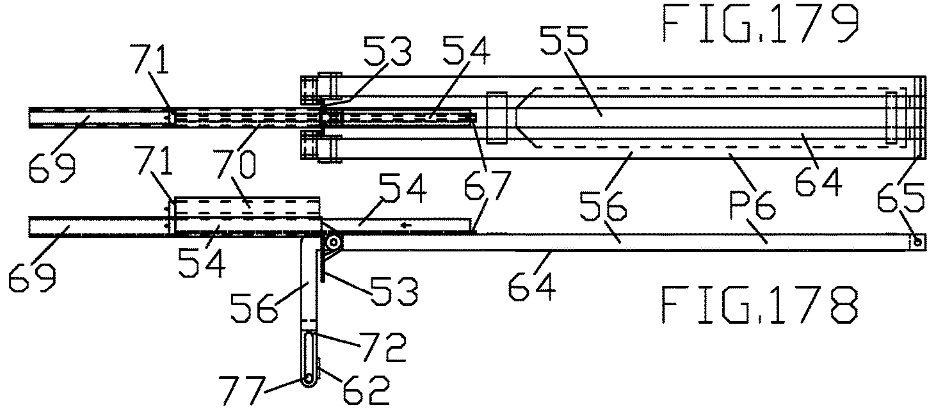
FIG.179
FIG.178

FIG.190
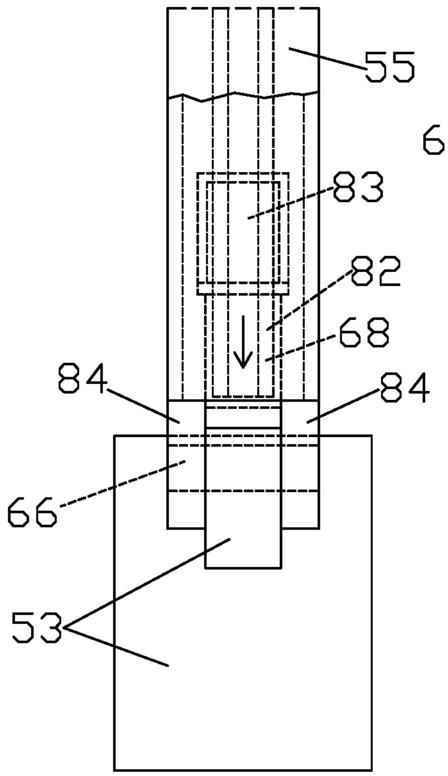
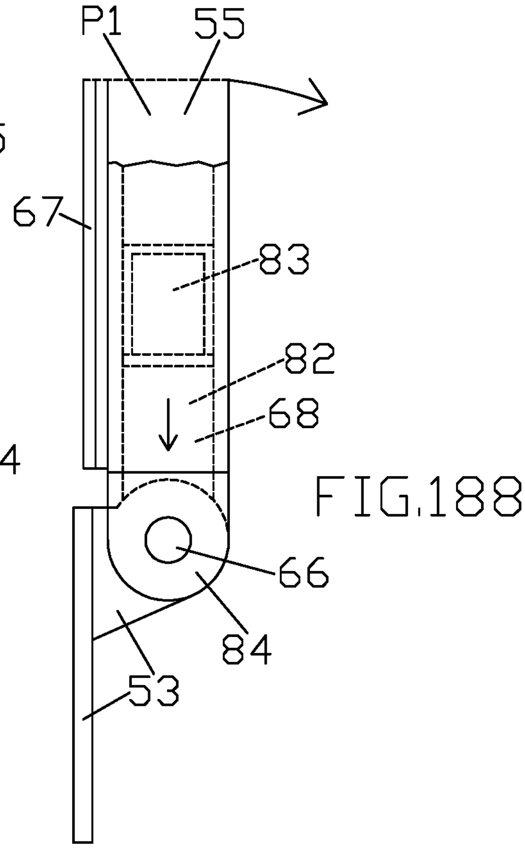
FIG.188
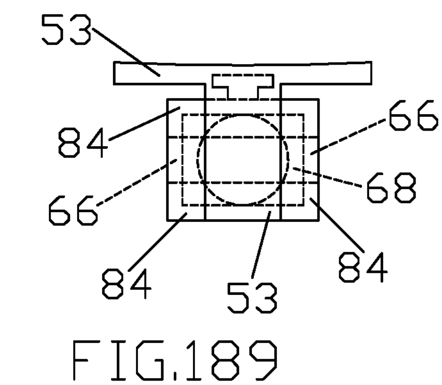
FIG.189
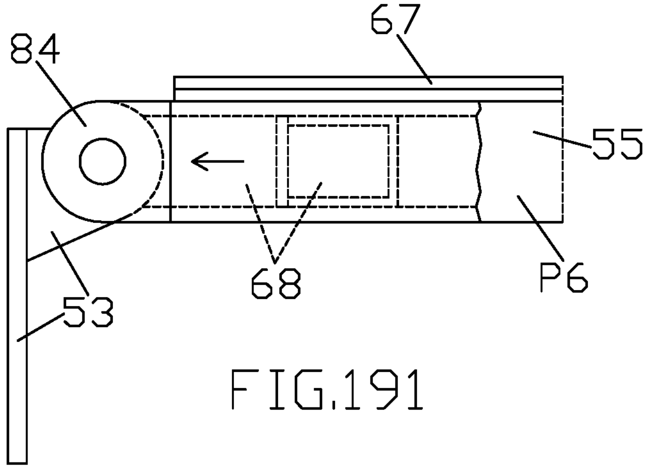
FIG.191

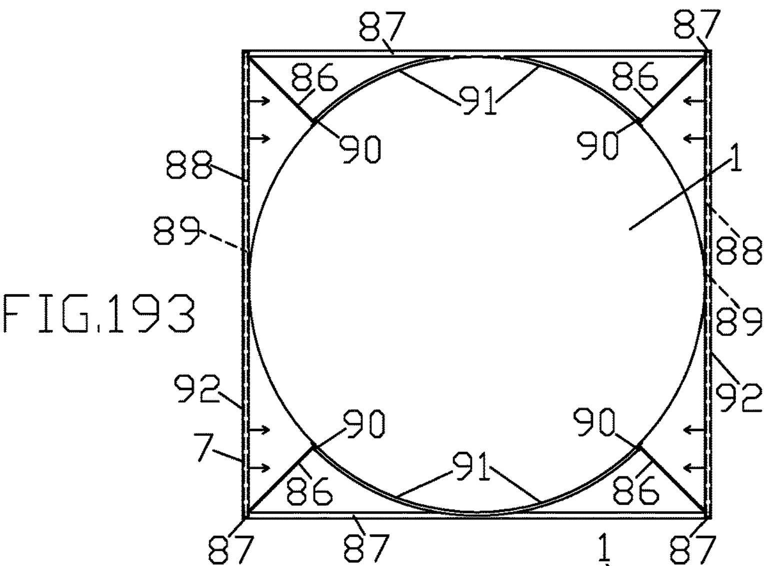
FIG.193
FIG.194
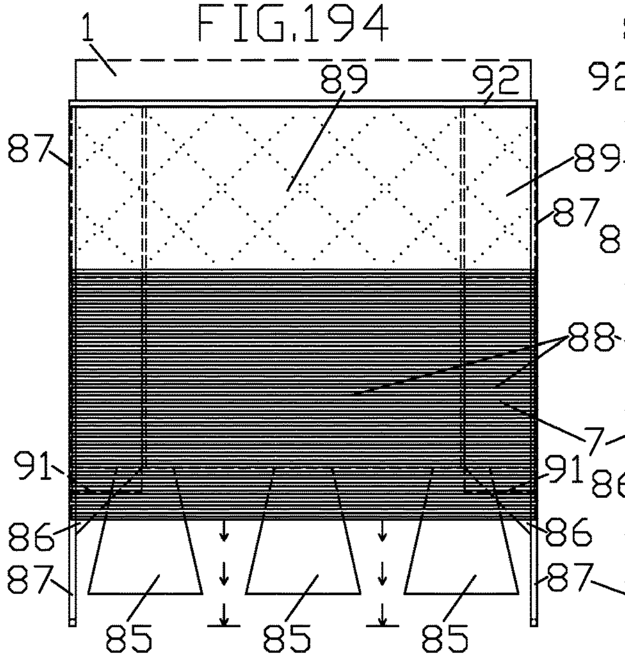
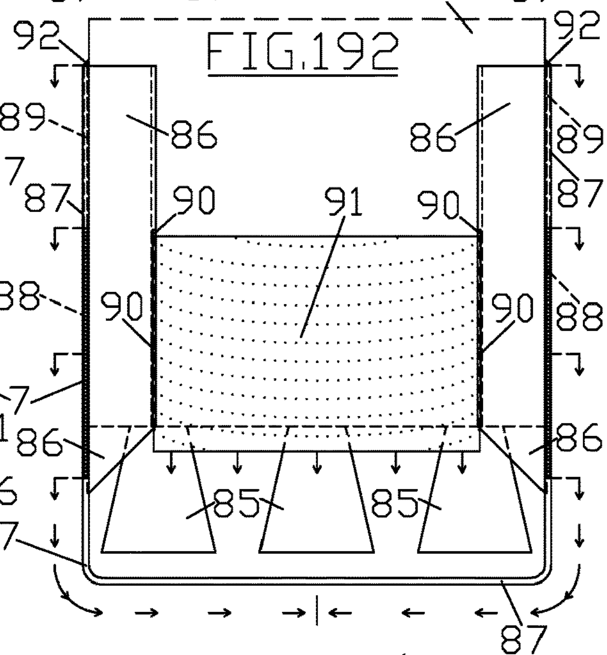
FIG.192
FIG.195
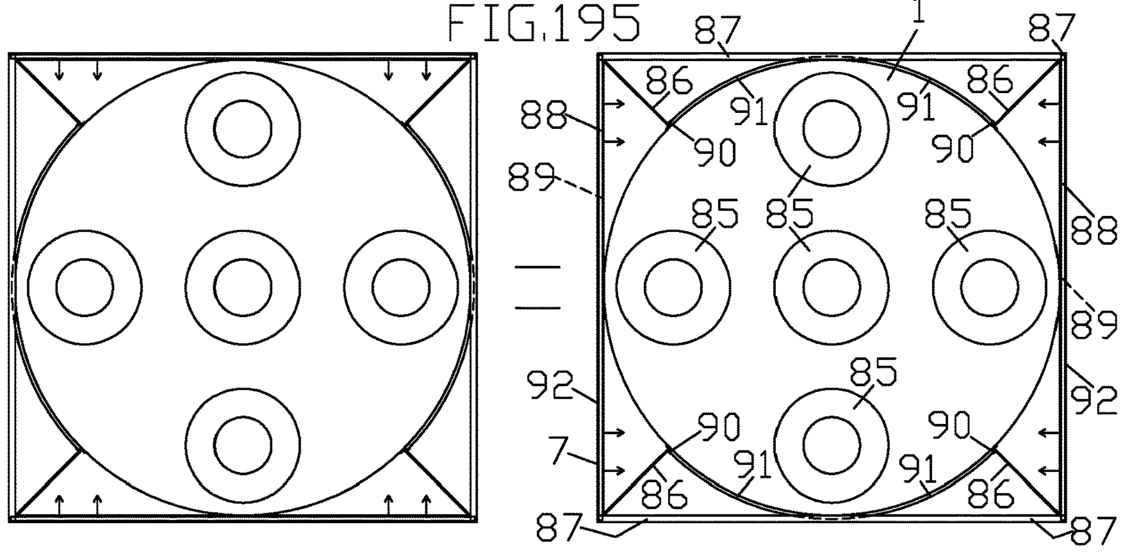

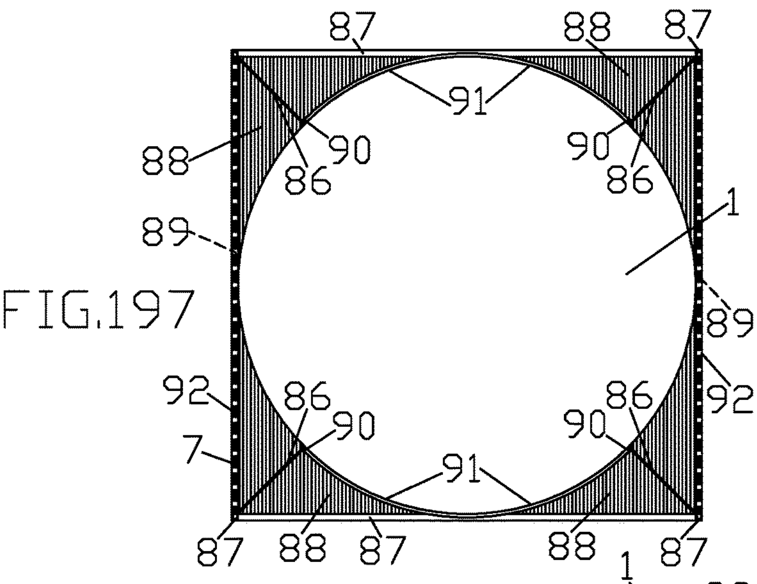
FIG.197
FIG.198
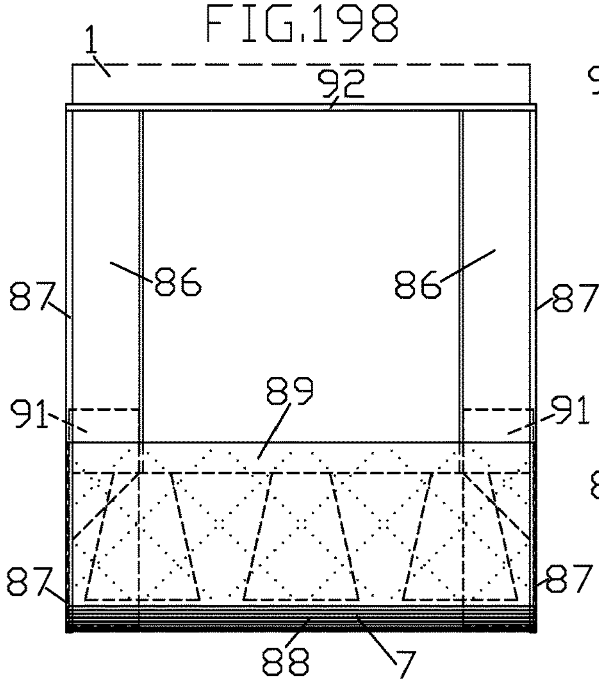
FIG.196
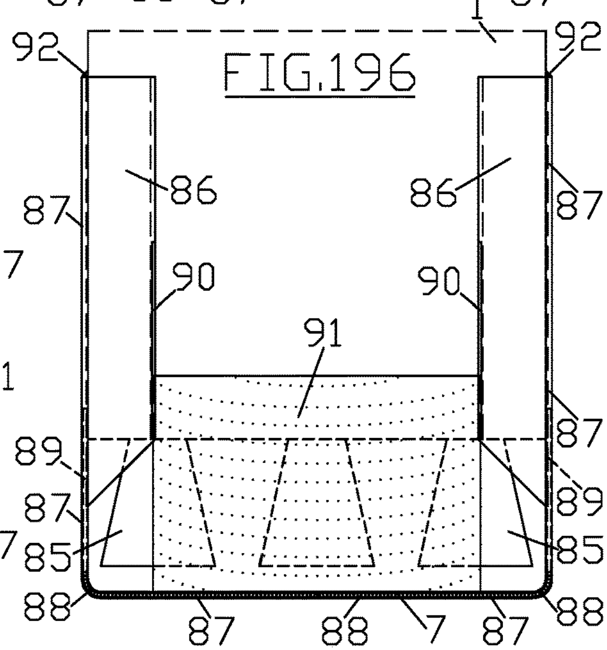
FIG.199
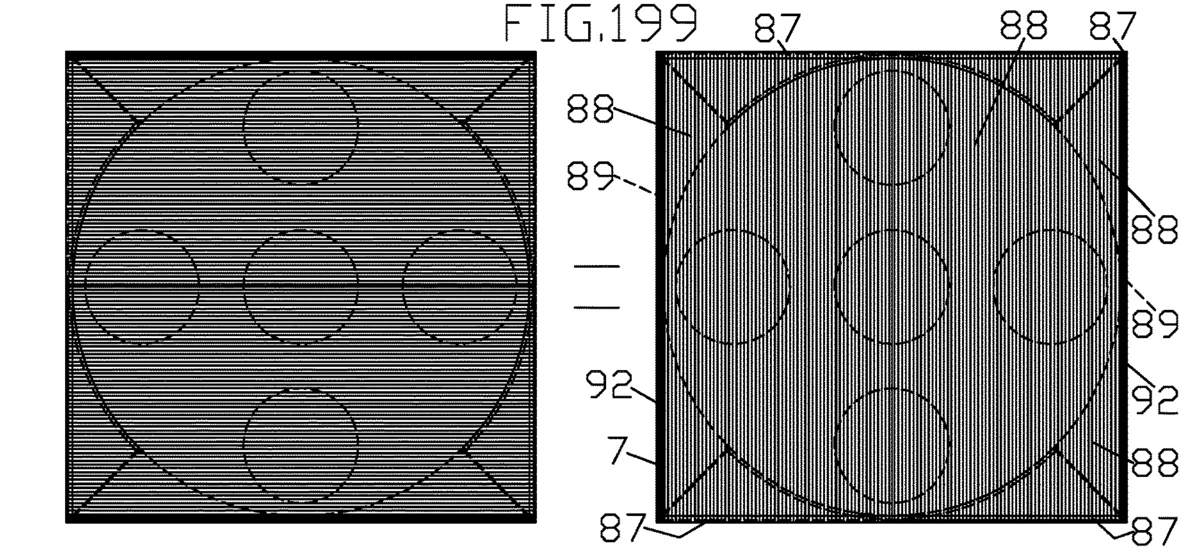

FIG. 218
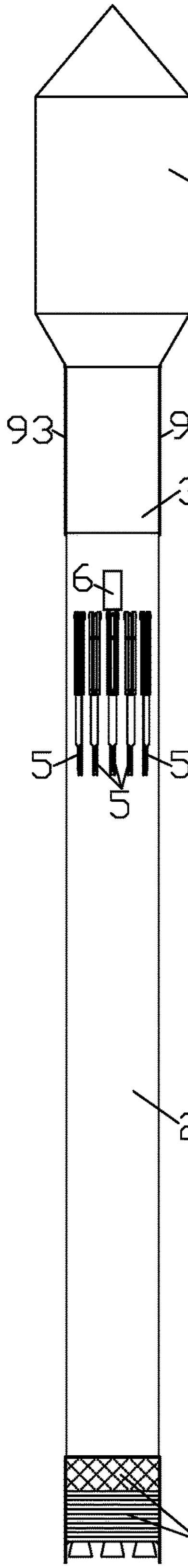
FIG. 217
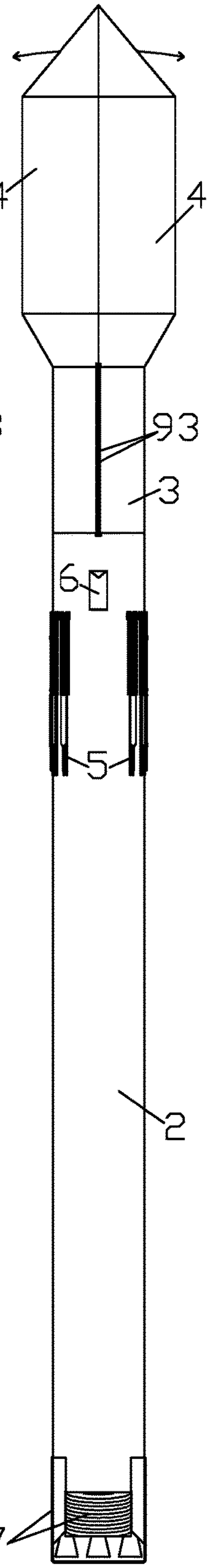
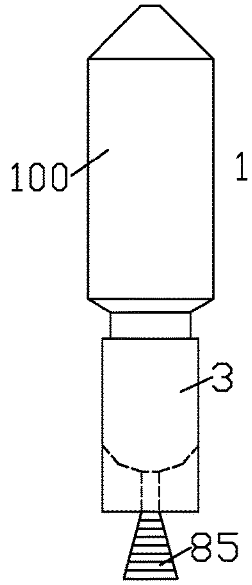
FIG. 221
FIG. 220
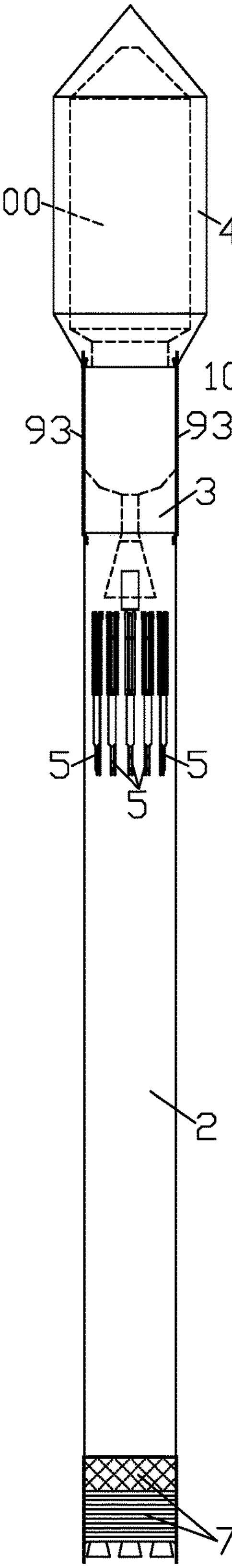
FIG. 219
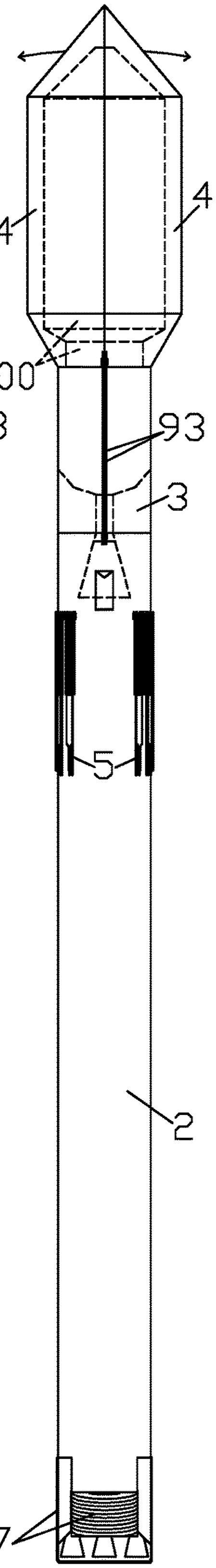
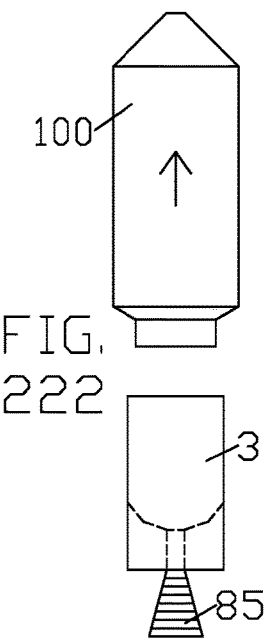
FIG. 222

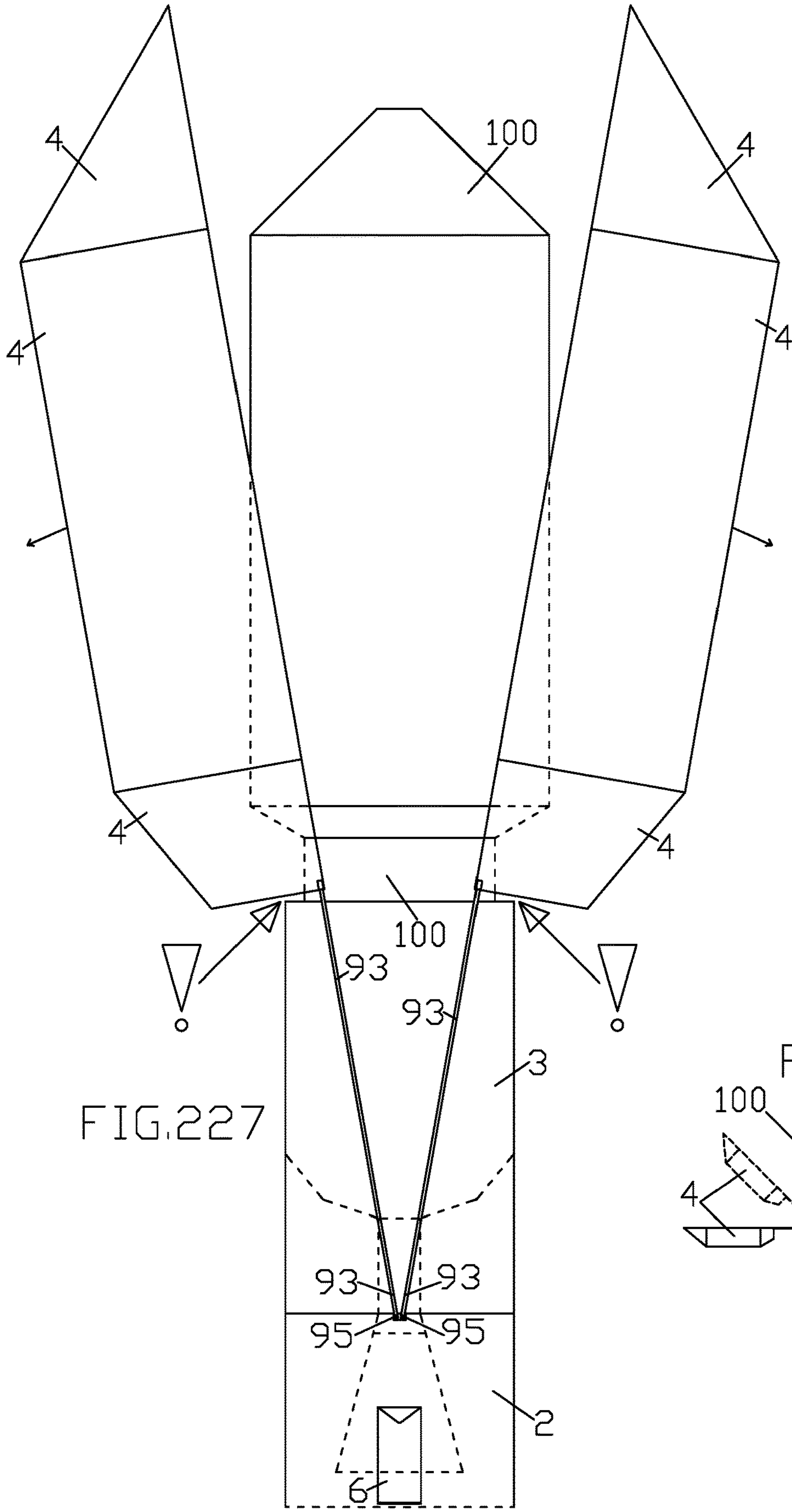
FIG.227
FIG.228
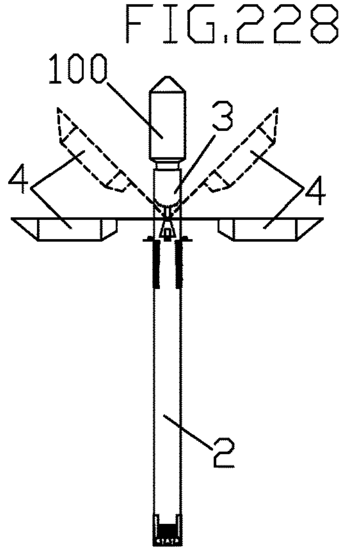

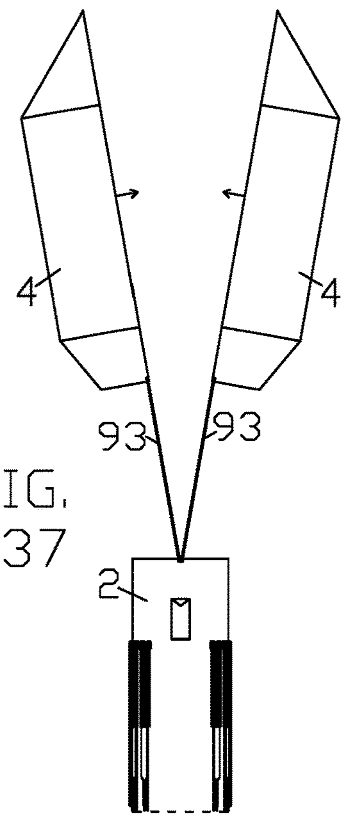
FIG. 237
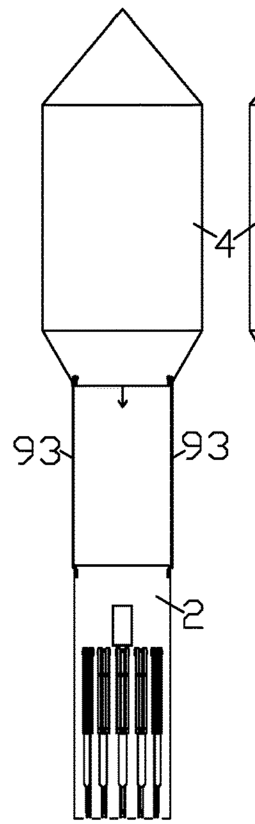
FIG. 239
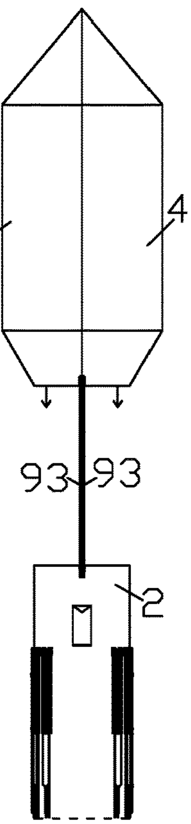
FIG. 238
FIG. 241
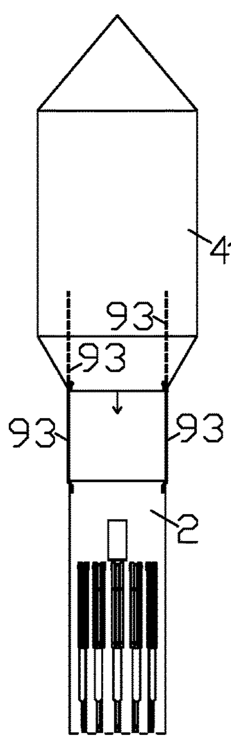
FIG. 240
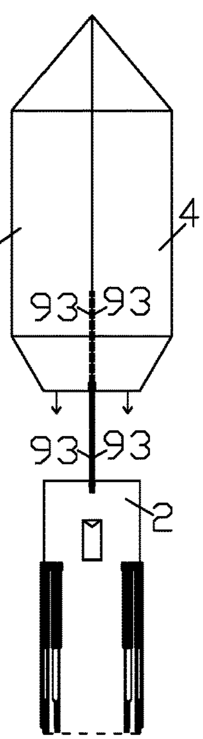
FIG. 243
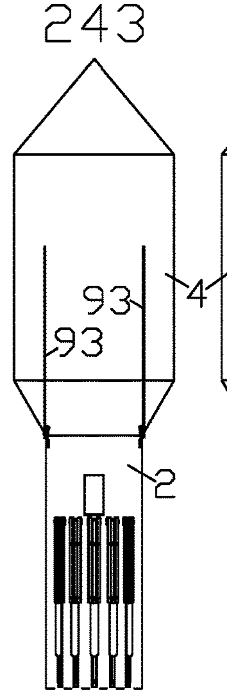
FIG. 242
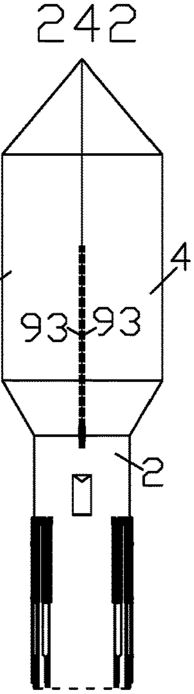

FIG. 247
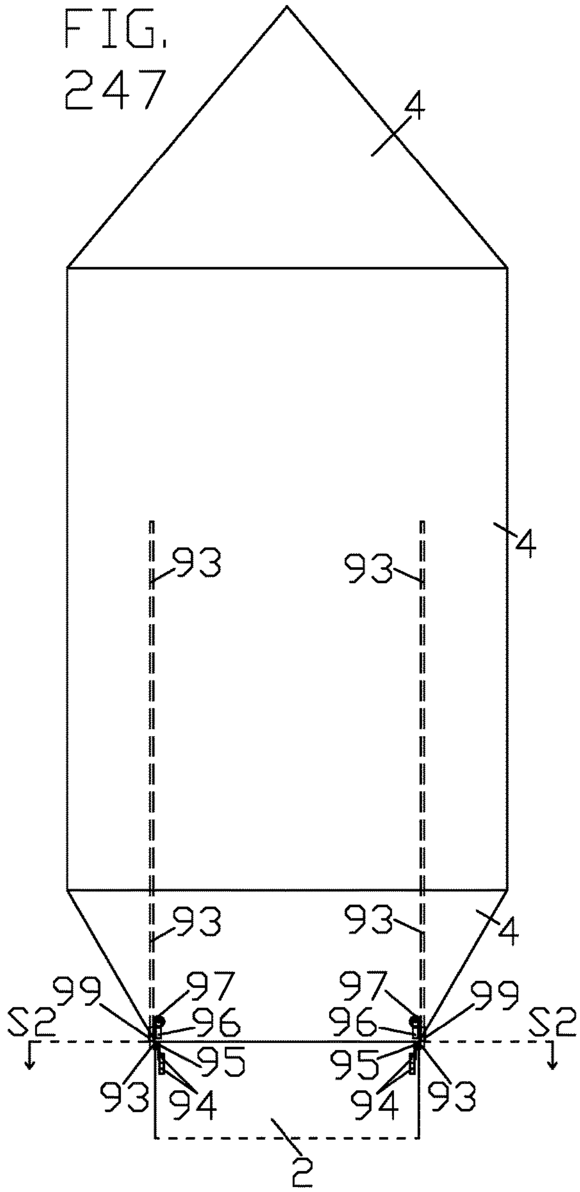
FIG. 244
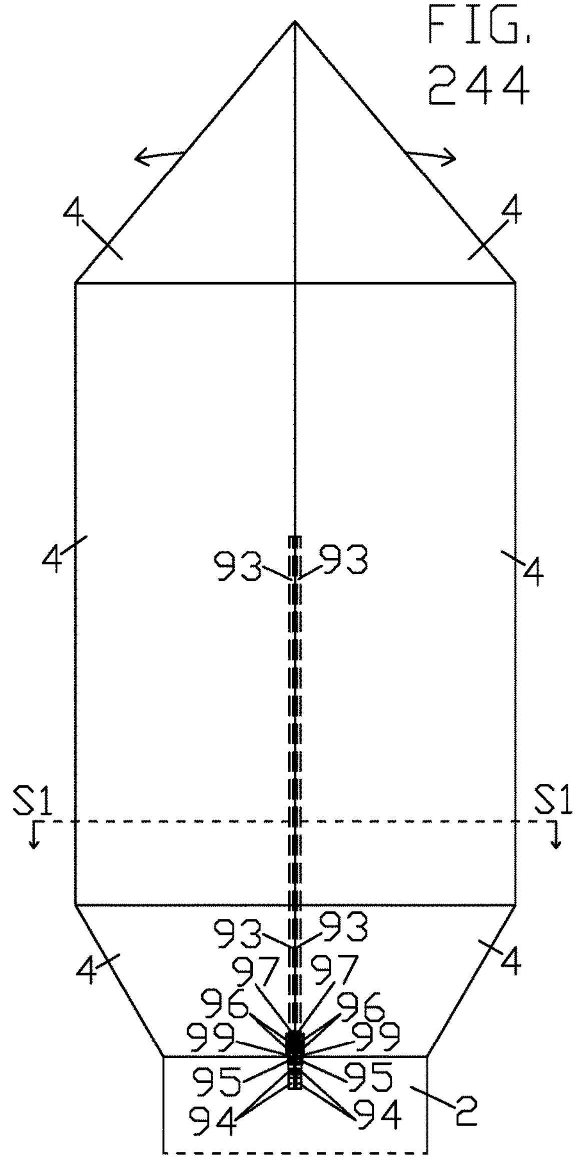
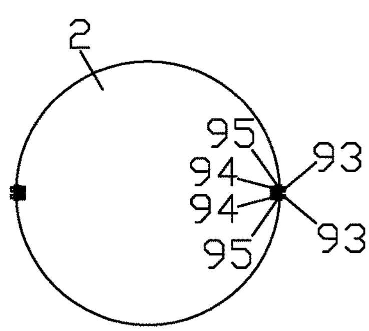
S2–S2
FIG. 246
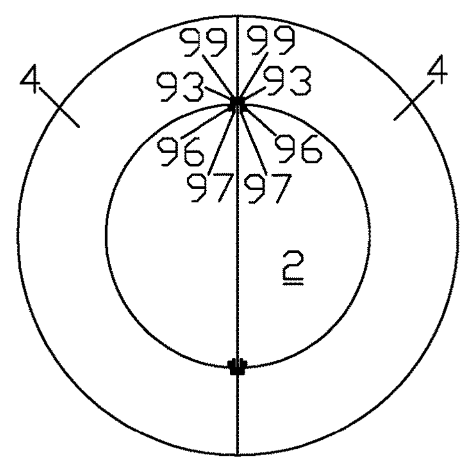
S1–S1
FIG. 245

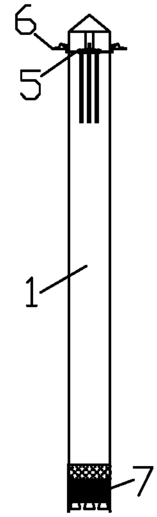
FIG.272
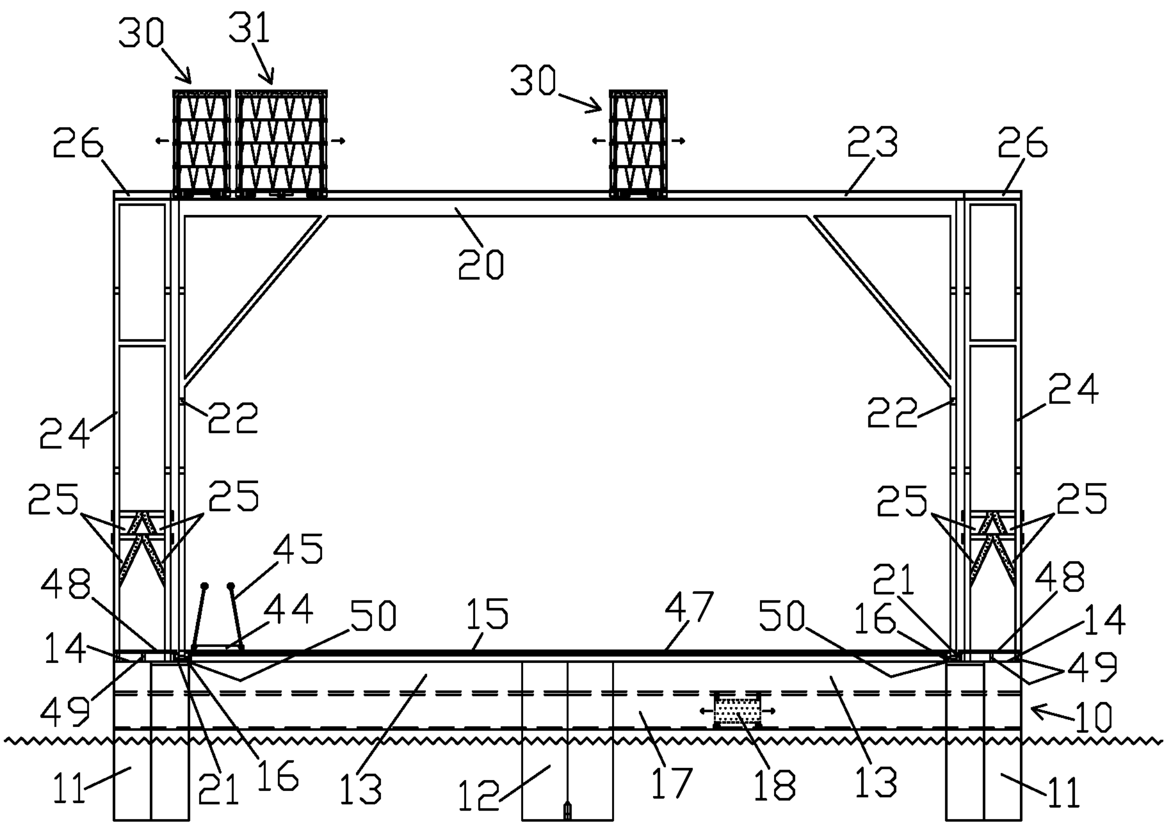

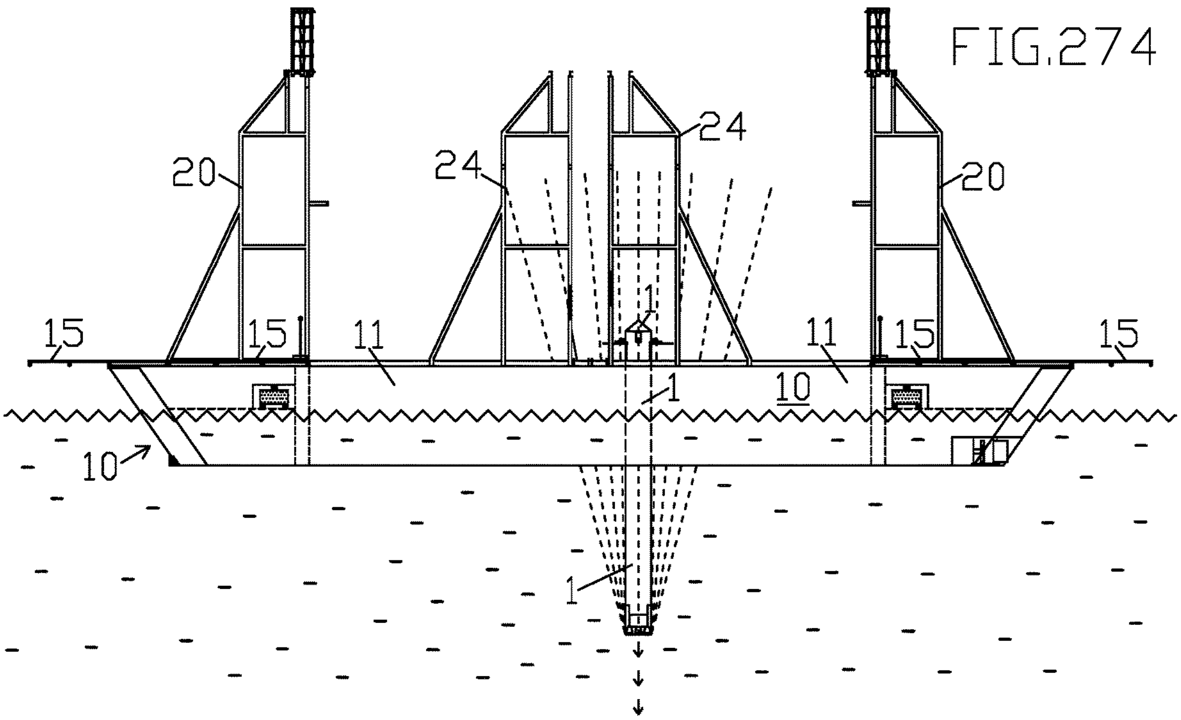
FIG.274
FIG.275
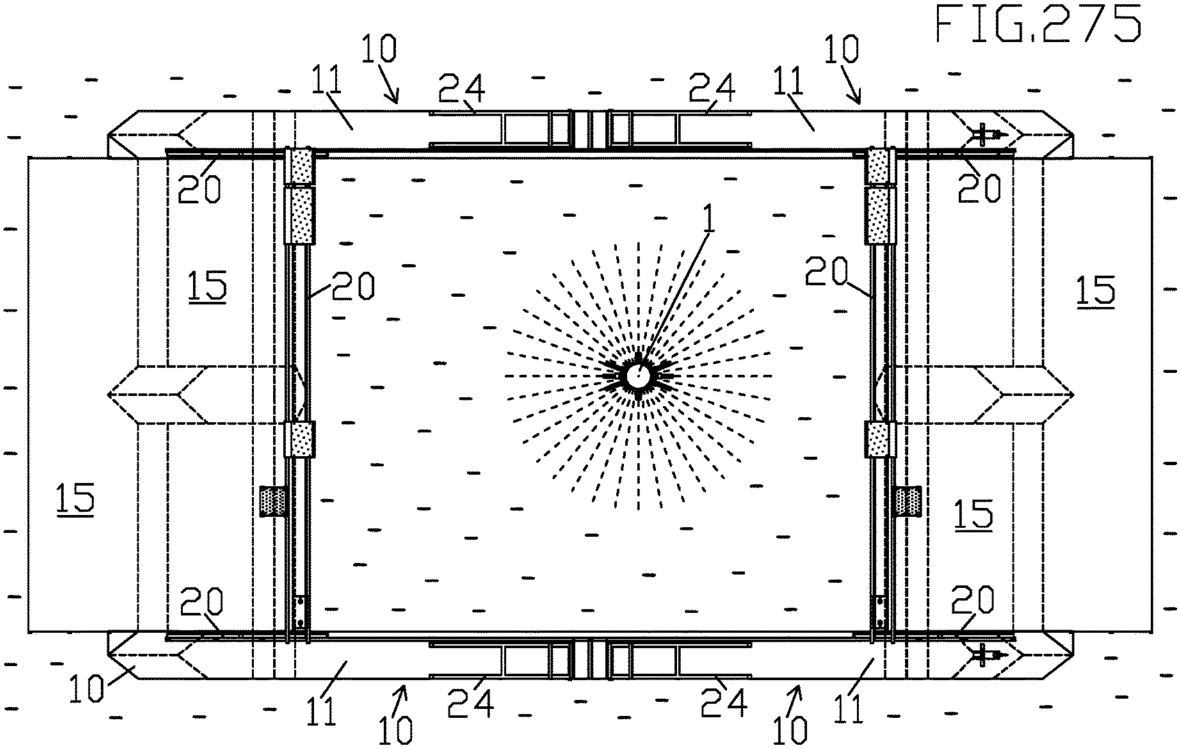

UTTER SYSTEM FOR MULTIPLE USE OF THE SPACE-ROCKETS EQUIPPED WITH SPREADABLE-ARMS AND POSSIBLY MORE DEVICES, AND METHOD OF THESE SPACE-ROCKETS VERTICAL LANDING BY HANGING ON LANDING-STATION HAVING MOVABLE GANTRIES AND MORE APPARATUS

TECHNICAL FIELD OF THE INVENTION

The present invention and its disclosure directs generally to the space rockets overall applying and usage, and their associated systems and methods.

BACKGROUND OF THE INVENTION

Since long time ago the space rockets are applied and used. Nonetheless, to this day one did not invent some system of space rocket launching and landing, which altogether would recover it, and would be very reliable, secure, trouble-free to use. And simultaneously the system that would enable the same space rocket launch several hours after its landing. Nowadays, particularly the space rocket landing is very problematic.

Currently, a few companies land the space rocket first stages on varied spreadable legs but such landings has several disadvantages. For example, during landing, the space rocket legs can be spread out only a few seconds before touchdown, because only then the space rocket descent is at low speed. Otherwise, atmospheric air would too strongly push the legs upward. Landing on the legs is very uncertain and sometimes after touch-down the space rocket can fall over by lots of reasons. In the event of one leg failure the whole space rocket will surely fall over. Landing on the legs makes it difficult to utilize some damping mechanisms in the legs because they would possibly cause the space rocket fall over as well. While, on the other hand a lack of some damping mechanisms in the legs can cause their breakdown. Sometimes after landing on the legs the space rocket stands slanted and can suddenly fall over as well. Therefore the slanted space-rocket will not securely stand on the legs. Such situation is very problematic and danger for all working personnel.

During landing on the legs, the space rocket legs are spread around plenty white-hot flames exhausting from the main engines. During touch-down these flames also rebound from the landing pad toward the legs thus, during this time they are burnt and destroyed in some part. Consequently, the legs have to stand on the landing pad, which is in plenty white-hot flames.

Landing on the legs makes impossible an application of very tall space-rockets, or that these space rockets would have mounted on their tops some modules or loads.

Landings on the legs require almost windless weather conditions because even moderate wind can cause the space rockets fall over and thus their total loss. As result, comes conclusion that at windy conditions the space rockets can not lift-off because later they will not be able to land on the legs. And it further causes that sometimes the space rockets having legs must wait several days for a launch possibility. There would not be such problems when landings would take place on presented in this invention spreadable arms.

The spreadable legs installed in a space rocket fuselage bottom makes it difficult for installing there some foldable thermal cover of main engines, as it is presented in current invention.

Therefore, currently, landings on the space rockets legs have characteristic of continuous attempts and hence all landings are treated as secondary purposes of all space rockets launching. Whereas, plenty other companies do not endeavor the space rocket landings at all. Furthermore, for security reasons it is recommended so that all space rockets landings would take place on the sea ships at sea. And for this reason landing on the space rocket legs and on a rolling sea ships are worse uncertain.

Earlier were applied Space Shuttles, which had plenty advantages, rather secure landing although unsafe lift-off. However, the Space Shuttles had very large and heavy wings and furthermore, several heavy wheels with heavy suspension. The large wings extorted usage of a complex and heavy thermal cover of the whole Space Shuttle. As a result of mentioned disadvantages and high operating costs the Space Shuttles one withdrew from the use.

All-in, currently, all over the world there are not possibilities of returns and regains from an Earth's orbit entire space rockets or entire loads. Yet, there are applied small capsules, which return from the Earth's orbit and land using the parachutes. This is a very primitive solution. Presented here invention does not have all before mentioned disadvantages.

SUMMARY OF THE INVENTION

This invention is the system for multiple use of the space rockets equipped with at least two spreadable arms and more devices. This system includes the space rockets vertical landing method on two movable gantries whereon the space rockets vertically land as hang themselves on their spreadable arms.

four

The movable gantries are in two versions, as two movable ship gantries and as two movable ground gantries. Two movable ship gantries are installed in a landing station, which is mounted on a specific sea ship deck. Both movable ground gantries are installed in a multi-task station situated on a solid ground.

The landing station has two movable ship gantries and two pairs of hangers for two space rockets. Both movable ship gantries are huge and are installed over the central part of the specific sea ship. Both movable ship gantries at the chassis bottom have a plurality of driving wheels to precisely roll on the specific sea ship decks length-ways. Both movable ship gantries have on a chassis top two rails each with installed a plurality of damping wagons whereon the space rockets vertically land as hang themselves on their spreadable arms. Furthermore, on the specific sea ship movable decks two grasping wagons help secure the space rockets at their bottoms. Both grasping wagons are installed on the specific sea ship two horizontally movable decks. On the current deck mounted landing station in a few minutes intervals can land three space rockets equipped with the spreadable arms. Two first landing space rockets can be quickly moved on two pairs of hangers and temporary fasten. That is because one pair of hangers is adapted for hanging one space rocket equipped with the spreadable arms and temporary fastening said space rocket at the bottom by means of four rotating wedges. The third landed space rocket can remain on both movable ship gantries and be fastened by both grasping wagons.

The multi-task station has two movable ground gantries and a movable specific ground crane.

This entire system is completely connected with utilization of the plurality of spreadable arms mounted on all space rockets. Therefor these spreadable arms are the main characteristic feature of this system. Furthermore, each space rocket vertical landing can occur with attached a plurality of modules and possibly a return load, and this feature is very important possibility and advantage of this system. Therefor this system includes that all space rockets and their sub-assemblies and modules are designed and destined for multiple use thus, return with the space rockets on the Earth.

This system comprises that on each space rocket can also be cardinally installed four steering flaps, a dividable sectional load cover and a sliding engines cover having two jalousies.

This system comprises the specific sea ship having a specific multi-hull with inbuilt two tunnels and having two horizontally movable decks. In each tunnel is installed one ballasting wagon. This system comprises that the specific sea ship is adapted for the deck mounted landing station.

Moreover, this whole system comprises also the multi-task station, which is adapted for hanging up, reload, launch preparation, lift-off and vertical landing of the space rockets equipped with the spreadable arms.
And that includes also unloading the space rockets from the specific sea ship.

The multi-task station has two movable ground gantries and one movable specific ground crane. Therefor this system includes also that a plurality of jointed space rockets during hanging on two movable ground gantries can be launch prepared in vertical position thus, while they vertically hang on their spreadable arms. And then these three jointed space rockets can lift-off from these two movable ground gantries thus, while they vertically hang on their spreadable arms as well.

All together, in current system are presented processes of three jointed space rockets lift-off, jointed ascent, their separation, further separated ascent, deployment of a payload, docking of the return load, descent and vertical landing on the specific sea ship having the deck mounted landing station.

In this system more exact description of the space rocket design and its action and multiple use is following. In this system each space rocket vertically lands as hangs itself on its spreadable arms. Therefor each space rocket has installed these sophisticated spreadable arms. And moreover each space rocket can have cardinally installed four steering flaps, the dividable sectional load cover and the sliding engines cover, which can be flat underneath or wedge shaped underneath.

On the space rockets mounted spreadable arms are absolutely necessary and are utilized multiple times. These spreadable arms create lots of possibilities. First of all and the most important is that each space rocket lands on its spreadable arms as hangs itself on them. Before landing, all spreadable arms are used as an aerodynamic brake during the space rocket descent in an Earth's atmosphere. Because all spreadable arms are designed and build as very strong therefor during space rocket descent, they can be lifted (spread out) on a very high altitude for use as the aerodynamic brake. As result of long-lasting aerodynamic braking caused by all spreadable arms, it will be necessary to use far less fuel at landing engine burn. These spreadable arms are mounted on each space rocket upper part. The quantity of spreadable arms mounted on each space rocket depends on its weight. Therefor currently, in one booster space rocket are mounted six spreadable arms and in one main space rocket are mounted ten spreadable arms. These spreadable arms are suitably spaced out in each space rocket fuselage so that they all could completely spread out on two sides. Whereas, all spreadable arms are entirely lowered, they are alongside and adjacent to the space rocket fuselage. Whereas, all spreadable arms are entirely lifted, they are completely spread out and are transverse the space rocket fuselage. Each spreadable arm is moved by one moving mechanism installed inside the space rocket fuselage.

Each spreadable arm consists of two lateral beams, one middle beam and additional sub-assemblies. Over each spreadable arm moving mechanism is installed a pushing mechanism having a blocking bar, which serves for blocking the middle beam in the spreadable arm, while it is entirely lifted.
The blocking bar fulfills blocking function when is maximally slid outside the fuselage. In such state, the blocking bar fulfills its main function, which is total blocking the middle beam in all directions. The middle beam after its blocking gains possibility of carrying burdens in all directions.

Four steering flaps are cardinally installed on each space rocket upper part as well. These flaps serve for steering the space rocket descent in the Earth's atmosphere. All flaps are in large sizes so that they could steer the space rocket descent even at low speeds. Two opposite steering flaps have additionally on top parts rotary mounted one torsional triangle each, which are configured for precise steering of the entire space rocket axial torsion as needed before landing on two movable ship gantries.

The sectional load cover is dividable into two sections and gradually foldable out on two opposite sides. And later this sectional load cover can be gradually folded up by pooling together up to total shutting. The sectional load cover serves for covering inside the payload and this way creates its thermal protection during the space rocket ascent and descent in the Earth's atmosphere. Thus, inside the sectional load cover can be fastened the payload, which will be carried out on the Earth's orbit and later can be fastened the return load, which will be carried on the Earth. The sectional load cover is revolvingly installed on the main space rocket upper part and can be situated over a second stage rocket. The sectional load cover can be completely lowered to the main space rocket upper part as well. Each one section of the sectional load cover is held up and incline by two cog beams. All four cog beams are long and are revolvingly installed to the main space rocket upper part. Whereas, the sectional load cover is shut up then all cog beams are outside and on both sides of the second stage rocket. The sectional load cover can be lifted somewhat over the second stage rocket before folding out on two opposite sides.

The sliding engines covers are flat underneath or wedge shaped underneath after their lowering. Each sliding engines cover serves for covering the space rocket main engines and this way creates their thermal protection during the space rocket descent in the Earth's atmosphere. Both sliding engines covers can be rapidly shut down (by sliding down) or rapidly opened (by sliding up). Each sliding engines cover consists of two sliding jalousies and consists of two sliding rounded plates.

In this system more exact description of the landing station design and its action and multiple use is following. The specific sea ship comprises the deck mounted landing station having two movable ship gantries, two pairs of hangers and two grasping-wagons which help secure the space rockets at their bottoms. Both grasping wagons are installed on the specific sea ship two horizontally movable decks.
On this landing station in a few minutes intervals can land three space rockets equipped with the spreadable arms.

Two first landing space rockets can be quickly moved on two pairs of hangers and temporary fasten.

Because each one pair of hangers is adapted for hanging one space rocket equipped with the spreadable arms and temporary fastening said space rocket at the bottom by means of four rotating wedges.

The third landed space rocket remains on both movable ship gantries and is fastened by means of four raised rotating poles, which reach from two grasping wagons.

Presented here, the specific sea ship with landing station having strong temporary fastening of the space rockets enables sea-transportation even at stormy sea.

Both movable ship gantries are huge and are installed over the central part of the specific sea ship. Both movable ship gantries can precisely and separably roll along the entire specific sea ship. Before landing of every space rocket, both movable ship gantries are entirely spread apart in two opposite directions of this specific sea ship. In such arrangement both movable ship gantries are ready and await landing of every space rocket. Both movable ship gantries can approach to each over and touch on themselves by means of two bumpers. Therefor short time before landing of each space rocket, both movable ship gantries approach to each over and together place themselves under the landing space rocket. In order to accomplish it, each movable ship gantry can roll until direction of the opposite movable ship gantry, if necessary during landing of the space rocket. It causes that each space rocket can land almost on the entire length of the specific sea ship. While, on the drawings there are shown only landings examples in the specific sea ship center.

On both movable ship gantries tops are installed four damping wagons and two large damping wagons. All damping wagons can precisely roll transverse the specific sea ship on both movable ship gantries tops. Short time before landing of each space rocket, two damping wagons place themselves under the landing space rocket. It causes that each space rocket can land almost on an entire width of the specific sea ship. On two damping wagons vertically lands one booster space rocket as hangs itself on its spreadable arms. On the next two damping wagons lands also one booster space rocket. Whereas, on two large damping wagons vertically lands one main space rocket. After the space rocket hanging itself, all damping wagons can be in fullness compressed. Then two compressed damping wagons can roll by from two movable ship gantries tops onto one pair of hangers tops. Because, the rails on the movable ship gantries tops are fitted in with the rails on all hangers tops. This way one pair of hangers is adapted for passing of two damping wagons from both movable ship gantries. And it is possible because constructions of the entire hangers and of the movable ship gantries are entirely adapted with constructions and function of all damping wagons.

Each damping wagon has four layers of a plurality of conic springs in vertical setting, which can be in fullness compressed. Therefor all damping wagons have damping high range during hanging the space rockets equipped with the spreadable arms. Simultaneously all damping wagons maintain unshaken and stable top surfaces during their compressing by the space rocket.

Two space rockets after landing can be quick moved from two movable ship gantries onto two pairs of hangers. Therefor in the landing station are mounted two pairs of hangers this way that one pair of hangers is mounted on each side of the specific sea ship. The hangers in construction remind immovable towers. Each hanger has two rotating wedges. One pair of hangers serve for hanging one space rocket and for strong temporary fastenings it by means of four rotating wedges.

And in the landing-station are installed also two low build grasping-wagons each having two rotating-poles. Both grasping wagons are installed on the specific sea ship two horizontally movable decks. Both grasping wagons have a plurality of driving wheels. And therefore both grasping-wagons can roll on both movable-decks transverse the specific sea ship length. Because both grasping wagons can roll on the long-transverse-rails on both movable decks. Both grasping wagons help secure the space rockets at their bottoms. All rotating poles have spherical ends with flexible coatings, which are adapted for direct contacts with the space rockets.

Moreover, both grasping wagons can together roll on rails between one pair of hangers. Because both grasping wagons are low build and are situated on both horizontally movable decks, they can move under every space rocket, which will hang itself on two damping wagons on both movable ship gantries. After each space rocket landing, both grasping wagons will move under this space rocket bottom and will suppress its swinging bottom by means of four raised rotating poles. Afterward two compressed damping wagons with hanged space rocket and both grasping wagons having grasped this space rocket bottom, as a complete set can move to one side of the specific sea ship side and thus between one pair of hangers. In order to perform it, both damping wagons and both grasping wagons must move at equal speeds toward one pair of hangers. After arriving all wagons between one pair of hangers, the hanged space rocket will be temporary fastened at the bottom by means of four rotating wedges on one pair of hangers. Then it will be possible to loose pressure of four rotating poles and lower them. And then both grasping wagons will be able to move under this hanged space rocket toward the specific sea ship center that mean return on both movable decks. Then the entire landing station will be instantly ready for landing the next space rocket equipped with the spreadable arms. It will be enough to entirely spread apart both movable ship gantries in two directions of the specific sea ship. Both grasping wagons serve also for strong fastening of the last landed space rocket bottom.

In this system more exact description of the specific sea ship design and its action is following. Thus, this system comprises also the specific sea ship having the deck mounted landing station.

The specific sea ship has the specific multi-hull with inbuilt two tunnels and have two horizontally movable decks. In each tunnel is installed one ballasting wagon. Both tunnels are transverse to the specific sea ship. The specific multi-hull construction consists of two long side hulls and two short central hulls, which all are permanently fastened with four over water copular hulls. Inside a central part of the specific multi-hull there are not any hull parts. A top surface of the multi-hull crates a main deck.

Both horizontally movable decks are huge and are installed over the central part of the specific sea ship. Both horizontally movable decks can be quickly and entirely spread apart in two directions of the specific sea ship in order to create inside its multi-hull a giant open interior where-into there is only sea surface. Spreading apart of these horizontally movable decks may be necessary in order to prevent some strike of the space rocket, which failed to stop its descent. Then this space rocket will plunge into sea-water. This kind coincidence is shown for example on FIG. 274-

275 and there one booster space rocket slips by through the giant open interior of the specific sea ship at sea.

Both ballasting wagons serve for very quick and precise ballasting the entire specific sea ship to a perfectly horizontal position during landing each space rocket and during moving each one on one pair of hangers. Furthermore, both ballasting wagons serve also for automatic, continuous, quick and precise ballasting this specific sea ship during seafaring.

In this system more exact description of the multi-task station design and its action is following. It is recommended that this multi-task station would be at a sea harbor wharf so that it could be possible to reload the space rockets from any specific sea ship. Thus, this system comprises also the multi-task station, which has two movable ground gantries and one movable specific ground crane for the space rockets reloading.

Both movable ground gantries at the chassis bottom have installed a plurality of driving wheels to precisely drive on the solid around and turn on it. Both movable ground gantries on their tops have fastened the rails for possible installing the damping wagons. Both movable ground gantries are adapted to approach to each over before landing of the space rocket. Both movable around gantries are adapted to place themselves precisely under landing space rocket equipped with the spreadable arms.

The movable specific ground crane is a lot bigger than both movable ground gantries. The movable specific ground crane is adapted to play along with both movable ground gantries. The movable specific ground crane has a plurality of beams, which reach up over the specific sea ship so that this movable specific ground crane could lift one space rocket and subsequently shift it on both movable ground gantries. The entire movable specific ground crane will move backwards before the space rocket lift-off. Both movable ground gantries serve for three space rockets lading after unloading from the specific sea ship. And later these two movable ground gantries serve for three joined space rockets launch preparation all time in vertical position thus, during hanging on these two movable ground gantries. And therefor all space rockets can lift-off from two movable ground gantries while these space rockets vertically hang on their spreadable arms. This even includes that three joined space rockets can lift-off this way. Both movable ground gantries will spread apart on two sides immediately after the space rockets lift-off. Summing-up, as result of this whole system with method of the space rockets launches and their quick return to the multi-task station there is possible their very fast renewed launch, for example several hours after landing on the specific sea ship.

The space rocket lift-off from two movable ground gantries creates also a few benefits as possibility of smooth igniting the main engines, smooth adjusting the space rocket initial vertical position. Moreover, it makes possible to abort the space rocket launch plenty seconds after lift-off. It means after lift-off and the space rocket failure, to descend the whole space rocket and hang it back on two movable ground gantries. It would be reverse process in comparison to the lift-off, thus, like from FIG. 7 to FIG. 4.

Moreover, this whole system makes possible aborting the space rocket ascent any time after lift-off and afterward perform emergency landing of the whole space rocket on the specific sea ship. As result, there is possible total salvage of the whole space rocket together with top mounted all modules and payload.

BRIEF DESCRIPTION OF THE DRAWINGS—275 NUMBERS

FIG. 1 is the side view and shows the space rockets vertical landing method in the system for multiple use of the space rockets equipped with the plurality of spreadable arms 5. Here, is shown the method of three space rockets vertical landing on the specific sea ship 10, which has the deck mounted landing station having two pairs of hangers 24, two grasping-wagons 44, two movable ship gantries 20 with the plurality of damping wagons 30 or 31 whereon each space rocket vertically lands as hangs itself on its spreadable arms 5. Both grasping wagons 44 are installed on the specific sea ship 10 two horizontally movable decks 15. Both grasping wagons 44 help secure the space rockets at their bottoms. On the landing station in a few minutes intervals can land three space rockets equipped with the spreadable arms 5. Two first space rockets can be quickly moved on two pairs of hangers 24 and fasten. The third landed space rocket remains on both movable ship gantries 20 and is fastened by both grasping wagons 44. Whereas, FIG. 1 is the side view of the entire specific sea ship 10, which has the deck mounted landing station for individual, vertical landing and also for fastening of three space rockets equipped with the plurality of spreadable arms 5. The current view shows just vertically landing one booster space rocket 1 with entirely lifted (spread out) all spreadable arms 5. This FIG. 1 shows additionally an enlarged drawing fragment with the one damping wagon 30 and the second enlarged drawing fragment of the booster space rocket 1 upper part showing the spreadable arms 5 and the steering flaps 6. Furthermore, nearby to the specific sea ship 10, current FIG. 1 shows the second booster space rocket 1 and the main space rocket 2, which both have also entirely lifted (spread out) all their spreadable arms 5. This view shows and explains that on the same specific sea ship 10, which has such landing station can still additionally vertically land these two earlier mentioned space rockets.

Figures 1, 2, 3:
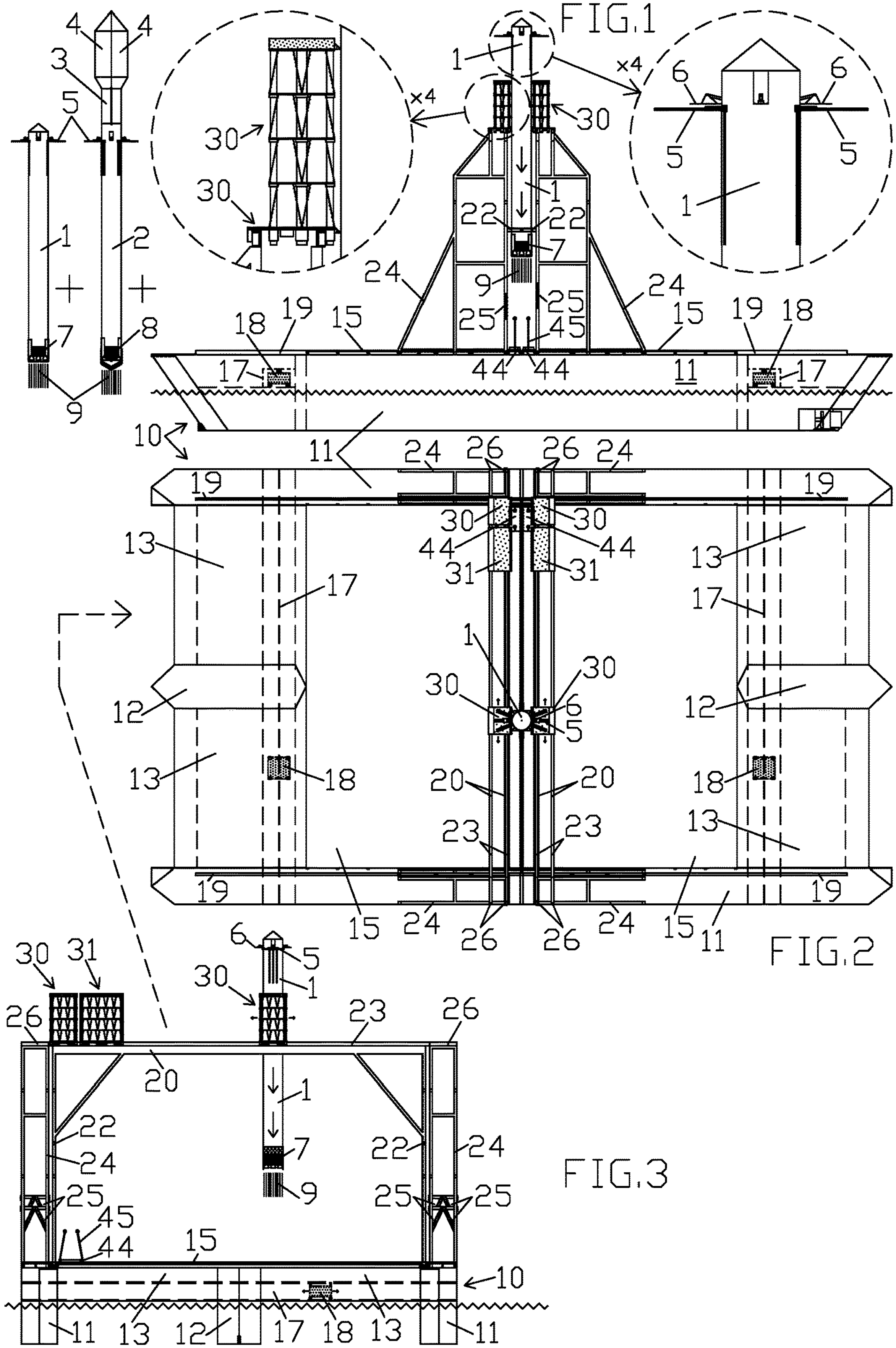
FIG. 2 is the top view of the entire specific sea ship 10 in the same situation as on FIG. 1.
FIG. 3 is the front view of the entire specific sea ship 10 in the same situation as on FIG. 1.

FIG. 4 is the side view and shows the space rockets launch method in the system for multiple use of the space rockets equipped with the plurality of spreadable arms 5. Here, is shown the multi-task station for three jointed space rockets launch preparation, lift-off and later unloading from the specific sea ship 10. The multi-task station comprises two movable ground gantries 104 and one movable specific ground crane 105. Therefor currently, three joined space rockets hang on all their spreadable arms 5 on two movable ground gantries 104 and will lift-off this way. These three joined space rockets are one main space rocket 2, which is joined on both sides with two booster space rockets 1. On the main space rocket 2 top it is mounted the assemblage, which consist of the second stage rocket 3 with attached the sectional load cover 4. And on this FIG. 4 is also sketched the side drawing of one movable specific ground crane 105, because it earlier moved away.

FIG. 5 is the top view of FIG. 4 in the same arrangement and situation.

FIG. 6 is the front view of FIG. 4 in the same arrangement and situation.

FIG. 7 is the side view of three joined space rockets, which are awhile after the lift-off and the side view of two movable ground gantries 104, which are spread somewhat apart on two sides.

Figure 8:
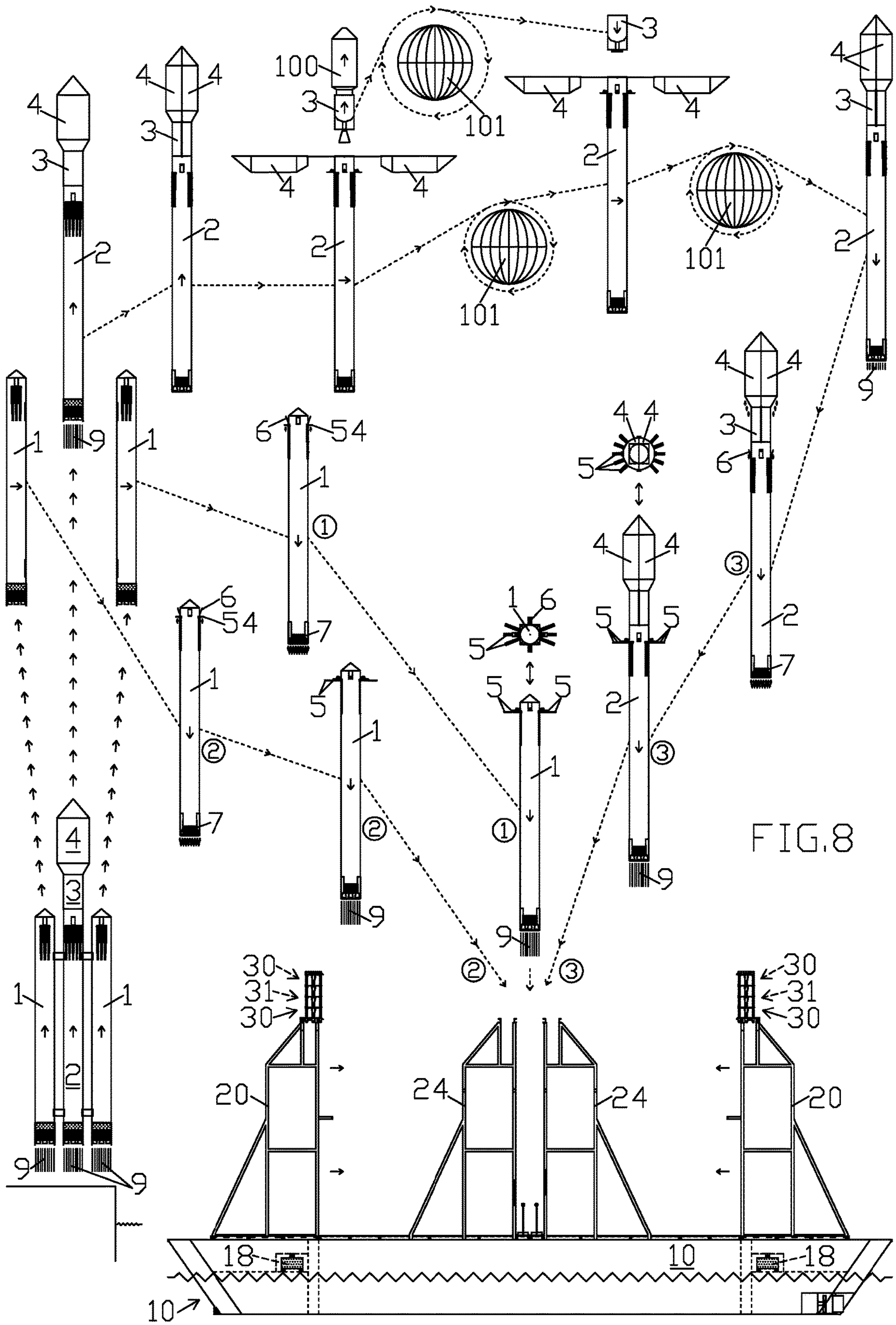

FIG. 8 is a prospectus presentation, which shows lots of crowded scenes in the system for multiple use of the space rockets equipped with the plurality of spreadable arms 5. The current whole presentation shows the methods of three joined space rockets launch and an entire ascent process toward the Earth's orbit, descent and vertical landing with the return load according to the current invention. Therefor this FIG. 8 shows for example plurality drawing statuses of three joined space rockets with their lift-off, joined ascent, their separation, further separated ascent toward the Earth's orbit, deploy the payload, dock the return load, and their individual descending and vertical landing aboard the specific sea ship 10 at open sea. On all space rocket statuses and alongside a plurality of arrows show the directions of their traveling trajectories. These three joined space rockets are the same as on previous FIG. 4, 5, 6, 7 and further FIG. 268, 269 and these are one main space rocket 2, which is joined on both sides with two booster space rockets 1. On the main space rocket 2 top it is mounted the assemblage, which consist of the second stage rocket 3 with attached the sectional load cover 4. At beginning aforesaid three space rockets statuses are in two front drawings. Thereafter, all space rockets statuses are in the side drawings and show their travel toward the specific sea ship 10, which is in the side drawing as well. Here, alongside the space rocket drawing statuses are a plurality of numbers in a plurality of small circles, which explain the space rockets landing sequences. Descent process from the Earth's orbit individually by three space rockets will end with vertical landing aboard the specific sea ship 10. Therefor both movable ship gantries 20 are entirely spread apart in two directions before landing of every space rocket as it is shown on the current view. The entire prospectus presentation on FIG. 8 targets presentation that is possible individual, vertical landing as many as three space rockets equipped with the spreadable arms 5 on one specific sea ship 10 at sea.

Figure 9:
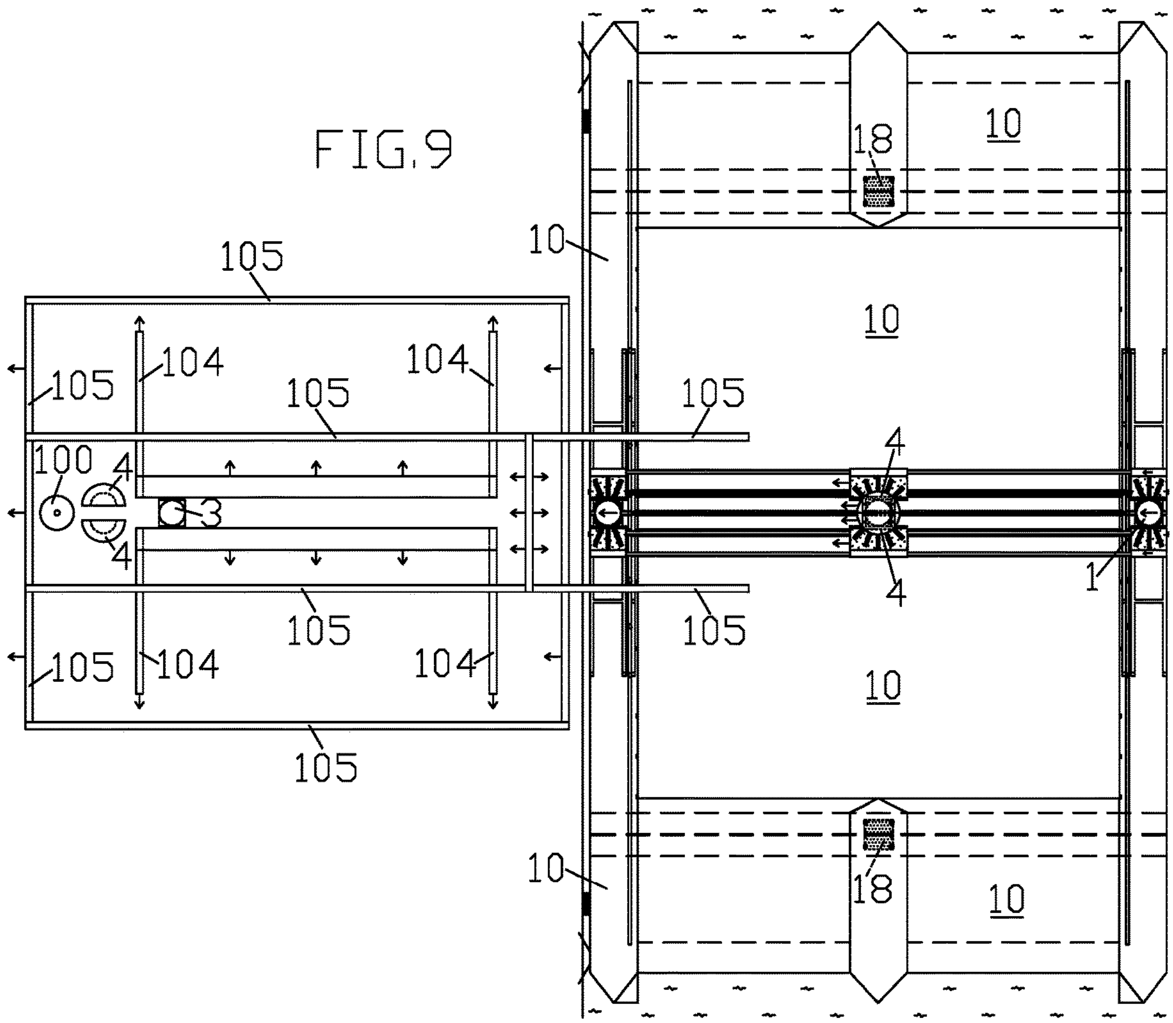

FIG. 9 is the top view and shows the space rockets vertical unloading method in the system for multiple use of the space rockets equipped with the plurality of spreadable arms 5. Here, is shown the method of three space rockets vertical unloading from the specific sea ship 10 at the multi-task station according to the current invention. Therefor this FIG. 9 shows the specific sea ship 10, which just moored at the multi-task station for unloading of three space rockets, which later can be launch again together or individually. This multi-task station consists of two movable ground gantries 104 and of one movable specific ground crane 105. Aboard the specific sea ship 10 are hanged and still individually fastened three space rockets.

Figure 10:
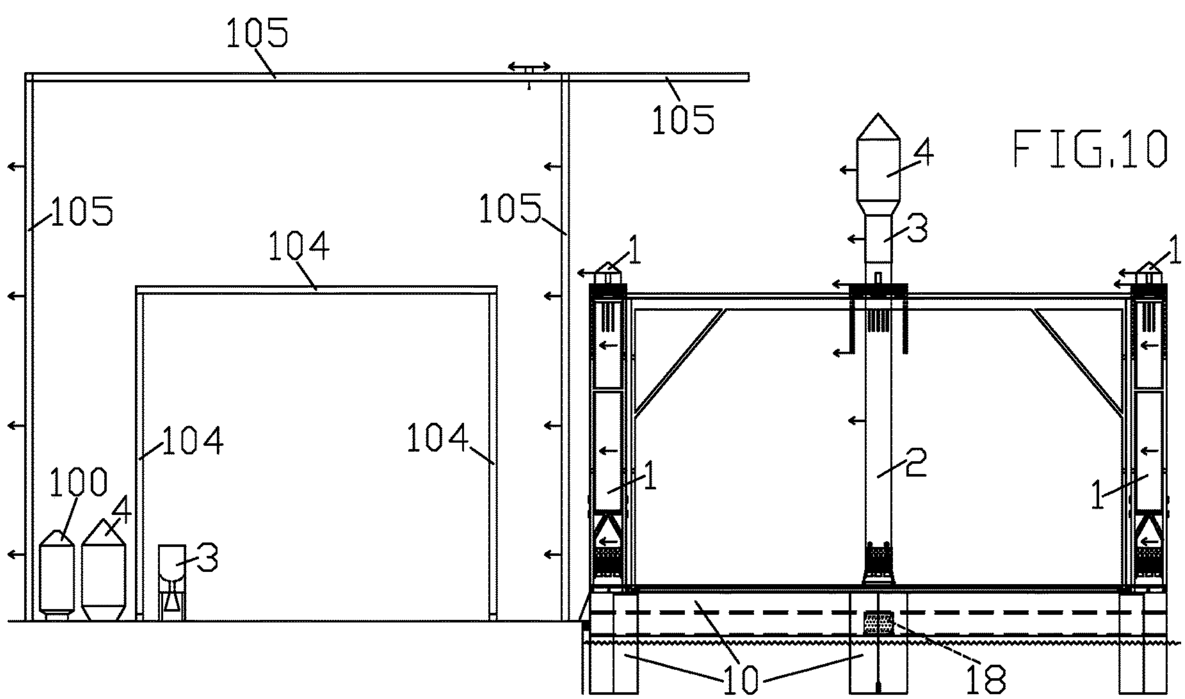

FIG. 10 is the front view of FIG. 9 in the same arrangement and situation.

FIG. 11 is the side view of the entire specific sea ship 10, which has the deck mounted landing station for individual, vertical landing and also for fastening of three space rockets equipped with the plurality of spreadable arms 5. Therefor nearby the specific sea ship 10 is also one booster space rocket 1, which has entirely lifted (spread out) all spreadable arms 5. The specific sea ship 10 and the landing station are ready for landing the first booster space rocket 1. The same side view of the entire specific sea ship 10 is also shown as enlarged on FIG. 270.

FIG. 12 is the top view of the entire specific sea ship 10 in the same arrangement and situation as on FIG. 11. The same top view of the entire specific sea ship 10 is also shown as enlarged on FIG. 271.

FIG. 13 is the front view of the entire specific sea ship 10 in the same arrangement and situation as on FIG. 11. The same front view of the entire specific sea ship 10 is also shown as enlarged on FIG. 272.

FIG. 14 is the side view of the entire specific sea ship 10, which has the deck mounted landing station for individual, vertical landing and also for fastening of three space rockets equipped with the plurality of spreadable arms 5. This view shows this specific sea ship 10 and the landing station ready for landing the second booster space rocket 1 because on her earlier already landed the first booster space rocket 1. Therefor here the specific sea ship 10 is with one booster space rocket 1, which hangs on one pair of hangers 24 and is already fastened at the bottom by means of four rotating wedges 25.

FIG. 15 is the top view of the entire specific sea ship 10 in the same situation as on FIG. 14.

FIG. 16 is the front view of the entire specific sea ship 10 in the same situation as on FIG. 14.

Figure 17:
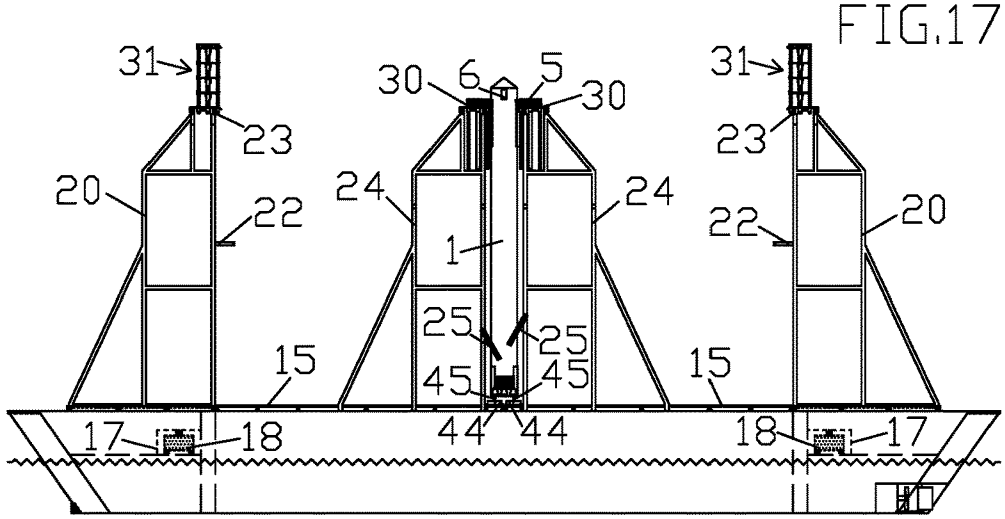

FIG. 17 is the side view of the entire specific sea ship 10, which has the deck mounted landing station for individual, vertical landing and also for fastening of three space rockets equipped with the plurality of spreadable arms 5. This view shows this specific sea ship 10 and the landing station ready for landing the third space rocket because earlier already landed two booster space rockets 1. Therefor the current view shows the specific sea ship 10 with two booster space rockets 1 whereas, each one hangs on one pair of hangers 24 and each one is fastened at the bottom by means of four rotating wedges 25.

Figure 18:
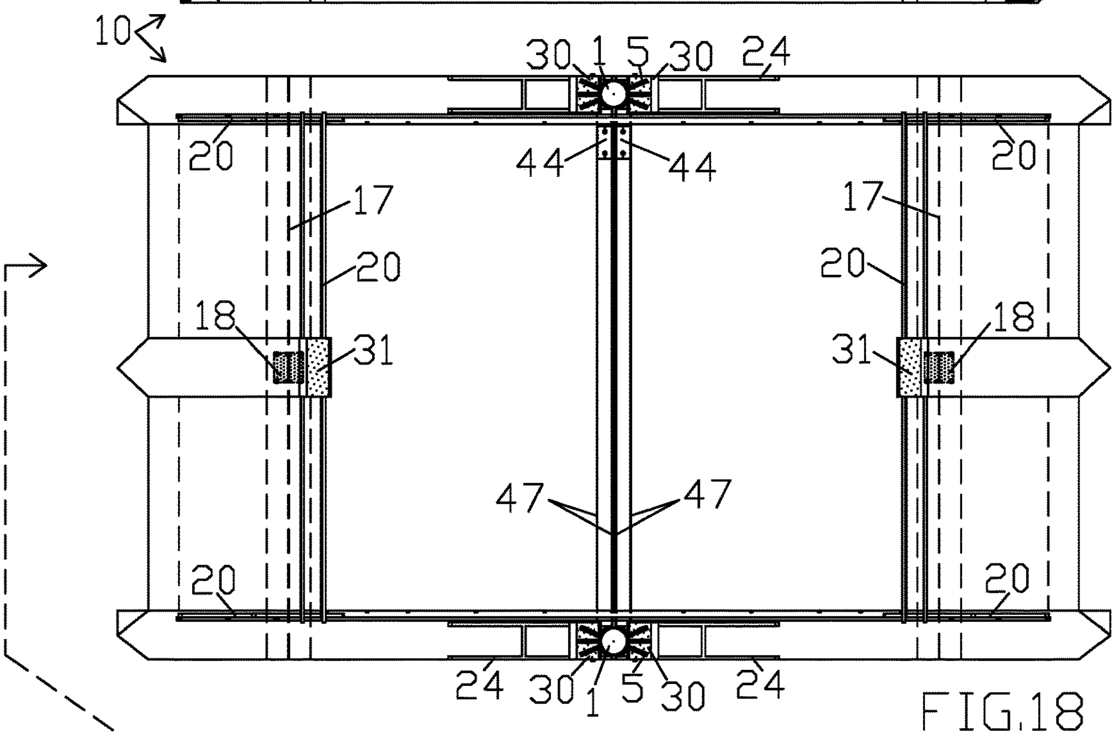

FIG. 18 is the top view of the entire specific sea ship 10 in the same situation as on FIG. 17.

Figure 19:
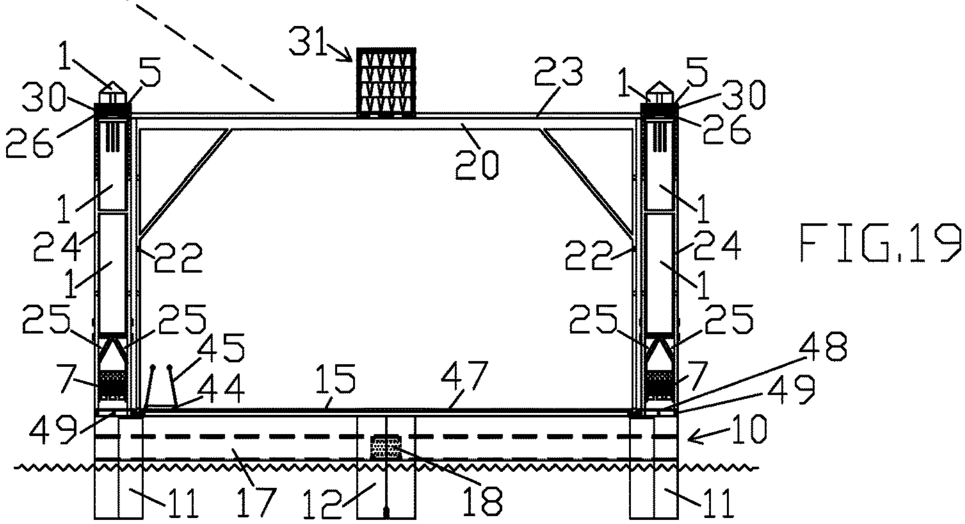

FIG. 19 is the front view of the entire specific sea ship 10 in the same situation as on FIG. 17.

Figure 20:
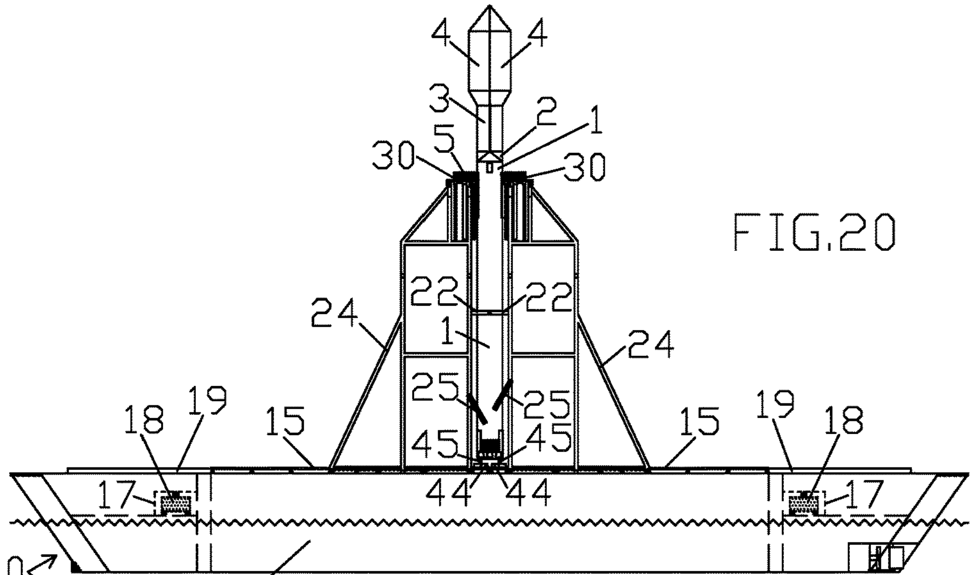

FIG. 20 is the side view of the entire specific sea ship 10, which has the deck mounted landing station for individual, vertical landing and also for fastening of three space rockets equipped with the plurality of spreadable arms 5. Here, this specific sea ship 10 is with three individually hanged and fastened space rockets and, which are ready for transporting over the sea for unloading at the multi-task station.

Figure 21:
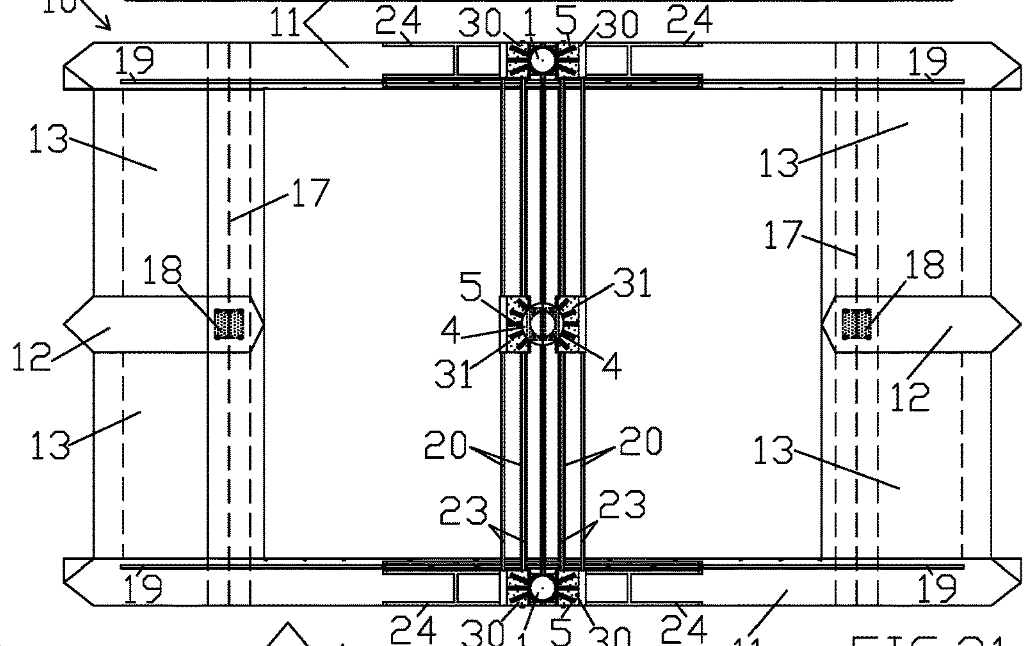

FIG. 21 is the top view of the entire specific sea ship 10 in the same situation as on FIG. 20.

Figure 22:
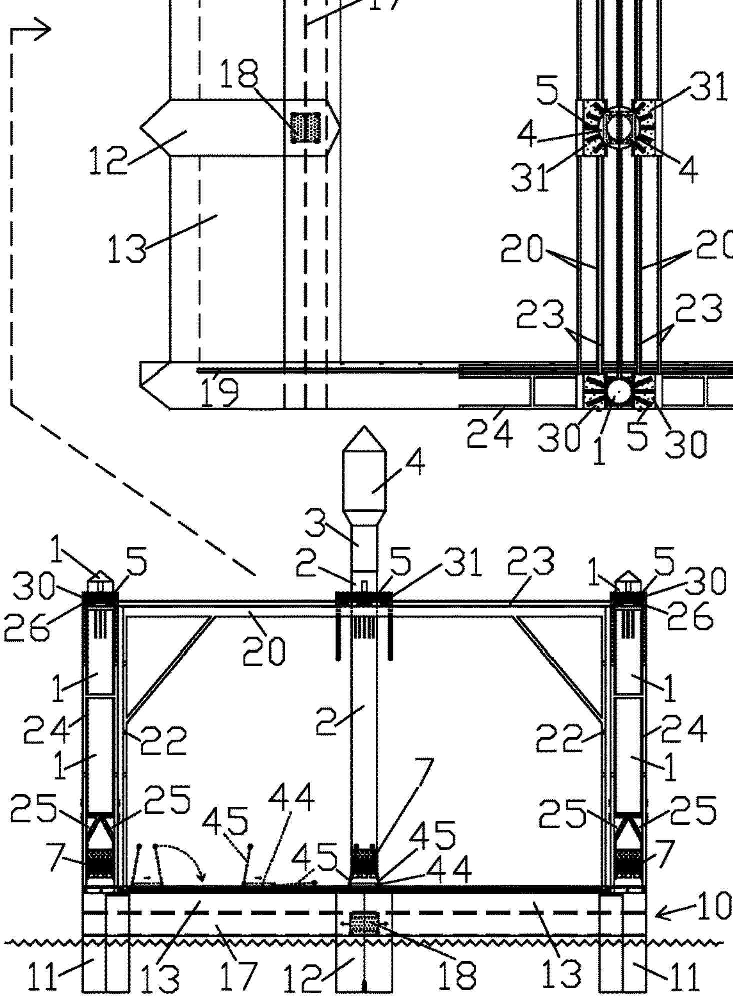

FIG. 22 is the front view of the entire specific sea ship 10 in the same situation as on FIG. 20.

FIG. 23 is the side view of the entire landing station for individual, vertical landing of three space rockets. This landing station is in the same arrangement as aboard the specific sea ship 10 however the current view is without the grasping wagons 44.

FIG. 24 is the top view of FIG. 23 in the same arrangement and situation.

FIG. 25 is the front view of FIG. 23 in the same arrangement and situation.

Figure 26:
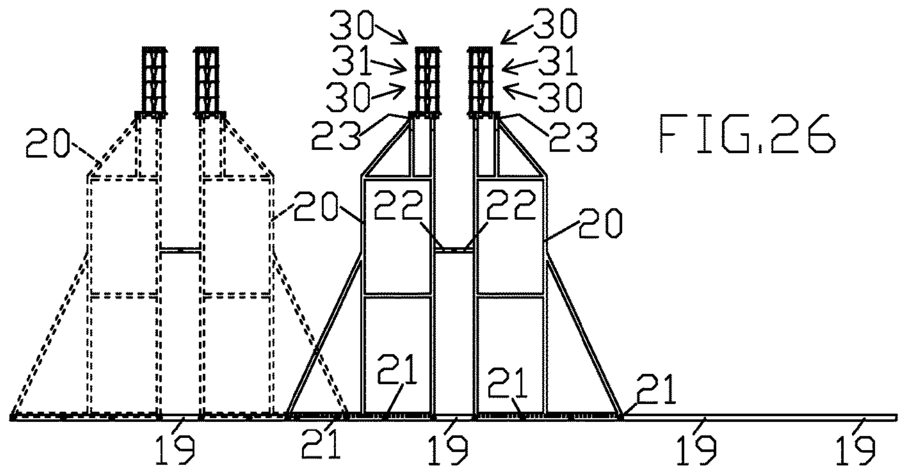

FIG. 26 is the side view of two whole movable ship gantries 20 by themselves, which are in the same arrangement as aboard the specific sea ship 10 and the same as on FIGS. 1-3 and 11-13.

Figure 27:
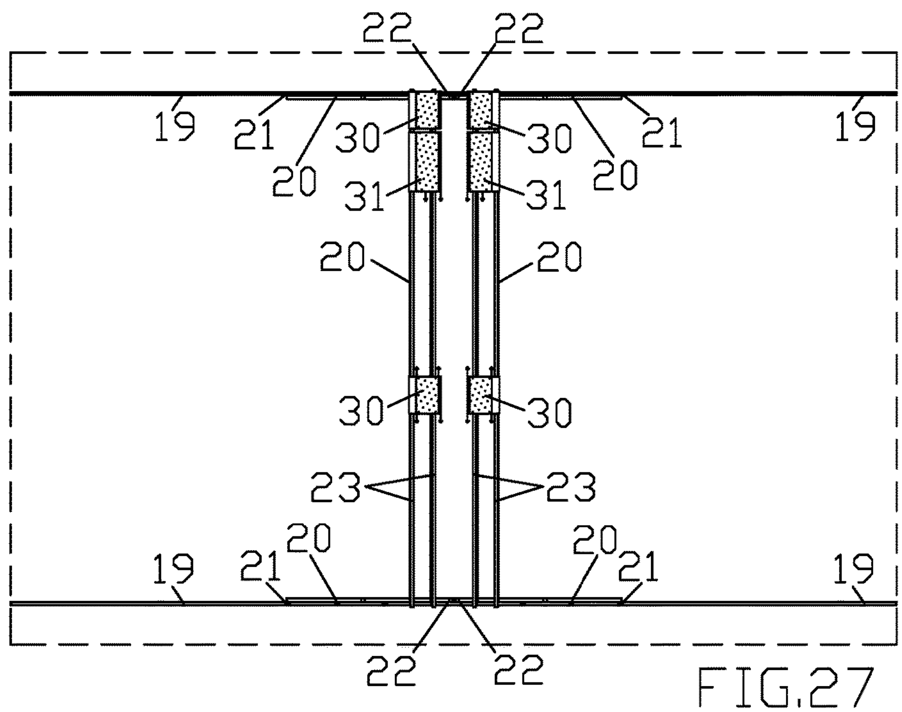

FIG. 27 is the top view of two whole movable ship gantries 20 in the same arrangement as on FIG. 26.

Figure 28:
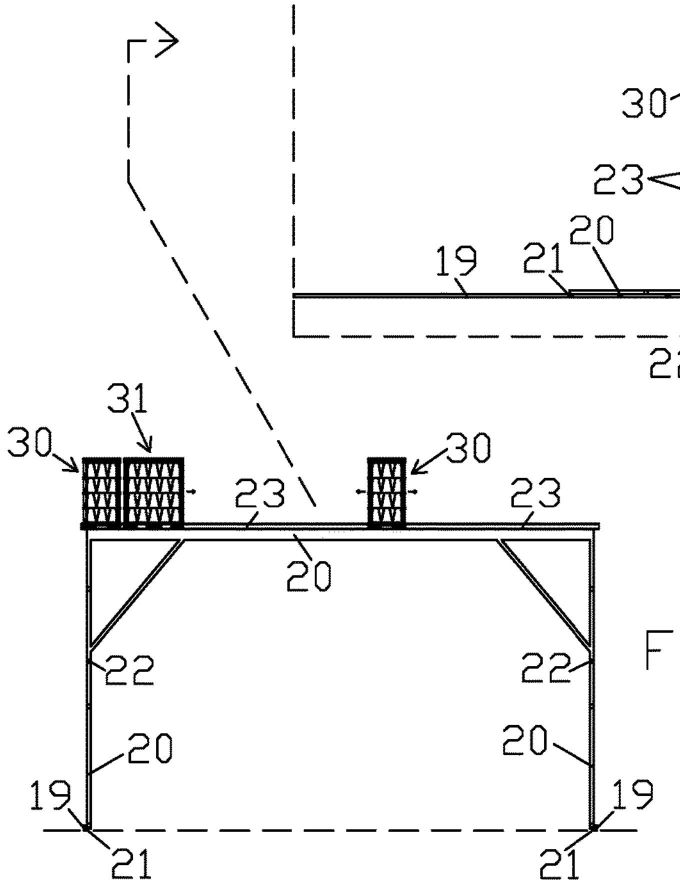

FIG. 28 is the front view of two whole movable ship gantries 20 in the same arrangement as on FIG. 26.

Figure 29:
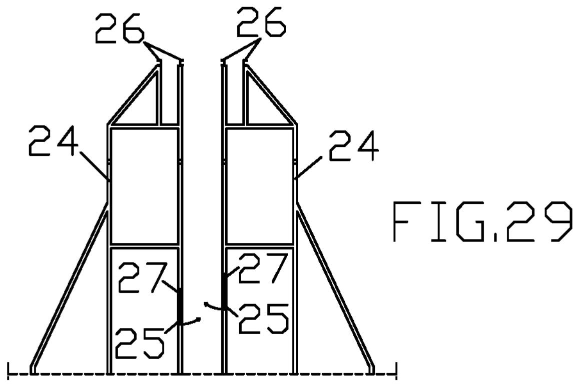

FIG. 29 is the side view of two pairs of hangers 24 in the same arrangement as on the specific sea ship 10.

Figure 30:
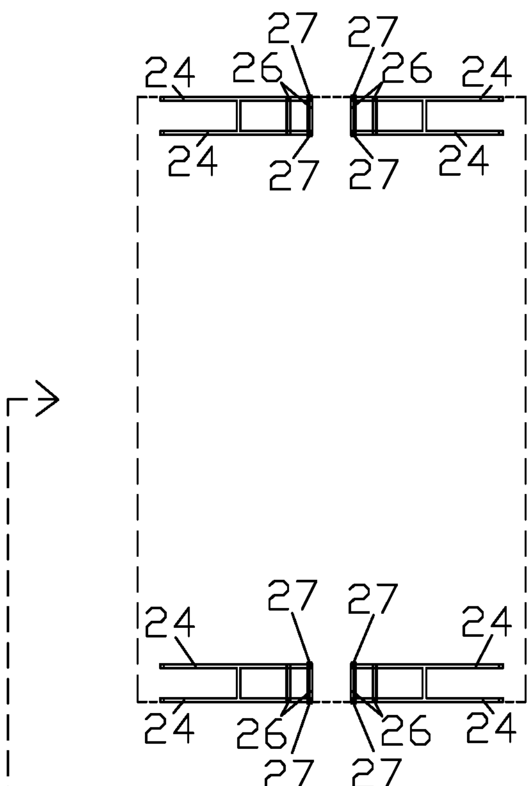

FIG. 30 is the top view of two pairs of hangers 24 in the same arrangement as on FIG. 29.

Figure 31:
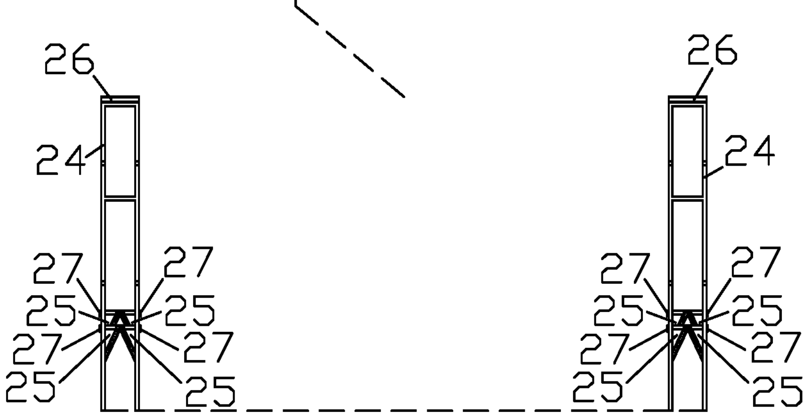

FIG. 31 is the front view of two pairs of hangers 24 in the same arrangement as on FIG. 29.

FIG. 32 is the enlarged side view of one pair of hangers 24 wherein each has two rotating wedges 25 lowered and with two arrows showing their rotating directions.

FIG. 33 is the top view of FIG. 32 in the same arrangement.

FIG. 34 is the front view of FIG. 32 in the same arrangement.

FIG. 35 is the enlarged side view of one pair of hangers 24 with a fragment of the space rocket fuselage 51, which is fastened by means of four rotating wedges 25.

FIG. 36 is the top view of FIG. 35 in the same arrangement.

FIG. 37 is the front view of FIG. 35 in the same arrangement.

FIG. 38 is the top view of the horizontal sectional view according to the S-S line on FIG. 35.

Figure 39:
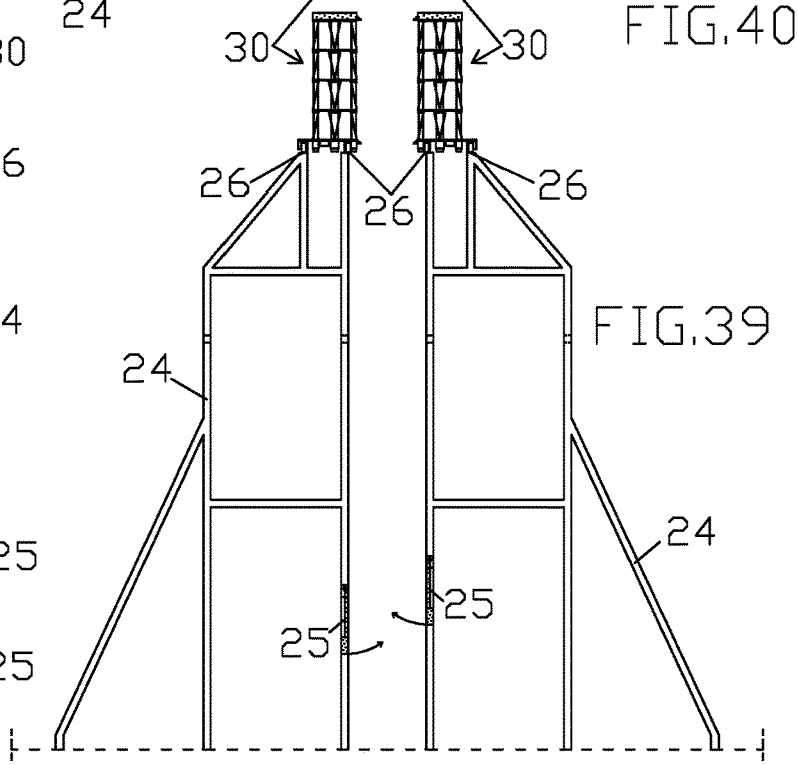

FIG. 39 is the enlarged side view of one pair of hangers 24 whereon tops on four upper short rails 26 stand two damping wagons 30.

Figure 40:
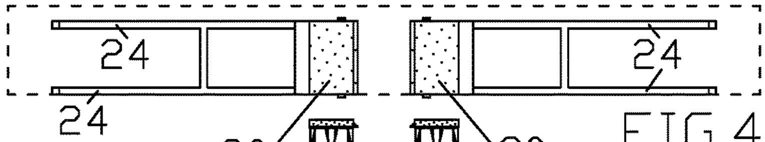

FIG. 40 is the top view of FIG. 39 in the same arrangement.

Figure 41:
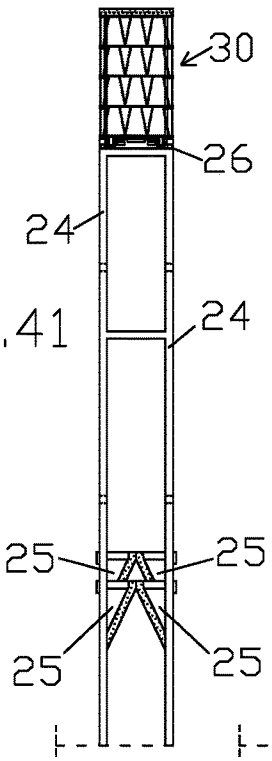

FIG. 41 is the front view of FIG. 39 in the same arrangement.

Figure 42:
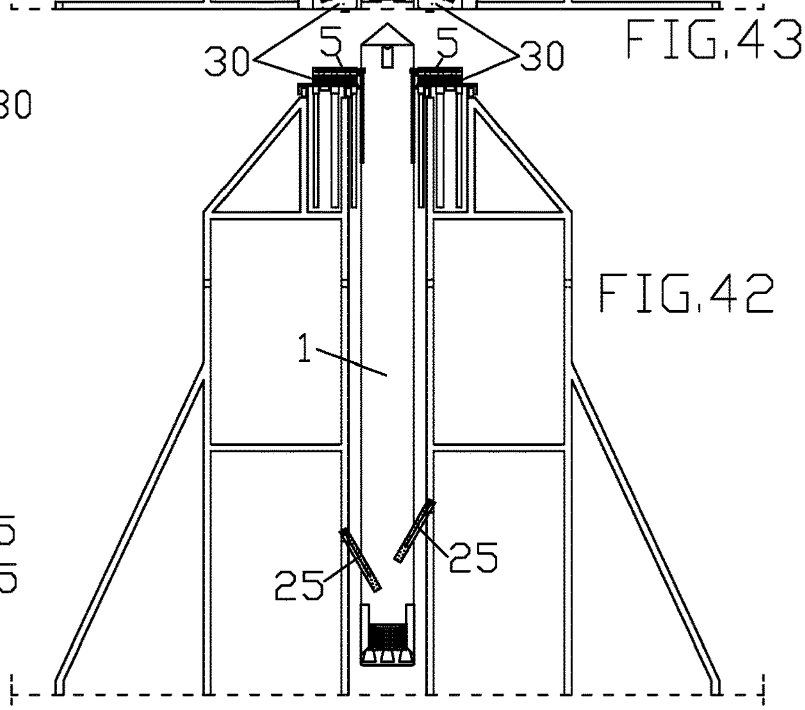

FIG. 42 is the enlarged side view of one pair of hangers 24 with hanged and fastened one booster space rocket 1.

Figure 43:
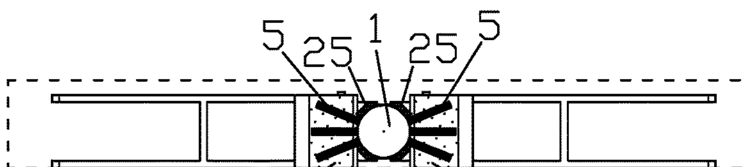

FIG. 43 is the top view of FIG. 42 in the same arrangement and situation.

Figure 44:
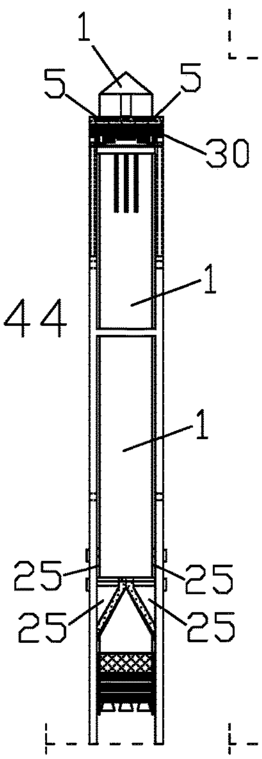

FIG. 44 is the front view of FIG. 42 in the same arrangement and situation.

FIG. 45 is the enlarged side view of the rotating wedges 25 with two hangers 24 fragments sketches, which are performed with the dashed lines. All four rotating wedges 25 are completely lowered and with two arrows showing their rotating directions.

FIG. 46 is the top view of FIG. 45 in the same arrangement.

FIG. 47 is the front view of FIG. 45 in the same arrangement.

FIG. 48 is the enlarged side view of four rotating wedges 25, which are rotated in such way that they all together tighten up the space rocket fuselage 51 fragment.

FIG. 49 is the top view of FIG. 48 in the same arrangement and situation.

FIG. 50 is the front view of FIG. 48 in the same arrangement and situation.

FIG. 51 is the top view and shows for example the space rocket bottom, which is moved away from correct location.

FIG. 52 is a lot enlarged side view of two rotating wedges 25, which are wholly lowered.

FIG. 53 is the top view of FIG. 52 in the same arrangement.

FIG. 54 is the front view of FIG. 52 in the same arrangement.

FIG. 55 is a lot enlarged side view of one pair of hangers 24 upper part in the same status as was earlier shown on FIG. 39. On one pair of hangers 24 tops and on four upper short rails 26 stand two damping wagons 30.

FIG. 56 is the top view of FIG. 55 in the same arrangement and situation.

FIG. 57 is the front view of FIG. 55 in the same arrangement and situation.

FIG. 58 is a lot enlarged side view of one pair of hangers 24 upper part in the same statuses as were earlier shown on FIG. 42. Here, on one pair of hangers 24 is hanged one booster space rocket 1.

FIG. 59 is the top view of FIG. 58 in the same arrangement and situation.

FIG. 60 is the front view of FIG. 58 in the same arrangement and situation.

Figures 61, 62, 63, 64, 65, 66:
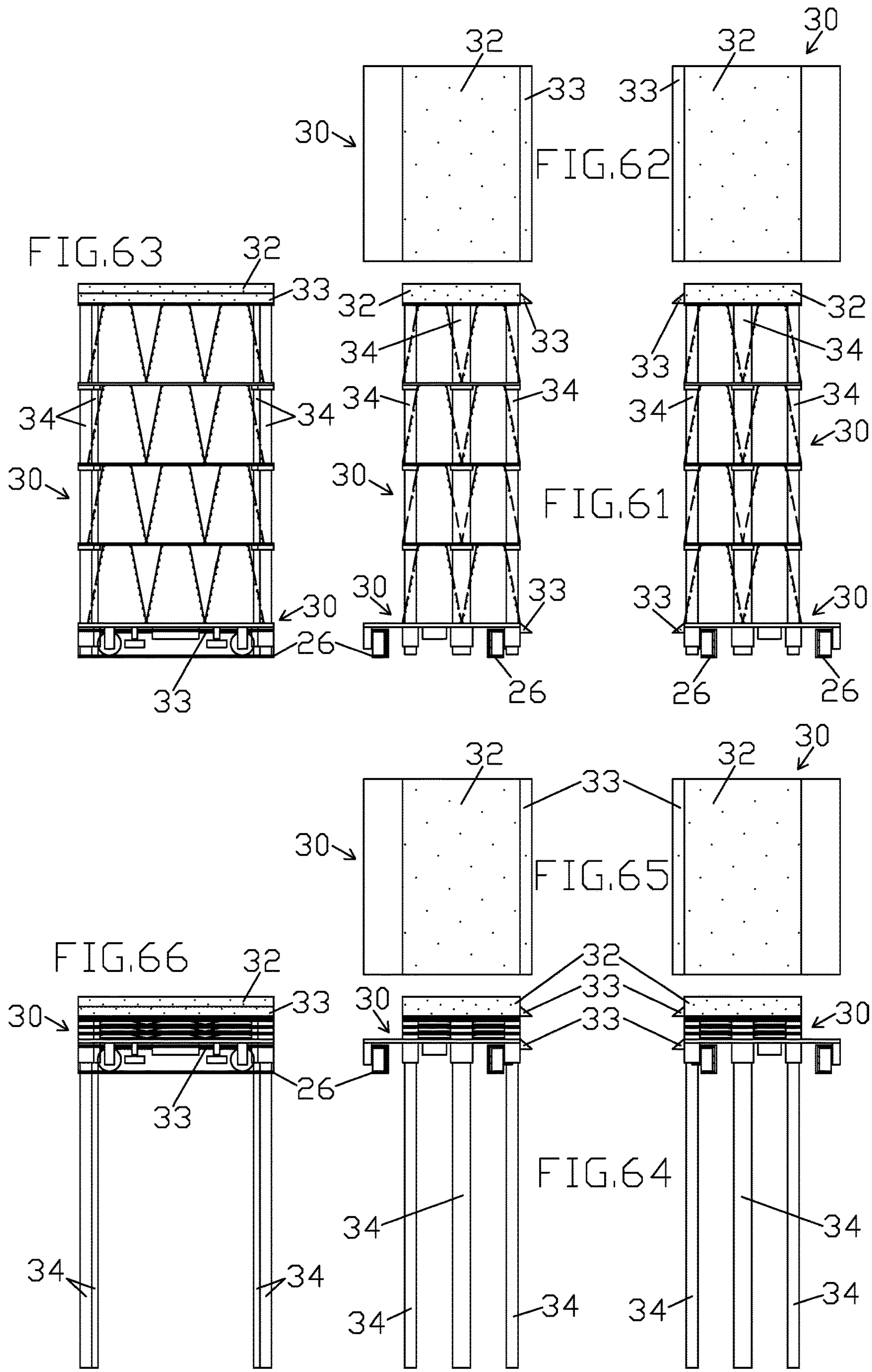

FIG. 61 is a lot enlarged side view of two damping wagons 30, which are not compressed, and they stand on four upper short rails 26, which are on the tops of one pair of hangers 24.

FIG. 62 is the top view of FIG. 61 in the same arrangement and situation.

FIG. 63 is the front view of FIG. 61 in the same arrangement and situation.

FIG. 64 is a lot enlarged side view of two damping wagons 30, which for example are compressed and stand on four upper short rails 26, which are on the tops of one pair of hangers 24.

FIG. 65 is the top view of FIG. 64 in the same arrangement and situation.

FIG. 66 is the front view of FIG. 64 in the same arrangement and situation.

FIG. 67 is a lot enlarged side view of one entire damping wagon 30, which is not compressed and in different manner than previously, stands on two upper long rails 23, which are on one movable ship gantry 20 top.

FIG. 68 is the top view of FIG. 67 in the same arrangement and situation.

FIG. 69 is the front view of FIG. 67 in the same arrangement and situation.

FIG. 70 is the bottom projection of FIG. 67 in the same arrangement and situation.

FIG. 71 is the top view of the horizontal sectional view according to the S-S line on FIG. 69.

FIG. 72 is a lot enlarged side view of one entire damping wagon 30 which for example is compressed and does not stand on any rails.

FIG. 73 is the top view of FIG. 72 in the same arrangement.

FIG. 74 is the front view of FIG. 72 in the same arrangement.

FIG. 75 is a lot enlarged side view of one large damping wagon 31, which is not compressed and stands on two upper long rails 23, which are on one movable ship gantry 20 top.

FIG. 76 is the top view of FIG. 75 in the same arrangement and situation.

FIG. 77 is the front view of FIG. 75 in the same arrangement and situation.

FIG. 78 is the bottom projection of FIG. 75 in the same arrangement and situation.

FIG. 79 is the top view of the horizontal sectional view according to the S-S line on FIG. 75.

FIG. 80 is the side view of two grasping wagons 44 wherein each with two rotating poles 45. Both grasping wagons 44 stand on four short transverse rails 48. The rotating poles 45 are raised.

FIG. 81 is the top view of FIG. 80 in the same arrangement and situation.

FIG. 82 is the front view of FIG. 80 in the same arrangement and situation.

FIG. 83 is the side view of two grasping wagons 44 standing on four long transverse rails 47. Both grasping wagons 44 by means of four raised rotating poles 45 tighten one main space rocket 2 bottom.

FIG. 84 is the top view of FIG. 83 in the same arrangement and situation.

FIG. 85 is the front view of FIG. 83 in the same arrangement and situation.

FIG. 86A is the side view of one booster space rocket 1 upper part, which has six spreadable arms 5 and four steering flaps 6. Here, all spreadable arms 5 are entirely lowered. Whereat all four flaps 6 are vertically set and are entirely inside the space rocket fuselage.

FIG. 86B is the side view of one booster space rocket 1 bottom part, which has one sliding engines cover 7 and, which currently is entirely lifted.

FIG. 87 is the top view of FIGS. 86A and 86B in two equal views, which are rotated 90 degrees.

FIG. 88A is the front view of FIG. 86A in the same arrangement and situation.

FIG. 88B is the front view of FIG. 86B in the same arrangement and situation.

Figure 89A:
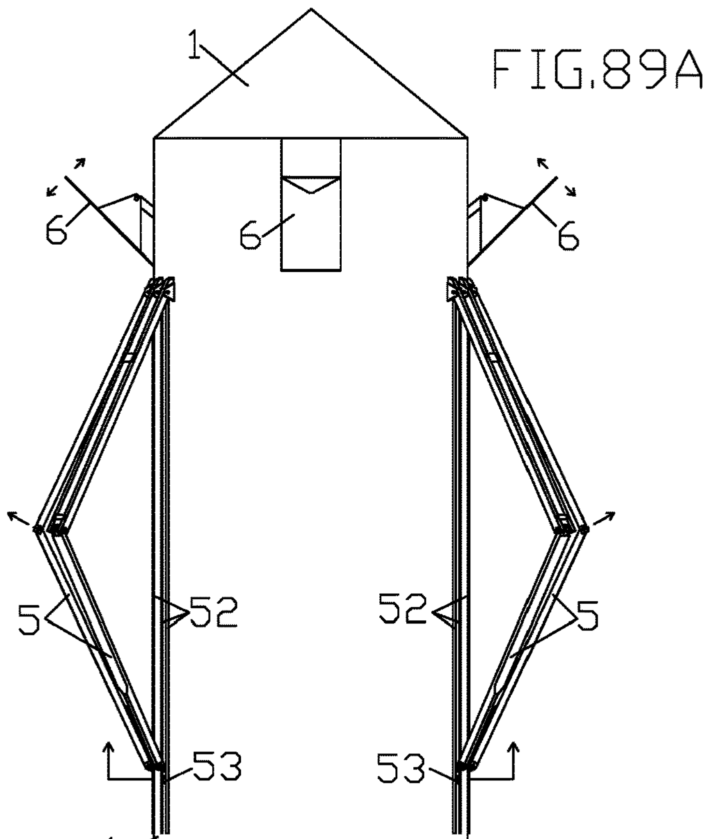

FIG. 89A is the side view of one booster space rocket 1 upper part, which has a bit lifted all six spreadable arms 5. Whereat all four flaps 6 are a lot deflected out.

Figure 89B:
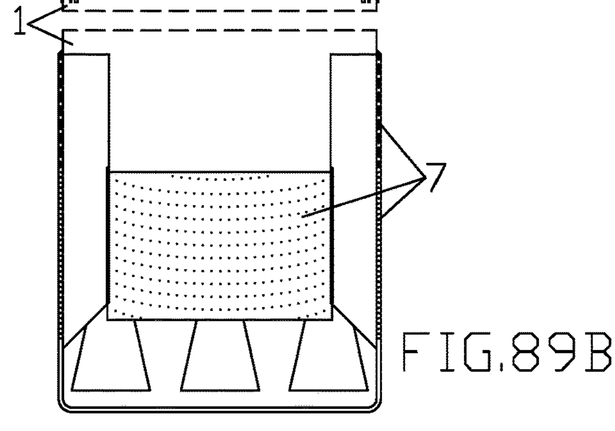

FIG. 89B is the side view of one booster space rocket 1 bottom part, which has one sliding engines cover 7 and, which is entirely lifted.

Figure 90:
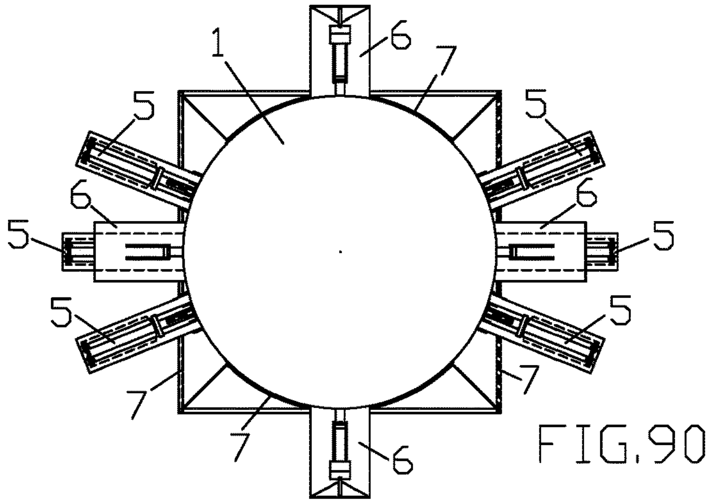

FIG. 90 is the top view of FIGS. 89A and 89B in the same arrangement and situation.

FIG. 91A is the side view of one booster space rocket 1 upper part, which has entirely lifted (spread out) all six spreadable arms 5. And whereat all four flaps 6 are entirely deflected out.

FIG. 91B is the side view of one booster space rocket 1 bottom part, which has one sliding engines cover 7 and, which currently, is entirely lifted.

FIG. 92 is the top view of FIGS. 91A, 91B and 93A, 93B in the same arrangement and situation. This FIG. 92 is the top view in two equal views, which are rotated 90 degrees.

FIG. 93A is the front view of FIG. 91A in the same arrangement and situation.

FIG. 93B is the front view of FIG. 91B in the same arrangement and situation.

FIG. 94A is the side view of one main space rocket 2 upper part, which has all spreadable arms 5 entirely lowered dam. And all four flaps 6 are vertically set and are inside the space rocket fuselage.

FIG. 94B is the side view of one main space rocket 2 bottom part, which has one sliding engines cover 7 and, which currently, is entirely lifted.

FIG. 95 is the top view of FIG. 94A, 94B and FIG. 96A, 96B in the same arrangement and situation. This FIG. 95 is the top view in two equal views, which are rotated 90 degrees.

FIG. 96A is the front view of FIG. 94A in the same arrangement and situation.

FIG. 96B is the front view of FIG. 94B in the same arrangement and situation.

FIGS. 97A and 97B are the side views of one main space rocket 2 upper and bottom parts, which has entirely lifted (spread out) all ten spreadable arms 5. Whereat all four flaps 6 are entirely deflected out. Whereat the sliding engines cover 7 is entirely lifted.

FIG. 98 is the top view of FIGS. 97A and 97B in the same arrangement and situation. This FIG. 98 is the top view in two equal views, which are rotated 90.

FIGS. 99A and 99B is the front view of FIGS. 97A and 97B in the same arrangement and situation.

Figure 100:
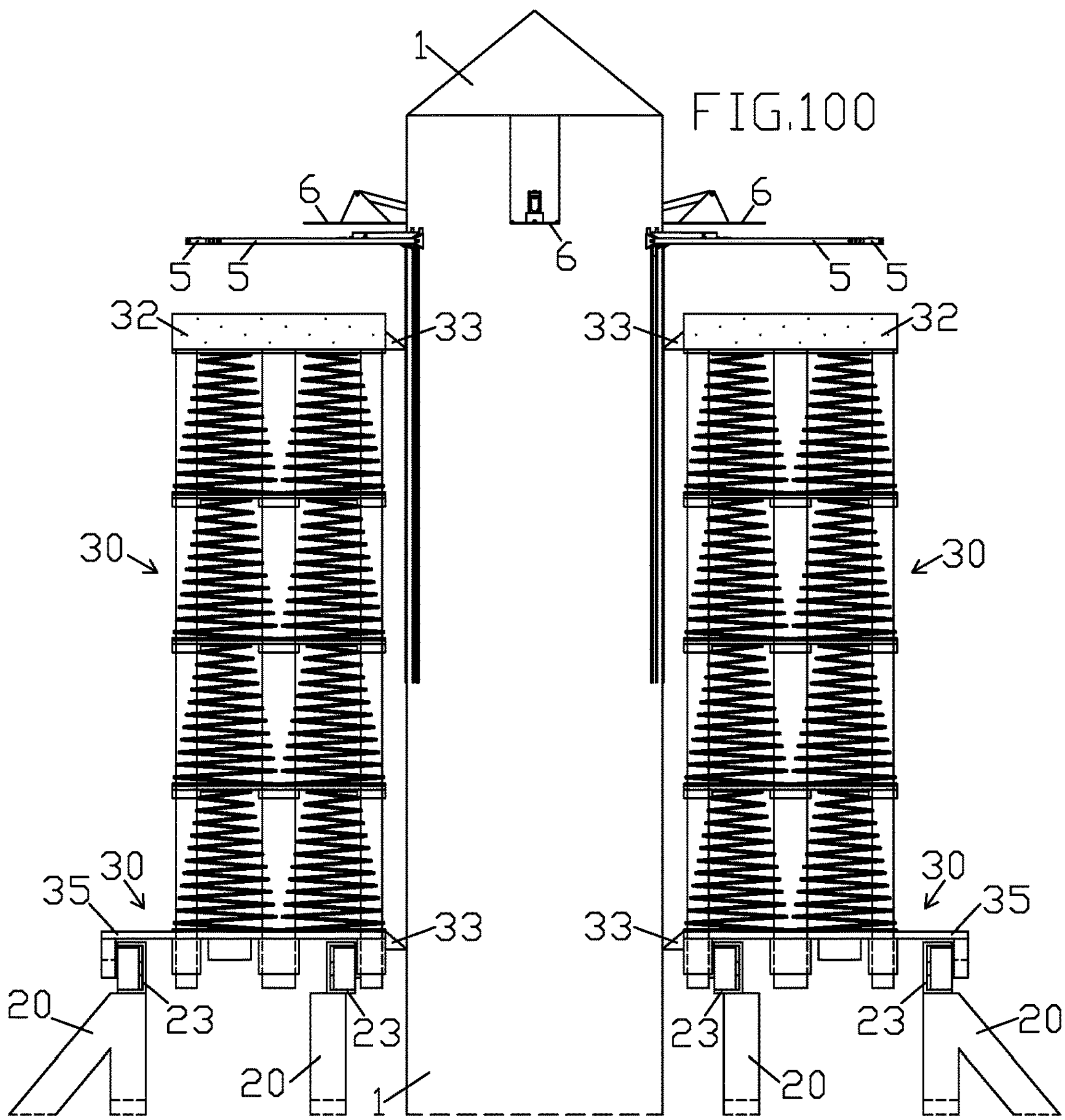

FIG. 100 is the side view of one booster space rocket 1 upper part and of two movable ship gantries 20 upper part whereon tops stand two damping wagons 30 and, which are not compressed. This view shows just vertically landing one booster space rocket 1, which in a moment will hang itself on two damping wagons 30.

Figure 101:
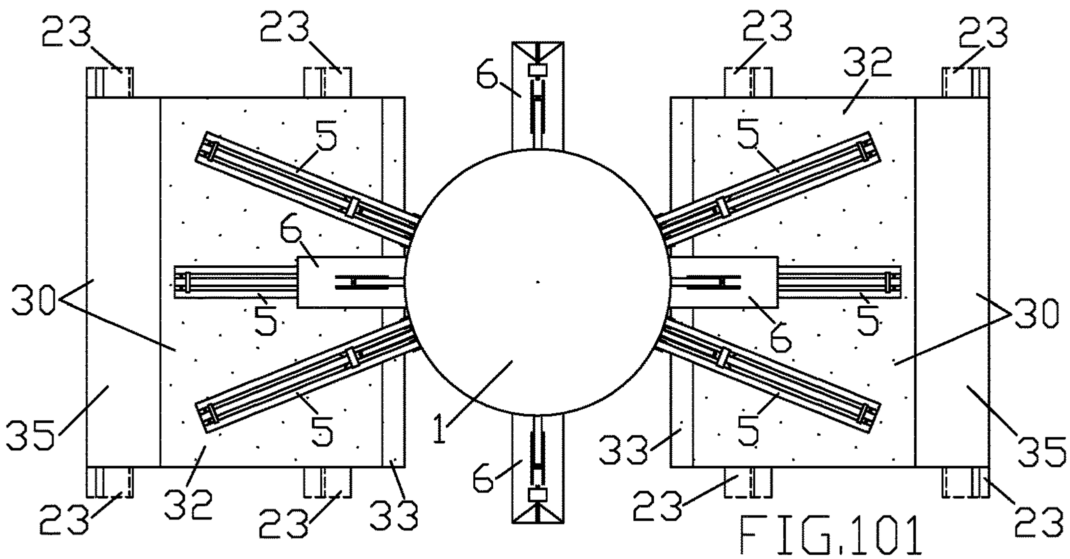

FIG. 101 is the top view of FIG. 100 in the same arrangement and situation.

Figure 102:
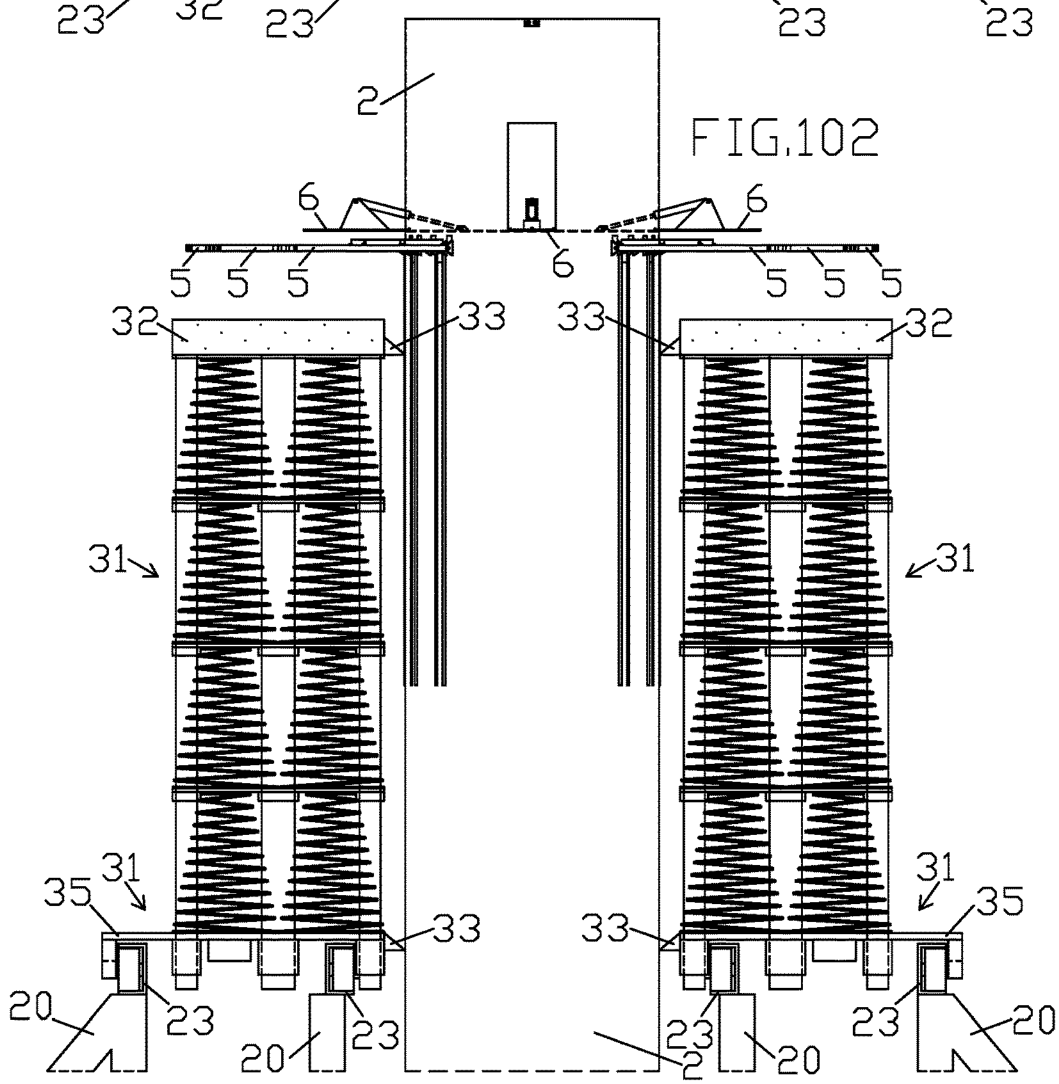

FIG. 102 is the side view of one main space rocket 2 upper part and of two movable ship gantries 20 upper part whereon tops stand two large damping wagons 31 and, which are not compressed. This view shows just vertically landing the main space rocket 2, which in a moment will hang itself on two large damping wagons 31.

Figure 103:
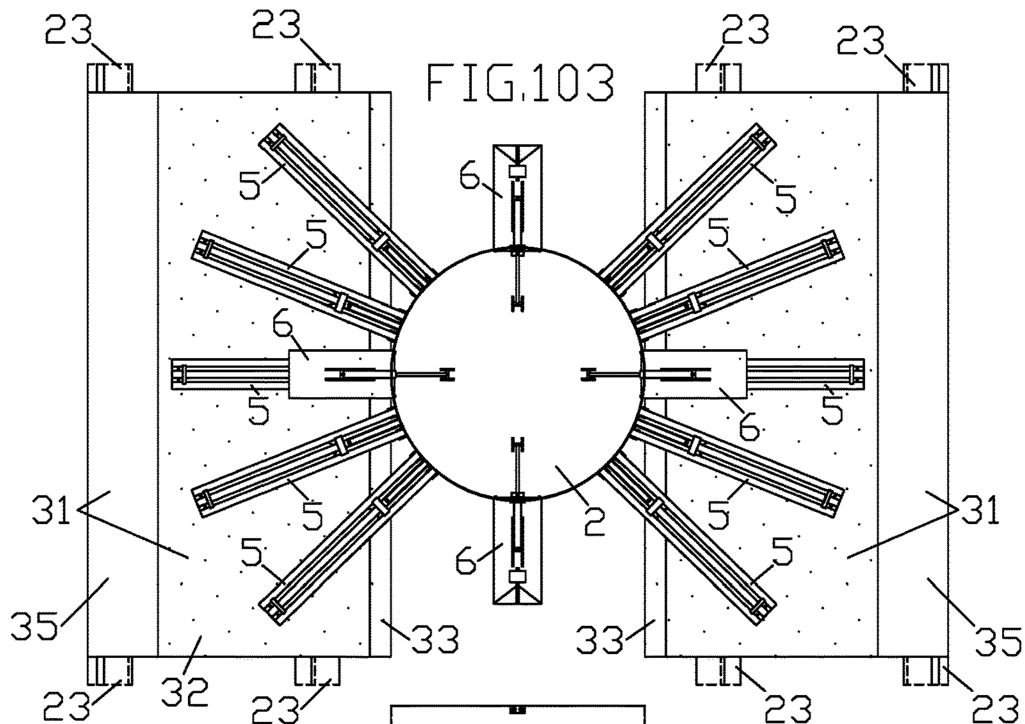

FIG. 103 is the top view of FIG. 102 in the same arrangement and situation.

FIG. 104 is the side view of four steering flaps 6 installed in the main space rocket 2 upper part. Currently, all four flaps 6 are vertically set and are entirely inside the space rocket fuselage.

FIG. 105 is the top view of FIG. 104 in the same arrangement.

FIG. 106 is the front view of FIG. 104 in the same arrangement.

FIG. 107 is the side view of four steering flaps 6 in the main space rocket 2 upper part. Currently, all four flaps 6 are a lot deflected outside.

FIG. 108 is the top view of FIG. 107 in the same arrangement.

FIG. 109 is the front view of FIG. 107 in the same arrangement.

FIG. 110 is the side view of four steering flaps 6 in the main space rocket 2 upper part. Currently, all four flaps 6 are entirely deflected outside FIG. 111 is the top view of FIG. 110 in the same arrangement.

FIG. 112 is the front view of FIG. 110 in the same arrangement.

FIG. 113 is the enlarged side view of one steering flap 6 with the sketches of its deflection mechanism in a main space rocket 2 fragment. Currently, this flap 6 is vertically set and entirely inside the space rocket fuselage.

FIG. 114 is the top view of FIG. 113 in the same arrangement.

FIG. 115 is the front view of FIG. 113 in the same arrangement.

FIG. 116 is the enlarged side view of one steering flap 6 with the sketches of its deflection mechanism in the main space rocket 2 fragment. Currently, this flap 6 is entirely deflected outside the space rocket fuselage.

FIG. 117 is the top view of FIG. 116 in the same arrangement.

FIG. 118 is the front view of FIG. 116 in the same arrangement.

FIG. 119 is the side view of a fragment of one main space rocket 2 upper part, which has entirely lowered all ten spreadable arms 5. Here, is visible in, which way are spaced out all ten spreadable arms 5 outside the space rocket fuselage.

FIG. 120 is the top view of FIG. 119 in the same arrangement. FIG. 120 shows all mechanisms outside and inside space rocket and in, which way are spaced out all ten spreadable arms 5. This FIG. 120 is the top view in two equal views, which are rotated 90 degrees.

FIG. 121 is the front view of FIG. 119 in the same arrangement.

FIG. 122 is the side view of the fragment of one main space rocket 2 upper part, which has entirely lifted all ten spreadable arms 5 and consequently they are completely spread out on two sides. And therefor these spreadable arms 5 are transverse the space rocket fuselage.

FIG. 123 is the top view of FIG. 122 in the same arrangement. FIG. 123 shows all mechanisms outside and inside space rocket and in, which way are spaced out all ten spreadable arms 5.

Figure 124:
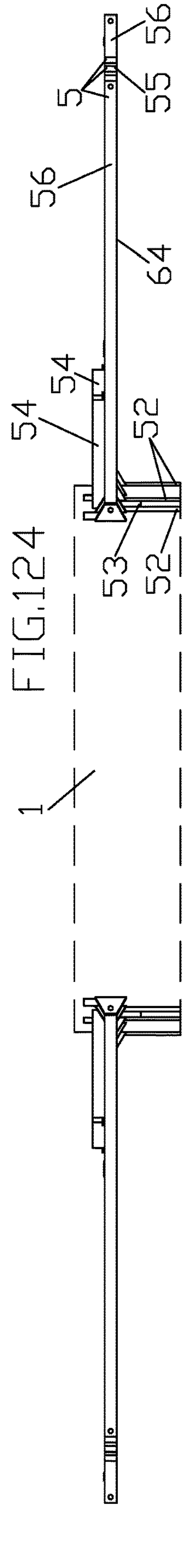

FIG. 124 is the enlarged side view of a fragment of one booster space rocket 1 upper part, which has entirely lifted all six spreadable arms 5 and consequently they are entirely spread out on two sides and are transverse the space rocket fuselage.

Figure 125:
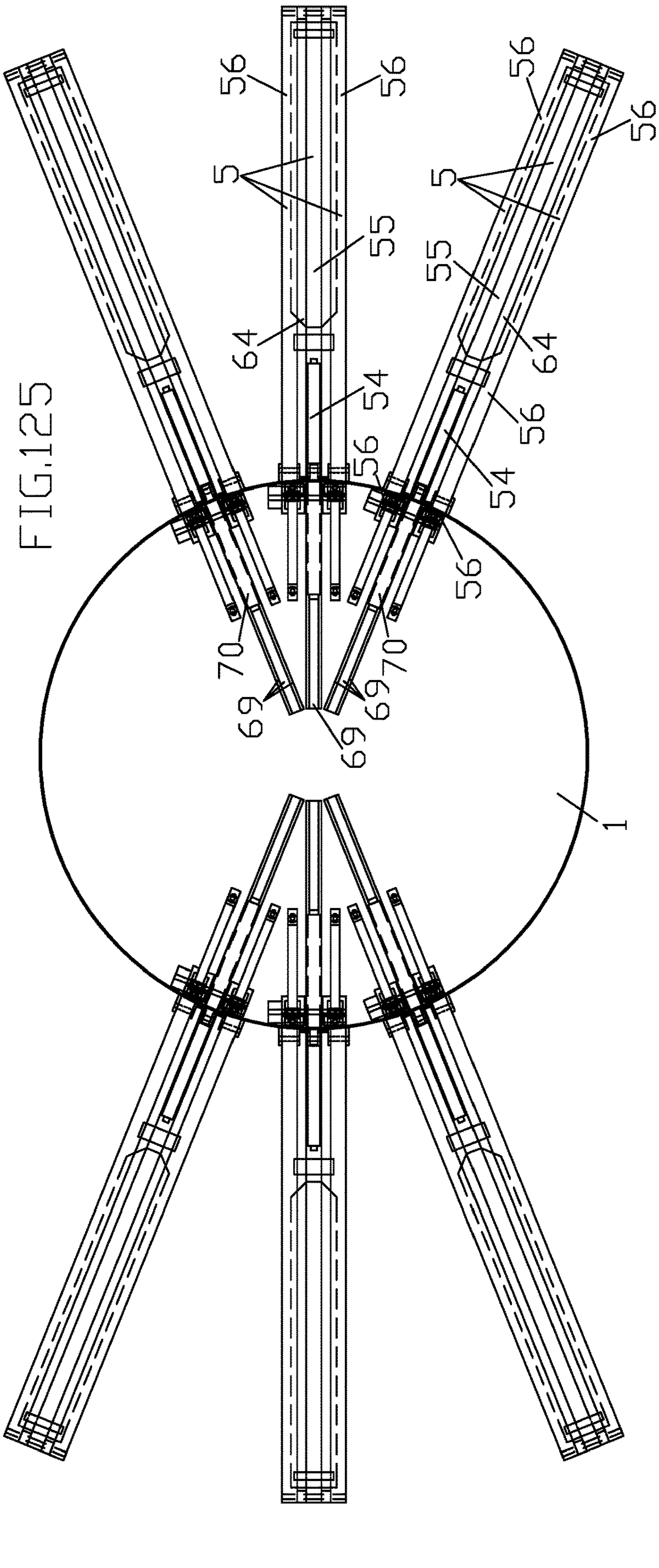

FIG. 125 is the top view of FIG. 124 in the same setting. This FIG. 125 shows all mechanisms outside and inside space rocket and in, which way are spaced out all six spreadable arms 5.

Figures 126, 127, 128:
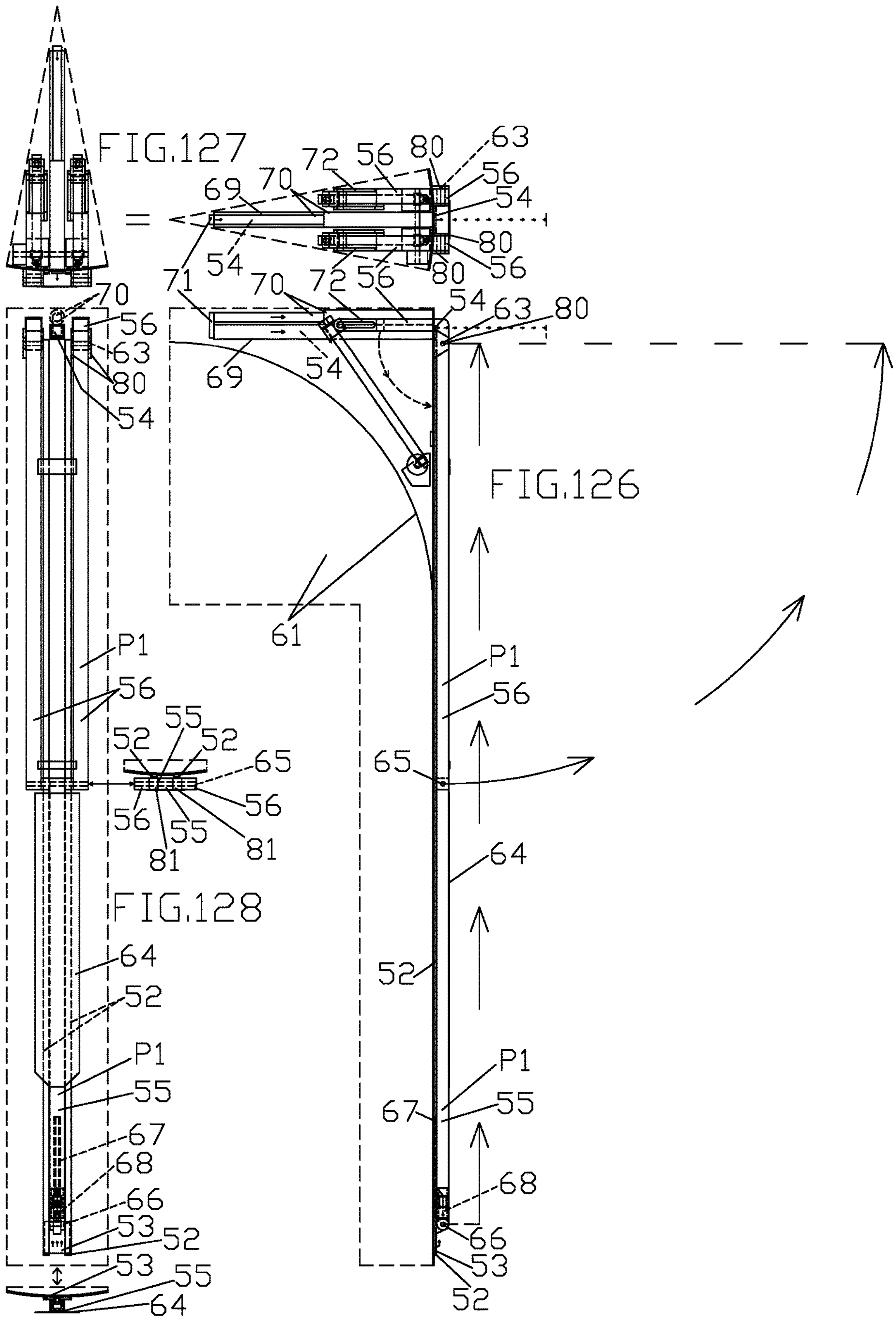

FIG. 126 is the side view of one entire spreadable arm 5 together with its moving mechanism and with one blocking bar 54 and its pushing mechanism. This entire spreadable arm 5 is entirely down to the P1 first setting, while the blocking bar 54 is inside the space rocket fuselage. This FIG. 126 is the side view with the partial vertical sectional view.

FIG. 127 is the top view of FIG. 126 in the same arrangement. This FIG. 127 is the top view in two equal views, which are rotated 90 degrees.

FIG. 128 is the front view of FIG. 126 in the same arrangement. This FIG. 128 is the front view but only of the sub-assemblies outside the space rocket.

Figure 129:
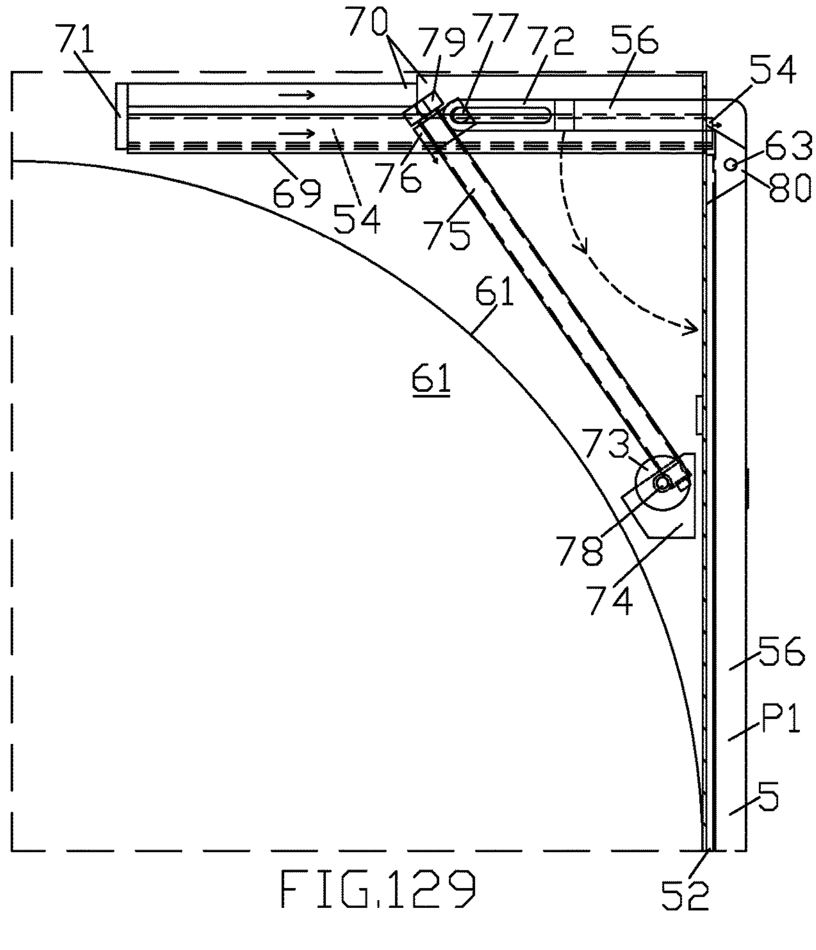

FIG. 129 is the enlarged side view of FIG. 126 drawing fragment. Here, are a fragment of one spreadable arm 5 with its moving mechanism and one blocking bar 54 with its pushing mechanism.

Figure 130:
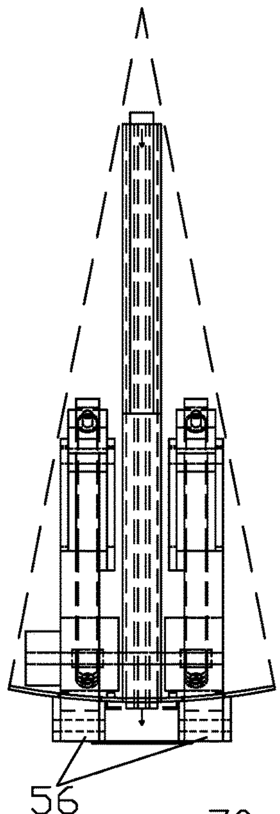

FIG. 130 is the enlarged top view of FIG. 127 in the same arrangement. This FIG. 130 is the top view in two equal views, which are rotated 90 degrees.

Figure 131:
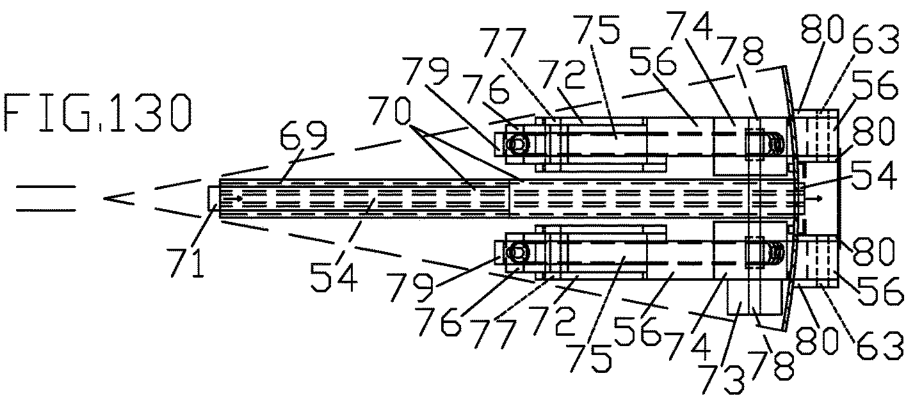
Figure 131:
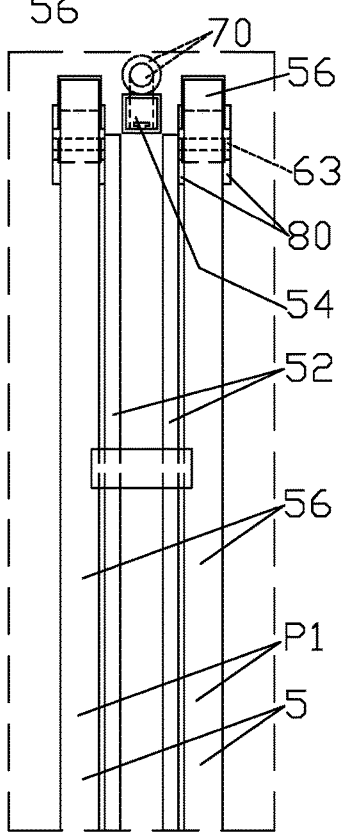

FIG. 131 is the enlarged front view of FIG. 128 in the same arrangement.

FIG. 132 is the very enlarged side view of the previous drawing fragment of FIG. 129. It shows in the most detail way the entire moving mechanism construction of the spreadable arm 5 in the space rocket fuselage fragment.

FIG. 133 is the very enlarged top view of FIG. 130 in the same arrangement.

FIG. 134 is the very enlarged front view of FIG. 131 in the same arrangement.

Figure 135:
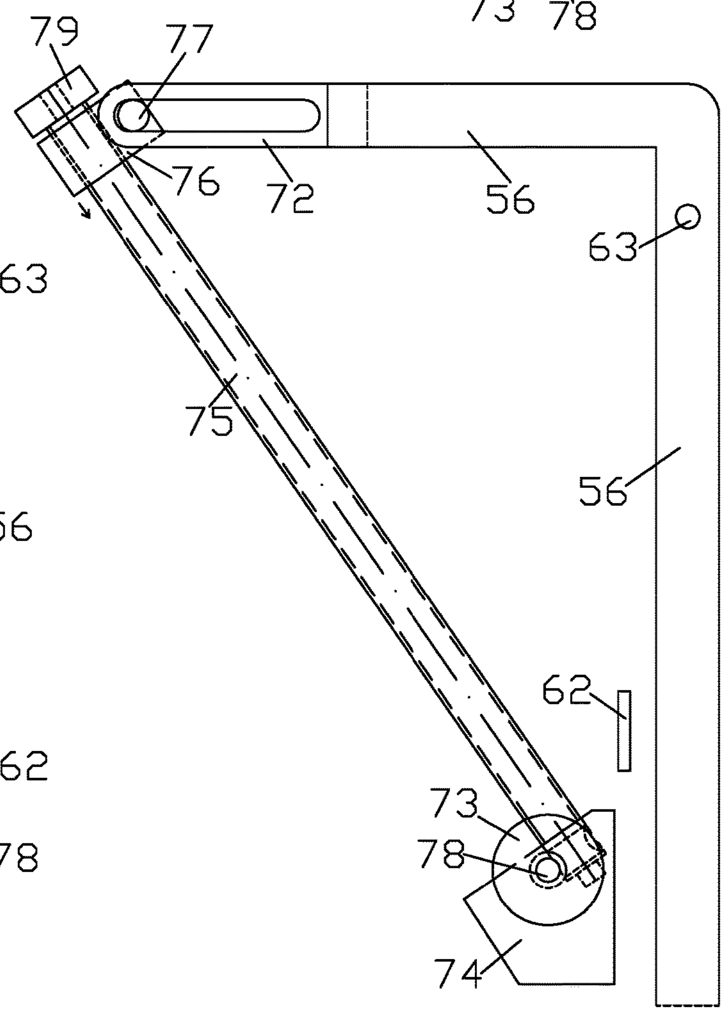

FIG. 135 is the enlarged side view of the alone entire moving mechanism of spreadable arm 5 together with the fragments of two lateral beam 56, which all are in P1 setting.

Figure 136:
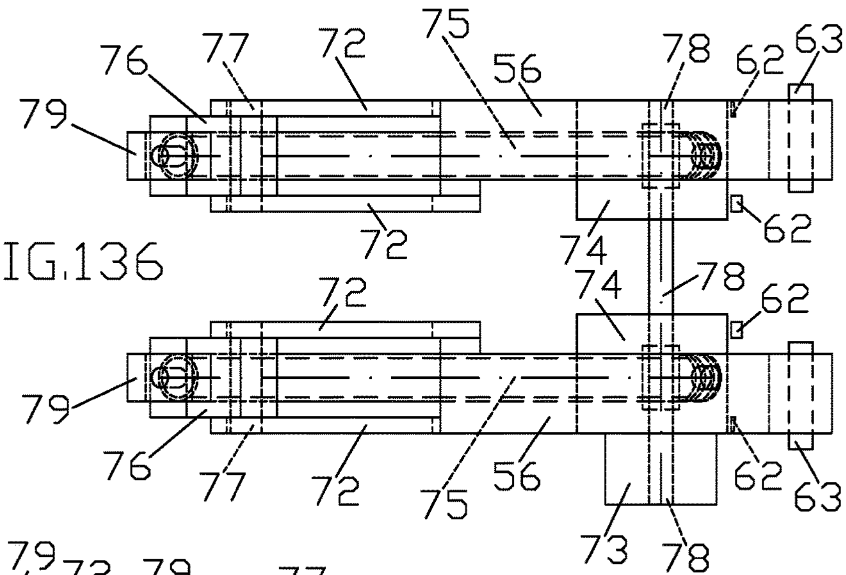

FIG. 136 is the top view of FIG. 135 in the same arrangement.

Figure 137:
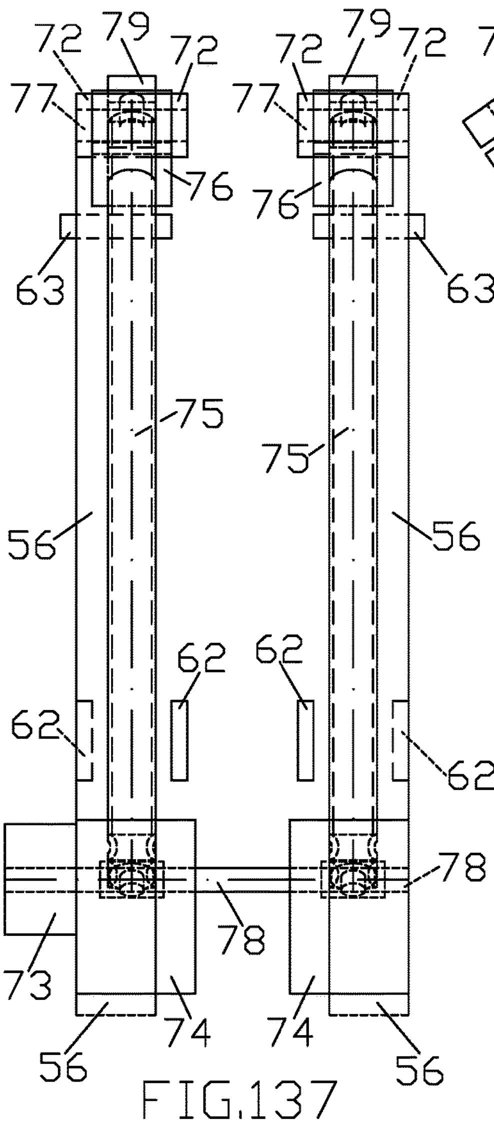

FIG. 137 is the front view of FIG. 135 in the same arrangement.

FIG. 138 is the enlarged side view of alone moving mechanism components of one spreadable arm 5.

FIG. 139 is the top view of FIG. 138 in the same arrangement.

FIG. 140 is the front view of FIG. 138 in the same arrangement.

FIG. 141 is the enlarged side view of four flat bars 72 (having oval openings), which are permanently fastened to both lateral beams 56 upper bent parts.

FIG. 142 is the top view of FIG. 141 in the same arrangement.

FIG. 143 is the front view of FIG. 141 in the same arrangement.

Figures 144, 145, 146:
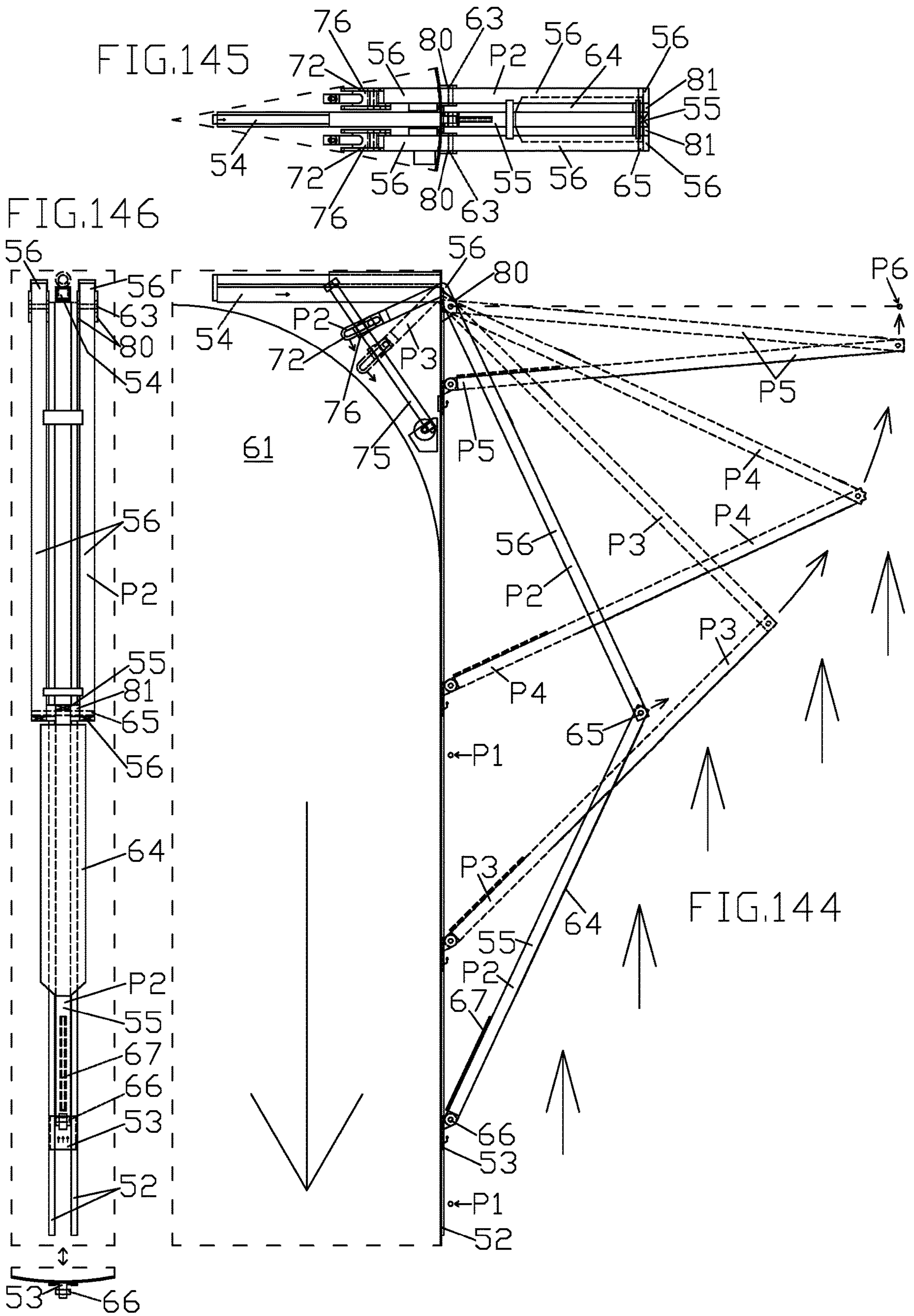

FIG. 144 is the side view and the partial vertical sectional view, which outside and partly inside the space rocket fragment show one entire spreadable arm 5 in P2 setting, which is in one-quarter lifted and consequently, it protrudes outside the space rocket fuselage. On this FIG. 144 are also sketched intermediate settings of spreadable arm 5, it means in P3, P4 and P5 settings. There is also marked P6 final setting ergo, while the spreadable arm 5 is entirely lifted.

FIG. 145 is the top view of FIG. 144 in the same arrangement and situation.

FIG. 146 is the front view of FIG. 144 in the same arrangement and situation. This FIG. 146 is the front view but only of the sub-assemblies outside the space rocket.

Figure 147:
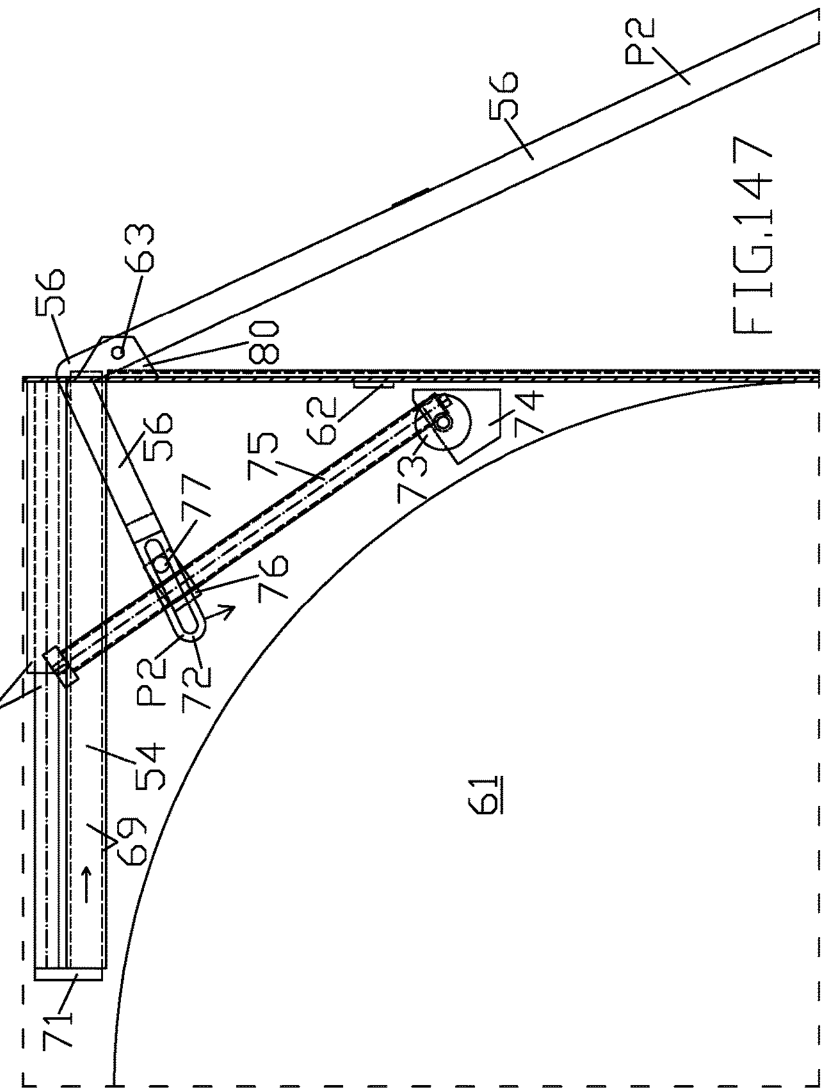

FIG. 147 is the side view of an enlarged drawing fragment of FIG. 144. The current view shows the upper part of spreadable arm 5 in P2 setting.

Figure 148:
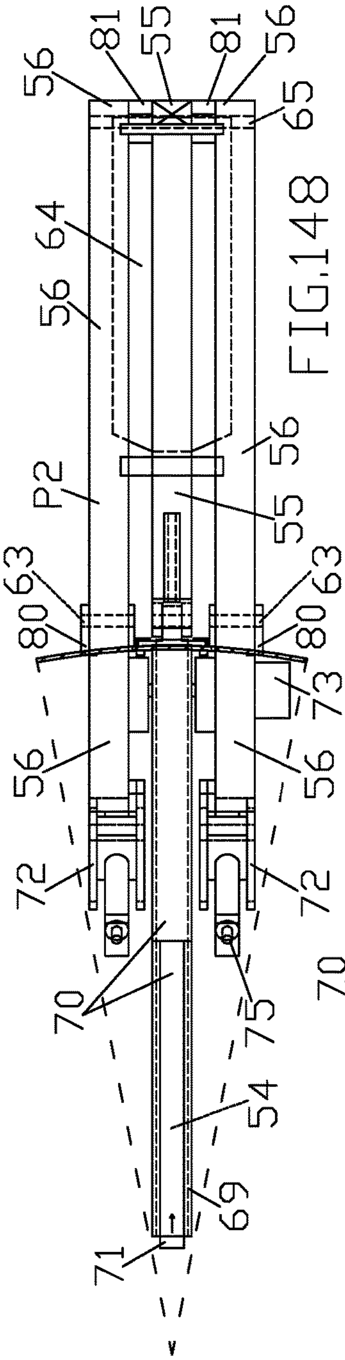

FIG. 148 is the top view of FIG. 147 in the same arrangement.

Figure 149:
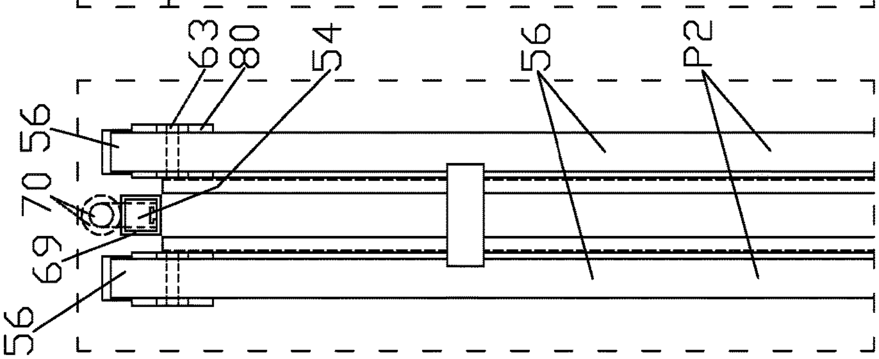

FIG. 149 is the front view of FIG. 147 in the same arrangement.

FIG. 150 is the side view and the partial vertical sectional view of the space rocket fuselage. And these views show outside and inside the space rocket fragment, the side views of one entire spreadable arm 5 in the P6 setting, which is entirely lifted and consequently it is transverse the space rocket fuselage. Whereat the blocking bar 54 is slid maximally outside the space rocket fuselage, and it entirely blocked in all directions the middle beam 55 in the spreadable arm 5. The blocking bar 54 has in its bottom-surface a key-seat, which is shaped as a T-groove and, which is fitted in with a T-bar 67 on the middle beam 55.

FIG. 151 is the top view of FIG. 150 in the same arrangement.

FIG. 152 is the front view of FIG. 150 in the same arrangement.

FIG. 153 is the auxiliary side view and partial vertical sectional view, which show FIG. 152 only in the middle.

Figures 154, 155, 156, 157:
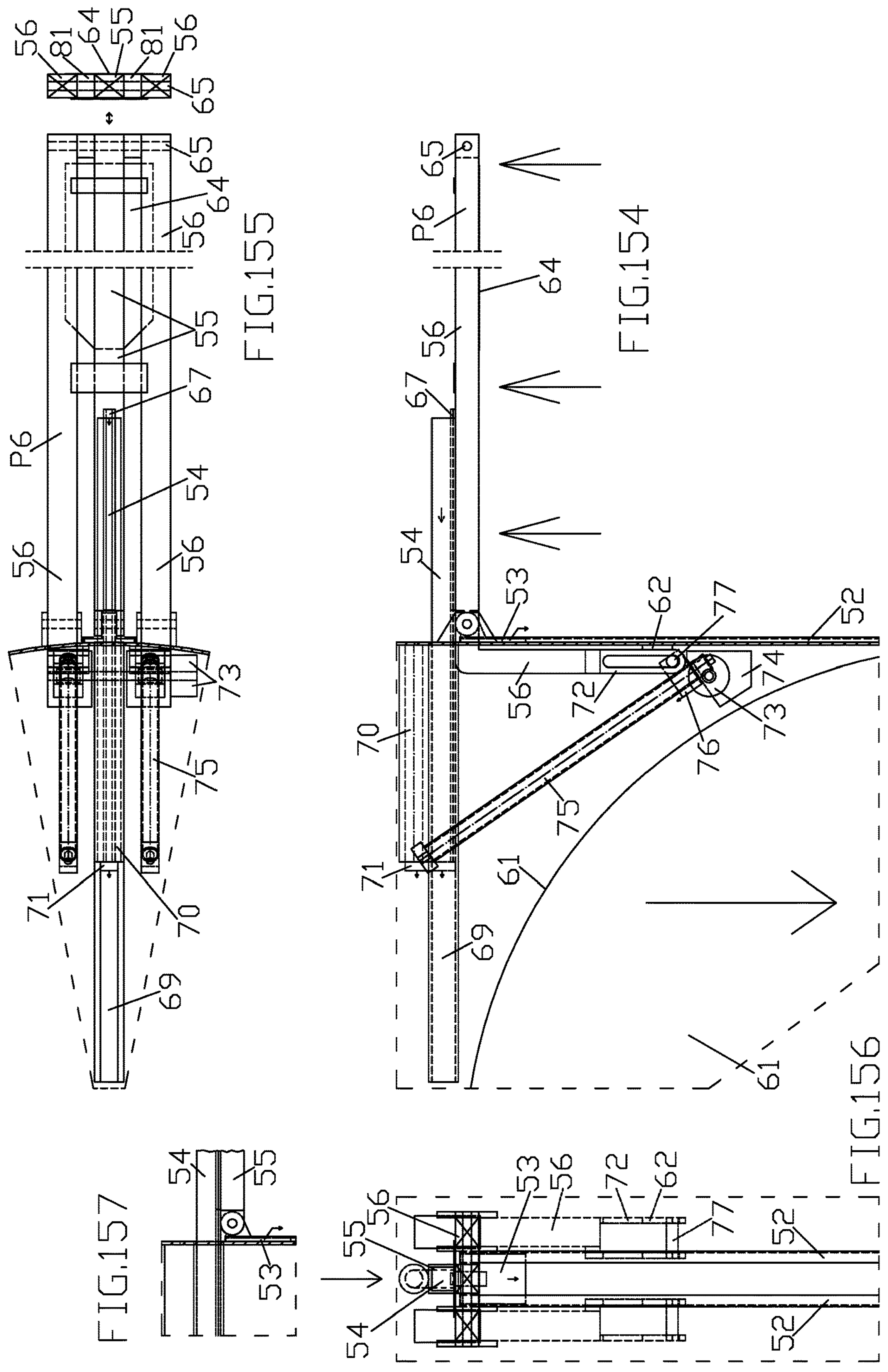

FIG. 154 is the side view of an enlarged drawing fragment of FIG. 150.

FIG. 155 is the top view of FIG. 154 in the same arrangement.

FIG. 156 is the front view of FIG. 154 in the same arrangement.

FIG. 157 is the auxiliary side view and partial vertical sectional view, which show FIG. 156 only in the middle.

Figure 158:
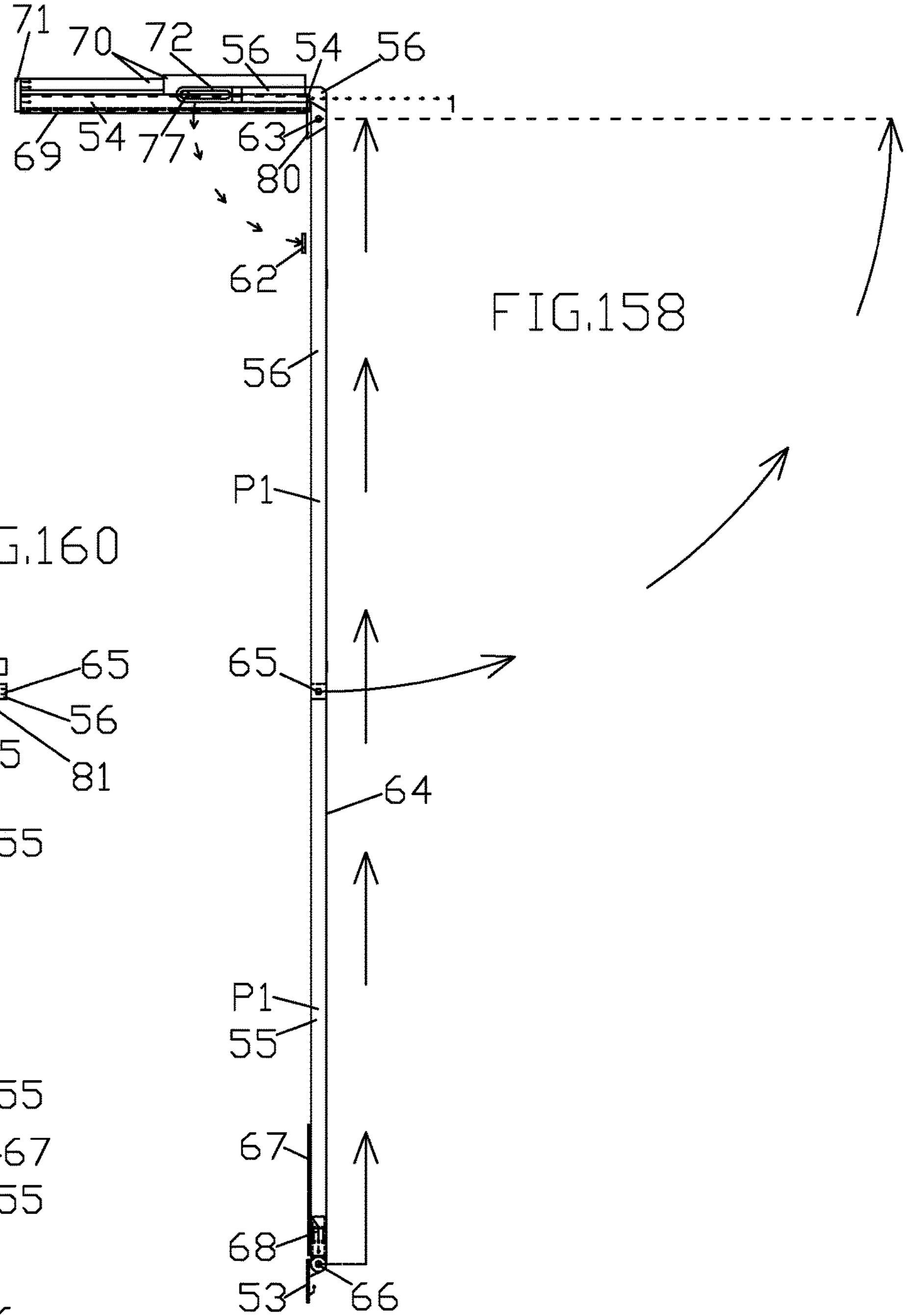

FIG. 158 is the side view of alone spreadable arm 5, which is entirely lowered ergo it is in P1 setting. It shows that each spreadable arm 5 mainly consists of two lateral beams 56 and of one middle beam 55.

Figure 159:
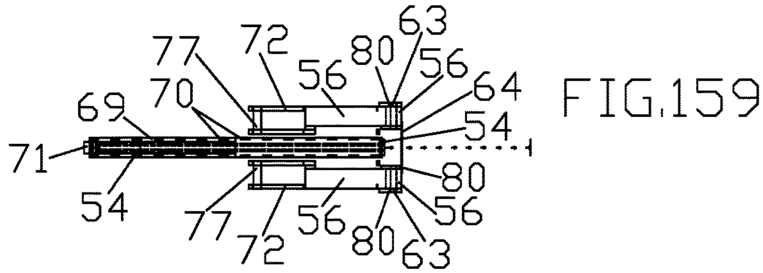

FIG. 159 is the top view of FIG. 158 in the same arrangement.

Figure 160:
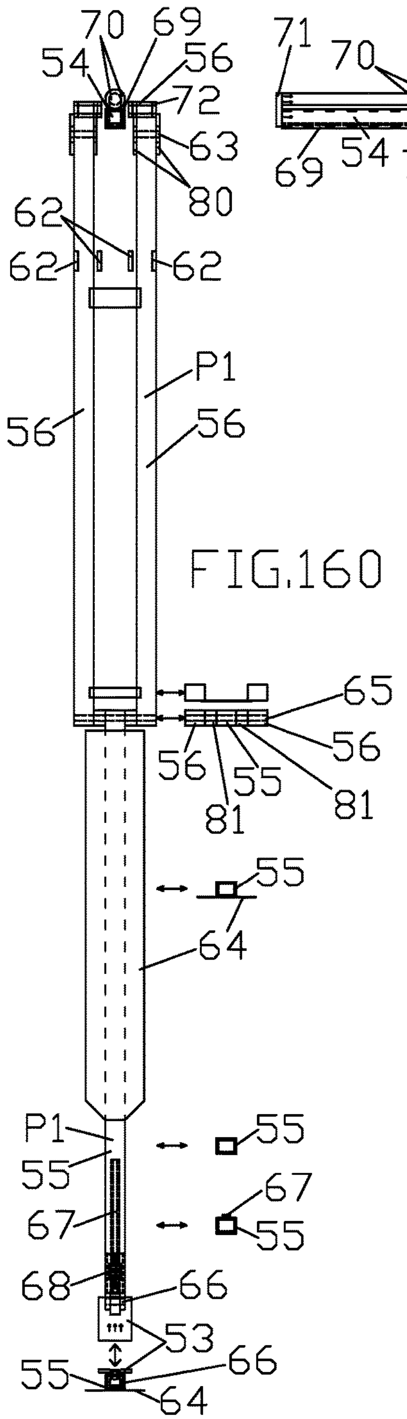

FIG. 160 is the front view of FIG. 158 in the same arrangement.

Figures 161, 162, 163:
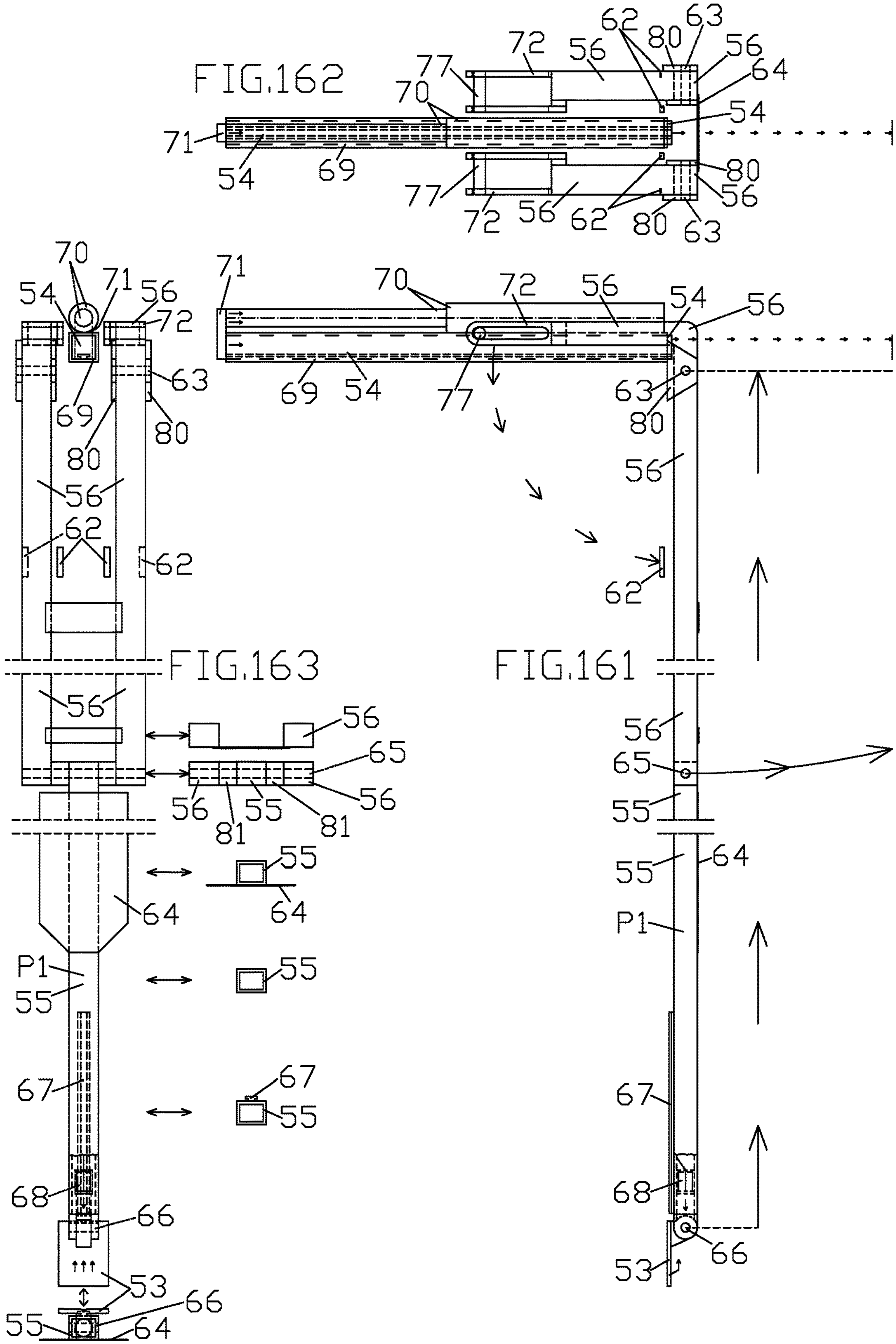

FIG. 161 is the side view of an enlarged drawing fragment of FIG. 158 in the same arrangement.

FIG. 162 is the top view of FIG. 161 in the same arrangement.

FIG. 163 is the front view of FIG. 161 in the same arrangement.

Figure 164:
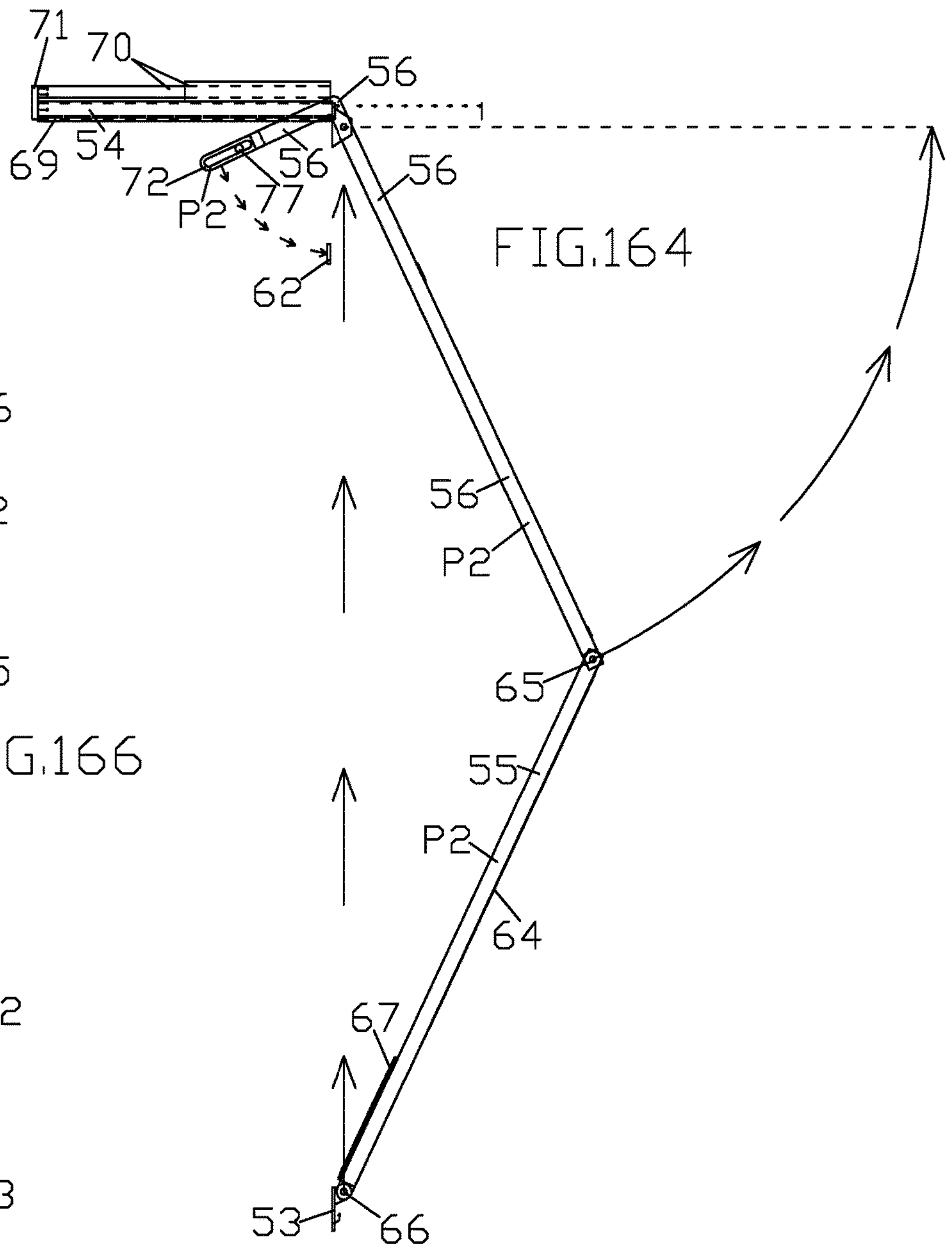

FIG. 164 is the side view of alone spreadable arm 5, which is in one-quarter lifted to the P2 setting.

Figure 165:
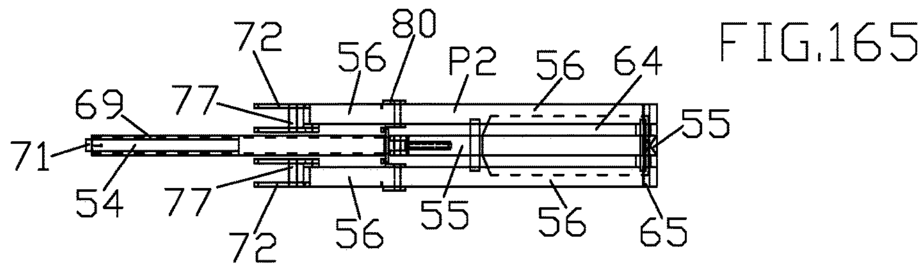

FIG. 165 is the top view of FIG. 164 in the same arrangement.

Figure 166:
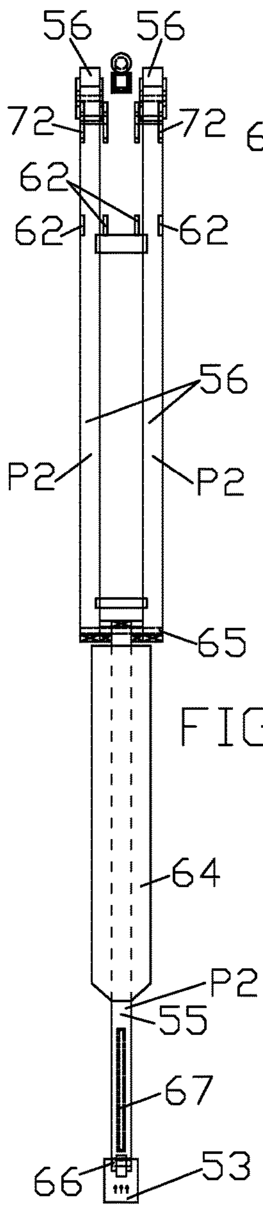

FIG. 166 is the front view of FIG. 164 in the same arrangement.

FIG. 167 is the side view of an enlarged drawing fragment of FIG. 164 in the same arrangement.

FIG. 168 is the top view of FIG. 167 in the same arrangement.

FIG. 169 is the front view of FIG. 167 in the same arrangement.

FIG. 170 is the side view of alone spreadable arm 5 together with the entire pushing mechanism of the blocking bar 54, which is not slid outside. The spreadable arm 5 is entirely lifted to the P6 setting.

FIG. 171 is the top view of FIG. 170 in the same arrangement.

FIG. 172 is the front view of FIG. 170 in the same arrangement.

FIG. 173 is the side view of alone middle beam 55 together with entire pushing mechanism of the blocking bar 54, which is not slid outside.

FIG. 174 is the top view of FIG. 173 in the same arrangement.

FIG. 175 is the front view of FIG. 173 in the same arrangement.

FIG. 176 is the side view of alone middle beam 55 together with the entire pushing mechanism of the blocking bar 54, which is slid very little outside.

FIG. 177 is the side view of alone middle beam 55 together with the entire pushing mechanism of the blocking bar 54, which is slid a lot outside.

FIG. 178 is the side view of alone spreadable arm 5 together with the entire pushing mechanism of the blocking bar 54, which is maximally slid outside.

FIG. 179 is the top view of FIG. 178 in the same arrangement.

Figures 180, 181, 182, 183, 184, 185, 186, 187:
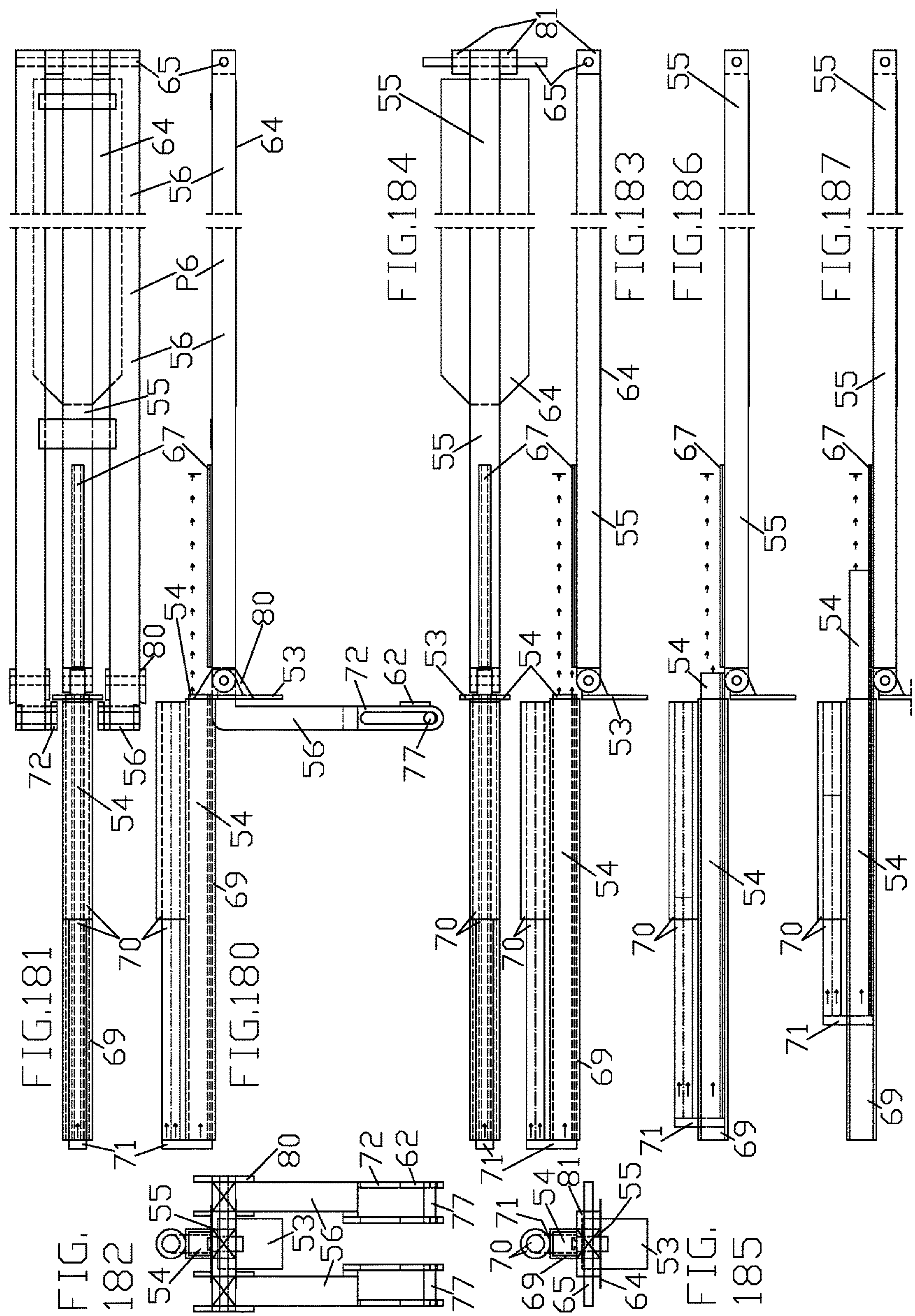

FIG. 180 is the side view of an enlarged drawing fragment of FIG. 170 in the same arrangement.

FIG. 181 is the top view of FIG. 180 in the same arrangement.

FIG. 182 is the front view of FIG. 180 in the same arrangement.

FIG. 183 is the side view of an enlarged drawing fragment of FIG. 173 in the same arrangement.

FIG. 184 is the top view of FIG. 183 in the same arrangement.

FIG. 185 is the front view of FIG. 183 in the same arrangement.

FIG. 186 is the side view of an enlarged drawing fragment of FIG. 176 in the same arrangement.

FIG. 187 is the top view of FIG. 186 in the same arrangement.

FIG. 188 is the side view of the middle beam 55 lowest end with inside visible a frictional brake 68 sketches. Here, this middle beam 55 is vertically set ergo it is in P1 setting.

FIG. 189 is the top view of FIG. 188 in the same arrangement.

FIG. 190 is the front view of FIG. 188 in the same arrangement.

FIG. 191 is side view of alone middle beam 55 lowest end with inside visible the frictional brake 68 sketches. Here, this middle beam 55 is slanted to the P6 full setting.

FIG. 192 is the side view of one sliding engines cover 7, which can be lowered and, which is flat underneath after lowering. It is installed to a space rocket fuselage bottom. Here this sliding engines cover 7 is entirely lifted and it causes that the main engines all nozzles 85 are entirely uncovered.

FIG. 193 is the top view of FIG. 192 in the same arrangement.

FIG. 194 is the front view of FIG. 192 in the same arrangement.

FIG. 195 is the bottom projection of FIG. 192 and that mean the current space rocket bottom—in two equal views, which are rotated 90 degrees in relation to each other so that they cohere with the above views.

FIG. 196 is the side view of one sliding engines cover 7, which can be lowered and, which is flat underneath after lowering. Currently, this sliding engines cover 7 is entirely lowered and it causes that the space rocket bottom is entirely covered underneath and almost entirely at both sides.

FIG. 197 is the top view of FIG. 196 in the same arrangement and situation.

FIG. 198 is the front view of FIG. 196 in the same arrangement and situation.

FIG. 199 is the bottom projection of FIG. 196 and that mean the current space rocket bottom—in two equal views, which are rotated 90 degrees in relation to each other so that they cohere with the above views. On these projections are visible that both jalousies 88 came to each other and touched on themselves in two U-shaped rails 87 bottom and in their middle.

Figure 200:
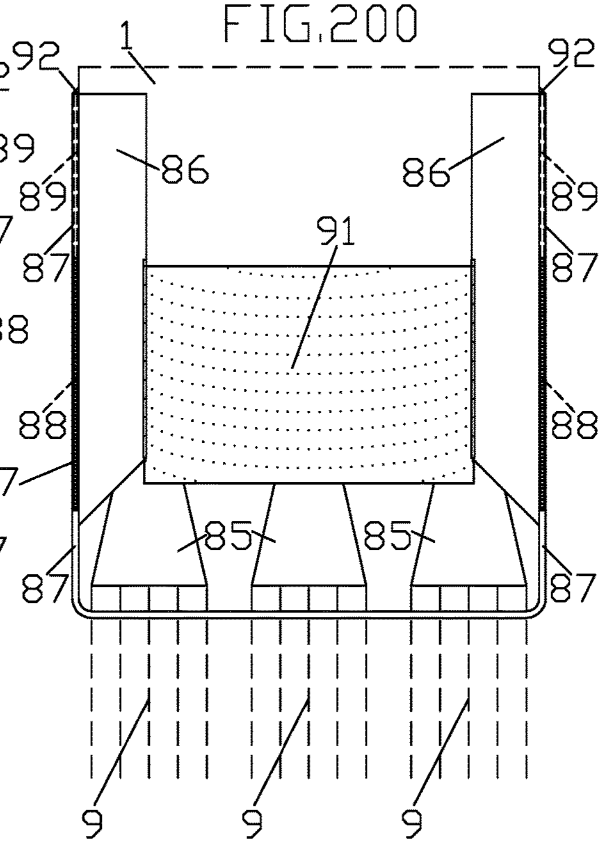

FIG. 200 is the side view of the sliding engines cover 7, which can be lowered and, which is flat underneath after lowering. Currently, the sliding engines cover 7 is entirely lifted and a plurality of exhaust fumes 9 gush down of the main engines all nozzles 85.

Figure 201:
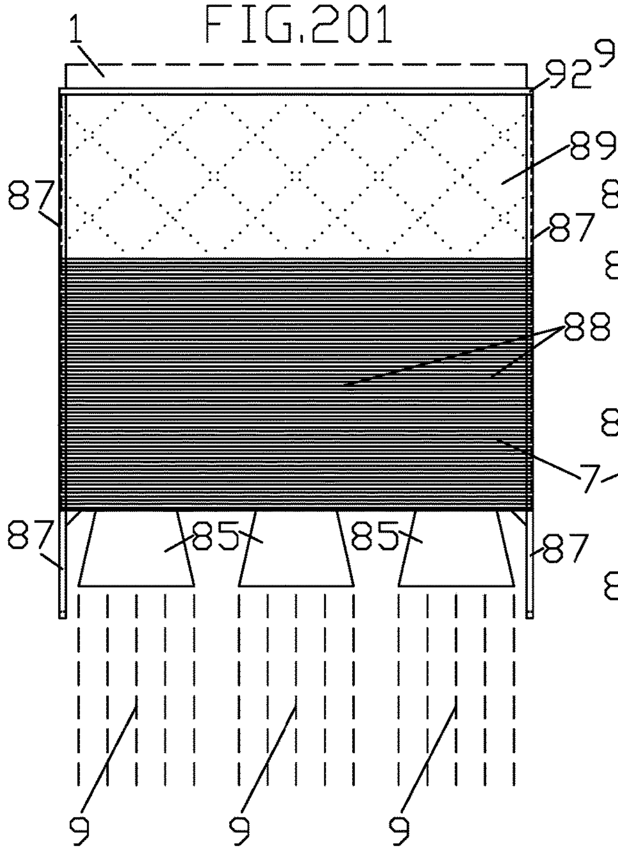

FIG. 201 is the front view of FIG. 200 in the same arrangement.

Figure 202:
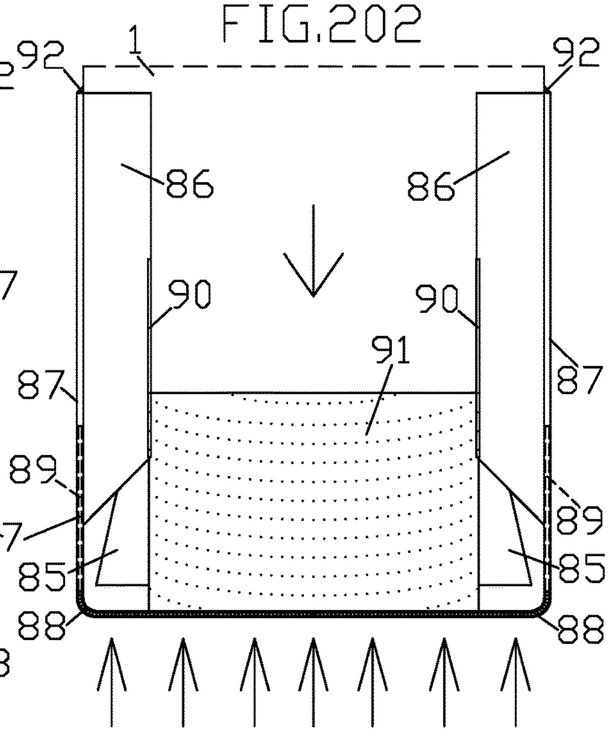

FIG. 202 is the side view of the sliding engines cover 7, which can be lowered and, which is flat underneath after lowering. Currently, the sliding engines cover 7 is entirely lowered and it causes that the space rocket bottom is entirely covered.

Figure 203:
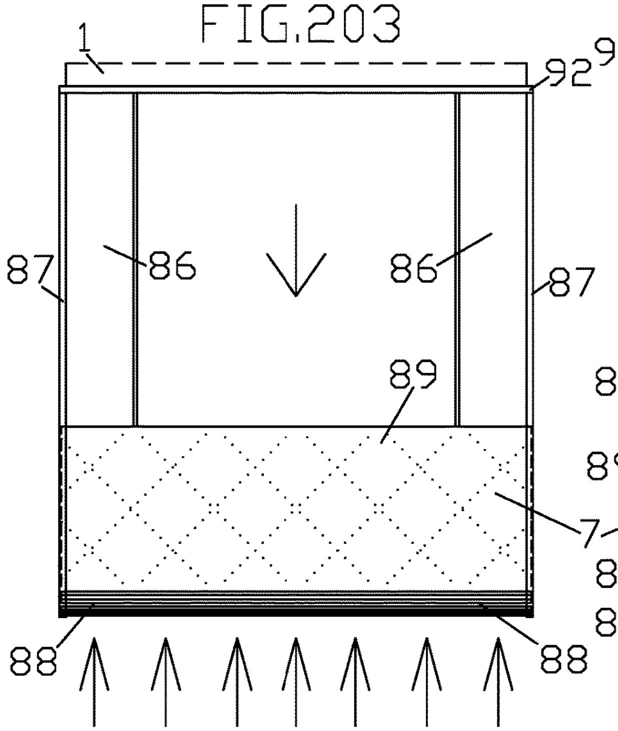

FIG. 203 is the front view of FIG. 202 in the same arrangement.

Figure 204:
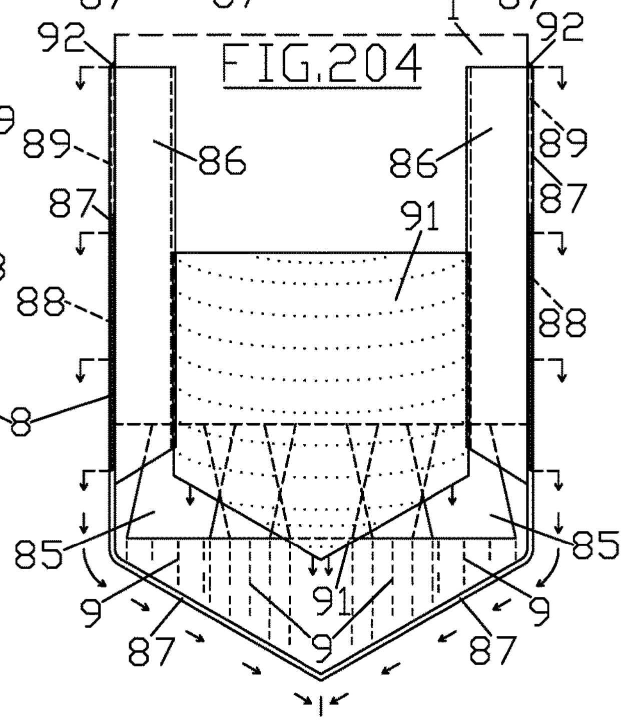

FIG. 204 is the side view of one sliding engines cover 8, which can be lowered and, which is wedge shaped underneath after lowering. This sliding engines cover 8 is installed to the space rocket fuselage bottom. Currently, the sliding engines cover 8 is entirely lifted and it causes that all main engines nozzles 85 are entirely uncovered. And currently, the exhaust fumes 9 gush down of the main engines all nozzles 85.

Figure 205:
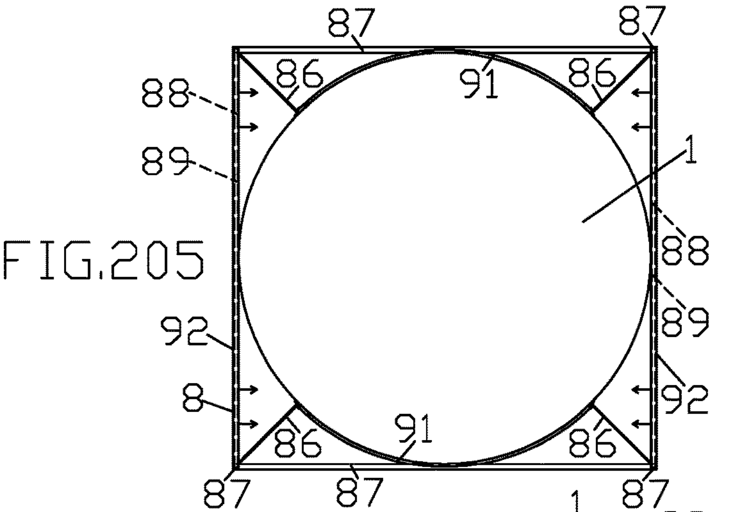

FIG. 205 is the top view of FIG. 204 in the same arrangement and situation.

Figure 206:
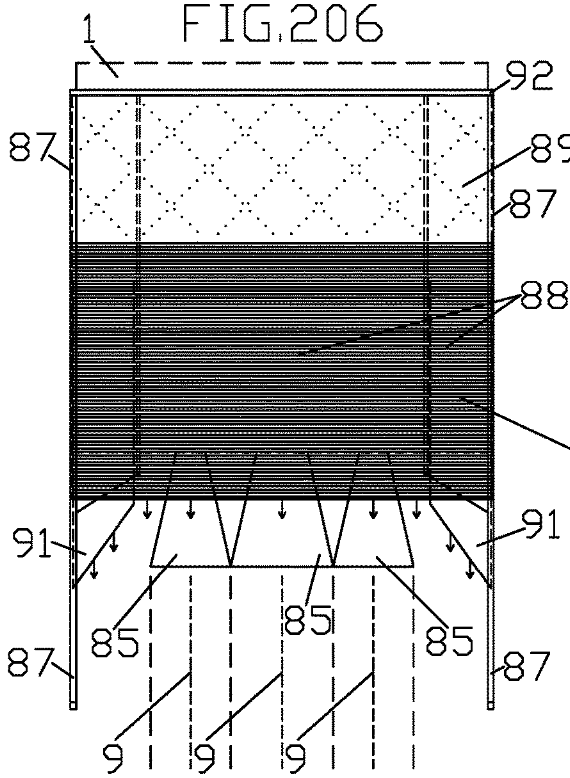

FIG. 206 is the front view of FIG. 204 in the same arrangement and situation.

Figure 207:
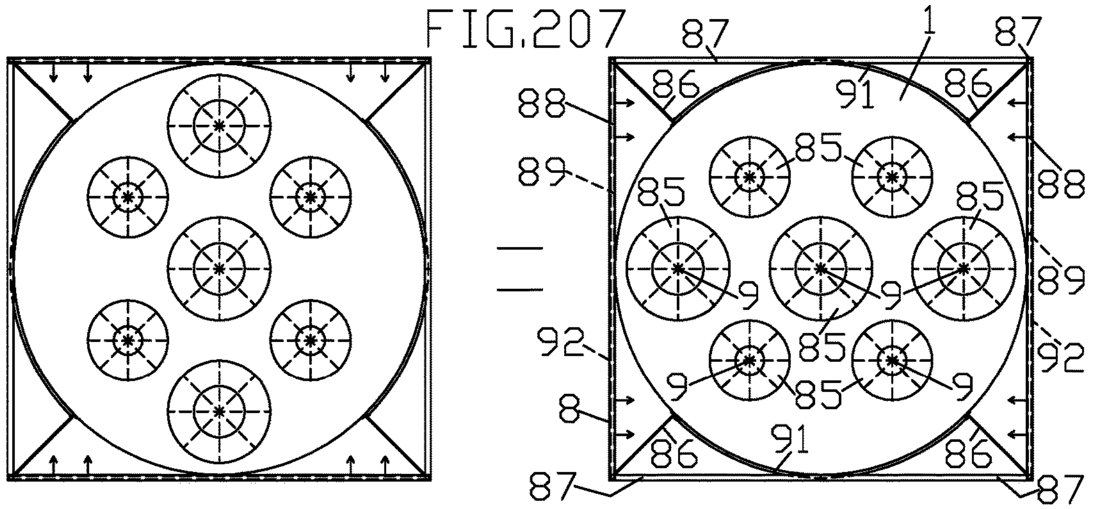

FIG. 207 is the bottom projection of FIG. 204 thus, of current space rocket bottom in two equal views, which are rotated 90 degrees in relation to each other so that they cohere with the above views.

Figure 208:
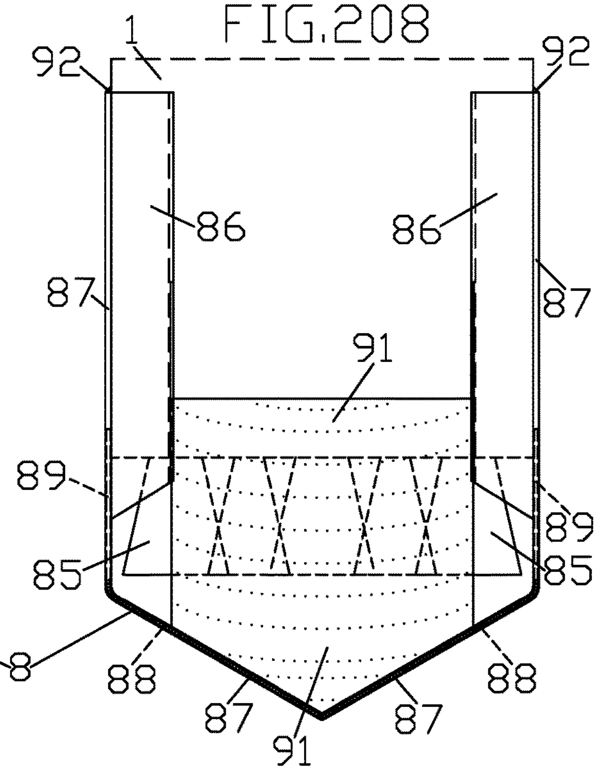

FIG. 208 is the side view of the sliding engines cover 8, which can be lowered and, which is wedge shaped underneath after lowering. Here, the sliding engines cover 8 is entirely lowered, and it causes that the space rocket bottom is entirely covered. This view shows a plurality of main components' emplacement of the sliding engines cover 8 in relation to themselves and with the components sketches, which are veiled by a plurality of other members.

Figure 209:
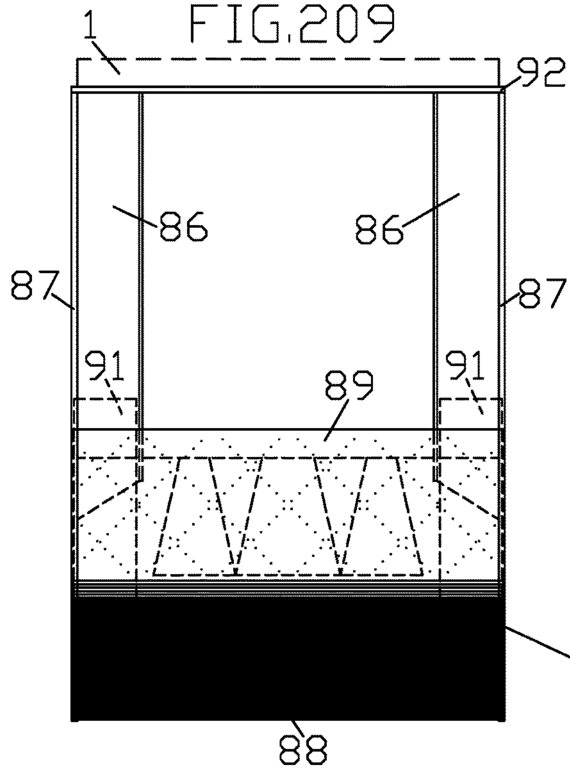

FIG. 209 is the front view of FIG. 208 in the same arrangement.

Figure 210:
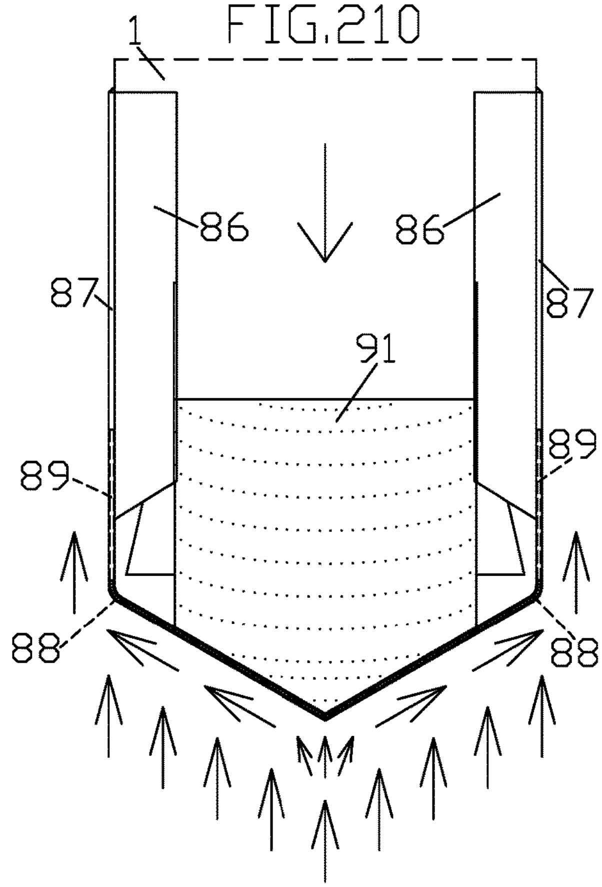

FIG. 210 is the side view of the sliding engines cover 8, which can be lowered and, which is wedge shaped underneath after lowering. Here, the sliding engines cover 8 is also entirely lowered and it causes that the space rocket bottom is entirely covered. This view shows in what way this sliding engines cover 8 expands and divides in two sides atmospheric air during the space rocket descent.

Figure 211:
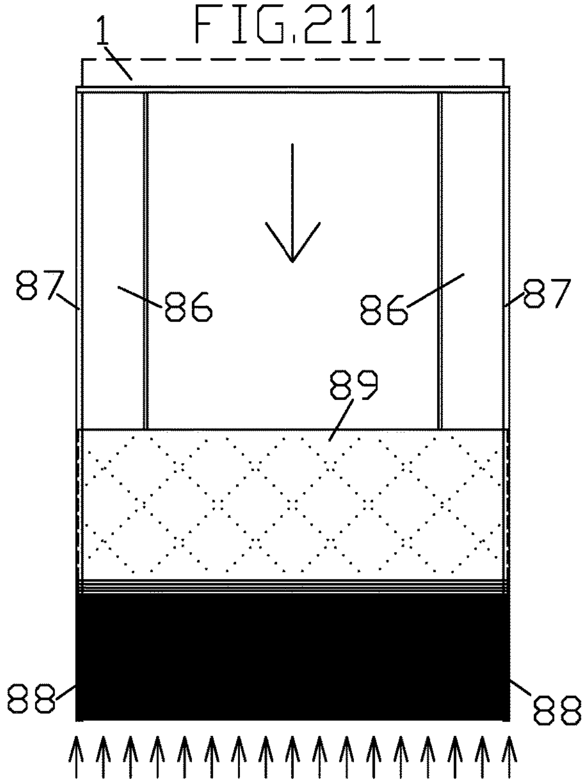

FIG. 211 is the front view of FIG. 210 in the same arrangement and situation.

Figure 212A:
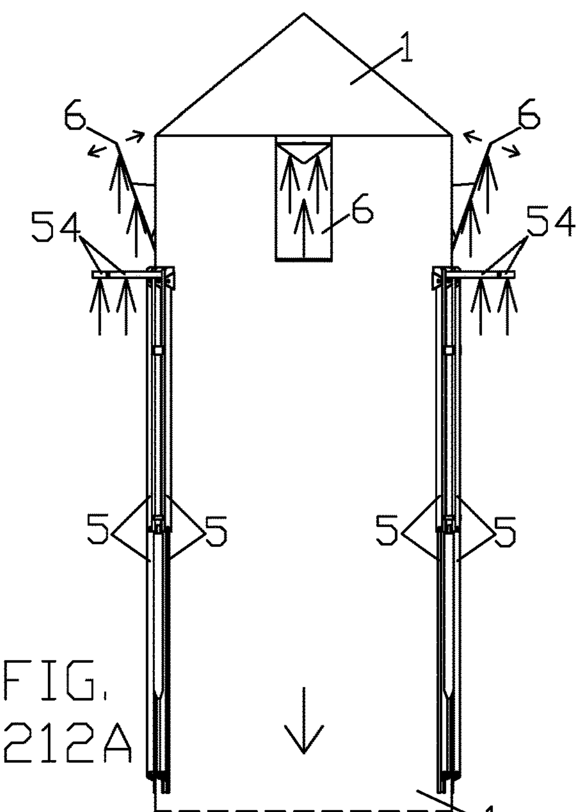
Figure 212B:
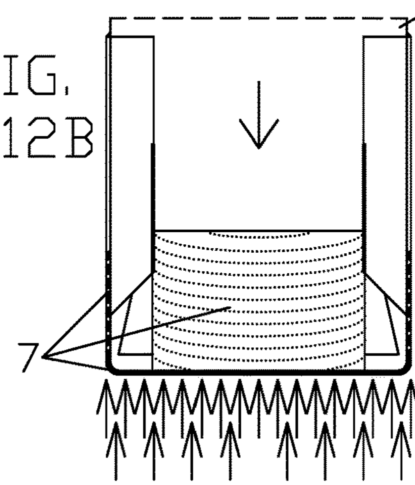

FIGS. 212A and 212B are the side views of the upper and bottom parts of one booster space rocket 1, which descends in the first time period at giant speed in the Earth's atmosphere. Currently, all six spreadable arms 5 are entirely lowered; four flaps 6 are a little deflected out; all six blocking bars 54 are entirely slid outside; the sliding engines cover 7 is entirely lowered.

Figure 213:
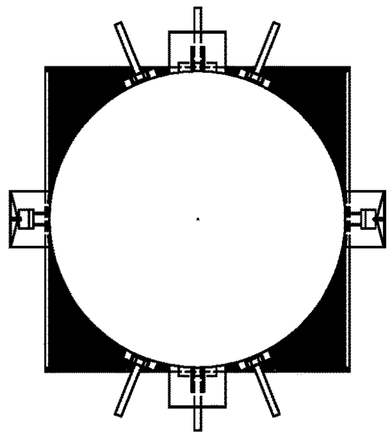
Figure 213:
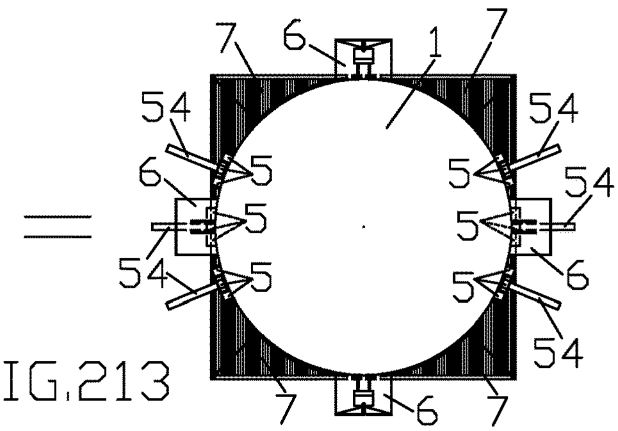

FIG. 213 is the top view of FIGS. 212A and 212B in the same situation. The FIG. 213 is in two equal views, which are rotated 90 degrees in relation to each other so that they cohere with the below views.

Figure 214A:
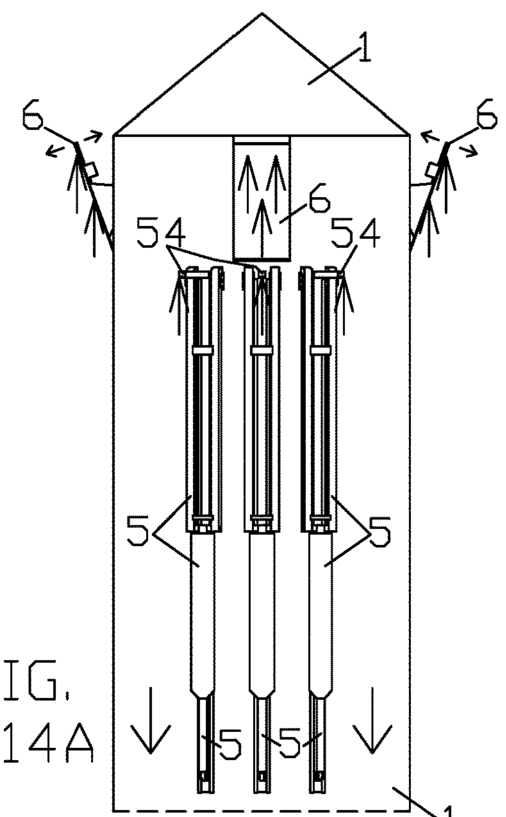
Figure 214B:
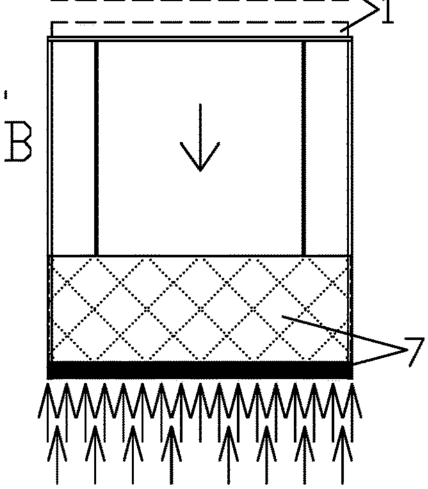

FIGS. 214A and 214B are the front views of FIGS. 212A and 212B in the same arrangement and situation.

Figure 215A:
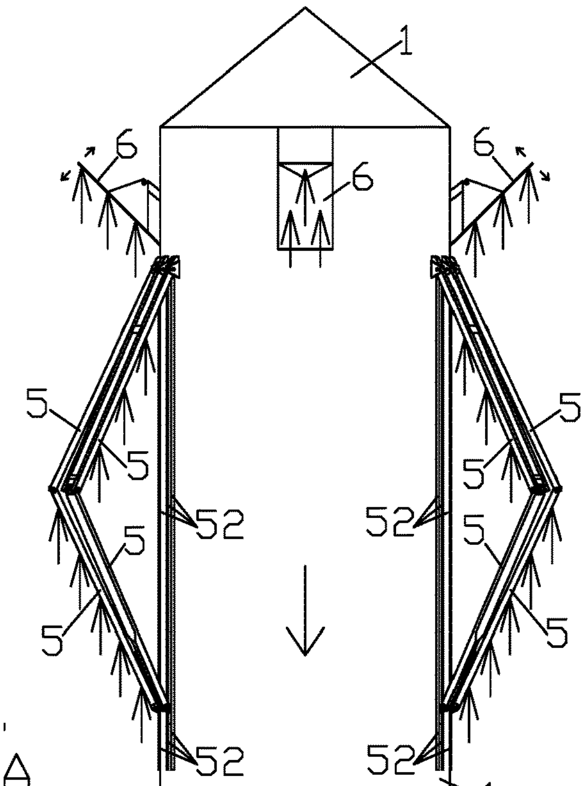
Figure 215B:
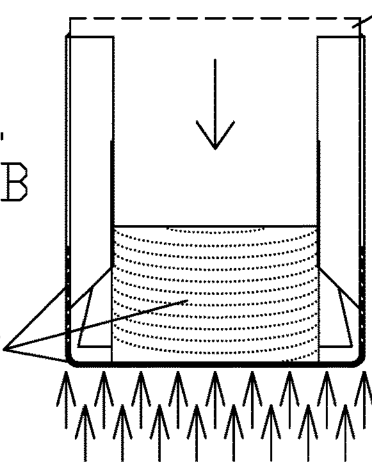

FIGS. 215A and 215B are the side views of the upper and bottom parts of one booster space rocket 1, which descends at average speed in the Earth's atmosphere. Currently, all six spreadable arms 5 are lifted somewhat; four flaps 6 are a lot deflected out; the sliding engines cover 7 is entirely lowered.

Figure 216:
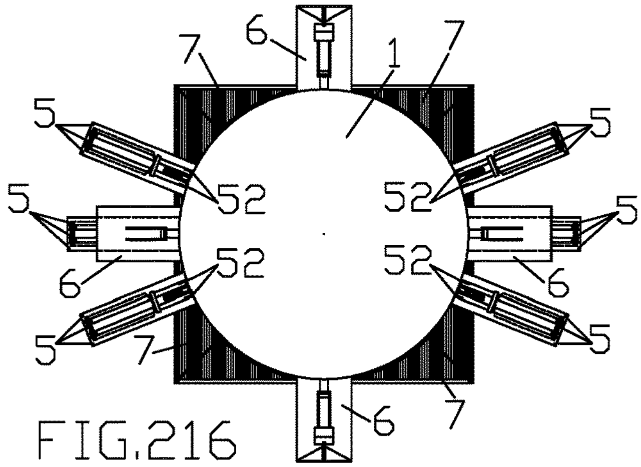

FIG. 216 is the top view of FIGS. 215A and 215B in the same arrangement and situation.

FIG. 217 is the side view of one entire main space rocket 2, which has revolvingly installed the sectional load cover 4, which is dividable into two sections and gradually foldable out on two opposite sides. This sectional load cover 4 is revolvingly installed to the main space rocket 2 by means of four long cog beams 93. Currently, to the main space rocket 2 is also attached the second stage rocket 3. The sectional load cover 4 is shut up, and all cog beams 93 are outside and on both sides of the second stage rocket 3.

FIG. 218 is the front view of FIG. 217 in the same arrangement and situation.

FIG. 219 is the side view, which is the same as FIG. 217 albeit contains the payload 100 sketches inside the shut up sectional load cover 4 and the second stage rocket 3 sub-assemblies sketches, which are veiled by a plurality of other modules.

FIG. 220 is the front view of FIG. 219 in the same arrangement and situation.

FIG. 221 is the side view of the second stage rocket 3 whereon is attached the payload 100.

FIG. 222 is the side view of the second stage rocket 3 where-from ascends freely the payload 100.

Figure 223:
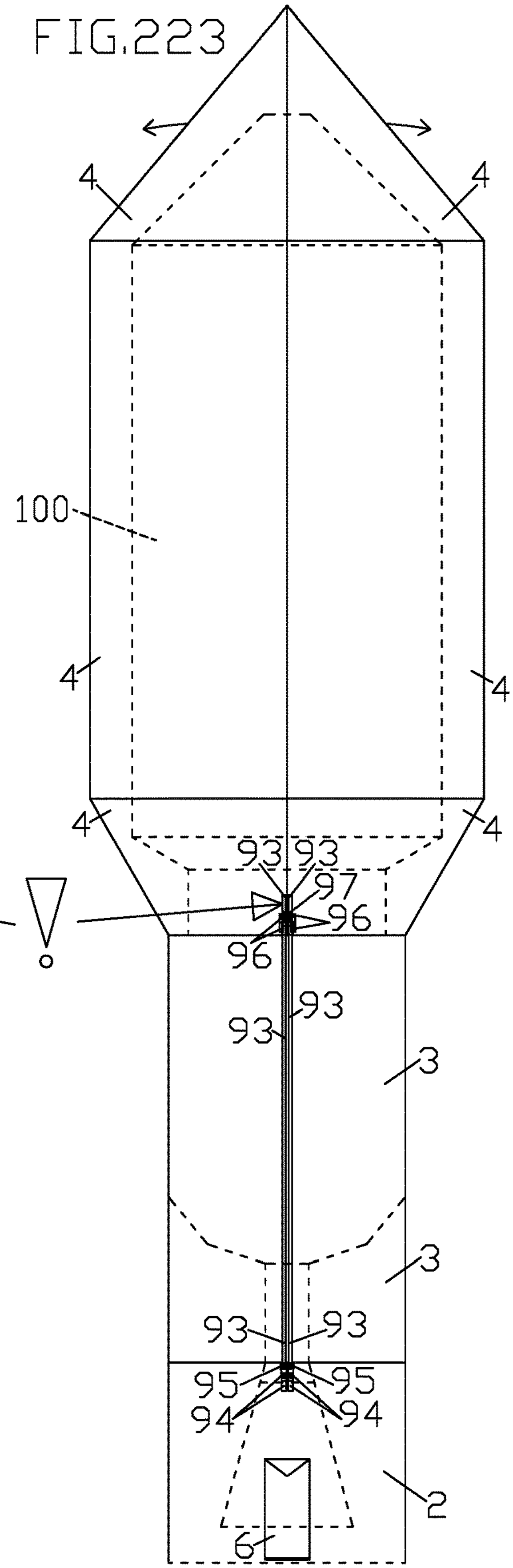

FIG. 223 is the enlarged side view of the main space rocket 2 upper part earlier shown on FIG. 219. This view shows the main space rocket 2 upper part, which has revolvingly installed the sectional load cover 4, which is dividable into two sections and gradually foldable out on two opposite sides. Now the sectional load cover 4 is shut up. While, inside the sectional load cover 4 is placed the payload 100, which will be carried out on the Earth's orbit.

Figure 224:
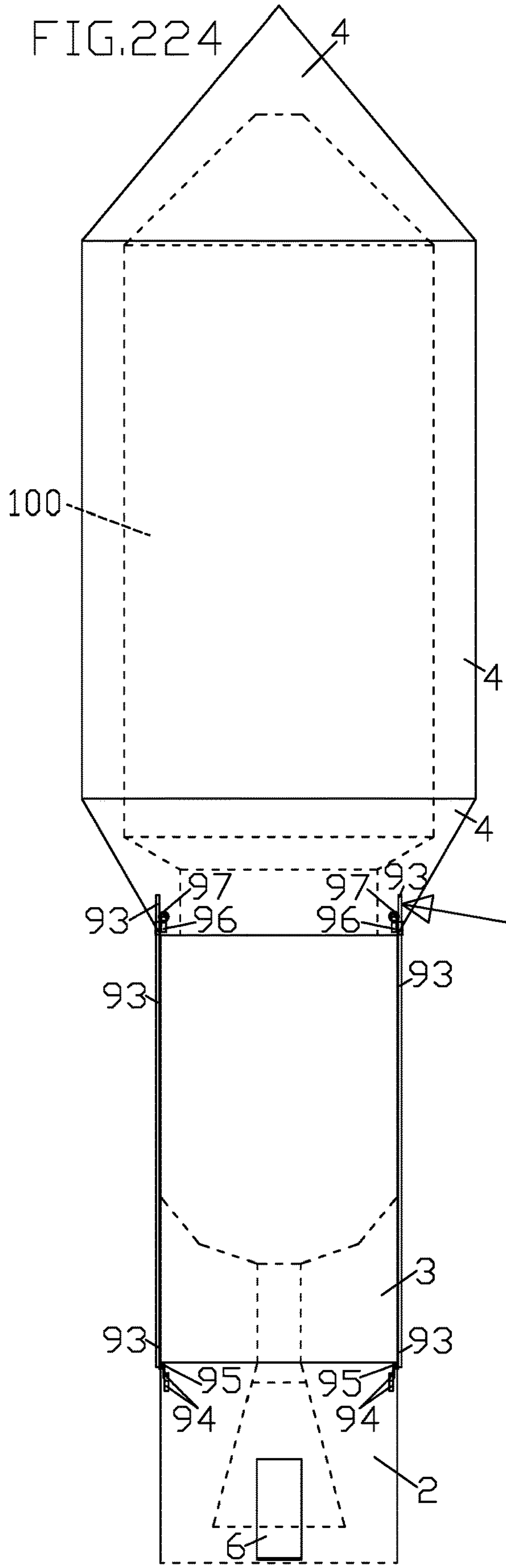

FIG. 224 is the front view of FIG. 223 in the same arrangement and situation.

Figure 225:
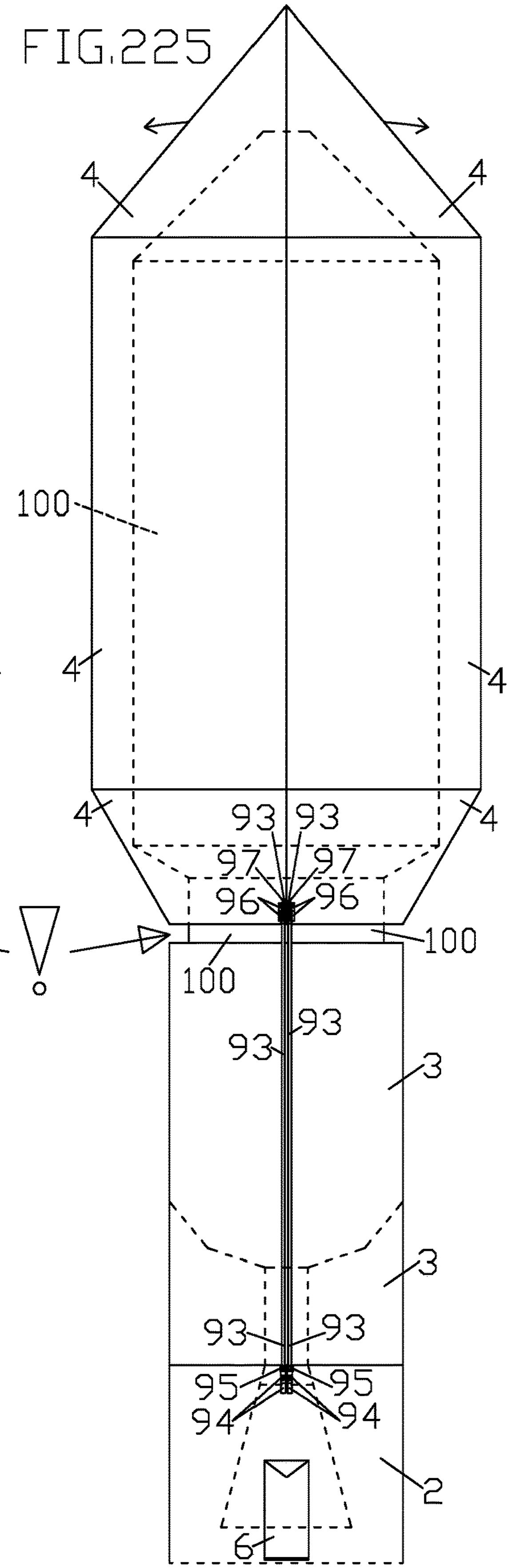

FIG. 225 is the enlarged side view of the main space rocket 2 upper part shown also earlier on similar FIG. 223. Currently, the sectional load cover 4 is lifted maximally on four cog beams 93. This enables spreading it out on two sides.

Figure 226:
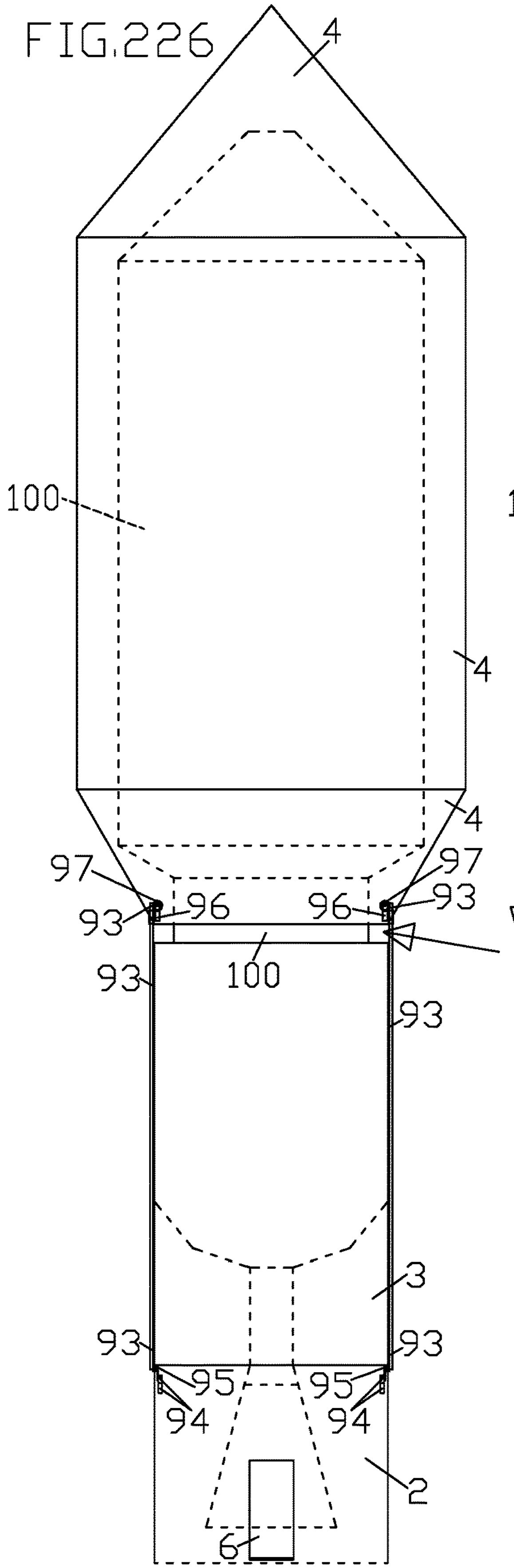

FIG. 226 is the front view of FIG. 225 in the same arrangement and situation.

FIG. 227 is enlarged side view of the main space rocket 2 upper part shown earlier on the similar FIG. 223, 225. Here, the sectional load cover 4 is already spread a little out on two sides. Here, the payload 100 is a lot uncovered.

FIG. 228 is significantly diminished the side view of one entire main space rocket 2, which has the sectional load cover 4 entirely folded out on two sides and shows the sketch of its intermediate folding out.

Figure 229:
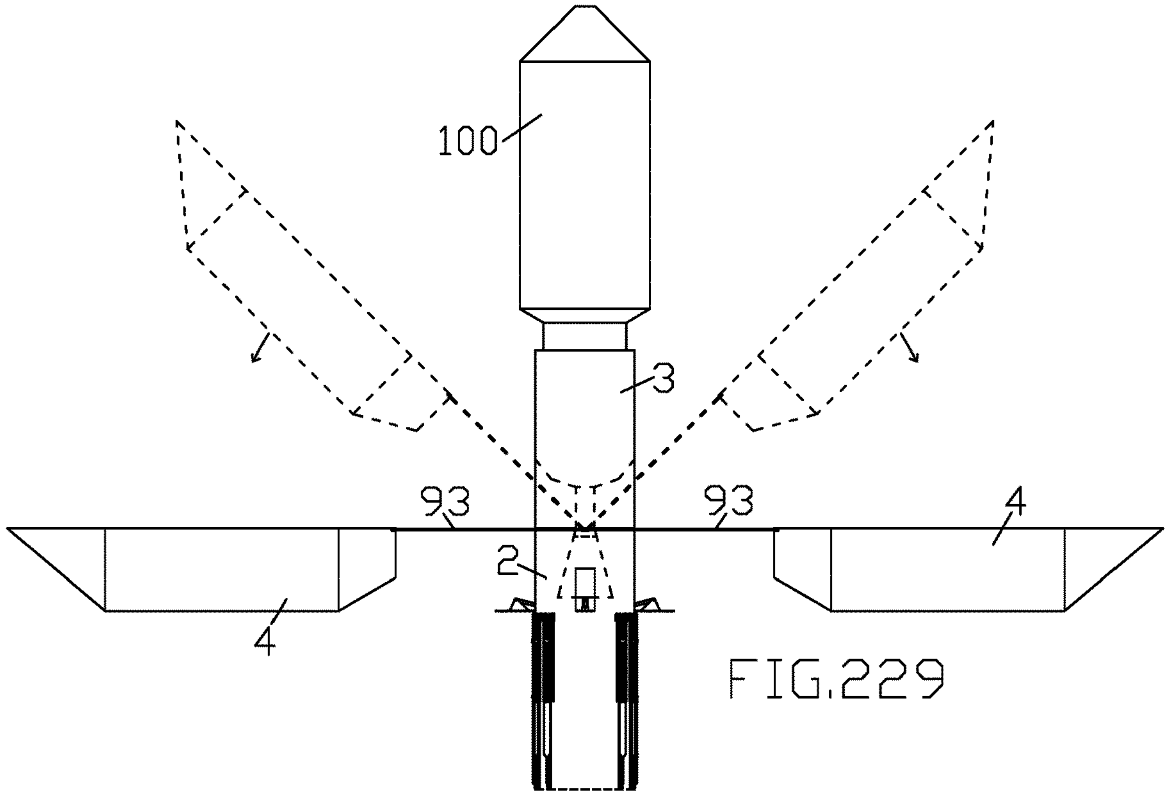

FIG. 229 is the side view of the main space rocket 2 upper part, which has the sectional load cover 4 entirely folded out on two sides and the sketch of this sectional load cover 4 intermediate folding out. Because of the sectional load cover 4 total folding out on two sides, there is the payload 100 entirely uncovered, and which is attached to the second stage rocket 3.

Figure 230:
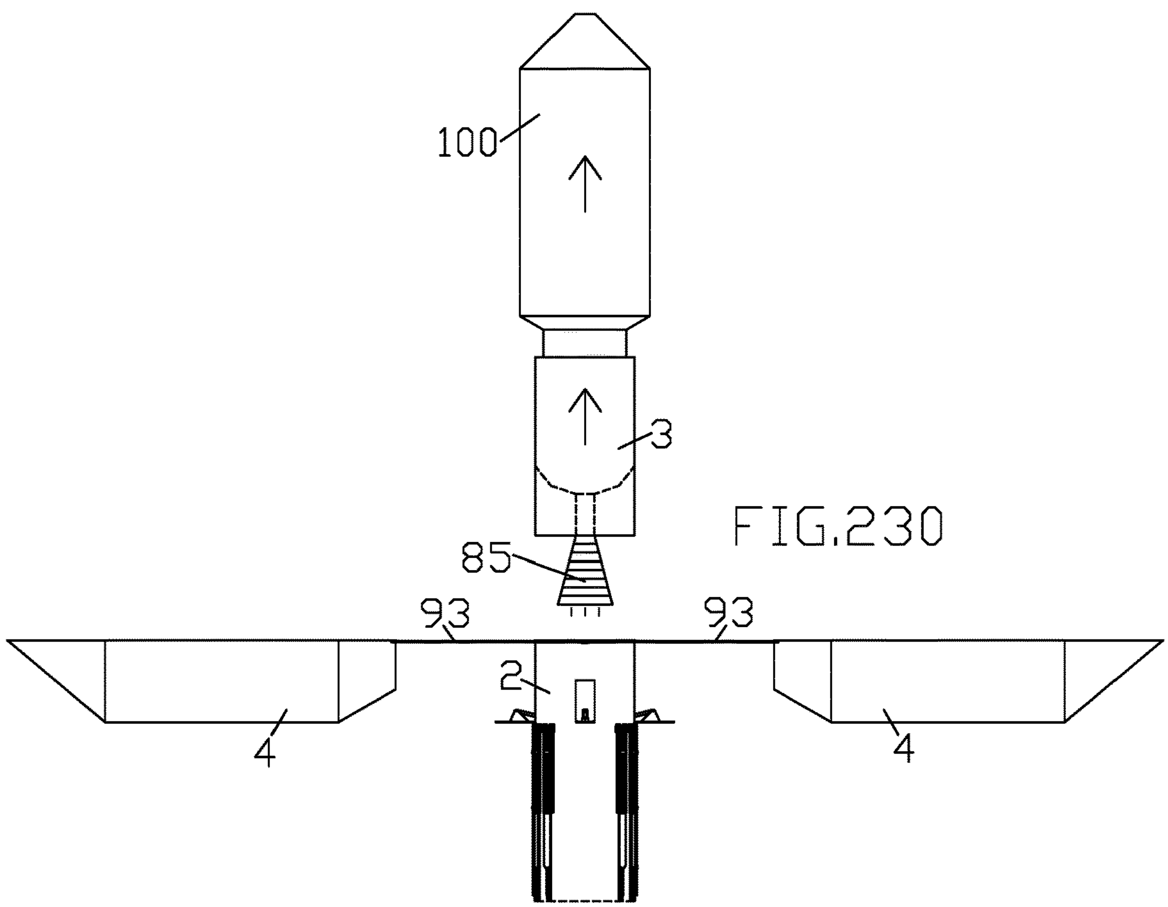

FIG. 230 is the side view of the main space rocket 2 upper part, which has also the sectional load cover 4 entirely folded out on two sides. And here, the second stage rocket 3 with the attached payload 100 ascend together because they already separated from the main space rocket 2.

Figure 231:
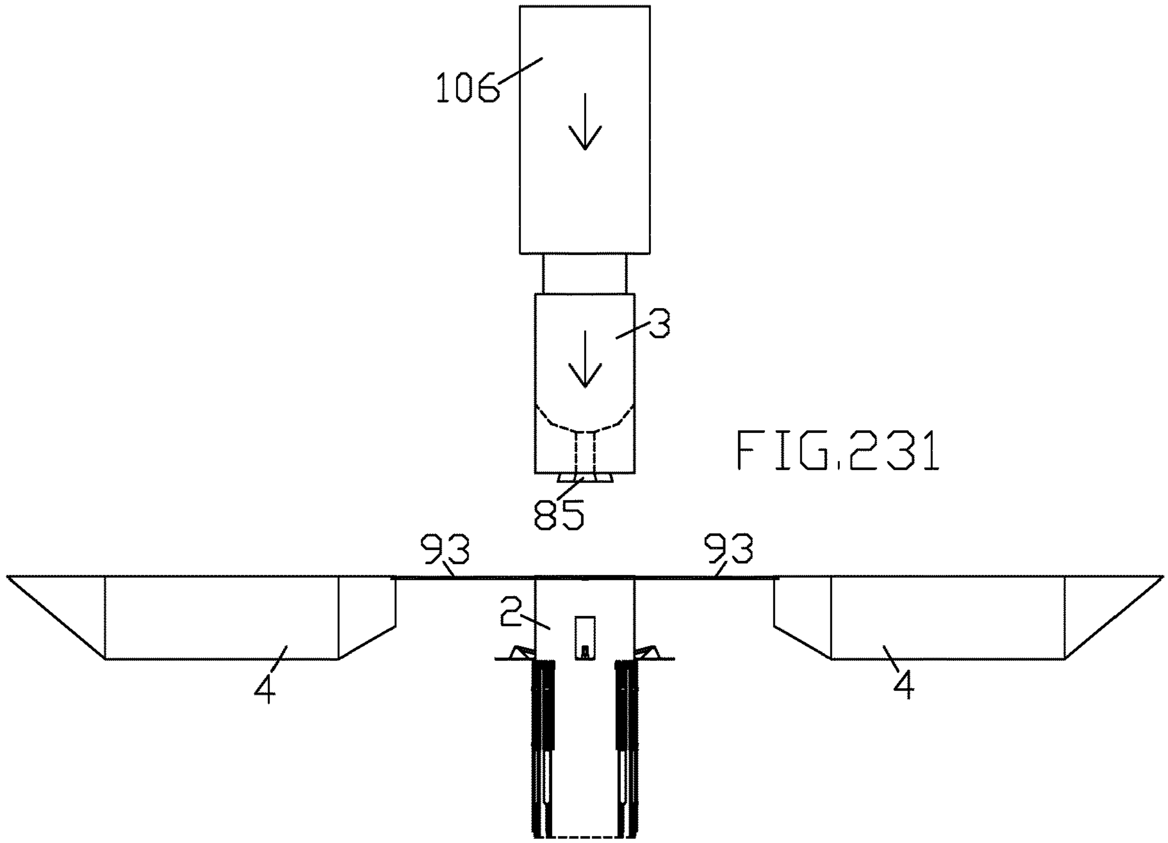

FIG. 231 is the side view of the main space rocket 2 upper part, which has the sectional load cover 4 entirely folded out on two sides. Here, the second stage rocket 3 with the attached return load 106 approaches to the main space rocket 2 in order to dock with it.

Figure 232:
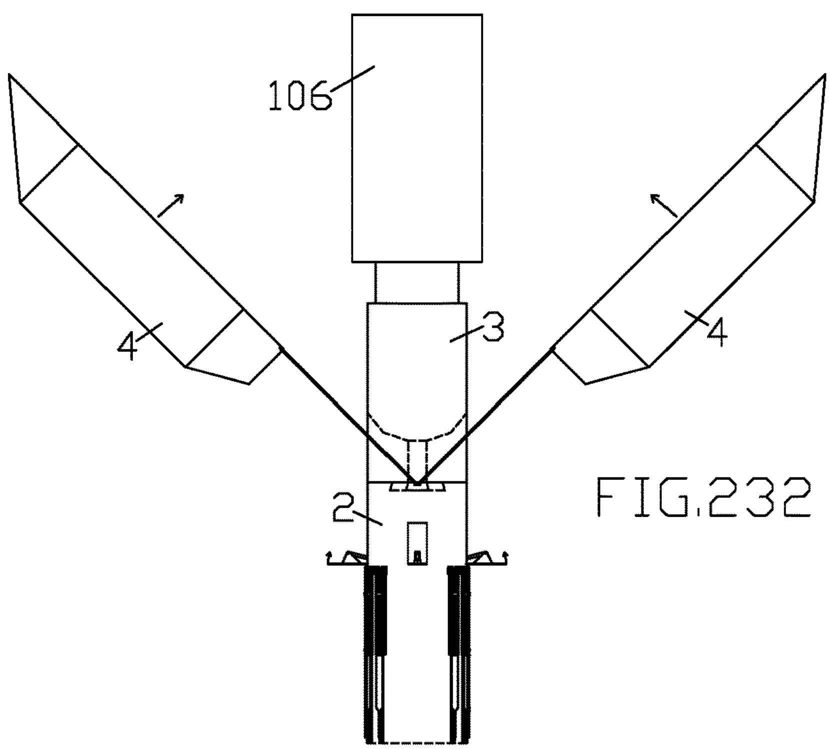

FIG. 232 is the side view of the main space rocket 2 upper part whereto is already docked the second stage rocket 3 with the attached return load 106. Here, the sectional load cover 4 is already a little shut up.

Figure 233:
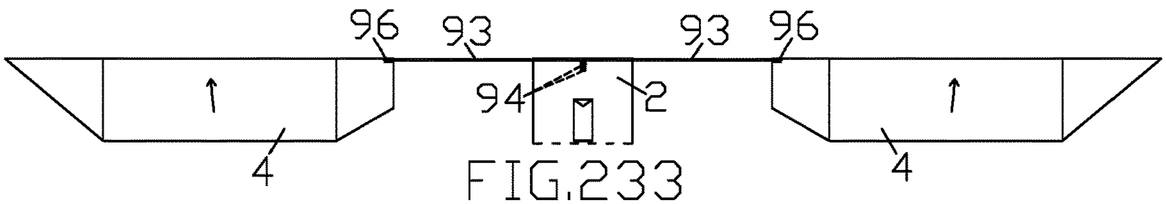

FIG. 233 is the side view of alone main space rocket 2 upper part, which has the sectional load cover 4 entirely folded out on two sides.

Figure 234:
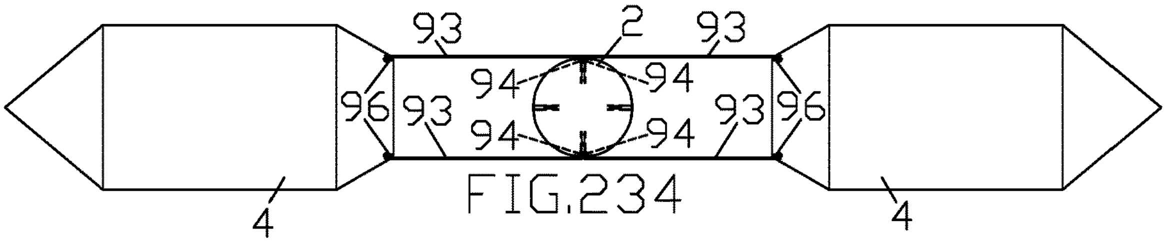

FIG. 234 is the top view of alone main space rocket 2 upper part, which has the sectional load cover 4 entirely folded out on two sides.

Figure 235:
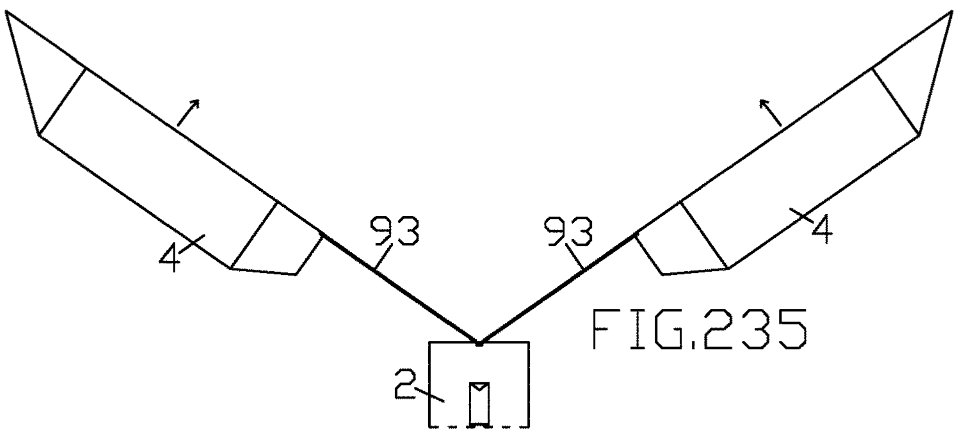

FIG. 235 is the side view of the main space rocket 2 upper part with the sectional load cover 4 a little shut up.

Figure 236:
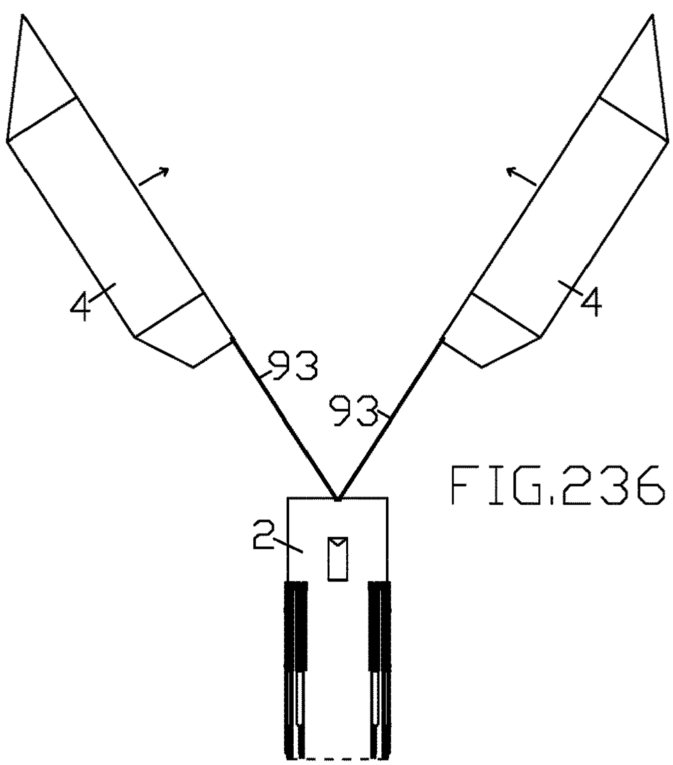

FIG. 236 is the side view of the main space rocket 2 upper part with the sectional load cover 4 more shut up.

FIG. 237 is the side view of the main space rocket 2 upper part, with the sectional load cover 4 close to shutting up.

FIG. 238 is the side view of the main space rocket 2 upper part, which has the sectional load cover 4 entirely shut up. This sectional load cover 4 is maximally distant upward from the main space rocket 2 because it is held up by means of four long cog beams 93.

FIG. 239 is the front view of FIG. 238 in the same arrangement and situation.

FIG. 240 is the side view of the main space rocket 2 upper part, which has also the sectional load cover 4 entirely shut up, which is already a lot lowered on four cog beams 93.

FIG. 241 is the front view of FIG. 240 in the same arrangement and situation.

FIG. 242 is the side view of the main space rocket 2 upper part, which has also the sectional load cover 4 entirely shut up, which is already entirely lowered on four cog beams 93. Therefore, this sectional load cover 4 touched on with the main space rocket 2 fuselage.

FIG. 243 is the front view of FIG. 242 in the same arrangement and situation.

FIG. 244 is the enlarged side view of the sectional load cover 4 entirely shut up, which is attached to the main space rocket 2 upper part. Here, is visible in what way are installed four hoisting gears 96 of the sectional load cover 4 and four rotating heads 94 of four cog beams 93.

FIG. 245 is the top view of the horizontal sectional view according to the S1-S1 line on FIG. 244.

FIG. 246 is the top view of the horizontal sectional view according to the S2-S2 line on FIG. 247.

FIG. 247 is the front view of FIG. 244 in the same arrangement and situation.

Figure 248:
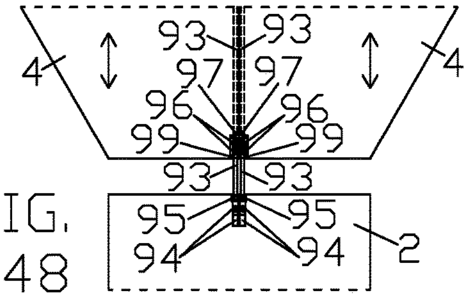

FIG. 248 is the enlarged side view of a fragment of the sectional load cover 4 entirely shut up, which is a little lifted on four cog beams 93 and therefor a little protrude from the main space rocket 2.

Figure 249:
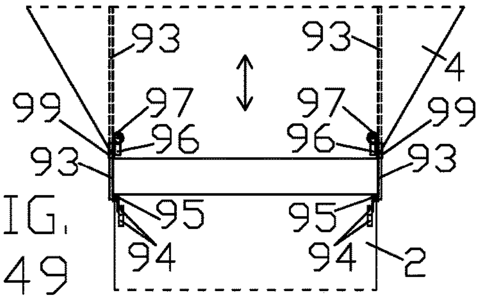

FIG. 249 is the front view of FIG. 248 in the same arrangement and situation.

Figure 250:
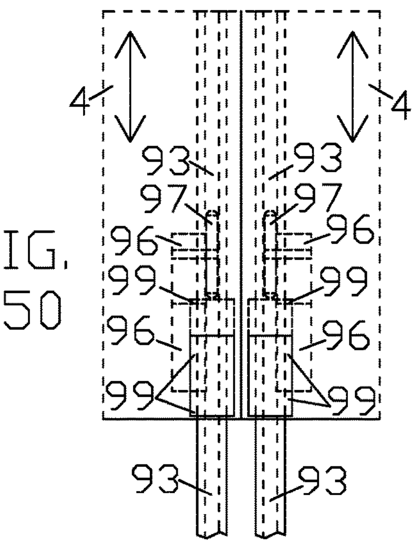

FIG. 250 is the very plenty enlarged and detailed side view of two hoisting gears 96 in the fragment of the sectional load cover 4 entirely shut up, which is lifted.

Figure 251:
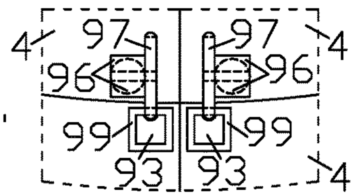

FIG. 251 is the top view of FIG. 250 in the same arrangement and situation.

Figure 252:
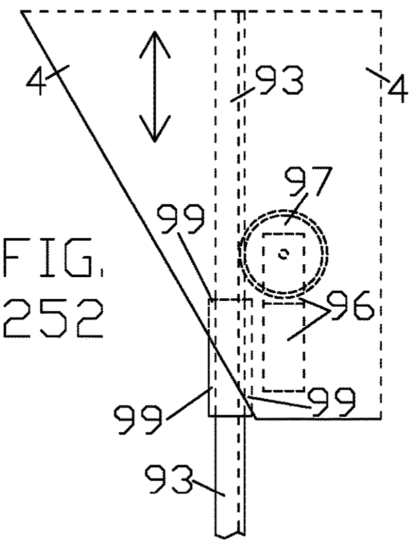

FIG. 252 is the front view of FIG. 250 in the same arrangement and situation.

Figure 253:
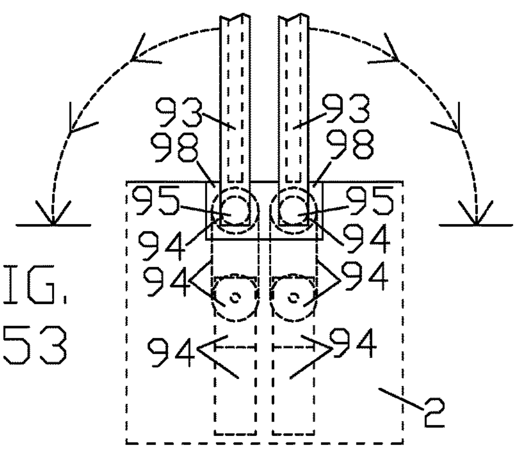

FIG. 253 is the very plenty enlarged and detailed side view of two rotating heads 94 of the cog beams 93 in the fragment of the main space rocket 2 fuselage.

Figure 254:
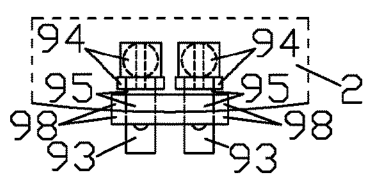

FIG. 254 is the top view of FIG. 253 in the same arrangement and situation.

Figure 255:
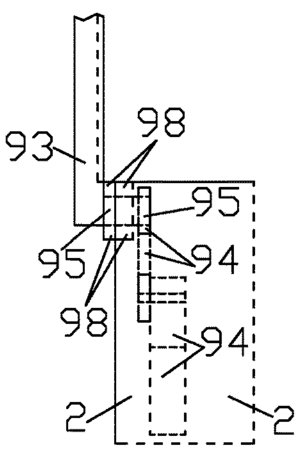

FIG. 255 is the front view of FIG. 253 in the same arrangement and situation.

Figure 256:
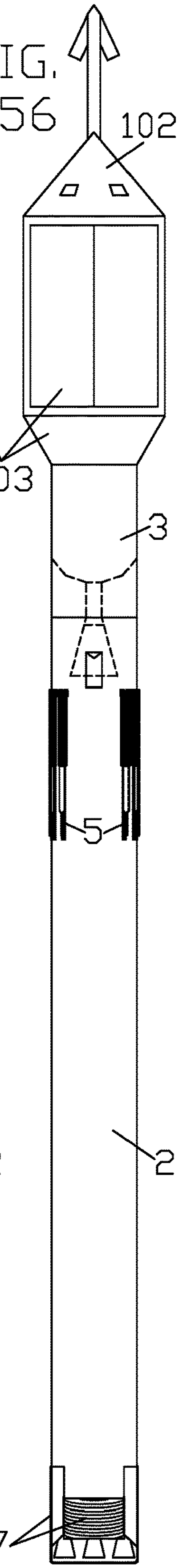

FIG. 256 is the side view of a attaching variant wherein on the main space rocket 2 top is mounted the assemblage, which consist of the second stage rocket 3 whereon is attached a payload module 103 and whereto is attached a crew module 102.

Figure 257:
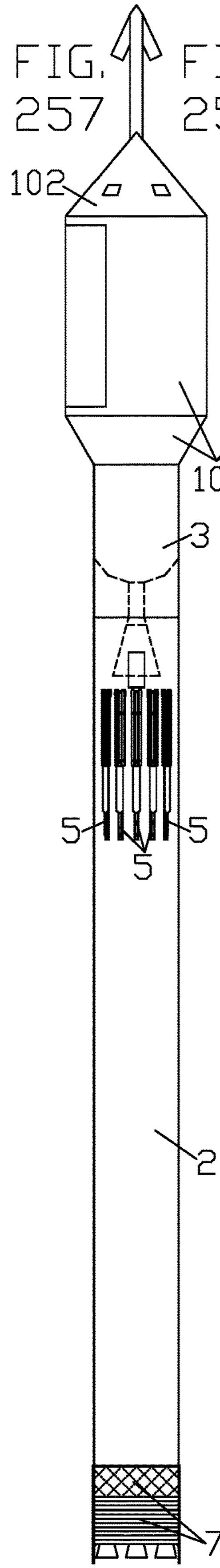

FIG. 257 is the front view of FIG. 256 in the same arrangement and situation.

Figure 258:
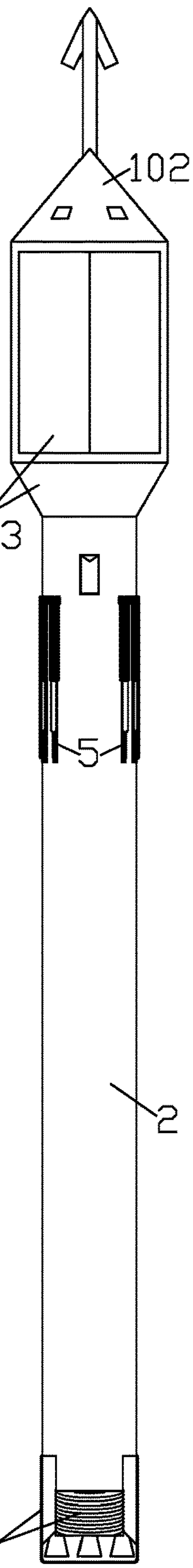

FIG. 258 is the side view of the attaching variant wherein on the main space rocket 2 top is mounted the assemblage, which only consists of the payload module 103 with the crew module 102.

Figure 259:
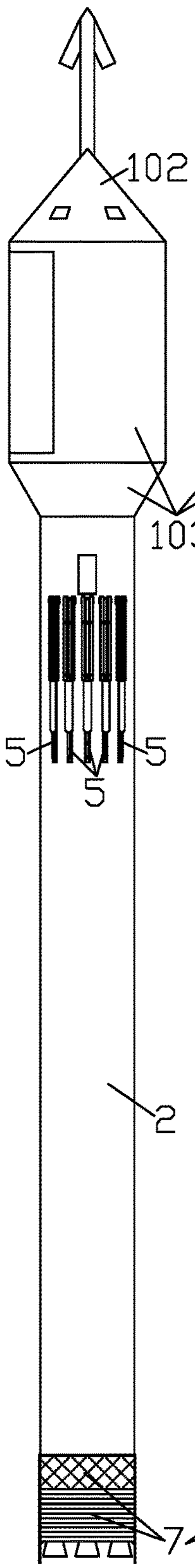

FIG. 259 is the front view of FIG. 258 in the same arrangement and situation.

Figure 260:
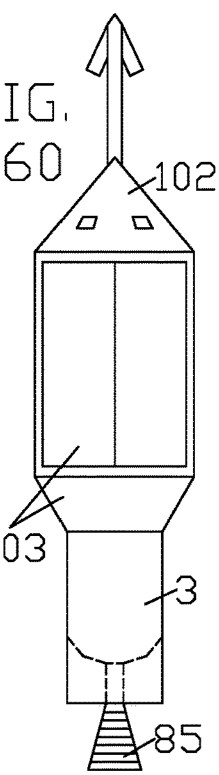

FIG. 260 is the side view of the separated assemblage, which consist of the second stage rocket 3 with attached the payload module 103 whereto is attached the crew module 102.

Figure 261:
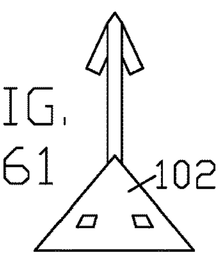

FIG. 261 is the side view of alone crew module 102.

Figure 262:
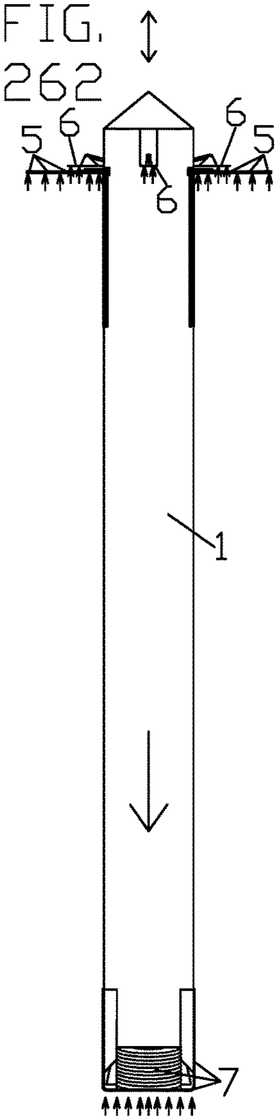

FIG. 262 is the side view of example of one booster space rocket 1 descending in the atmosphere. This booster space rocket 1 has entirely lifted (spread out) its all six spreadable arms 5.

Figure 263:
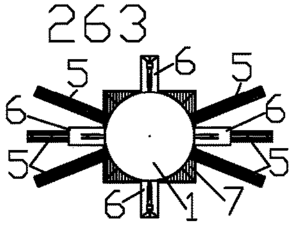

FIG. 263 is the top view of FIG. 262 in the same arrangement and situation.

Figure 264:
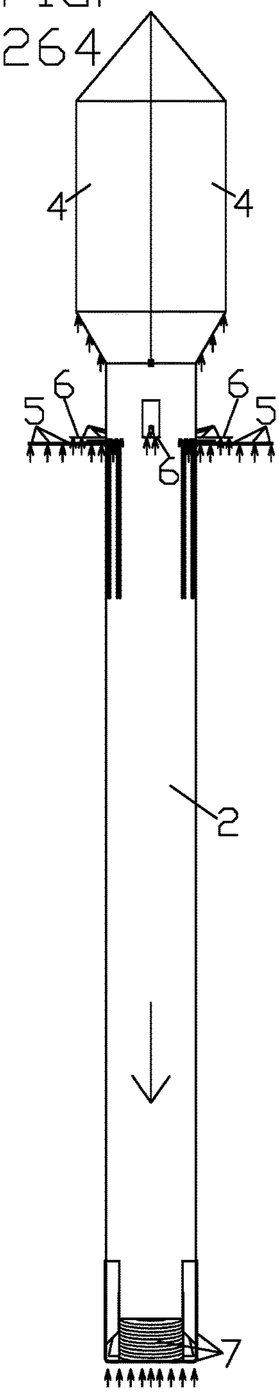

FIG. 264 is the side view of example of one main space rocket 2 descending in the atmosphere. This main space rocket 2 has entirely lifted (spread out) its all ten spreadable arms 5. And this main space rocket 2 has on its top installed the sectional load cover 4.

Figure 265:
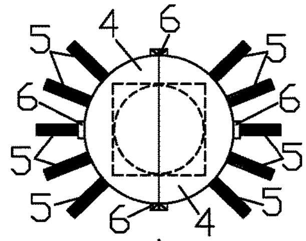

FIG. 265 is the top view of FIG. 264 in the same arrangement and situation.

Figure 266:
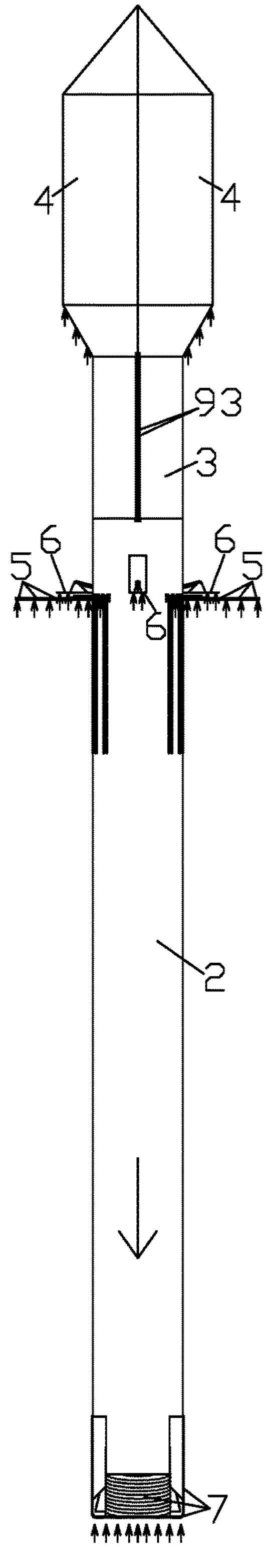

FIG. 266 is the side view of example of one main space rocket 2 descending in the atmosphere. This main space rocket 2 has also entirely lifted (spread out) all ten spreadable arms 5. This view shows the attaching variant wherein on the main space rocket 2 top is mounted the assemblage, which consist of the second stage rocket 3 and the sectional load cover 4.

Figure 267:
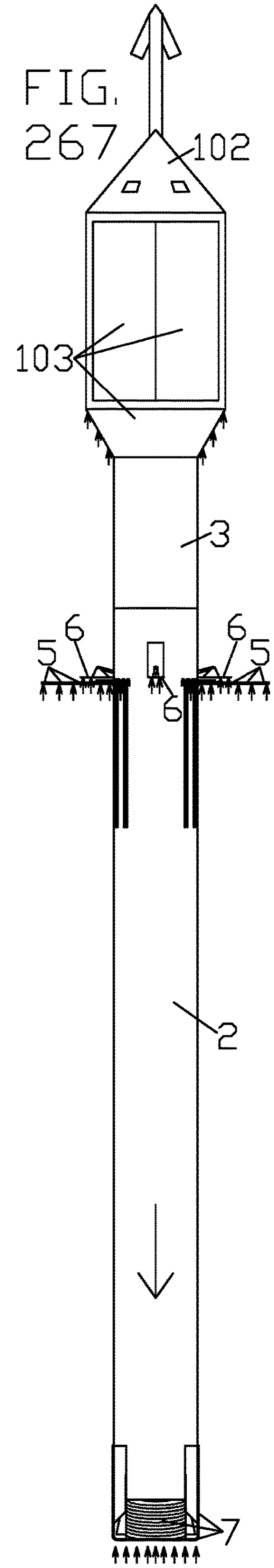

FIG. 267 is the side view of example of one main space rocket 2 descending in the atmosphere. This main space rocket 2 has also entirely lifted (spread out) all ten spreadable arms 5. This view shows the attaching variant wherein on the main space rocket 2 top is mounted the assemblage, which consist of the second stage rocket 3 with attached the payload module 103 and the crew module 102.

Figure 268:
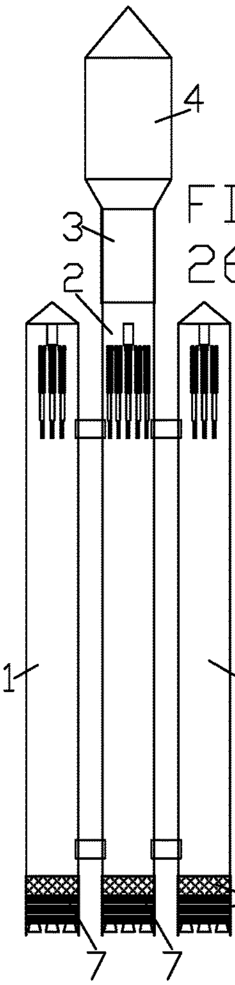

FIG. 268 is the diminished front view of three joined space rockets. They are one main space rocket 2, which is joined on both sides with two booster space rockets 1. On the main space rocket 2 top is mounted the assemblage, which consist of the second stage rocket 3 and the sectional load cover 4.

Figure 269:
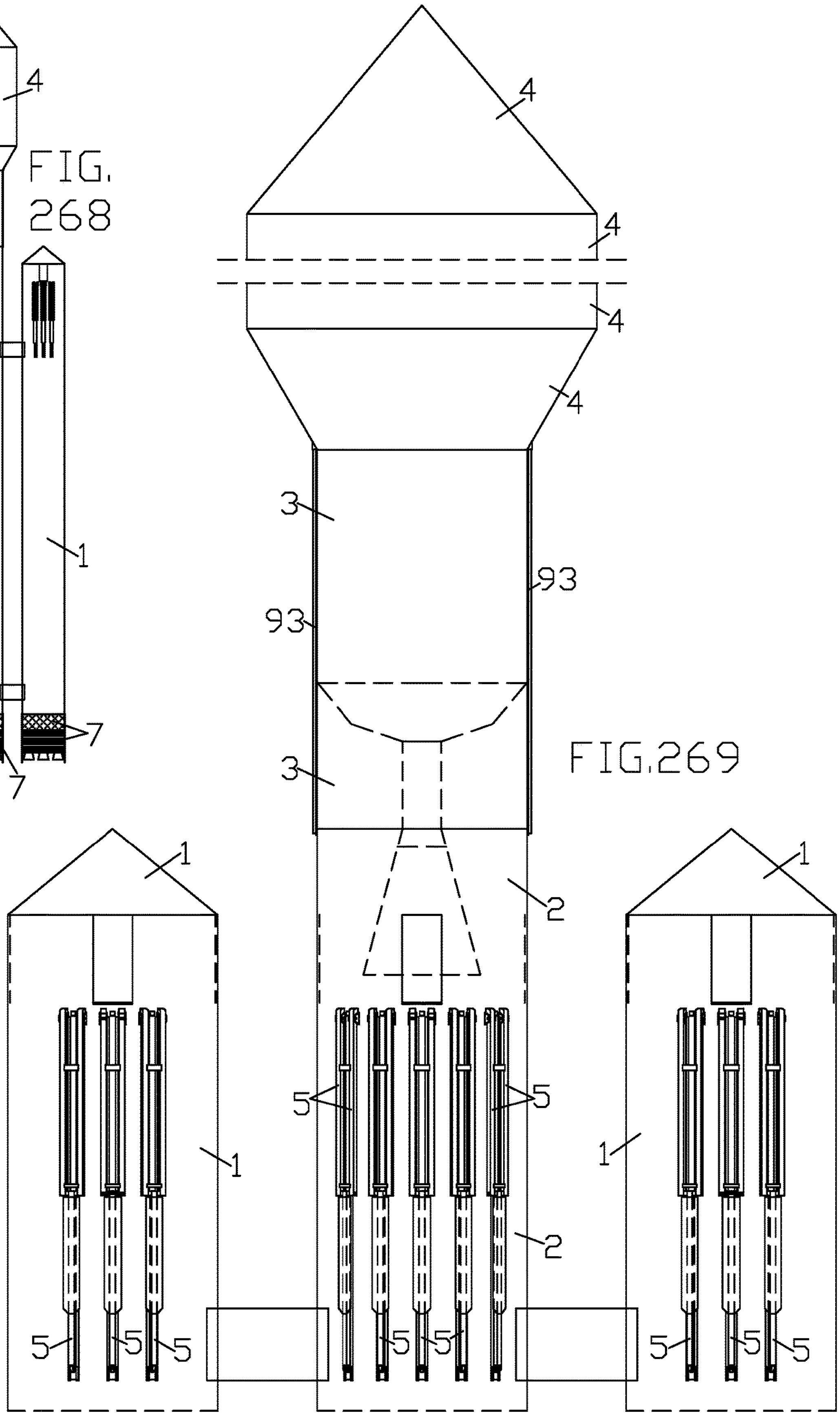

FIG. 269 is the enlarged front view of the upper parts of three joined space rockets, which are on FIG. 268.

Figure 270:
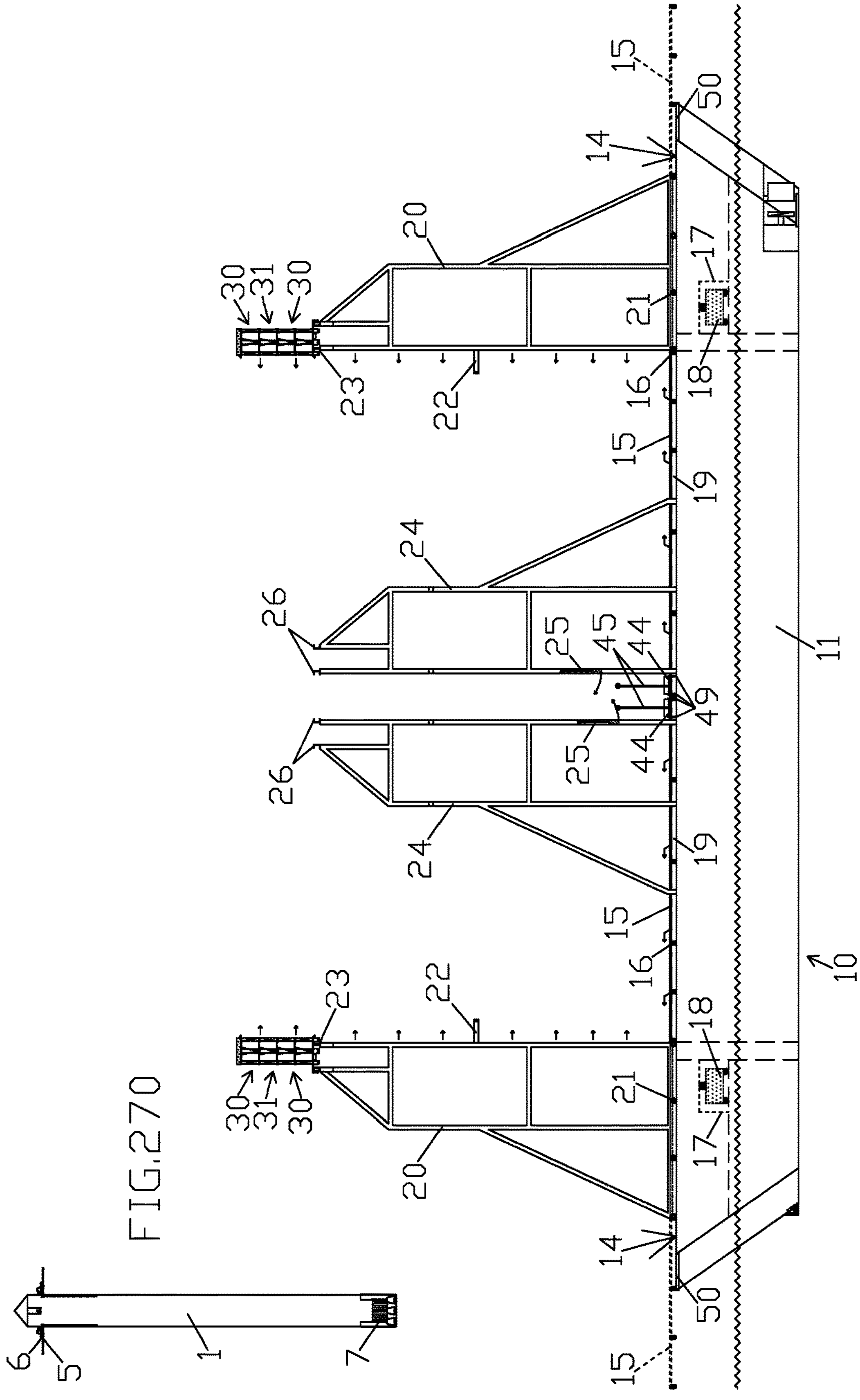

FIG. 270 is the enlarged side view of the entire specific sea ship 10, which has the deck mounted landing station for individual, vertical landing and also for fastening of three space rockets equipped with the plurality of spreadable arms 5. This view is the same as FIG. 11 albeit is enlarged. This view shows the specific sea ship 10 and the landing station ready for landing the first booster space rocket 1 and alongside very such space rocket.

Figure 271:
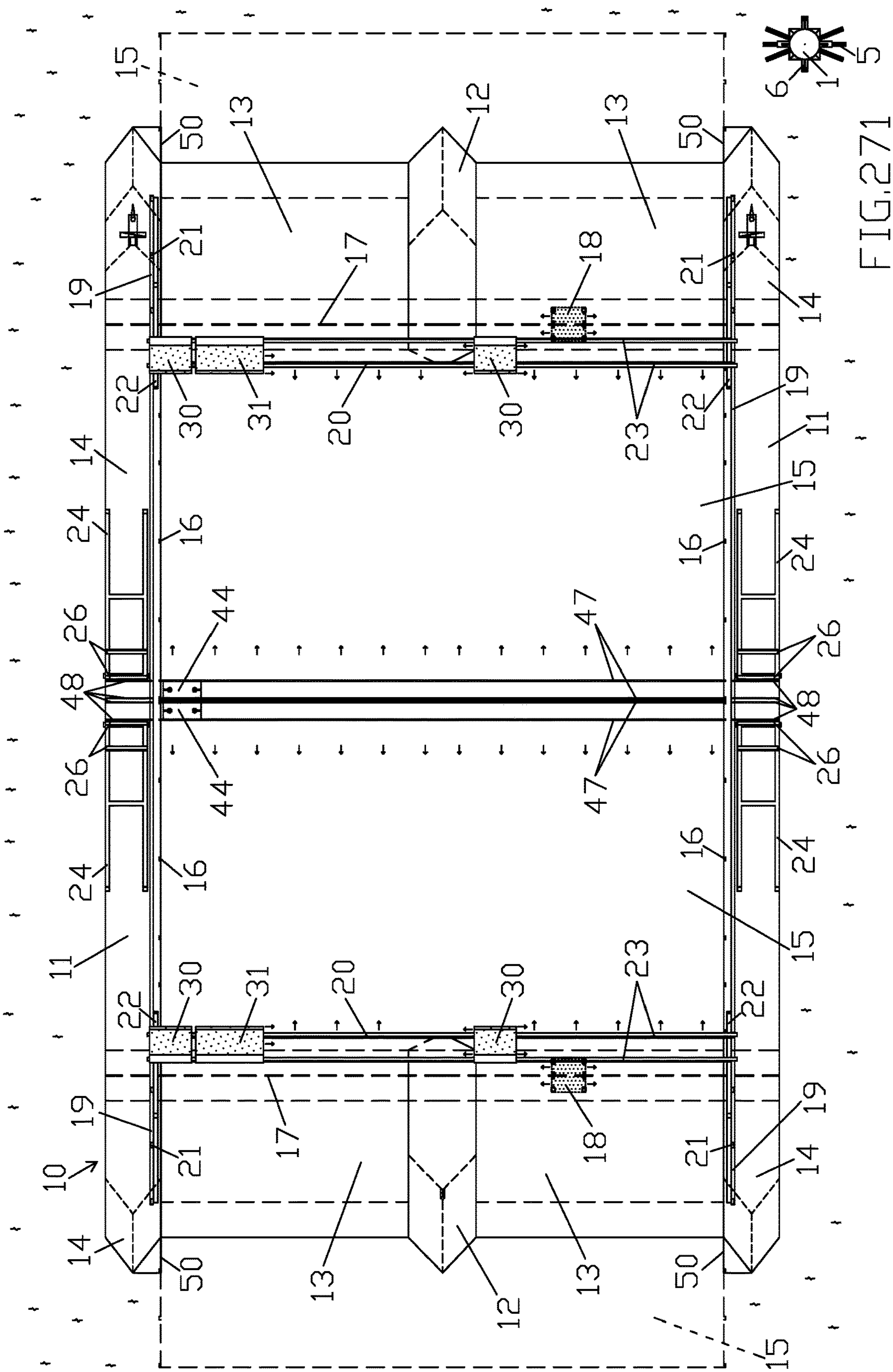

FIG. 271 is the enlarged top view of the entire specific sea ship 10, which has the deck mounted landing station for individual, vertical landing and also for fastening of three space rockets equipped with the plurality of spreadable arms 5. This view is the same as FIG. 12 albeit is enlarged. This view shows this specific sea ship 10 and the landing station ready for landing the first booster space rocket 1 and alongside very such space rocket.

FIG. 272 is the enlarged front view of the entire specific sea ship 10, which has the deck mounted landing station for individual, vertical landing and also for fastening of three space rockets equipped with the plurality of spreadable arms 5. This view is the same as FIG. 13 albeit is enlarged. This view shows this specific sea ship 10 and the landing station ready for landing the first booster space rocket 1 and alongside very such space rocket.

Figure 273:
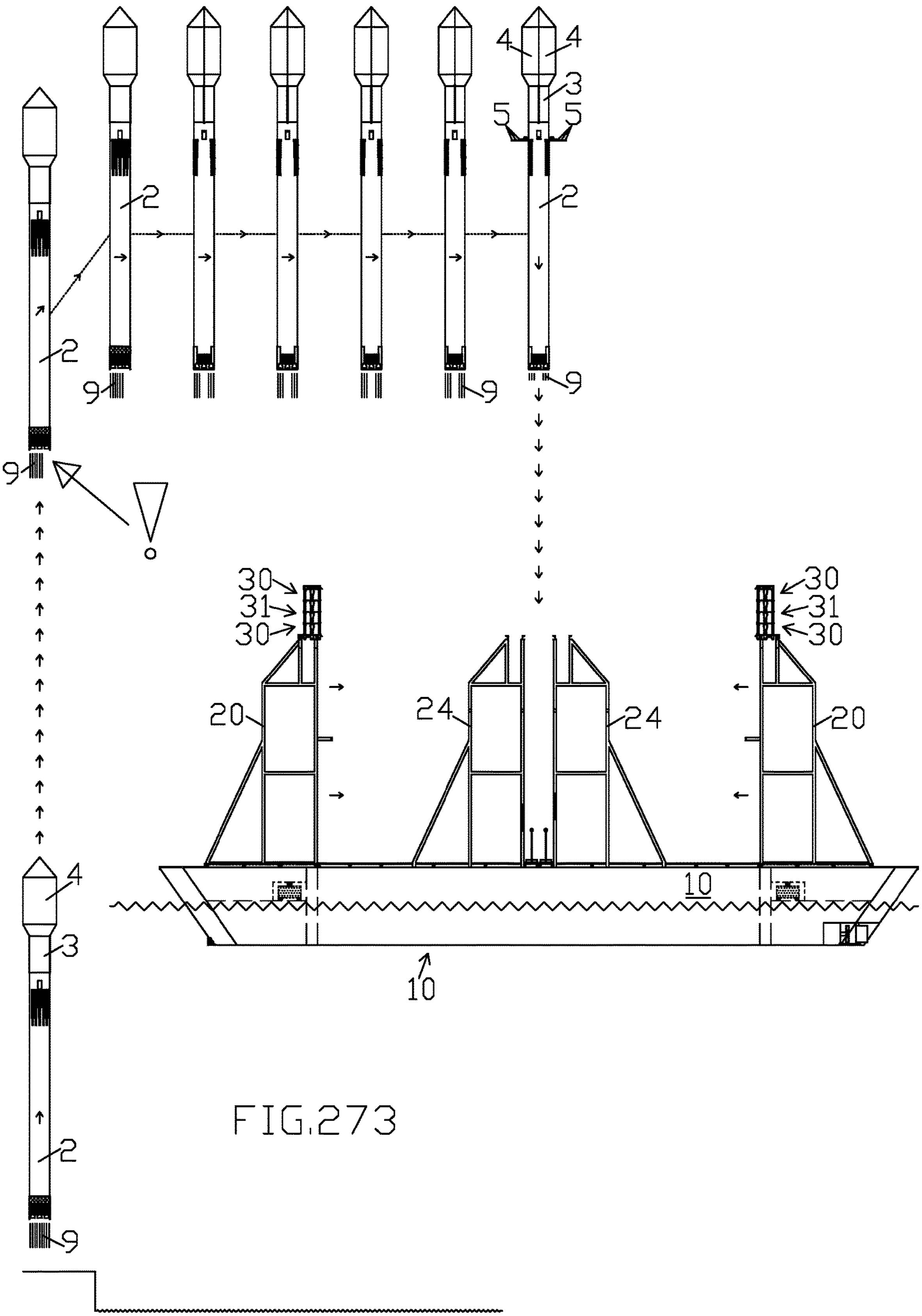

FIG. 273 is prospectus presentation, which shows for example a few drawing statuses of one main space rocket 2, which lifted-off and its further traveling trajectory, while unexpectedly happened one main engine failure. The whole presentation shows process of this entire space rocket salvation and its emergency landing aboard the specific sea ship 10 at open sea. This view targets display that each space rocket equipped with the spreadable arms 5 can in emergency land aboard the specific sea ship 10.

FIG. 274 is the side view, which shows for example one booster space rocket 1, which slips by through the giant open interior of the specific sea ship 10 at open sea. According to a plan, this booster space rocket 1 was supposed to land on this specific sea ship 10. However, during this space rocket descent happened some failure of the main engines, which were supposed to bring total stop of the space rocket descent and make possible landing aboard the specific sea ship 10. In order to prevent any strike of this space rocket onto the specific sea ship 10 there were quick and entirely spread apart in two directions both horizontally movable decks 15.

FIG. 275 is the top view of FIG. 274 in the same situation.

DISCLOSURE and DETAILED DESCRIPTION OF THE INVENTION AND DRAWINGS

The views on FIG. 1, 2, 3 show space rockets vertical landing method in the system for multiple use of the space rockets equipped with the plurality of spreadable arms 5. Here, is shown the method of three space rockets vertical landing on the specific sea ship 10, which has the deck mounted landing station having two pairs of hangers 24, two grasping wagons 44, two movable ship gantries 20 having the plurality of damping wagons 30 or 31 whereon each space rocket vertically lands as hangs itself on its spreadable arms 5. On the movable decks 15 two grasping wagons 44 help secure the space rockets at their bottoms.

On the current landing station in a few minutes intervals can land three space rockets equipped with the spreadable arms 5. Two first space rockets can be quickly moved on two pairs of hangers and fasten. The third landed space rocket can remain on both movable ship gantries 20 and is be fastened by both grasping wagons. This system is completely connected with utilization of the plurality of spreadable arms 5 mounted on all space rockets. Therefor the spreadable arms 5 are the main characteristic feature of this system. More information about these spreadable arms 5 is in description of further FIG. 86-88. Moreover, in this system, each space rocket (equipped with the plurality of spreadable arms 5) can vertically land with the attached modules and the return load and this feature is super important possibility and advantage. Therefor this system includes that all space rockets and their sub-assemblies and modules are designed and destined for multiple use thus, return with the space rockets on the Earth. Consequently, here presented the system for multiple use of suchlike space rockets regard vertical landing as very important purpose of this here invention. Whereas, here FIG. 1 is the side view, FIG. 2 is the top view, FIG. 3 is the front view. Current FIG. 1, 2, 3 show three views of the entire specific sea ship 10, which has the deck mounted landing station for individual, vertical landing and fastening of three space rockets equipped with the plurality of spreadable arms 5.

And therefor here FIG. 1, 2, 3 show just vertically landing one booster space rocket 1 with entirely lifted (spread out) all spreadable arms 5. Near to the specific sea ship 10, FIG. 1 shows also the second booster space rocket 1 and the main space rocket 2, which both have entirely lifted (spread out) their all spreadable arms 5. All views show and explain that on this specific sea ship 10, which has such landing station can still additionally vertically land these two earlier mentioned space rockets. Moreover, all these landings can progress in a few minutes intervals. And FIG. 1 shows additionally the enlarged drawing fragment with one damping wagon 30 and the second enlarged drawing fragment with the booster space rocket 1 upper part showing the spreadable arms 5 and the steering flaps 6. All current views show just vertically landing one booster space rocket 1 and therefor from this space rocket all main engines gush the exhaust fumes 9. This vertically landing booster space rocket 1 will soon hang up on two damping wagons 30, which stand on two movable ship gantries 20 tops. These two damping wagons 30 stand almost in centers of both movable ship gantries 20 tops. Whereat both movable ship gantries 20 approached close to each other in the specific sea ship 10 center. Because the specific sea ship 10 has the landing station, the first and second landed space rockets can be quickly moved on two pairs of hangers 24 and be strong temporary fastened by means of four rotating wedges 25 each. The third thus the last landed space rocket will remain on both movable ship gantries 20 and will be fastened by means of four raised rotating poles 45, which reach from two grasping wagons 44.

Presented here, the specific sea ship 10, which has the landing station with strong fastening of the space rockets enables sea-transportation even at stormy sea. Simultaneously, all mentioned feature are very important possibilities and advantages of this system. Therefor current views on FIG. 1, 2, 3 show the entire landing station construction, which consists of two pairs of hangers 24 having the rotating wedges 25, two huge movable ship gantries 20 whereon tops are installed four damping wagons 30 and two large damping wagons 31, two low build grasping wagons 44 having two rotating poles 45 each. Both grasping wagons 44 help fasten the space rockets bottom. All rotating poles 45 have spherical ends with flexible coatings, which are adapted for direct contacts with the space rockets. Both grasping wagons 44 have the plurality of driving wheels 46.

Here, is visible that four upper short rails 26 on all hangers 24 tops are fitted in with four upper long rails 23 on both movable ship gantries 20 tops while these both movable ship gantries 20 stand at the specific sea ship 10 center. This system comprises also that the specific sea ship 10 has the specific multi-hull with inbuilt two tunnels 17 and has two horizontally movable decks 15. In each tunnel 17 is installed one ballasting wagon 18.

The specific sea ship 10 has exceptional construction and is designed as sea-going sea ship. The views on FIG. 1, 2, 3 show the entire specific sea ship 10 having the specific multi-hull, which consists of two long side hulls 11 and two short central hulls 12 and which are permanently fastened with four over water copular hulls 13. The top surface of the multi-hull crates the main deck 14.

The specific sea ship 10 has also two huge horizontally movable decks 15, which are installed over the multi-hull central part. Both horizontally movable decks 15 can roll on the main deck 14 that is on two long side hulls 11. Both horizontally movable decks 15 can be quickly and entirely spread apart in two directions of the specific sea ship 10 in order to create inside its multi-hull the giant open interior where-into there is only sea surface. More information about these horizontally movable decks 15 is in description of further FIG. 11-13 and in FIG. 274-275.

Inside the specific sea ship 10 multi-hull are installed two ballasting wagons 18. Both ballasting wagons 18 are placed in two tunnels 17, which are transverse to the multi-hull. Currently, in both tunnels 17 both ballasting wagons 18 are shifted into such side setting, which maintains an exactly horizontal position of this specific sea ship 10. Both ballasting wagons 18 serve for very quick and precise ballasting the entire specific sea ship 10 to the perfectly horizontal position. FIG. 1-3 show the booster space rocket 1 and the main space rocket 2 with attached on top the second stage rocket 3 whereon on its top is the sectional load cover 4. Furthermore, FIG. 1-3 show a plurality of sophisticated components and sub-assemblies of each space rocket construction and these are the space rocket fuselage, the plurality of spreadable arms 5, four steering flaps 6, the sectional load cover 4, the sliding engines cover 7 flat underneath, the sliding engines cover 8 wedge shaped underneath.

The views on FIG. 4, 5, 6, 7 show the space rockets launch method in the system for multiple use of the space rockets equipped with the plurality of spreadable arms 5. Here, is shown the multi-task station for three jointed space rockets launch preparation, lift-off and later unloading from the specific sea ship 10. Whereas, FIG. 4 is the side view, FIG. 5 is the top view, FIG. 6 is the front view and FIG. 7 is also the side view. This multi-task station is at the sea harbor wharf. The multi-task station comprises two movable ground gantries 104 and one movable specific ground crane 105 for the space rockets reloading. The movable specific ground crane 105 is a lot bigger than both movable ground gantries 104. The movable specific ground crane is adapted to play along with both movable ground gantries. The movable specific ground crane 105 is movable because it has at the chassis bottom installed a plurality of driving wheels to precisely drive on the solid ground and turn on it. The movable specific ground crane 105 has the beams, which reach up somewhat over the specific sea ship 10 so that this movable specific ground crane 105 could lift one space rocket and subsequently shift it on both movable ground gantries 104. The entire movable specific ground crane 105 will move backwards shortly before the space rockets launch. Both movable ground gantries 104 serve for three space rockets lading after unloading from the specific sea ship 10. And later these two movable ground gantries 104 serve for three space rockets launch preparation all time in vertical position thus, during hanging on these two movable ground gantries 104. And therefor all space rockets can lift-off from two movable ground gantries 104 while these space rockets vertically hang on their spreadable arms 5. It even includes that three joined space rockets can lift-off this way. Both movable ground gantries 104 will spread apart on two sides immediately after the space rockets lift-off. Current FIG. 4-6 show the method of three space rockets lift-off from the multi-task station according to the current invention. Here, three joined space rockets hang on their all spreadable arms 5 on two movable ground gantries 104 and will lift-off this way. These three joined space rockets are the same as on the further FIG. 268-269 and these are one main space rocket 2, which is joined on both sides with two booster space rockets 1. On the main space rocket 2 top it is mounted the assemblage, which consist of the second stage rocket 3 and the sectional load cover 4. Inside this sectional load cover 4 is fastened the payload 100, which will be carried out on the Earth's orbit. These three joined space rockets all time had entirely lifted (spread out) their all spreadable arms 5 and all time hung on them on two movable ground gantries 104 until the launch. All time in such vertical position these three space rockets were overhauled, refit and prepared for launching. And in such status these three joined space rockets are entirely ready for launch toward space self-evidently from these two movable ground gantries 104.

On FIGS. 4 and 5 a few small arrows show the moving directions of both movable ground gantries 104 after three joined space rockets lift-off. It is so, because both movable ground gantries will spread apart on two sides immediately after the space rockets lift-off. And on the current FIG. 4 is also sketched the side drawing of one movable specific ground crane 105, because it earlier moved away. This movable specific ground crane 105 is shown in its working place on the further FIG. 9, 10. And FIG. 7 is the side view of these three joined space rockets, which are awhile after the lift-off and the side view of two movable ground gantries 104, which are spread somewhat apart on two sides. Thereby, the exhaust fumes 9 gush down of all main engines of these three joined space rockets. Currently, these three joined space rockets have already a lot lowered their all spreadable arms 5. The flow of atmospheric air pushes down all spreadable arms 5, which by a while will be entirely lowered thus, will be alongside their space rockets fuselages. Current views show that there is possible lift-off of three joined space rockets, which before the lift-off hanged on their all spreadable arms 5 and, which were laid on two movable ground gantries 104.

The space rocket lift-off from two movable ground gantries creates also a few benefits as possibility of smooth igniting the main engines, smooth adjusting the space rocket initial vertical position. Moreover, it makes possible to abort the space rocket launch plenty seconds after lift-off. That mean after lift-off and the space rocket failure to descend the whole space rocket and hang it back on two movable ground gantries. It would be reverse process in comparison to the launch, thus, as from FIG. 7 to FIG. 4. Furthermore, current views target presentation that construction of such multi-task station is very simple and is very suitable for unloading the hanging space rockets from the specific sea ship 10 after her arriving to this multi-task station and such coincidence is shown on the further FIG. 9-10. As result of such method space rockets launches and their quick return to this multi-task station there is possible their very fast renewed launch, for example several hours after landing on the specific sea ship 10. Therefor this system includes the method of three jointed space rockets launch preparation all time in vertical position.

FIG. 8 is a prospectus presentation, which shows a lot of crowded scenes in the system for multiple use of the space rockets equipped with the plurality of spreadable arms 5. The current whole presentation shows the methods of three joined space rockets launch and entire ascent process toward the Earth's orbit, descent and vertical landing with the return load according to the current invention. Hence, this FIG. 8 shows for example plurality drawing statuses of three joined space rockets with their lift-off, joined ascent, their separation, further separated ascent toward the Earth's orbit, deploy the payload 100, dock the return load 106, and their individual descending and vertical landing aboard the specific sea ship 10 at open sea. On all space rocket statuses and alongside the plurality of arrows show the directions of their traveling trajectories. On the space rocket statuses in right moments the exhaust fumes 9 gush down off the space rockets main engines in actual statuses. These three joined space rockets are the same as on FIG. 4-7 and FIG. 268-269 and these are one main space rocket 2, which is joined on both sides with two booster space rockets 1. On the main space rocket 2 top it is mounted the assemblage, which consist of the second stage rocket 3 and the sectional load cover 4. Inside the sectional load cover 4 is fastened the payload 100, which will be carried out on the Earth's orbit. At beginning these three space rockets statuses are in two front drawings. The first front drawing shows three joined space rockets in the first status thus, their launch from the multi-task station and show that directly after the lift-off they entirely lowered their all spreadable arms 5. The second front drawings show three separated space rockets in the second statuses thus, after their separation on a suitable height. Whereat the main space rocket 2 still ascends because its all main engines continuously run. While, two booster space rockets 1 already cut-off their main engines and will soonly steer toward the specific sea ship 10. Thereafter, all space rockets statuses are in the side drawings and show their travel trajectories toward the specific sea ship 10, which is in the side drawing as well. The main space rocket 2 with attached the second stage rocket 3 and with the payload 100 inside the sectional load cover 4 ascend together toward space until a stop moment on an Earth's low orbit. Whereas, at the same time, both booster space rockets 1 steer themselves down towards the specific sea ship 10. One booster space rocket 1 endeavors to as quick as possible landing so that it could be quickly moved sideways onto one pair of hangers 24. While, the second booster space rocket 1 endeavors to as late as possible landing so that it would be as plenty time as possible for moving sideways the first already landed booster space rockets 1 onto one pair of hangers 24. Probably, it will be enough only a few delay minutes so that the second booster space rocket 1 landing could take place. The current view shows the descent trajectories of these two booster space rockets 1. Here, alongside the space rocket drawing statuses are the numbers in the small circles, which explain the space rockets landing sequences. The first landing booster space rocket 1 has the number one in the small circle and in its last status before landing it has also the top drawing. At this juncture, it is already situated exactly over the specific sea ship 10. This space rocket has already lifted all its six spreadable arms 5 whereon it will hang up itself on two damping wagons 30. The second landing booster space rocket 1 has the number two in the small circle. As the third will later land the main space rocket 2 and therefor it has the number three in the small circle and in its last status before landing it has also the top drawing. After arriving to the Earth's low orbit the main space rocket 2 folded out on two sides the sectional load cover 4 so that the second stage rocket 3 with the payload 100 could separate and ascend away toward an Earth's high orbit. It means that the main space rocket 2 remains on the Earth's low orbit with continuously folded out on two sides the sectional load cover 4.

The current space rocket status shows as the main space rocket 2 circles around an Earth's globe 101 on the low orbit. Whereas, the second stage rocket 3 with the payload 100 after arrival in the Earth's high orbit releases aforesaid payload 100, which travel freely away. The current space rocket status shows as the second stage rocket 3 circles around the Earth's globe 101 on the high orbit. And later the second stage rocket 3 in a right moment steer itself back to the Earth's low orbit so that there dock back to the main space rocket 2. In order to both space rockets could attach themselves, they will have to circle the Earth's globe 101 and it can take plenty hours. After both space rockets attached themselves on the low orbit then there will be the entirely shut up sectional load cover 4, which in this example is empty. And then the main space rocket 2 rotates suitably and ignites its main engines for losing speed and steer earthwards. After cut-off all main engines there is rapidly shut down the sliding engines cover 7 and then this main space rocket 2 enters into the Earth's atmosphere. On the space rockets drawing statuses, only the shut-down sliding engines covers 7 are marked with a plurality of numbers. On one suitable status of this main space rocket 2, plenty external arrows show from what direction strongly crowds atmospheric air into the sliding engines cover 7 and into bottom conic part of the sectional load cover 4. Such space rocket status will occur during the space rocket initial entering into the Earth's atmosphere. At that time, the suitable flaps 6 will be very little deflected outside so that only steer the space rocket descent direction. While, ten blocking bars 54 can be entirely slid outside in order to generate aerodynamic braking and stabilization in this space rocket uppermost part. Furthermore, the sectional load cover 4 bottom conic part generates large aerodynamic braking and stabilization in the space rocket uppermost part.

After considerable speed losing by the main space rocket 2, it enters into second time period of descent in the atmosphere. Then all ten spreadable arms 5 are a little lifted and all four flaps 6 are a lot deflected out. After a little lifting of all ten spreadable arms 5, they generate large aerodynamic braking and stabilization in the space rocket upper part. At the same time the sliding engines cover 7 can be still shut-down. After following considerable speed losing by the main space rocket 2, it lifted entirely all ten spreadable arms 5 and maximally deflected out all four flaps 6. In this descent time period, the flows of atmospheric air strongly pushes upward all spreadable arms 5 and therefor it is necessary to use all brakes installed in these spreadable arms 5. After entire lifting of all ten spreadable arms 5, they generate maximal aerodynamic braking. Steering of the space rocket descent direction progress by a deflection reduction of the suitable flaps 6. All four flaps 6 are in large sizes so that they could steer the space rocket descent direction even at low speeds.

The main space rocket 2 in the same status is shown on the larger view on the further FIG. 266. The main space rocket 2 descends all time toward the specific sea ship 10. In a right moment is rapidly opened the sliding engines cover 7. Then in a right moment ignites the main engines to bring total stop of this space rocket descent and so that it could hang up itself on two large damping wagons 31 on both movable ship gantries 20. Previous entire landing processes of both booster space rockets 1 required performing similar stages as for the main space rocket 2.

Earlier described descent processes from the Earth's orbit individually by three space rockets will end with their vertical landing aboard the specific sea ship 10. Therefor both movable ship gantries 20 are entirely spread apart in two directions before landing of every space rocket as it is shown on the current view and on the plenty other views. In such arrangement both movable ship gantries 20 are ready and await landing of every space rocket. Both movable ship gantries 20 are huge and are installed directly over the central part of the specific sea ship 10. Both movable ship gantries 20 at the chassis bottom have the plurality of driving wheels 21 to precisely roll on the specific sea ship 10 decks length-ways. Therefor both movable ship gantries 20 can precisely and separably roll along the entire specific sea ship 10 on two deck rails 19. Each one deck rail 19 is permanently fastened on each long side hull 11 along the specific sea ship 10 length-ways. The deck rails 19 are common for both movable ship gantries 20 and it causes that both movable ship gantries 20 can roll on their whole-length. Therefor each movable ship gantry 20 can roll until direction of the opposite movable ship gantry 20, if necessary during landing of the space rocket. It causes, each space rocket can land almost on the entire length of the specific sea ship 10. It shows for example FIG. 26 whereon are the sketches of both movable ship gantries 20, which rolled together maximally to the left side on both deck rails 19.

During descent from the Earth's orbit every space rocket aims to land exactly in the specific sea ship 10 center however it is not possible so that each space rocket would achieve it with one centimeter accuracy. Therefor short time before landing of each space rocket, both movable ship gantries 20 approach to each over and together place themselves under the landing space rocket just with one centimeter accuracy because they can precisely roll along the specific sea ship 10.

Furthermore, both movable ship gantries 20 have on the chassis top two upper long rails 23 each with installed the plurality of damping wagons 30 or 31 whereon the space rockets vertically land as hang themselves on their spreadable arms 5. Therefore, the damping wagons 30 or 31 can also place themselves under the landing space rocket with one centimeter accuracy because these damping wagons can precisely roll transverse the specific sea ship 10 on both movable ship gantries 20 tops. It causes that each space rocket can land almost on the entire width of the specific sea ship 10. Then each vertically landing space rocket with lifted all spreadable arms 5 will be able to carefully, gently and precisely hang up itself on two damping wagons 30 or two 31. Both movable ship gantries 20 and all movable damping wagons 30 or 31 are absolutely essential at juncture of each space rocket hanging itself. On two damping wagons 30 vertically lands one booster space rocket 1 as hangs itself on its six spreadable arms 5. On the next two damping wagons 30 vertically lands one booster space rocket 1 as well.

Whereas, on two large damping wagons 31 vertically lands one main space rocket 2. After each space rocket hanging itself, all damping wagons can be in fullness compressed. Then two compressed damping wagons 30 can roll by from two movable ship gantries 20 tops onto one pair of hangers 24 tops. It is possible because, the upper long rails 23 on the movable ship gantries tops are fitted in with the upper short rails 26 on all hangers 24 tops. This way one pair of hangers 24 is adapted for passing of two damping wagons 30 from both movable ship gantries 20.

And it is possible because constructions of the entire hangers 24 and of the movable ship gantries 20 are entirely adapted with constructions and function of the damping wagons 30 and 31.

Whereas, inside the specific sea ship 10 two ballasting wagons 18 will very quickly and precisely ballast this entire specific sea ship 10 to the perfectly horizontal position during landing of each space rocket and during moving each one on the hangers 24. All three space rockets after their individual landing, hanging itself and fastening aboard the specific sea ship 10 are shown on the next FIG. 9-10 and on the further FIG. 20-22.

The entire current prospectus presentation on FIG. 8 targets presentation that is possible individual, vertical landing as many as three space rockets equipped with the spreadable arms 5 on one specific sea ship 10 at sea. Simultaneously it is very important that these space rockets can land with an attached load and that these landings can progress at very short time intervals for example a few minutes intervals. These landing progresses enable this here entire construction of the specific sea ship 10, which has its elaborated landing station for individual landing, quick sideways moving and fastening of these space rockets. If necessary, it is possible to redesign construction of the presented here landing station to a version for landing five space rockets and, which could also land in a few minutes intervals.

The views on FIG. 9, 10 show space rockets vertical unloading method in the system for multiple use of the space rockets equipped with the plurality of spreadable arms 5. Here, is shown the method of three space rockets vertical unloading from the specific sea ship 10 at the multi-task station according to the current invention. This multi-task station is at the sea harbor wharf and was earlier shown on FIG. 4-7. This multi-task station consists of two movable ground gantries 104 and of one movable specific ground crane 105. And FIG. 9 is the top view, FIG. 10 is the front view. Therefor these FIG. 9-10 show the views of the specific sea ship 10, which just moored at the multi-task station for unloading of three space rockets, which later can be again launch together or individually.

The specific sea ship 10 has the deck mounted landing station for individual, vertical landing and also for fastening of three space rockets equipped with the plurality of spreadable arms 5. Aboard the specific sea ship 10 are hanged and still individually fastened three space rockets. These are the main space rocket 2 and two booster space rockets 1 in the same status as shown on the further FIG. 20-22. The main space rocket 2 has on its top mounted the assemblage, which consist of the second stage rocket 3 and the sectional load cover 4. The movable specific ground crane 105 is a lot bigger than both movable ground gantries 104. The movable specific ground crane 105 has the beams, which reach up somewhat over the specific sea ship 10 so that this movable specific ground crane 105 could lift one space rocket and subsequently shift it on both movable ground gantries 104. In order to lift from the specific sea ship 10 the next space rockets, they must by themselves move over sideways until the specific sea ship 10 side. Those space rockets during moving over will hang on two damping wagons 30 and on the current views the arrows show their moving directions. Before such sideways moving of each space rocket on two damping wagons 30 or 31 there must be first released all fastenings of each space rocket.

Inside the specific sea ship 10 two ballasting wagons 18 will quickly and precisely ballast this entire specific sea ship 10 to the perfectly horizontal position after unloading each space rocket and during moving over each space rocket sideways.

On a wharf within reach of the movable specific ground crane 105 stands a next payload 100, which will be carried out on the Earth's orbit, a reserve second stage rocket 3 and a reserve sectional load cover 4.

On the current views, the arrows show the moving directions of the entire movable specific ground crane 105 and its top-crossbar with a hook. The movable specific ground crane 105 will move backwards before the space rockets launch.

On the earlier FIG. 4 is sketched the side drawing of the movable specific ground crane 105 because it earlier moved away. Current views target presentation that construction of such multi-task station is very simple and well-fitted for taking delivery of the space rockets from the specific sea ship 10 after hers arriving to this multi-task station. As result of the space rockets such return to this multi-task station there is possible their very fast renewed launch just from this multi-task station. Current FIG. 9-10 together with earlier FIG. 4-7 show also that all space rockets can be all the time and constantly in the vertical position during their transport, unloading and launch preparation.

FIG. 11, 12, 13 show three views of the entire specific sea ship 10, which has the deck mounted landing station for individual, vertical landing and also for fastening of three space rockets equipped with the plurality of spreadable arms 5. Therefor nearby the specific sea ship 10 the views show also one booster space rocket 1, which has entirely lifted (spread out) all spreadable arms 5. These views show the specific sea ship 10 and the landing station ready for landing the first booster space rocket 1. And FIG. 11 is the side view, FIG. 12 is the top view, FIG. 13 is the front view. These FIG. 11-13 are also shown as enlarged on FIG. 270-272.

Both movable ship gantries 20 are entirely spread apart in two directions before landing of every space rocket as it is shown on the current view. In such arrangement these both movable ship gantries 20 are ready and await landing of every space rocket. Therefor readiness for landing of the first booster space rocket 1 relies on entirely spreading apart both movable ship gantries 20 on two opposite directions of this specific sea ship 10. Furthermore, readiness for landing of the first booster space rocket 1 relies also on a proper setting of four damping wagons 30 and two large damping wagons 31 on both movable ship gantries 20 tops. For this reason almost at centers of both movable ship gantries 20 tops stand two damping wagons 30 so that it could hang up on them the first landing booster space rocket 1. Whereas, remaining two damping wagons 30 and two large damping wagons 31 stand inactively on one side of both movable ship gantries 20 tops. Furthermore, readiness for landing of every space rocket relies also on leveling of the entire specific sea ship 10. For this reason, inside the specific sea ship 10 multi-hull are installed two ballasting wagons 18. Both ballasting wagons 18 are placed in two tunnels 17, which are transverse to the multi-hull. Currently, in both tunnels 17, both ballasting wagons 18 are shifted into such side setting, which maintains the exactly horizontal position of this specific sea ship 10. Both ballasting wagons 18 serve for very quick and precise ballasting the entire specific sea ship 10 to the perfectly horizontal position.

Whereas, the right places for setting all damping wagons on both movable ship gantries 20 tops are selected in such way, which enable carrying out individual landing of three space rockets. During descent from the Earth's orbit every space rocket aims to land exactly in the specific sea ship 10 center however is not possible so that every space rocket would achieve it with one centimeter accuracy. Therefor shortly before landing of every space rocket both movable ship gantries 20 place themselves under this landing space rocket just with one centimeter accuracy because they can precisely roll along the entire specific sea ship 10. Furthermore, all damping wagons 30 or 31 place themselves also under this landing space rocket with one centimeter accuracy because all damping wagons can precisely roll transverse the specific sea ship 10 on both movable ship gantries 20 tops. It causes that each space rocket can land almost on the entire width of the specific sea ship 10. Thereat every landing space rocket with lifted all spreadable arms 5 will be able to softly and precisely hang up itself on two damping wagons 30 or two 31.

All current views show the entire specific multi-hull construction of the specific sea ship 10, which consists of two long side hulls 11 and two short central hulls 12, which are permanently fastened with four over water copular hulls 13. The top surface of the multi-hull crates the main deck 14.

The specific sea ship 10 has also installed two huge horizontally movable decks 15, which are installed directly over the central part of the specific sea ship 10 multi-hull. Both horizontally movable decks 15 can roll on the main deck 14 that is on both long side hulls 11. Furthermore, FIG. 11 and FIG. 12 show also possibility and range of spreading apart in two directions of both horizontally movable decks 15. And a plurality of arrows show the directions of spreading apart of these horizontally decks 15. Currently, both movable decks 15 are pushed to each other and touch on themselves in the specific sea ship 10 center. Furthermore, both horizontally movable decks 15 are sketched with the dashed lines after their complete spreading apart in two directions.

Inside the central part of the specific sea ship 10 multi-hull there are not any hull parts. Therefore, after the horizontally movable decks 15 have been completely spread apart there are not any hull parts of the multi-hull. As result, inside the specific sea ship 10 multi-hull arises the giant open interior where-into there is only sea surface. Spreading apart of horizontally both movable decks 15 is adapted to prevent them from strike of the space rocket, which failed to stop its descent from the space.

The specific sea ship 10, which has entirely spread apart in two directions both horizontally movable decks 15, is also shown on FIG. 274-275. Currently, the movable ship gantries 20 are also entirely spread apart in two directions and therefor here are well visible four long transverse rails 47, which are permanently fastened on both movable decks 15. Furthermore, on the hangers 24 there are not hanged any space rockets and therefor between every pair of hangers 24 there are well visible four short transverse rails 48. Furthermore, here are marked a plurality of additional following component members and sub-assemblies of this specific sea ship 10; the main deck 14, the plurality of wheels 16 in both movable decks 15, two deck rails 19 (for rolling both movable ship gantries 20), the plurality of wheels 21 in both movable ship gantries 20.

FIG. 14, 15, 16 show three views of the entire specific sea ship 10, which has the deck mounted landing station for individual, vertical landing and also for fastening of three space rockets equipped with the plurality of spreadable arms 5. Whereas, FIG. 14 is the side view, FIG. 15 is the top view, FIG. 16 is the front view. These views show this specific sea ship 10 and the landing station ready for landing the second booster space rocket 1 because on her earlier already landed the first booster space rocket 1. Therefor here, the specific sea ship 10 is with one booster space rocket 1, which hangs on one pair of hangers 24 and is already fastened at the bottom by means of four rotating wedges 25. This booster space rocket 1 earlier landed and moreover it is still fastened also at the bottom by means of four raised rotating poles 45, which reach from two grasping wagons 44. Both grasping wagons 44 are currently, under this booster space rocket 1.

Landing process of this booster space rocket 1 aboard the specific sea ship 10 was following. The booster space rocket 1 earlier during landing hung up itself by means of its all spreadable arms 5 on two damping wagons 30, which were earlier suitably placed on both movable ship gantries 20 tops as on FIG. 11-13. After hanging itself of this first booster space rocket 1 on two damping wagons 30, they became entirely compressed and, which are well visible on FIG. 45-51 and FIG. 61-66. Furthermore, after hanging itself of this first booster space rocket 1 on two damping wagons 30 under this space rocket moved in two grasping wagons 44 wherein each having two rotating poles 45. Jointly four rotating poles 45 were raised suitably to suppress swinging this space rocket bottom. After hanging itself of every space rocket on two damping wagons 30 or two 31, the space rocket can swing. Hence, under every space rocket can roll two grasping wagons 44 in order to suppress this swinging. Both grasping wagons 44 can precisely roll on the long transverse rails 47 on both movable decks 15 and so transverse the specific sea ship 10.

four

Moreover, both grasping wagons 44 can together roll on the short transverse rails 48 thus between one pair of hangers 24. It is so, because all short transverse rails 48 are fitted in with all long transverse rails 47 on both movable decks 15.

Each grasping wagon 44 has two rotating poles 45, which serve for suppressing swinging of the space rockets bottoms and for strong fastening of the last landed space rocket bottom. It is so because both grasping wagons 44 are low build and are situated on both movable decks 15 thus, they can roll under every space rocket, which will hang itself on two damping wagons on both movable ship gantries 20. Both grasping wagons 44 can roll underneath every space rocket providing they would lower their all rotating poles 45. And then four rotating poles 45 are raised so that they could suitably suppress swinging of every space rocket bottom.

It is necessary for quick moving of the space-rocket onto one pair of hangers 24. While, the non-swinging booster space rocket 1 hangs on two damping wagons 30 and is blocked at the bottom by four raised rotating poles 45, so just then it is possible to move this space rocket onto one side of the specific sea ship and thus between one pair of hangers 24, in order to hang this space rocket onto one pair of hangers 24. Because one pair of hangers 24 is adapted for passing of two damping wagons 30 from both movable ship gantries 20.

In order to perform it, both damping wagons 30 and both grasping wagons 44 must roll at equal speeds toward one pair of hangers 24. Then both grasping wagons 44 will roll by from four long transverse rails 47 onto four short transverse rails 48, which are between one pair of hangers 24. Whereat both damping wagons 30 with hanged on them one booster space rocket 1 will roll by from the upper long rails 23 onto the upper short rails 26. Currently, both damping wagons 30 stand on four upper short rails 26 being situated on one pair of hangers 24 tops. Both these damping wagons 30 stand precisely in centers of one pair of hangers 24 tops. It enabled fastening this hanging booster space rocket 1 at its bottom by means of four rotating wedges 25. Therefor after arriving of all wagons between one pair of hangers, the hanged space rocket will be fastened at the bottom by means of four rotating wedges 25 in one pair of hangers. After fastening at the bottom this booster space rocket 1 by means of four rotating wedges 25 it will be possible to loose pressure of four rotating poles 45. Currently, both grasping wagons 44 are still under the booster space rocket 1. Then it will be possible to lower two external rotating poles 45 as it show the current views with the sketches. And afterward both grasping wagons 44 will be able to roll under the hanged booster space rocket 1 toward the specific sea ship 1 center. Here, show it the sketches of the grasping wagons 44 in two statuses and arrangements. At that time both grasping wagons 44 will roll by from four short transverse rails 48 onto four long transverse rails 47. Among those rails are long intervals however the grasping wagons 44 are a lot longer and have the plurality of wheels 43 and therefor these grasping wagons 44 will easily roll by from the short transverse rails 48 onto the long transverse rails 47 on both movable decks 15. It is well visible on the further FIG. 81, 82 and there these long intervals are indicated with the large exclamation marks.

After moving of an entire assemblage with all wagons (with hanged space rocket) between one pair of hangers 24, this specific sea ship 10 and the landing station are immediately ready for landing the next space rocket. It is only enough to entirely spread apart both movable ship gantries 20 onto the specific sea ship 10 two directions.

Described here, course of action for landing of the first space rocket enables very quick readiness for landing of the next space rocket. During moving of the booster space rocket 1 on one pair of hangers 24, inside the specific sea ship 10 in two tunnels 17 both ballasting wagons 18 were moving at suitable speeds to reverse direction so that continually maintain the exactly horizontal position of the entire specific sea ship 10. As result, both ballasting wagons 18 moved almost entirely aside of the specific sea ship 10. In current status on both movable ship gantries 20 tops stand remaining two damping wagons 30 and two large damping wagons 31. After moving of the first booster space rocket 1 on one pair of hangers 24 all remaining damping wagons rolled by on the upper long rails 23 on both movable ship gantries 20 to a suitable arrangement for landing of the second booster space rocket 1. Thereby in current status the views show the specific sea ship 10 and the landing station ready for landing the second booster space rocket 1.

Readiness for landing of the second booster space rocket 1 as previously relies on entirely spreading apart both movable ship gantries 20 on two opposite directions of this specific sea ship 10. Moreover, readiness for landing of the second booster space rocket 1 relies also on proper setting of two damping wagons 30 on both movable ship gantries 20 tops as are on the current views. These two damping wagons 30 stand almost in centers of two movable ship gantries 20 tops so that it could hang up on them the second landing booster space rocket 1. Whereas, two large damping wagons 31 inactively stand on one side of both movable ship gantries 20 tops. Furthermore, readiness for landing of every space rocket relies also on leveling of the entire specific sea ship 10. For this reason, inside the specific sea ship 10 multi-hull are installed two ballasting wagons 18. These two ballasting wagons 18 are placed in two tunnels 17, which are transverse to the multi-hull. Whereat in two tunnels 17, both ballasting wagons 18 are currently, shifted almost entirely on the specific sea ship 10 one side because on an opposite side is hanged the booster space rocket 1. It causes that the entire specific sea ship 10 has equal level.

FIG. 17, 18, 19 show three views of the entire specific sea ship 10, which has the deck mounted landing station for individual, vertical landing and also for fastening of three space rockets equipped with the Plurality of spreadable arms 5. And FIG. 17 is the side view, FIG. 18 is the top view, FIG. 19 is the front view. These views show this specific sea ship 10 and the landing station ready for landing the third space rocket because earlier already landed two booster space rockets 1. Lately landed the second booster space rocket 1, which hung up itself by means of its all spreadable arms 5 on two damping wagons 30, which were earlier suitably placed on both movable ship gantries 20 tops as on previous FIG. 14-16. The entire landing process, hanging itself and moving of the second booster space rocket 1 on one pair of hangers 24 was the same as during the entire process of the first booster space rocket 1 and, which was described in FIG. 14-16. Current views show the specific sea ship 10 with two booster space rockets 1 whereas, each one hangs on one pair of hangers 24 and each one is fastened at the bottom by means of four rotating wedges 25. These two space rockets earlier landed and currently, the views show this specific sea ship 10 and the landing station ready for landing the third space rocket, which will be the main space rocket 2. Readiness for landing of the main space rocket 2 relies as previously on entirely spreading apart both movable ship gantries 20 on two opposite directions of this specific sea ship 10. Furthermore, this readiness also relies on setting two large clamping wagons 31 at centers of two movable ship gantries 20 tops as on the current views. These two large damping wagons 31 stand now in centers of two movable ship gantries 20 tops so that it could hang up on them the main space rocket 2. Furthermore, readiness for landing of every space rocket relies also on leveling of the entire specific sea ship 10. For this reason, inside the specific sea ship 10 multi-hull are installed two ballasting wagons 18. These two ballasting wagons 18 are placed in two tunnels 17, which are transverse to the multi-hull. Whereat in two tunnels 17, both ballasting wagons 18 are currently, shifted to the specific sea ship 10 center and it currently, maintains the exactly horizontal position of this specific sea ship 10.

FIG. 20, 21, 22 show three views of the entire specific sea ship 10, which has the deck mounted landing station for individual, vertical landing and also for fastening of three space rockets equipped with the plurality of spreadable arms 5. Whereas, FIG. 20 is the side view, FIG. 21 is the top view, FIG. 22 is the front view. These views show the specific sea ship 10 with three individually hanged and fastened space rockets and, which are ready for transporting over the sea for unloading at the multi-task station. On this specific sea ship 10 earlier landed two booster space rockets 1 and furthermore, the third landed the main space rocket 2. Here, this main space rocket 2 hangs at centers of two movable ship gantries and is fastened at the bottom by means of four raised rotating poles 45, which reach from two grasping wagons 44. the last, landed just this main space rocket 2, which hung up itself by means of its all ten spreadable arms 5 on two large damping wagons 31, which were earlier placed at centers of two movable ship gantries 20 tops as on previous FIG. 17-19. After the main space rocket 2 hanging itself, both large damping wagons 31 became entirely compressed, which are visible on FIG. 20, 22. During the same time, both grasping wagons 44 stood inactively on the specific sea ship 10 one side and had raised all four rotating poles 45. And after the main space rocket 2 completely hanged up itself, both grasping wagons 44 completely lowered two rotating poles 45 on one side to a horizontal setting. It enabled unrestricted rolling of both grasping wagons 44 underneath this hanged main space rocket 2.

Therefor then these two grasping wagons 44 moved under this main space rocket 2 until two rotating poles 45, which were continuously raised touched on with the main space rocket 2. And then both grasping wagons 44 raised two before horizontally set rotating poles 45, which afterward touched on with the main space rocket 2 as well. And then all four rotating poles 45 together suitably and gradually suppressed swinging of this space rocket bottom. Afterwards all four rotating poles 45 strongly tightened themselves to this main space rocket 2 and it strongly fastened this main space rocket 2 bottom part. On FIG. 22 are shown the grasping wagons 44 rolling under this space rocket by means of the sketches in two statuses. Further views on FIG. 83-85 show the enlarged views of the grasping wagons 44, which by means of four rotating poles 45 strongly fastened one main space rocket 2 bottom. This main space rocket 2 landed with attached the second stage rocket 3 and the sectional load cover 4, which could have inside the return load 106 from the Earth's orbit. Whereat in two tunnels 17, both ballasting wagons 18 are now shifted to the specific sea ship center and it maintains the exactly horizontal position of this specific sea ship 10. As it was earlier mentioned the current views show the specific sea ship 10 in fullness loaded with three space rockets and ready for seafaring for unloading at the multi-task station. Presented here, the specific sea ship 10, which has landing station having strong fastening of the space rockets enables sea-transportation even at stormy sea. Whereat in two tunnels 17, both ballasting wagons 18 serve also for automatic, continuous, quick and precise ballasting of this specific sea ship 10 during seafaring. Furthermore, the current views somewhat show that the upper short rails 26 on all hangers 24 are fitted in with the upper long rails 23 on both movable ship gantries 20 while these both movable ship gantries 20 stand at specific sea ship 10 center. Consequently, the damping wagons 30 with the hanged space rockets could earlier roll by on one pair of hangers 24. Such fitting of these rails will be later also necessary for vertical unloading all space rockets from this specific sea ship 10. It is shown on previous FIG. 9-10.

FIG. 23, 24, 25 show three views of the entire landing station for individual, vertical landing of three space rockets. FIG. 23 is the side view, FIG. 24 is the top view, FIG. 25 is the front view. This landing station is in the same arrangement as aboard the specific sea ship 10 however the current views are without the grasping wagons 44. This landing station for vertical landing of three space rockets consist of two pairs of hangers 24 and of two movable ship gantries 20. Two space rockets after landing can be quick moved from two movable ship gantries 20 to two pairs of hangers 24. Hence, in the landing station are mounted two pairs of hangers 24 this way that one pair of hangers 24 is mounted on each side of the specific sea ship 10.

The hangers 24 in construction reminds immovable towers. Each hanger 24 has two rotating wedges 25 which serve for fastenings of one space-rocket. One pair of hangers 24 serve for hanging one space rocket and for strong temporary fastening it by means of four rotating wedges 25. On each hanger 24 top are two upper short rails 26. Whereas, on each movable ship gantry 20 top are two upper long rails 23. Therefor on both movable ship gantries 20 tops are together four upper long rails 23 whereon stand four damping wagons 30 and two large damping wagons 31. Both movable ship gantries 20 can separably roll along the entire specific sea ship 10 on two deck rails 19. For rolling, both movable ship gantries 20 use their own plurality of wheels 21. Furthermore, in both movable ship gantries 20, each one has two bumpers 22 distinctly protruding forwards. Currently, both movable ship gantries 20 are entirely spread apart in two directions, the same as on the earlier FIG. 11-19 and further FIG. 270-272.

FIG. 26, 27, 28 show three views of two whole movable ship gantries 20 by themselves, which are in the same arrangement as aboard the specific sea ship 10 and the same as on FIGS. 1-3 and 11-13. And FIG. 26 is the side view, FIG. 27 is the top view, FIG. 28 is the front view. Currently, both movable ship gantries 20 approached to each other because earlier rolled on their own plurality of wheels 21 on two deck rails 19. After approaching to each other, both movable ship gantries 20 touch on themselves with the bumpers 22. Both movable ship gantries 20 can precisely and separably roll on two deck rails 19 along the entire specific sea ship 10. Each deck rail 19 is permanently fastened on each long side hull 11 along the specific sea ship 10 length-ways. These deck rails 19 are common for both movable ship gantries 20 and it causes that both movable ship gantries 20 can roll on both deck rails 19 whole-length. Therefor each movable ship gantry 20 can roll until direction of the opposite movable ship gantry 20, if necessary during landing of the space rocket. It causes that each space rocket can land almost on the entire length of the specific sea ship 10. While, on all drawings there are only shown landings examples in the specific sea ship center. While, FIG. 26 shows the sketch of both movable ship gantries 20, which rolled together maximally to the left side on the deck rails 19.

Hence, on both movable ship gantries 20 tops are together four upper long rails 23 whereon stand four damping wagons 30 and two large damping wagons 31.

FIG. 29, 30, 31 show three views of two pairs of hangers 24 in the same arrangement as aboard the specific sea ship 10. Whereas, FIG. 29 is the side view, FIG. 30 is the top view, FIG. 31 is the front view. All hangers 24 are permanently fastened onto the deck 14 of both long side hulls 11 of the specific sea ship 10 and therefor are immobile. The hangers 24 in construction reminds immovable towers. On each hanger 24 top there are two upper short rails 26. Moreover, each hanger 24 has two rotating wedges 25, which serve for fastening of the space rockets. In one pair, the opposite hangers 24 have the rotating wedges 25 mounted on varied heights so that they would not hook on each over. Consequently, every space rocket can be fastened by four rotating wedges 25, which are on one pair of hangers 24. Furthermore, here are also visible a plurality of rotary actuators 27, which rotate the rotating wedges 25.

FIG. 32, 33, 34 show three enlarged views of one pair of hangers 24 wherein each has two rotating wedges 25 lowered and with the arrows showing their rotating directions. Each rotating wedge 25 has its own rotary actuator 27. And FIG. 32 is the side view, FIG. 33 is the top view, FIG. 34 is the front view. The hangers 24 are permanently fastened onto the deck 14 of the specific sea ship 10 and thus, are immobile. On each hanger 24 top there are two upper short rails 26 whereon can roll in one damping wagon 30.

FIG. 35, 36, 37 show the enlarged views of one pair of hangers 24 with the fragment of the space rocket fuselage 51, which is fastened by means of four rotating wedges 25. These four rotating wedges 25 are rotated in such way that they all together tighten up this space rocket fuselage 51 fragment. Whereas, FIG. 35 is the side view, FIG. 36 is the top view, FIG. 37 is the front view.

FIG. 38 is the top view of the horizontal sectional view according to the S-S line on FIG. 35. Here, from above are visible four rotating wedges 25 tightening the space rocket fuselage 51 fragment. The enlarged views of the rotating wedges 25 are shown on FIG. 45-54.

FIG. 39, 40, 41 show three enlarged views of one pair of hangers 24 whereon tops on the upper short rails 26 stand two damping wagons 30. FIG. 39 is the side view, FIG. 40 is the top view, FIG. 41 is the front view. Two damping wagons 30 are not compressed because they are not loaded with any space rocket.

FIG. 42, 43, 44 show three enlarged views of one pair of hangers 24 with hanged and fastened one booster space rocket 1. And FIG. 42 is the side view, FIG. 43 is the top view, FIG. 44 is the front view. This booster space rocket 1 all six spreadable arms 5 lay on two damping wagons 30, which are entirely compressed by a weight of this space rocket. Simultaneously the booster space rocket 1 in its bottom is fastened by means of four rotating wedges 25. The current views are very similar to previous FIG. 32-38 however here are additionally two damping wagons 30 and the entire booster space rocket 1. Aboard the specific sea ship 10 fastening of every space rocket bottom is absolutely necessary for seagoing even at small sea-waving. Without fastening of the space rocket bottoms, these space rockets would swing during a little rolling of the specific sea ship 10. Presented here, the fastening solutions of the space rockets bottoms are very strong and these enable the sea-transportation of these space rockets even at hefty sea-waving.

FIG. 45, 46, 47 show three enlarged views of the rotating wedges 25 with the hanger 24 fragments sketches, which are performed with the dashed lines. All four rotating wedges 25 are completely lowered and with the arrows showing their rotating directions. And FIG. 45 is the side view, FIG. 46 is the top view, FIG. 47 is the front view. In one pair the opposite hangers 24 have the rotating wedges 25 mounted on the varied heights so that they would not hook each over.

FIG. 48, 49, 50 show three enlarged views of four rotating wedges 25, which are rotated in such way that they all together tighten up the space rocket fuselage 51 fragment. FIG. 48 is the side view, FIG. 49 is the top view, FIG. 50 is the front view. Each rotating wedge 25 has flexible coatings in suitable places, marked with a plurality of dots on the views. These flexible coatings are intended for direct contacts with the space rockets.

FIG. 51 is the top view and shows for example the space rocket bottom, which is moved away from correct location. If the space rocket accidentally hung up itself aslant then all rotating wedges 25 will enable pushing this space rocket to as best location as its possible in order to fasten this space rocket. It shows this FIG. 51 and here two upper rotating wedges 25 are pushing this space rocket bottom.

FIG. 52, 53, 54 show three a lot enlarged views of two rotating wedges 25, which are completely lowered. Whereas, FIG. 52 is the side view, FIG. 53 is the top view, FIG. 54 is the front view. Two rotating wedges 25, which are installed on one hanger 24, have a common support axle 28. Each rotating wedge 25 has its own rotating axle 29 with its own rotary actuator 27. Thus, each rotating wedge 25 can rotate apart other rotating wedges 25.

FIG. 55, 56, 57 show three a lot enlarged views of one pair of hangers 24 upper parts in the same statuses as were earlier shown on FIG. 39-41. Whereas, FIG. 55 is the side view, FIG. 56 is the top view, FIG. 57 is the front view. On one pair of hangers 24 tops and on four upper short rails 26 stand two damping wagons 30. These two damping wagons 30 are not compressed because they are not loaded with any load. On both damping wagon 30 tops are permanently fastened thick flexible layers 32, which are marked with the dots on the views. Furthermore, there are also permanently fastened two flexible wedge shaped fenders 33, one in the uppermost part and one in a bottom part of each damping wagon 30. There are also visible all leading shafts 34 in not compressed both damping wagons 30.

FIG. 58, 59, 60 show three a lot enlarged views of one pair of hangers 24 upper part in the same statuses as were earlier shown on FIG. 42-44. Whereas, FIG. 58 is the side view, FIG. 59 is the top view, FIG. 60 is the front view. Here, on one pair of hangers 24 is hanged one booster space rocket 1. All six spreadable arms 5 of this one booster space rocket 1 lay on two damping wagons 30, which are in fullness compressed by the weight of this space rocket. All six spreadable arms 5 penetrated and couched on two thick flexible layers 32 on both damping wagons 30 tops. Each thick flexible layer 32 is adapted for direct contacts with the spreadable arms 5 of the space rockets. Furthermore, there are also visible four flexible wedge shaped fenders 33 whereon is leaned against the booster space rocket 1 fuselage. It is also visible that compressed both damping wagons 30 lowered their all leading shafts 34 and, which do not hook and collide with any components of all hangers 24 and of the movable ship gantries 20. On FIG. 59 from above are visible four rotating wedges 25, which fastened the booster space rocket 1 bottom. Consequently, constructions of the entire hangers 24 and of the movable ship gantries 20 are entirely adapted with constructions and function of all damping wagons 30 and large damping wagons 31. Therewith the compressed damping wagons 30 are able to roll by from two movable ship gantries 20 onto one pair of hangers 24. All current views also show that the damping wagons 30 and the large damping wagons 31 have damping high range during hanging on them the space rockets equipped with the plurality of spreadable arms 5. This damping high range of all damping wagons is very beneficial on durability of all fastenings, which up-bear the spreadable arms 5 onto the space rocket fuselage.

FIG. 61, 62, 63 show three a lot enlarged views of two damping wagons 30, which are not compressed and they stand on four upper short rails 26, which are on the tops of one pair of hangers 24. FIG. 61 is the side view, FIG. 62 is the top view, FIG. 63 is the front view. These two damping wagons 30 are in the same setting as on previous FIG. 55-57. Here, is visible construction of two damping wagons 30 and their interrelation because for one space rocket hanging itself there are necessary two damping wagons 30.

FIG. 64, 65, 66 show three a lot enlarged views of two damping wagons 30 and, which for example are compressed and stand on four upper short rails 26, which are on the tops of one pair of hangers 24. FIG. 64 is the side view, FIG. 65 is the top view, FIG. 66 is the front view. These two damping wagons 30 are in the same setting as on previous FIG. 58-60. Here, is visible that compressed both damping wagons 30 lowered their all leading shafts 34. Here, except of the upper short rails 26 there are not other fragments of the hangers 24. The damping wagons 30 are described in fullness on the next FIG. 67-71.

FIG. 67, 68, 69, 70, 71 show a lot enlarged views and the horizontal sectional view and a bottom projection of one entire damping wagon 30, which is not compressed and in different manner than previously, stands on two upper long rails 23, which are on one movable ship gantry 20 top. Whereas, FIG. 67 is the side view, FIG. 68 is the top view in two equal views, which are rotated 90 degrees in relation to each other so that they cohere with the below views. And FIG. 69 is the front view, FIG. 70 is the bottom projection. And FIG. 71 is the top view of the horizontal sectional view according to the S-S line on FIG. 69. There are visible all sub-assemblies and construction of one damping wagon 30.

Each damping wagon 30 has one main plate 35 with on both sides permanently fastened six high leading tubes 36. Under the main plate 35 are installed four driving wheels 41, four leading wheels 42 and a battery 43. In all driving wheels 41 are installed electric motors powered of the battery 43. Over the main plate 35 are permanently fastened the bottoms of six conic springs 39 in vertical setting. Whereat these six conic springs 39 tops are permanently fastened to being situated over them a middle plate 38. This middle plate 38 has on both sides permanently fastened six low leading tubes 37, which are the very same spaced out as the high leading tubes 36 in the main plate 35. Over the middle plate 38 are permanently fastened the bottoms of six conic springs 39 in vertical setting and the very same way as on the main plate 35. Whereat those six conic springs 39 tops are permanently fastened to being situated over them the next middle plate 38. This next middle plate 38 is the same as the previous middle plate 38. Presented here, one damping wagon 30 has three middle plates 38 with the plurality of conic springs 39 in the very same settings and fastenings. Whereat tops of six uppermost conic springs 39 are permanently fastened to being situated over them a top plate 40. This top plate 40 has on both sides permanently fastened six leading shafts 34, which are spaced out suitably to being situated under them the low leading tubes 37 in all middle plates 38 and all high leading tubes 36 in the main plate 35. Presented here, the construction solution of one damping wagon 30 has the leading shafts 34 in two diameters. It is not needed and they can be equal. Over the top plate 40 is permanently fastened the thick flexible layer 32, which is marked with the dots on the views. On two flexible layers 32 will couch all six spreadable arms 5, which are applied in the booster space rocket 1. Moreover, to the top plate 40 and to the flexible layer 32 one side is permanently fastened one flexible wedge shaped fender 33. A similar flexible wedge shaped fender 33 is also permanently fastened to the main plate 35 one side. As result of such solution, one damping wagon 30 has four layers with the conic springs 39, which can be in fullness compressed and this create damping high range.

The damping wagons 30 are designed for rolling by from the upper long rails 23 on both movable ship gantries 20 onto the upper short rails 26 on one pair of hangers 24. It is possible because the upper short rails 26 on all hangers 24 are fitted in with the upper long rails 23 on both movable ship gantries 20 while these both movable ship gantries 20 stand at the specific sea ship 10 center. It means the damping wagons 30 can be situated on two movable ship gantries 20 or on two pairs of hangers 24. All upper long rails 23 and all upper short rails 26 are shaped as C-beams and thus, all damping wagons cannot fall out off them.

FIG. 72, 73, 74 show three a lot enlarged views of one entire damping wagon 30, which for example is compressed and does not stand on any rails. And FIG. 72 is the side view. And FIG. 73 is the top view of one damping wagon 30 in two equal views, which are rotated 90 degrees in relation to each other so that they cohere with the below views. And FIG. 74 is the front view. Here, is visible that all conic springs 39 are entirely compressed. Whereat all conic springs 39 in the highest layer are entirely compressed. Whereat all conic springs 39 in the lower three layers are compressed to the low leading tubes 37 height. Here, is also visible that all leading shafts 34 over-passed all low leading tubes 37 and all high leading tubes 36. As result all leading shafts 34 are hanging by themselves down under the damping wagon 30. This solution of the leading shafts 34, which are fitted in with all leading tubes creates damping high range and simultaneously maintains unshaken and stable top surface of all damping wagons during compressing by the space rocket.

FIG. 75, 76, 77, 78, 79 show a lot enlarged views and the horizontal sectional view and the bottom projection of one large damping wagon 31, which is not compressed and stands on two upper long rails 23, which are on one movable ship gantry 20 top. Whereas, FIG. 75 is the side view. And FIG. 76 is the top view of one large damping wagon 31 in two equal views, which are rotated 90 degrees in relation to each other so that they cohere with the below views. And FIG. 77 is the front view, FIG. 78 is the bottom projection. And FIG. 79 is the top view of the horizontal sectional view according to the S-S line on FIG. 77. This large damping wagon 31 has the same construction as the damping wagon 30 however is longer. For this reason each large damping wagon 31 has six driving wheels 41 and ten conic springs 39 in each layer. The large damping wagons 31 are longer so that could lay on them all ten spreadable arms 5, which are applied in the main space rocket 2. Increased number of the conic springs 39 create also damping larger capacity, which is necessary during hanging itself of the main space rocket 2 with the attached additional modules or assemblages. The large damping wagons 31 are not designed for rolling by on the upper short rails 26 on the hangers 24. Instead, both large damping wagons 31 are designed only for remaining and rolling on the upper long rails 23 on both movable ship gantries 20.

FIG. 80, 81, 82 show three views of two grasping wagons 44 wherein each with two rotating poles 45. These two grasping wagons 44 stand on four short transverse rails 48. The current views show the rotating poles 45 lifted to a similar setting as during holding the space rocket. Whereat the sketches of two right rotating poles 45 together with the arrows show their total possible rotation range. Whereas, FIG. 80 is the side view, FIG. 81 is the top view, FIG. 82 is the front view. The short transverse rails 48 are permanently fastened on a plurality of pillars 49, which are situated between one pair of hangers 24 and visible on lots of views. All pillars 49 are permanently fastened on the main deck 14, which is on two long side hulls 11. Both grasping wagons 44 have the plurality of wheels 46 in order to they could roll by long intervals, which are between the short transverse rails 48 and the long transverse rails 47. These intervals are the best visible on FIG. 81-82 and are indicated with the large exclamation marks Both grasping wagons 44 wherein each has two rotating poles 45 with spherical ends, which have flexible coatings. These flexible coatings are intended for direct contacts with the space rockets.

FIG. 83, 84, 85 show three views of two grasping wagons 44, which stand on four long transverse rails 47. These both grasping wagons 44 by means of four rotating poles 45 tighten one main space rocket 2 bottom in the same way as on the earlier FIG. 20-22 though on those FIGS., lots of components are veiled by other members. Whereas, FIG. 83 is the side view, FIG. 84 is the top view, FIG. 85 is the front view. Furthermore, on the current views, the sketches of all inclined down rotating poles 45 together with the arrows show their required inclination down, so that the entire grasping wagons 44 could roll underneath this hanged main space rocket 2. It is the best visible on FIG. 85 and somewhat on FIG. 83 and it is indicated with two large exclamatory signs. Furthermore, on FIG. 81-82, 84-85 the arrows on the grasping wagons 44 show their possible moving rolling directions.

FIG. 86A, 86B, FIG. 87, FIGS. 88A and 88B show three views of one booster space rocket 1 upper and bottom parts, which has six spreadable arms 5, four steering flaps 6 and one sliding engines cover 7. Whereas, FIG. 86A is the side view of one booster space rocket 1 upper part. And FIG. 86B is the side view of one booster space rocket 1 bottom part. And FIG. 87 is the top view in two equal views, which are rotated 90 degrees in relation to each other so that they cohere with the below views. And FIGS. 88A and 88B are the front views. On the current views the sliding engines cover 7 is entirely lifted and it uncovered all nozzles 85 of this space rocket main engines. Here, all spreadable arms 5 are entirely lowered and consequently are alongside the space rocket fuselage. Whereat all four flaps 6 are vertically set and are entirely inside the space rocket fuselage. On FIG. 86A, 86B and FIG. 88A, 88B the external arrows show the spreading directions of the spreadable arms 5 and deflections of the flaps 6.

More information about the spreadable arms 5 mounted on each space rocket.

The quantity of the spreadable arms 5 mounted on each space rocket depends on its weight. Therefor currently, in one booster space rocket 1 are mounted six spreadable arms 5. These spreadable arms 5 are suitably spaced out in each space rocket fuselage 51, so that they all could completely spread out on two sides. Here, presented system for multiple use of the space rockets is completely connected with utilization of the plurality of spreadable arms 5 mounted on all space rockets. Therefor these spreadable arms 5 are absolutely necessary, are utilized multiple times and are the main characteristic feature of this system. These spreadable arms 5 create lots of possibilities. First of all and the most important is that each space rocket lands on its spreadable arms 5 as hangs itself on them.

And later spreadable arms 5 are used as the aerodynamic brake and the space rockets land as hang themselves on these spreadable arms 5. Because all spreadable arms 5 are designed and build as very strong therefor during space rocket descent they can be lifted (spread out) on the very high altitude for use as the aerodynamic brake. As result of long-lasting aerodynamic braking caused by the spreadable arms 5, it will be necessary to use far less space rocket fuel at landing engine burn so that each space rocket could hang up itself. Each spreadable arm 5 is moved by one moving mechanism installed inside the space rocket fuselage. Therefor every spreadable arm 5 is moved independently of other spreadable arms 5. And it causes that if some spreadable arm 5 fail to lift itself thus, then the others will lift anyway and the whole space rocket will be able to land on them. In some circumstances, the spreadable arms 5 can also be used for emergency steering direction of the space rocket descent. It is so because the spreadable arms 5 can be differently and fluently lowered and lifted for emergency steering the space rocket descent. In this system, the spreadable arms 5 are mounted on the space rockets upper parts and it causes that the space rockets bottom parts are without some legs for landing. As result, in the space rockets bottom parts is plenty room for installing the sliding engines covers 7 or 8, which are presented in current invention. More information about construction of each spreadable arm 5 begins in description of further FIG. 119-121.

FIG. 89A, 89B and FIG. 90 show two views of one booster space rocket 1 upper and bottom parts, which has a little lifted all six spreadable arms 5 and consequently, they protrude a little outside the space rocket fuselage. Whereat all four flaps 6 are a lot deflected out and consequently, they protrude outside the space rocket fuselage. Whereat the sliding engines cover 7 is entirely lifted. Whereas, FIG. 89A is the side view of one booster space rocket 1 upper part. And FIG. 89B is the side view of one booster space rocket 1 bottom part. And FIG. 90 is the top view of FIGS. 89A and 89B in the same arrangement and situation. On FIGS. 89A and 89B the arrows show the spreading directions of the spreadable arms 5 and deflections of the flaps 6. On FIGS. 89A and 89B, on the space rocket fuselage are clearly visible a plurality of corner beams 52, which lead a plurality of sliders 53 of the spreadable arms 5.

FIG. 91A, 91B, FIG. 92, FIGS. 93A and 93B show three views of one booster space rocket 1 upper and bottom parts. This booster space rocket 1 has entirely lifted all six spreadable arms 5 and consequently they are completely spread out on two sides. And therefor these spreadable arms 5 are transverse the space rocket fuselage. Furthermore, currently, all blocking bars 54 are entirely slid outside the space rocket fuselage, and it entirely blocked all middle beams 55 in all spreadable arms 5. Whereat all four flaps 6 are entirely deflected out and consequently are horizontal and transverse the space rocket fuselage 51. Whereat the sliding engines cover 7 is entirely lifted and it uncovered all nozzles of the main engines. Whereas, FIG. 91A is the side view of one booster space rocket 1 upper part. And FIG. 91B is the side view of one booster space rocket 1 bottom part. And FIG. 92 is the top view in two equal views, which are rotated 90 degrees in relation to each other so that they cohere with the below views. And FIG. 93A is the front view of one booster space rocket 1 upper part. And FIG. 93B is the front view of one booster space rocket 1 bottom part. On FIG. 91A and FIG. 93A, on the space rocket fuselage are also clearly visible the plurality of corner beams 52, which lead the plurality of sliders 53 of the spreadable arms 5.

FIG. 94A, 94B, FIG. 95, FIGS. 96A and 96B show three views of one main space rocket 2 upper and bottom parts, which has ten spreadable arms 5, four steering flaps 6 and one sliding engines cover 7. Currently, all spreadable arms 5 are entirely lowered and consequently are alongside the space rocket fuselage. The quantity of spreadable arms 5 mounted on each space rocket depends on its weight. Therefor currently, in one main space rocket 2 are mounted ten spreadable arms 5. These spreadable arms 5 are suitably spaced out in each space rocket fuselage so that they all could completely spread out on two sides. Whereat all four flaps 6 are vertically set and entirely inside the space rocket fuselage. Whereat the sliding engines cover 7 is entirely lifted, and it uncovered all nozzles of the main engines. And FIGS. 94A and 94B are the side views, FIG. 95 is the top view in two equal views, which are rotated 90 degrees in relation to each other so that they cohere to the below views. And FIGS. 96A and 96B are the front views. On FIG. 94A, 94B and FIG. 96A, 96B the arrows show the spreading directions of the spreadable arms 5 and deflections of the flaps 6. On FIG. 95 are visible a plurality of linear actuators 60, which steer deflections of the flaps 6. On FIG. 94A, 94B and FIG. 96A, 96B, these linear actuators 60 are sketched with the dashed lines because they are situated inside the space rocket fuselage.

FIG. 97A, 97B, FIG. 98 and FIG. 99A, 99B show three views of one main space rocket 2 upper and bottom parts, which has entirely lifted all ten spreadable arms 5 and consequently they are completely spread out on two sides. And therefor these spreadable arms 5 are transverse the space rocket fuselage. Moreover, now all blocking bars 54 are entirely slid outside the space rocket fuselage, and it entirely blocked all middle beams 55 in all spreadable arms 5. Whereat all four flaps 6 are entirely deflected out and consequently are horizontal and transverse the space rocket fuselage. On all views are visible the linear actuators 60, which steer deflections of the flaps 6. Whereat the sliding engines cover 7 is entirely lifted. And FIGS. 97A and 97B is the side view. And FIG. 98 is the top view in two equal views, which are rotated 90 degrees in relation to each other so that they cohere with the below views. And FIGS. 99A and 99B is the front view. On FIGS. 97A and 97B are clearly visible the plurality of whole corner beams 52 on this space rocket fuselage. These corner beams 52 lead the sliders 53 of the spreadable arms 5.

FIG. 100, 101 show two views of one booster space rocket 1 upper part and of two movable ship gantries 20 upper part whereon tops stand two damping wagons 30 and, which are not compressed. These views show just vertically landing the booster space rocket 1, which in a moment will hang itself on two damping wagons 30. This space rocket has entirely lifted (spread out) all six spreadable arms 5, which are not yet lying on the flexible layers 32 on the damping wagons 30. Whereat four flaps 6 are entirely deflected outside the space rocket fuselage. And FIG. 100 is the side view, FIG. 101 is the top view. On FIG. 101 are visible four flexible wedge shaped fenders 33 whereon the space rocket fuselage is already leaned against in despite of, this space rocket does not yet hang up itself on both damping wagons 30.

On FIG. 101 is not shown below situated the sliding engines cover 7. Current views show fitting way of both damping wagons 30 with six spreadable arms 5 in one booster space rocket 1. Current views are a little similar to FIG. 42-43 and FIG. 58-59 and there one booster space rocket 1 already hangs on compressed two damping wagons 30 but, which stand on one pair of hangers 24.

FIG. 102, 103 show two views of one main space rocket 2 upper part and of two movable ship gantries 20 upper part whereon tops stand two large damping wagons 31 and, which are not compressed. These views show just vertically landing the main space rocket 2, which in a moment will hang up itself on two large damping wagons 31. This space rocket has entirely lifted (spread out) all ten spreadable arms 5, which are not yet lying on the flexible layers 32 on these large damping wagons 31. Whereat four flaps 6 are entirely deflected outside the space rocket fuselage.

Whereas, FIG. 102 is the side view, FIG. 103 is the top view. On FIG. 103 are visible four flexible wedge shaped fenders 33 whereon is already leaned against this space rocket fuselage in despite of this space rocket does not hang up yet on both large damping wagons 31. On FIG. 103 is not shown below situated the sliding engines cover 7. The current views target showing fitting way of both large damping wagons 31 with ten spreadable arms 5 in one main space rocket 2.

FIG. 104, 105, 106 show three views of four steering flaps 6 cardinally installed in the main space rocket 2 upper part. Currently, all four flaps 6 are vertically set and are entirely inside the space rocket fuselage. They are set this way during the space rocket ascent toward space. Here, the arrows show the deflections out directions of the flaps 6. Whereas, FIG. 104 is the side view, FIG. 105 is the top view, FIG. 106 is the front view. All four flaps 6 are in large sizes so that they could steer the space rockets even at low speeds of their descent in the Earth's atmosphere. Each space rocket has cardinally installed four steering flaps 6. Two opposite steering flaps 6 on the top parts have additionally rotary mounted the torsional triangles 59, which serve for precise steering of the entire space rocket axial torsion, needed before landing on two movable gantries used in current system. Each torsional triangle 59 is grasped and axially steered by the rotary actuator 58 fastened on the steering flap 6. The torsional triangles 59 installing way and triangular shapes are adapted for use at gigantic, medium and low speeds of the space rocket descent in the atmosphere.

FIG. 107, 108, 109 show three views of four steering flaps 6 in the main space rocket 2 upper part. Currently, all four flaps 6 are a lot deflected outside ergo mainly for steering the space rocket at average speed of its descent in the Earth's atmosphere as on FIG. 215-216. And FIG. 107 is the side view, FIG. 108 is the top view, FIG. 109 is the front view. On the current views the arrows show the possible deflections out directions of the flaps 6. Moreover, on FIG. 109 two torsional triangles 59 are sketched in a few settings varies twisted.

FIG. 110, 111, 112 show three views of four steering flaps 6 in the main space rocket 2 upper part. Currently, all four flaps 6 are entirely deflected outside ergo mainly for aerodynamic braking and steering the space rocket at low speed of its descent in the Earth's atmosphere as on FIG. 262-267. And FIG. 110 is the side view, FIG. 111 is the top view, FIG. 112 is the front view.

On the current views the arrows show the return direction of flaps 6. Moreover, here the torsional triangles 59 are also sketched in a few settings varied twisted. The views on FIG. 104-112 show also four deflection mechanisms of the flaps 6. Each such deflection mechanism consists of one linear actuator 60 and of two ample brackets 57. The linear actuators 60 steer deflections of the flaps 6 while the ample brackets 57 are auxiliary. These ample brackets 57 are not marked on the current views but only on the next FIG. 113-118. On the current top views the deflection mechanisms are in fullness visible. While, the side views and the front views contain both the views and the sketches of the deflection mechanisms.

FIG. 113, 114, 115, 116, 117, 118 show the enlarged views of one steering flap 6 together with the sketches of its deflection mechanism in the main space rocket 2 fragment.

And FIG. 113-115 show three enlarged views of one steering flap 6, which is vertically set and entirely inside the space rocket fuselage. Whereas, FIG. 113 is the side view, FIG. 114 is the top view, FIG. 115 is the front view. On FIG. 113 the arrows show direction of deflection out of the flap 6. And FIG. 116-118 show three enlarged views of one flap 6, which is entirely deflected outside the space rocket fuselage. Whereas, FIG. 116 is the side view, FIG. 117 is the top view, FIG. 118 is the front view. Moreover, here one torsional triangle 59 is sketched in a few variously twisted settings.

Each deflection mechanism of the flap 6 consists of one linear actuator 60 and of two ample brackets 57. Each flap 6 is cardinally installed by means a plurality of hinges to the space rocket fuselage. Each flap 6 has permanently fastened two ample brackets 57 whereto are rotatably installed the linear actuator 60. The linear actuator 60 second end is rotatably installed inside the space rocket fuselage. The linear actuators 60 steer deflections of the entire flaps 6. On the top parts of two opposite flaps 6 are installed the rotary actuators 58, which strongly grasp and steer axial torsion of the torsional triangles 59. Therewith both torsional triangles 59 serve for precise steering of the entire space rocket axial torsion, needed before landing on two movable ship gantries 20. The torsional triangles 59 can be rotary installed on all four flaps 6. The torsional triangles 59 are triangular shaped so that they could be used at all speeds and stages of the space rocket descent in the Earth's atmosphere. During the first time period of the space rocket descent in the Earth's atmosphere occur gigantic pushing forces on all flaps 6 and on both torsional triangles 59, which are shown on the further FIG. 212-214.

FIG. 119, 120, 121 show three views of the fragment of one main space rocket 2 upper part, which has entirely lowered all ten spreadable arms 5 and consequently they are alongside the space rocket fuselage. Whereas, FIG. 119 is the side view. And FIG. 120 is the top view, which is in two equal views, which are rotated 90 degrees in relation to each other so that they cohere with the below views. And FIG. 121 is the front view. Whereas, FIG. 119 shows only the sub-assemblies outside the space rocket fuselage.

Here, is visible that all ten spreadable arms 5 are suitably spaced out in the space rocket fuselage so that they all could spread out on two sides. Furthermore, it is visible that each spreadable arm 5 consists of two lateral beams 56 and one middle beam 55 with permanently fastened a long plate 64. The middle beam 55 lowest end is rotatably joined with the slider 53. Whereat the middle beam 55 top end is rotatably joined with the lowest ends of both lateral beams 56. Furthermore, both lateral beams 56 upper ends are bent and are inside the space rocket fuselage.

Both lateral beams 56 in both bent corners are rotatably joined with the space rocket fuselage by two bearing axles 63, which are situated in four bearing brackets 80. These lateral beams 56 upper bent parts are very close to the moving mechanism, which moves this entire spreadable arm 5. Each moving mechanism is adapted for moving together both lateral beams 56 upper bent ends and in consequence for moving the entire spreadable arm 5. It is visible on FIG. 120 and there simultaneously it is visible that these moving mechanisms do not overlap and collide with each other during moving. This FIG. 120 shows the moving mechanisms outside and inside space rocket. These views show in this space rocket interior—an arrangement of ten moving mechanisms, which spread out the spreadable arms 5.

Furthermore, over each spreadable arm 5 moving mechanism is installed a pushing mechanism having the blocking bar 54, which serves for blocking the middle beam 55 in the spreadable arm 5 while it is entirely lifted. The blocking bar 54 has in its bottom-surface the key-seat, which is shaped as the T-groove and, which is fitted in with the T-bar 67 on the middle beam 55.

The pushing mechanism consists of a large C-shaped beam 69, a linear actuator 70 and of a vertical low bar 71. Here, is shown in the space rocket interior, the arrangement of ten large C-shaped beams 69, which have inside the blocking bars 54, which are moved slidingly and lineally by the linear actuators 70. And FIG. 121 is the front view of the fragment of one main space rocket 2 upper part. This view shows only the sub-assemblies outside the space rocket fuselage. Here, outside the space rocket fuselage is visible in what way are spaced out all ten spreadable arms 5. On all views FIG. 119-121, all blocking bars 54 are entirely inside the space rocket fuselage 51. Thus, each blocking bar 54 is situated in the large C-shaped beam 69.

FIG. 122, 123 show two views of the fragment of one main space rocket 2 upper part, which has entirely lifted all ten spreadable arms 5 and consequently they are completely spread out on two sides. And therefor these spreadable arms 5 are transverse the space rocket fuselage. Whereas, FIG. 122 is the side view. And FIG. 123 is the top view. And FIG. 122 shows only the sub-assemblies outside the space rocket fuselage.

Here, outside the space rocket fuselage is visible in what way are spaced out all ten spreadable arms 5 after their lifting. Furthermore, here are clearly visible the whole corner beams 52 on the space rocket fuselage because all spreadable arms 5 are lifted. Two corner beams 52 serve for leading one slider 53.

And FIG. 123 is the top view and shows the sub-assemblies outside and inside the space rocket fuselage after lifting all ten spreadable arms 5. Here, is visible that all ten spreadable arms 5 are suitably spaced out in the space rocket fuselage so that they all could spread out on two sides. Furthermore, is visible in the space rocket interior, arrangement of ten moving mechanisms, which spread out ten spreadable arms 5. And is visible in the space rocket interior, arrangement of ten large C-shaped beams 69 wherein inside are the blocking bars 54, which can be moved slidingly and lineally by the linear actuators 70. Currently, all blocking bars 54 are entirely slid outside the space rocket fuselage and it entirely blocked all middle beams 55 in all spreadable arms 5. While, the lateral beams 56 upper bent parts are inside the space rocket fuselage and currently, are alongside the space rocket fuselage. And consequently they are very close to the moving mechanisms, which spread out the entire spreadable arms 5. They are better visible on the further FIG. 150, 153, 154, 156. On the current FIG. 123 it is visible that all lateral beams 56 bent parts do not collide with themselves during moving. There are also visible ten half empty interiors of all ten large C-shaped beams 69 because all ten blocking bars 54 half-lengths moved slidingly and lineally outside the space rocket fuselage. Here, are also marked the long plates 64 and the sliders 53. Current FIG. 122-123 are similar to the earlier FIG. 102-103.

FIG. 124, 125 show two enlarged views of the fragment of one booster space rocket 1 upper part, which has entirely lifted all six spreadable arms 5 and consequently they are completely spread out on two sides. And therefor these spreadable arms 5 are transverse the space rocket fuselage. And FIG. 124 is the side view, FIG. 125 is the top view. And FIG. 124 shows only the sub-assemblies outside the space rocket fuselage.

Here, outside the space rocket fuselage is visible in what way are spaced out all six spreadable arms 5 after their little. And FIG. 125 shows the sub-assemblies outside and inside space rocket after lifting all six spreadable arms 5. Here, is visible that all six spreadable arms 5 are suitably spaced out in the space rocket fuselage so that they all could spread out on two sides. Furthermore, all views show in the space rocket interior, arrangement of six moving mechanisms of six spreadable arms 5. And show in the space rocket interior, arrangement of six large C-shaped beams 69 wherein inside are the blocking bars 54, which can be moved slidingly and lineally by the linear actuators 70. Now all blocking bars 54 are entirely slid outside the space rocket fuselage and it entirely blocked all middle beams 55 in all spreadable arms 5. There are visible the half empty interiors of all six large C-shaped beams 69 because all six blocking bars 54 half-lengths moved slidingly and lineally outside the space rocket fuselage. Here, are marked also the long plates 64, the sliders 53 and the corner beams 52 on the space rocket fuselage. Current FIG. 124-125 are similar to previous FIG. 122-123, FIG. 100-101.

FIG. 126, 127, 128 show three views of one entire spreadable arm 5 together with its moving mechanism and with one blocking bar 54 and its pushing mechanism. These views are in the space rocket fuselage fragments with the sub-assemblies outside and inside. This spreadable arm 5 is entirely lowered to the P1 first setting and consequently it is alongside the space rocket fuselage. While, the blocking bar 54 is inside the space rocket fuselage.

And FIG. 126 is the side view with the partial vertical sectional view. And FIG. 127 is the top view in two equal views, which are rotated 90 degrees in relation to each other so that they cohere with the below views. FIG. 127 is the view only of the components situated upwards of a common long axle 65. And FIG. 128 is the front view but only of the sub-assemblies outside the space rocket. Furthermore, here are auxiliary one sectional view and the bottom projection both without some drawing numbers. On FIG. 126 the arrows show the moving directions of the spreadable arm 5 components. And the arrows show the moving direction of the blocking bar 54. Here, is also visible a fragment of a pressure tank 61 inside the space rocket fuselage. It shows and explains that all mechanisms are designed in such way that they fit into vacant space over this pressure tank 61.

Each spreadable arm 5 mainly consists of two lateral beams 56 and one middle beam 55, which are joined in suitable way with themselves and with the additional components. Both lateral beams 56 lowest ends are rotatably joined with the middle beam 55 top end by means of the common long axle 65. Between the middle beam 55 and both lateral beams 56 on the common long axle 65 are inserted two distance blocks 81. The middle beam 55 lowest end is rotatably joined with the slider 53 by means of a holding axle 66. The slider 53 can move slidingly between two corner beams 52 on the space rocket fuselage. To the middle beam 55 is permanently fastened the T-bar 67 and the long plate 64 for aerodynamic purposes. Inside the middle beam 55 lowest end is installed the frictional brake 68.

Whereat, both lateral beams 56 in both bent corners are rotatably joined with the space rocket fuselage by means of two bearing axles 63, which are situated in four bearing brackets 80. Both lateral beams 56 upper bent parts are situated inside the space rocket fuselage. To each upper bent part are permanently fastened two flat bars 72, which have the oval openings. In current setting, both lateral beams 56 upper bent parts with all flat bars 72 are transverse the space rocket fuselage. These lateral beams 56 upper bent parts are very near the moving mechanisms, which spread out the entire spreadable arms 5. Here, is also shown that over each spreadable arm 5 moving mechanism is installed the pushing mechanism of the blocking bar 54. This pushing mechanism consists of the large C-shaped beam 69, the linear actuator 70 and of the vertical low bar 71. Currently, the entire blocking bar 54 is inside the large C-shaped beam 69 and consequently it is inside the space rocket fuselage.

FIG. 129, 130, 131 show three enlarged drawing fragments of previous FIG. 126, 127, 128. Whereas, FIG. 129 is the side view with the partial vertical sectional view. And FIG. 130 is the top view in two equal views, which are rotated 90 degrees in relation to each other so that they cohere with the below views. And FIG. 131 is the front view but only of the sub-assemblies outside the space rocket fuselage. On FIG. 129, 130, 131 are already more clearly visible the moving mechanism components of one spreadable arm 5. These are following components and sub-assemblies; one servomotor 73, two worm gears 74, one common roller 78, two threaded pipes 75, two special nuts 76, two cylindrical pegs 77 and two bearing seats 79. Furthermore, here are better visible both bearing axles 63 and four bearing brackets 80. On FIG. 129 the arrows show the moving directions of the lateral beams 56 upper bent parts, which are inside the space rocket fuselage. And together with them move the flat bars 72, which have the oval openings. Here, is also better visible the pushing mechanism of the blocking bar 54.

This pushing mechanism consists of the large C-shaped beam 69, the linear actuator 70 and of the vertical low bar 71. Now the entire blocking bar 54 is inside the large C-shaped beam 69 and consequently is inside the space rocket fuselage. The blocking bar 54 is situated and move slidingly and lineally inside the large C-shaped beam 69. The blocking bar 54 is the same long as the large C-shaped beam 69. The blocking bar 54 with its half total length can slide outside the space rocket fuselage and it is visible on the following FIGS. 150-157 and 178-179. The blocking bar 54 has in its bottom-surface the key-seat, which is shaped as the T-groove and, which is fitted in with the T-bar 67 on the middle beam 55. Over the large C-shaped beam 69 is permanently fastened the linear actuator 70. This linear actuator 70 is permanently joined with the blocking bar 54 by means of the vertical low bar 71. Consequently, the linear actuator 70 serves for pushing the blocking bar 54 outside the space rocket fuselage and pulling it back. While, the spreadable arm 5 is entirely lifted and after sliding outside the blocking bar 54 then its T-groove enters into the T-bar 67 on the middle beam 55. The blocking bar 54 serves for blocking in all directions the middle beam 55 while it is entirely lifted to the P6 setting.

The middle beam 55 after its blocking gains possibility of carrying burdens in all directions. Consequently, the middle beam 55 after its blocking carries burdens together with both lateral beams 56. It significantly influences upon full-load capacity of one spreadable arm 5. The middle beam 55 blocking causes also strengthening of the entire spreadable arm 5 in all directions.

Burdens upon every spreadable arm 5 will occur during the space rocket descent in the Earth's atmosphere and during the space rocket hanging itself on two damping wagons 30 or two 31. All blocking bars 54 can also be slide outside space rockets while the spreadable arms 5 are not entirely lifted. Such situation can be favorable during the first time period of the space rocket descent in the Earth's atmosphere and that is shown on FIGS. 212A, 212B and 214A, 214B. During giant speed of the space rocket descent in the Earth's atmosphere slid outside all blocking bars 54 will cause aerodynamic braking, which will stabilize this space rocket descent. Further description of the current views are the same as previous FIG. 126, 127, 128 and therefor are not fully quoted here.

FIG. 132, 133, 134 show three very enlarged drawing fragments of previous FIG. 129, 130, 131. And current FIG. 132 is the side view with the partial vertical sectional view. And FIG. 133 is the top view. And FIG. 134 is the front view but only of the sub-assemblies outside the space rocket and the sketches of four limiters 62 in the space rocket interior. The front view of alone moving mechanism of the spreadable arm 5 is on the next FIG. 137. All current views, show in the most detail way the entire moving mechanism construction of the spreadable arm 5 in the space rocket fuselage fragment. Thereby, there is well visible the servomotor 73, which by means of the common roller 78 propels two worm gears 74, which rotate two threaded pipes 75 and whereon move two special nuts 76 with the cylindrical pegs 77. Both threaded pipes 75 tops are rotatably installed by means of two bearing seats 79. Both lateral beams 56 upper bent parts have permanently fastened the flat bars 72, which have the oval openings. These are the best visible on the further FIG. 141-143. Such solution is necessary so that the spreadable arm 5 entire moving mechanism would require the least space over the pressure tank 61. In the flat bars 72 oval openings can move slidingly the cylindrical pegs 77. Whereas, at the same time each entire special nut 76 moves slidingly and tightly between two flat bars 72. This entire moving mechanism by means of two cylindrical pegs 77 push all flat bars 72 and consequently both lateral beams 56 upper bent parts, and it consequently moves the entire spreadable arm 5. The spreadable arm 5 entire moving mechanism is driven by one servomotor 73 driving simultaneously two worm gears 74, so that both lateral beams 56 would always slant equally out. Both lateral beams 56 are rotatably installed to the space rocket fuselage by means of the bearing axles 63. Each bearing axle 63 is up-borne to the space rocket fuselage by means of two bearing brackets 80. There are also four limiters 62 permanently fastened inside the space rocket fuselage. On the limiters 62 will lean against all flat bars 72 while the entire spreadable arm 5 will be entirely lifted to the P6 setting. Between two lateral beams 56 upper bent parts is situated the pushing mechanism of the blocking bar 54, which was earlier exactly described. Further description of the current views are the same as previous FIG. 126-131 and therefor are not fully quoted here.

FIG. 135, 136, 137 show three enlarged views of the entire moving mechanism of one spreadable arm 5 together with the fragments of two lateral beams 56 of the spreadable arm 5 in P1 setting. And FIG. 135 is the side view, FIG. 136 is the top view, FIG. 137 is the front view. Here, are not any space rocket fragments except of four limiters 62. Here, are also visible the limiters 62 whereon will lean against the flat bars 72 while the entire spreadable arm 5 will be entirely lifted to the P6 setting. All these views show in most detail way the entire moving mechanism construction of one spreadable arm 5. Further description of this moving mechanism construction of one spreadable arm 5 is in previous FIG. 132-134.

FIG. 138, 139, 140 show three enlarged views of alone moving mechanism components of one spreadable arm 5. On these views are very well visible all components of this moving mechanism, which were described in previous FIG. Whereas, FIG. 138 is the side view, FIG. 139 is the top view, FIG. 138 is the front view. This FIG. 138 shows also for example two sketches of one special nut 76 with the cylindrical peg 77 in two locations on one threaded pipe 75. These sketches show in what way the special nuts 76 can move on the threaded pipes 75.

FIG. 141, 142, 143 show the enlarged views of four flat bars 72 (having the oval openings), which are permanently fastened to both lateral beams 56 upper bent parts. These views are related to FIG. 138-140.

FIG. 144, 145, 146 show outside and partly inside the space rocket fragment, three views of one entire spreadable arm 5 in P2 setting, which is in one-quarter lifted and consequently, it protrudes outside the space rocket fuselage. Whereas, FIG. 144 is the side view and the partial vertical sectional view of the space rocket fuselage. And FIG. 145 is the top view. And FIG. 146 is the front view but only outside the space rocket fuselage. This FIG. 146 has also an auxiliary bottom projection without some drawing number. On FIG. 144 are also sketched intermediate settings of the spreadable arm 5, it means in P3, P4 and P5 settings. There is also marked P6 final setting thus, while the spreadable arm 5 is entirely lifted. Here, the arrows show the spreading direction of this spreadable arm 5 from its P1 first setting up to its last P6 setting. Inside the space rocket fragment FIG. 144 shows all components and moving mechanism of the spreadable arm 5. The lateral beams 56 upper bent parts with the flat bars 72 are in P2 setting and are also sketched in P3 setting. There is also the pressure tank 61 fragment in the space rocket interior and it shows and explain that the flat bars 72 during their moving do not hook with this pressure tank 61. On the space rocket fuselage one large arrow shows the space rocket descent direction in the Earth's atmosphere while the external arrows show from what direction comes flying atmospheric air and consequently in what way this atmospheric air strongly crowds into spreadable arm 5 in P2, P3, P4 and P5 settings. Currently, the entire blocking bar 54 is inside the space rocket fuselage. Here, are visible a lot of components mentioned in FIG. 126, 127, 128. Here, and on a few further FIGs., the lateral beams 56 ends and the middle beams 55 ends are marked with crossed lines as an X letter so that those ends would be better visible.

FIG. 147, 148, 149 show three enlarged drawing fragments of previous FIG. 144, 145, 146. Current views show the upper part of the spreadable arm 5 in P2 setting. And FIG. 147 is the side view and the partial vertical sectional view of the space rocket fuselage. Here, is visible the pressure tank 61 fragment inside the space rocket fuselage. And FIG. 148 is the top view and here are visible a plurality of subjacent components, which are not visible on FIG. 147, 149. And FIG. 149 is the front view but only of the sub-assemblies outside the space rocket. All current views show in the most detail way surrounding of the flat bars 72 with the lateral beams 56 upper bent parts in P2 setting in relation to the spreadable arm 5 all moving mechanism components. Here, is a visible way of acting of one spreadable arm 5 entire moving mechanism. The servomotor 73 propelled the common roller 78 whereby propelled two worm gears 74, and they caused rotation of both threaded pipes 75. It then caused that both special nuts 76 with both cylindrical pegs 77 moved down on these both threaded pipes 75. Hence, both cylindrical pegs 77 pushed down all flat bars 72 together with both lateral beams 56 upper bent parts, and it caused that the entire spreadable arm 5 lifted itself outside the space rocket fuselage. During moving down of both special nuts 76 their both cylindrical pegs 77 move slidingly in the flat bars 72 oval openings. On FIG. 147 are also visible the limiters 62 whereon will lean against the flat bars 72 while the entire spreadable arm 5 will be entirely lifted to the P6 setting. It is shown on the next FIG. 150-157. Here, is also the linear actuator 70, which moves slidingly the blocking bar 54 inside the large C-shaped beam 69. Currently, the blocking bar 54 is entirely inside the space rocket fuselage.

FIG. 150, 151, 152, 153 show outside and inside the space rocket fragment the views of one entire spreadable arm 5 in the P6 setting, which is entirely lifted and consequently it is transverse the space rocket fuselage. Whereat the blocking bar 54 is slid maximally outside the space rocket fuselage and it entirely blocked the middle beam 55 in the spreadable arm 5. And FIG. 150 is the side view with partial vertical sectional view of the space rocket fuselage. And FIG. 151 is the top view and with all components and mechanisms and this view has one auxiliary right-side-view without some drawing number. And FIG. 152 is the front view outside the space rocket fuselage. This view in the space rocket interior has the sketches of the flat bars 72 together with both lateral beams 56 upper bent parts. On the space rocket fuselage are visible two whole corner beams 52, which lead the slider 53 of the spreadable arm 5. This view has also the auxiliary bottom projection without some drawing number. On FIG. 150 on the space rocket fuselage one large arrow shows the space rocket descent direction in the Earth's atmosphere. Whereas, the external arrows show from what direction comes flying atmospheric air and consequently in what way this atmospheric air strongly crowds into the spreadable arm 5 entirely lifted. FIG. 153 is an auxiliary side view and the partial vertical sectional view, which show FIG. 152 only in the middle. Namely, FIG. 153 shows the fragments of the middle beam 55, of the slider 53 and of a blocking bar 54 fragment. All views show that the flat bars 72 together with the lateral beams 56 upper bent parts are directed down inside the space rocket fuselage and consequently are alongside of the space rocket fuselage. On FIG. 150 is well visible that all flat bars 72 are leaned against on the limiters 62 in the space rocket fuselage. The blocking bar 54 is slid maximally outside the space rocket fuselage and it entirely blocked the middle beam 55 in the spreadable arm 5. There is visible an empty part of the large C-shaped beam 69 because the blocking bar 54 moved slidingly and lineally outside. Whereas, the linear actuator 70 is folded entirely up. The middle beam 55 after its blocking gains possibility of carrying burdens in all directions.

Burdens carrying ability by this middle beam 55 is very beneficial for the entire spreadable arm 5. During aerodynamic braking and during hanging of the space rocket on two damping wagons 30 or two 31, all spreadable arms 5 will be maximally burden. Recommended is therefor so that all middle beams 55 would carry also burdens together with all lateral beams 56. Current views descriptions are tied with descriptions of the pushing mechanism of the blocking bar 54 in earlier FIG. 129-131.

FIG. 154, 155, 156, 157 show the enlarged drawing fragments of earlier FIG. 150-153. Whereas, FIG. 154 is the side view, FIG. 155 is the top view And FIG. 156 is the front view, FIG. 157 is the auxiliary side view and the partial vertical sectional view, which show FIG. 156 only in the middle. Whereat on the current FIG. 155 are visible a plurality of subjacent components, which are not visible on FIG. 154, 156. Current views descriptions are the same as descriptions of previous FIG. 150-153 and descriptions of the pushing mechanism of the blocking bar 54 on the earlier FIG. 129-131. On the current views are more clearly visible the blocking bar 54 with the T-groove, the large C-shaped beam 69, the vertical low bar 71, the linear actuator 70 and the middle beam 55 with the T-bar 67.

FIG. 158, 159, 160 show three views of alone spreadable arm 5, which is entirely lowered ergo it is in P1 setting. These views are similar to FIG. 126, 127, 128 however do not contain the moving mechanism of this spreadable arm 5 except of the cylindrical pegs 77. There are also not the space rocket fuselage fragments except of four bearing brackets 80 and four limiters 62. While, here is also the entire pushing mechanism of the blocking bar 54, which is not slid outside. And FIG. 158 is the side view and here the arrows show the moving directions of the spreadable arm 5 components and of the blocking bar 54. And FIG. 159 is the top view, FIG. 160 is the front view together with five auxiliary horizontal sectional views and with one bottom projection, all without any drawing numbers. All views show that each such spreadable arm 5 mainly consists of two lateral beams 56 and of one middle beam 55. Both lateral beams 56 are bent in the upper part and are rotatably installed to the space rocket fuselage by means of two bearing axles 63. Both lateral beams 56 upper bent parts have permanently fastened the flat bars 72 having the oval openings. Both lateral beams 56 are subsidiary permanently fastened with themselves by means of two plates without some numbers. Whereat each bearing axle 63 is up-borne to the space rocket fuselage by means of two bearing brackets 80. Both lateral beams 56 are rotatably joined by one common long axle 65 with the middle beam 55. On the common long axle 65 are also two distance blocks 81, which are between the middle beam 55 and each lateral beam 56. On the middle beam 55 upper part is permanently fastened the long plate 64 for aerodynamic purposes. In the middle beams 55 one side is permanently fastened the T-bar 67. In the middle beam 55 lowest end is rotatably installed the slider 53 by means of the holding axle 66. Furthermore, inside the middle beam 55 lowest end is installed the frictional brake 68.

FIG. 161, 162, 163 show three enlarged drawing fragments of FIG. 158, 159, 160. And FIG. 161 is the side view, FIG. 162 is the top view, FIG. 163 is the front view together with five auxiliary horizontal sectional views and with one bottom projection. Current views descriptions are the same as descriptions of previous FIG. 158-160. Here, are more clearly visible all smaller components as the vertical low bar 71, the T-bar 67, the slider 53, the frictional brake 68. Furthermore, in the blocking bar 54 is visible the T-groove.

FIG. 164, 165, 166 show three views of alone spreadable arm 5, which is in one-quarter lifted to the P2 setting. These views are similar to FIG. 144, 145, 146 however do not contain the moving mechanism of this spreadable arm 5 except of the cylindrical pegs 77. There are also not the space rocket fragments except of four bearing brackets 80 and four limiters 62. While, here is also the entire pushing mechanism of the blocking bar 54, that is not slid outside. And FIG. 164 is the side view and here is visible in what way stoop flown the lateral beams 56 upper bent parts and together with them stoop down the flat bars 72, which have the oval openings. Here, the arrows show the directions of further moving of the spreadable arm 5 components and of the blocking bar 54. And FIG. 165 is the top view, FIG. 166 is the front view.

FIG. 167, 168, 169 show three enlarged drawing fragments of FIG. 164, 165, 166. Whereas, FIG. 167 is the side view, FIG. 168 is the top view, FIG. 169 is the front view. Current views descriptions are the same as descriptions of previous FIG. 164, 165, 166. Here, are better visible all smaller components. Furthermore, in the blocking bar 54 is visible the T-groove.

FIG. 170, 171, 172 are three views of alone spreadable arm 5 together with the entire pushing mechanism of the blocking bar 54, which is not slid outside while the arrows show its sliding direction and range. The spreadable arm 5 is entirely lifted to the P6 setting. And FIG. 170 is the side view, FIG. 171 is the top view, FIG. 172 is the front view. Current views do not contain the moving mechanism of the spreadable arm 5 except the cylindrical pegs 77. Current views are in the same arrangement as previous FIG. 150-153 yet here are not any space rocket fragments except four bearing brackets 80 and four limiters 62.

FIG. 173, 174, 175 are three views of alone middle beam 55 together with entire pushing mechanism of the blocking bar 54, that is not slid outside while lots of small arrows show its sliding direction and range. The middle beam 55 is entirely lifted to the P6 setting as on previous FIG. 170-172. And FIG. 173 is the side view, FIG. 174 is the top view, FIG. 175 is the front view.

FIG. 176 is the side view of alone middle beam 55 together with the entire pushing mechanism of the blocking bar 54. Here, the blocking bar 54 is slid very little outside to a location where it will soon begin to slip into the T-bar 67, which is permanently fastened to the middle beam 55.

FIG. 177 is the side view of alone middle beam 55 together with the entire pushing mechanism of the blocking bar 54. Here, the blocking bar 54 is slid a lot outside and consequently is inserted already into the T-bar 67 half length. Here, is visible the empty part of the large C-shaped beam 69 because the blocking bar 54 slid a lot outside.

FIG. 178, 179 are two views of alone spreadable arm 5 together with the entire pushing mechanism of the blocking bar 54. And FIG. 178 is the side view, FIG. 179 is the top view. Here, the blocking bar 54 is maximally slid outside and consequently is already entirely inserted into the T-bar 67. Here, is visible the empty part of large C-shaped beam 69 because the blocking bar 54 moved slidingly and lineally maximally outside. In maximally slid outside location the blocking bar 54 fulfills its main function, which is total blocking the middle beam 55 in all directions. The middle beam 55 after its blocking gains possibility of carrying burdens in all directions. Therefore, the middle beam 55 after its blocking carries burdens together with both lateral beams 56. It significantly influences upon full-load capacity of one spreadable arm 5. The middle beam 55 blocking causes also strengthening of the entire spreadable arm 5 in all directions. Burdens upon all spreadable arms 5 will occur during the space rocket descent in the Earth's atmosphere and during the space rocket hanging itself on two damping wagons 30 or two 31. During the space rocket descent in the atmosphere it will maneuver, which will cause strong torsional forces on all spreadable arms 5. Although the most important is that the middle beam 55 after its blocking—gains upward carrying capacity, which is necessary during the space rocket hanging itself on two damping wagons 30 or two 31. Hence, the middle beam 55 blocking by the blocking bar 54 is very important for each spreadable arm 5.

FIG. 180, 181, 182 show the enlarged drawing fragments of FIG. 170, 171, 172 in the same arrangement. And FIG. 180 is the side view, FIG. 181 is the top view, FIG. 182 is the front view.

FIG. 183, 184, 185 show the enlarged drawing fragments of FIG. 173, 174, 175 in the same arrangement. And FIG. 183 is the side view, FIG. 184 is the top view, FIG. 185 is the front view.

FIG. 186 is the side view and shows the enlarged drawing fragment of FIG. 176 in the same setting.

FIG. 187 is the top view and shows the enlarged drawing fragments of FIG. 177 in the same setting.

FIG. 188, 189, 190, 191 show the views of the frictional brake 68 installed inside the middle beam 55 lowest end together with the slider 53. One frictional brake 68 consists of one brake block 82 and of one linear actuator 83. On all views this frictional brake 68 is sketched because it is inside the middle beam 55 lowest end. And FIG. 188 is the side view, FIG. 189 is the top view, FIG. 190 is the front view. On these views the middle beam 55 is vertically set ergo it is in P1 setting. And FIG. 191 is side view of alone middle beam 55 lowest end, which is slanted to the P6 full setting. On all views is visible the slider 53, which has a side-ward protruding part and wherein is situated the holding axle 66. In the middle beam 55 lowest end are permanently fastened two ending brackets 84 with the holes. Here, is also visible the T-bar 67 permanently fastened to the middle beam 55. All views display mutual setting of the brake block 82, the linear actuator 83, the slider 53 and of the holding axle 66. And on all views, the arrows show the moving direction of the brake block 82. The brake block 82 pressure on the side-ward protruding part of the slider 53 will brake its rotation against the middle beam 55. The whole frictional brake 68 is supposed to enable blocking this rotation, which will step-by-step immobilize the slider 53 between two corner beams 52 on the space rocket fuselage. While, the holding axle 66 fulfills here only guiding function. Step-by-step immobilizing of the slider 53 by the frictional brake 68 will step-by-step immobilize the spreadable arm 5 lowermost part. Step-by-step immobilizing of all spreadable arms 5 lowermost parts will be necessary during the space rocket descent in the Earth's atmosphere. The frictional brake 68 fulfills subsidiary function because the entire spreadable arm 5 will be lifted and set to the suitable setting by its moving mechanism, which contains in itself also blocking function and braking function.

FIG. 192, 193, 194, 195 show the views of one sliding engines cover 7, which can be lowered and here is in a version flat underneath after its lowering. The sliding engines cover 7 is installed to the space rocket fuselage bottom because there are its main engines. All current views show only the booster space rocket 1 bottom.

Currently, the sliding engines cover 7 is entirely lifted, and it causes that all main engines nozzles 85 are entirely uncovered. And FIG. 192 is the side view. And FIG. 193 is the top view only of the current space rocket fragment. And FIG. 194 is the front view. And FIG. 195 is the bottom projection of FIG. 192 and that mean the current space rocket bottom in two equal views, which are rotated 90 degrees in relation to each other so that they cohere with the above views.

The whole sliding engines cover 7 is installed to the space rocket fuselage bottom by means of four flat carrying plates 86 and four angle profiles 90. The whole sliding engines cover 7 consists of two sliding jalousies 88, two sliding rounded plates 9, two U-shaped rails 87, two stiffening beams 92, two side plates 89. Wherewith each jalousie 88 is joined by a plurality of hinges with one side plate 89. Whereas, each rounded plate 91 slides in two angle profiles 90.

All flat carrying plates 86 are permanently fastened to this space rocket fuselage and are perpendicular to this space rocket fuselage. To the carrying plates 86 opposite sides are permanently fastened two U-shaped rails 87. These two U-shaped rails 87 are long and are installed on the space rocket fuselage opposite sides. Each U-shaped rail 87 is permanently fastened to two carrying plates 86. Thereby both U-shaped rails 87 stretch on from the space rocket fuselage one side to its bottom and further to the space rocket fuselage opposite side. Consequently, each U-shaped rail 87 reminds with its shape an extensive U letter. The opposite U-shaped rails 87 upper ends are permanently fastened with themselves and with the space rocket fuselage by means of two stiffening beam 92. In both U-shaped rails 87 are placed two jalousies 88 wherewith each one is joined by the plurality of hinges with one side plate 89. Both jalousies 88 with the side plates 89 are placed on two opposite sides of the space rocket fuselage. Both jalousies 88 with the side plates 89 can move slidingly in two U-shaped rails 87. As result of their sliding down, they will slide to the U-shaped rails 87 bottom part. Then both jalousies 88 will come to each other, touch on themselves and then tighten up to each other in the U-shaped rails 87 bottom and in their middle. During moving down of both jalousies 88, there will move slidingly down also both side plates 89, which will remain in the vertical part of the U-shaped rails 87. And as result, underneath the space rocket arises a square flat surface after coming to each other and touching on themselves of both jalousies 88. This square flat surface will cover the main engines underneath whereas, this space rocket enters into the Earth's atmosphere.

Furthermore, to the space rocket fuselage are installed said two rounded plates 91, which are situated on two opposite sides of the space rocket fuselage that mean the sides, which are not cover in fullness by both jalousies 88. Each rounded plate 91 slides in two angle profiles 90. All four angle profiles 90 are permanently fastened to the space rocket fuselage. In two angle profiles 90 is placed one rounded plate 91, which can move slidingly and up in these two angle profiles 90. Both rounded plates 91 after their lowering shield almost the entire main engines on the both sides, which are not entirely covered by both jalousies 88. Consequently, both rounded plates 91 create two extensive side shields of the main engines. On all views, the arrows show the sliding directions of both jalousies 88 with the side plates 89 and of both rounded plates 91. The sliding engines cover 7 will be entirely lifted during running the space rocket main engines ergo during the space rocket launch and during braking action at space rocket landing Both jalousies 88 can be very easy and quickly replace by two new after each space rocket landing. On FIGS. 193 and 195 are visible airy spaces between the space rocket fuselage and the sliding engines cover 7 all components. Throughout these airy spaces can freely breeze air. These airy spaces for air cause that during the space rocket launch there will not be aerodynamic braking caused by the sliding engines cover 7. Shown here, the solution of the sliding engines cover 7 does not contain some sliding mechanisms of the jalousies 88 and of the rounded plates 91. These sliding mechanisms can be made according to a general known solutions.

FIG. 196, 197, 198, 199 show the views of one sliding engines cover 7, which can be lowered and here is in the version flat underneath after its lowering. The sliding engines cover 7 is installed to the space rocket fuselage bottom because there are its main engines. All current views show only the booster space rocket 1 bottom. Currently, this sliding engines cover 7 is entirely lowered and it causes that the space rocket bottom is entirely covered underneath and almost entirely at both sides. And FIG. 196 is the side view, FIG. 197 is the top view only of the current space rocket fragment, FIG. 198 is the front view, FIG. 199 is the bottom projection of FIG. 196 and that mean the current space rocket bottom in two equal views, which are rotated 90 degrees in relation to each other so that they cohere with the above views. On these projections are visible that both jalousies 88 came to each other and touched on themselves in the U-shaped rails 87 bottom and in their middle. Whereat on FIGS. 196 and 198 are visible that both rounded plates 91 are entirely lowered until both jalousies 88. Here, are also visible all components mentioned in description of previous FIG. 192-195. The sliding engines cover 7 will be rapidly and entirely lowered before the space rocket entry into the Earth's atmosphere. It will cover all space rocket main engines against a blast of air and consequently becoming overheated. Thereafter, the sliding engines cover 7 will remain shut down during the space rocket further descent in the Earth's atmosphere until a moment while it will be necessary the main engines firing blast for braking action at space rocket landing. Lifting of the sliding engines cover 7 can occur rapidly quickly.

FIG. 200, 201, 202, 203 show the views of the sliding engines cover 7, which can be lowered and here is in the version flat underneath after its lowering. The sliding engines cover 7 is installed to the space rocket fuselage bottom because there are its main engines. All current views show only the booster space rocket 1 bottom. On FIG. 200-201 the sliding engines cover 7 is entirely lifted and the exhaust fumes 9 gush down of all main engines nozzles 85. Whereas, FIG. 200 is the side view. And FIG. 201 is the front view. Here, is visible that all exhaust fumes 9 gush down but beside both U-shaped rails 87 and consequently they cannot melt them. Furthermore, the U-shaped rails 87 do not brake gushing down the exhaust fumes 9 of all nozzles 85. Such space rocket status will occur during the space rocket launch and for beginning of the space rocket descent from the Earth's orbit and later also at final phase for braking action at space rocket landing Whereat on FIG. 202-203 the sliding engines cover 7 is entirely lowered and it causes that the space rocket bottom is entirely covered. And FIG. 202 is the side view. And FIG. 203 is the front view. Such space rocket status will occur during the space rocket entering into the Earth's atmosphere and its further descent until a moment while there will be necessary the main engines firing blast for braking action at space rocket landing. Lifting of the sliding engines cover 7 can occur rapidly quickly. Here, on the space rocket fuselage, the large arrows show the space rocket descent direction in the Earth's atmosphere. Whereat the external arrows show from what direction comes flying atmospheric air and consequently in what way this air strongly crowds into both jalousies 88, which came to each other inside the U-shaped rails 87. While, both rounded plates 91 shield almost entirely at both sides the main engines nozzles 85. Here, are also visible the components mentioned in descriptions of FIG. 192-195.

FIG. 204, 205, 206, 207 show the views of one sliding engines cover 8, which can be lowered and here is in a version wedge shaped underneath after its lowering. This sliding engines cover 8 is installed to the space rocket fuselage bottom because there are its main engines. All current views show only the booster space rocket 1 bottom. Currently, the sliding engines cover 8 is entirely lifted and it causes that all main engines nozzles 85 are entirely uncovered. Whereas, FIG. 204 is the side view. And FIG. 205 is the top view only of the current space rocket fragment. And FIG. 206 is the front view. And FIG. 207 is the bottom projection of the current space rocket bottom in two equal views, which are rotated 90 degrees in relation to each other so that they cohere with the above views. This version of the sliding engines cover 8 is very similar in construction to the version flat underneath shown on FIG. 192-195. Current version, the sliding engines cover 8 creates a wedge underneath the space rocket after coming to each other and touching on themselves of both jalousies 88. This wedge underneath the space rocket entirely cover underneath the space rocket main engines. Furthermore, both rounded plates 91 are pointed in two bottom edges so that they adjoin to both jalousies 88. Here, in the space rocket fuselage are different arrangements and kinds of the main engines nozzles so that the exhaust fumes 9 completely pass by the U-shaped rails 87. On all views, the arrows show the sliding directions of both jalousies 88 and both rounded plates 91. Here, is visible that the exhaust fumes 9 gush down but beside both U-shaped rails 87 and consequently they cannot melt them. Furthermore, the U-shaped rails 87 do not brake gushing down of the exhaust fumes 9 of all nozzles 85. Here, are also visible the components mentioned in description FIG. 192-195.

FIG. 208, 209, 210, 211 show the views of the sliding engines cover 8, which can be lowered and here is in the version wedge shaped underneath after its lowering. This sliding engines cover 8 is installed to the space rocket fuselage bottom because there are its main engines. Current views show only the booster space rocket 1 bottom. On all views the sliding engines cover 8 is entirely lowered and it causes that the space rocket bottom is entirely covered. The views on FIG. 208, 209 show the plurality of main components' emplacement of the sliding engines cover 8 in relation to themselves and with the components sketches, which are veiled by a plurality of other members. And FIG. 208 is the side view, FIG. 209 is the front view. Whereat the views on FIG. 210-211 do not have the components sketches, which are veiled by the plurality of other members. And FIG. 210 is the side view, FIG. 211 is the front view. These views show in what way this sliding engines cover 8 expands and divides in two sides atmospheric air during the space rocket descent in the Earth's atmosphere. Underneath the space rocket arose the large wedge-shape after coming to each other and touching on themselves of both jalousies 88. This large wedge-shape underneath the space rocket covers the main engines whereas, this space rocket enters into the Earth's atmosphere. Furthermore, this large wedge-shape will divide and bend an air stream in two directions outside the space rocket fuselage. Here, on the space rocket fuselage, the large arrows show this space rocket descent direction in the Earth's atmosphere. Whereat the external arrows show from what direction comes flying atmospheric air and consequently in what way this atmospheric air strongly crowds into both jalousies 88, which came to each other inside the U-shaped rails 87. While, both rounded plates 91 shield almost entirely the main engines on both sides, which are not entirely covered by the jalousies 88. Such space rocket status will occur during the space rocket entering the Earth's atmosphere and its further descent until the moment while there will be necessary the main engines firing blast for braking action at landing. Lifting of the sliding engines cover 8 can occur rapidly quickly. Here, are also visible the components mentioned in descriptions of FIG. 192-195.

FIGS. 212A, 212B, 213, 214A and 214B show the views of the upper and bottom parts of one booster space rocket 1, which descends in the first time period at giant speed in the Earth's atmosphere. Whereas, FIG. 212A is the side view of the upper part, and FIG. 212B is the side view of the bottom part. And FIG. 214A is the front view of the upper part, and FIG. 214B is the side view of the bottom part. And FIG. 213 is the top view in two equal views, which are rotated 90 degrees in relation to each other so that they cohere with the below views. This booster space rocket 1 has six spreadable arms 5, four steering flaps 6, six blocking bars 54 and the sliding engines cover 7 flat underneath. Currently, all six spreadable arms 5 are entirely lowered and consequently are alongside the space rocket fuselage; four flaps 6 are a bit deflected out from the space rocket fuselage for steering this space rocket descent direction; all six blocking bars 54 are entirely slid outside so that causing small aerodynamic braking, which will stabilize this space rocket descent; the sliding engines cover 7 is entirely lowered and it causes that the space rocket bottom is entirely covered. Such arrangement of all components and sub-assemblies of this entire booster space rocket 1 will occur during its descent in the first time period at giant speed in the Earth's atmosphere. On FIG. 212A, 212B and FIG. 214A, 214B, on the space rocket fuselage the large arrows show the space rocket descent direction in the Earth's atmosphere. Whereat remaining arrows show in several places what happens with the space rocket and its sub-assemblies in such situation. These arrows show from what direction comes flying atmospheric air and consequently in what way this atmospheric air strongly crowds into sliding engines cover 7, into six blocking bars 54 and into four flaps 6. Simultaneously the arrows also show the deflection directions of the flaps 6 for steering the space rocket's descent direction.

And FIGS. 215A, 215B and 216 show the views of the upper and bottom parts of one booster space rocket 1, which descends in the second time period at average speed in the Earth's atmosphere. Whereas, FIG. 215A is the side view of the upper part, and FIG. 215B is the side view of the bottom part. And FIG. 216 is the top view. This booster space rocket 1 has six spreadable arms 5, four steering flaps 6 and the sliding engines cover 7 flat underneath. Currently, all six spreadable arms 5 are lifted somewhat and consequently, they protrude outside the space rocket fuselage; four flaps 6 are a lot deflected out the space rocket fuselage; the sliding engines cover 7 is entirely lowered and it causes that the space rocket bottom is entirely covered. Whereas, all six blocking bars 54 are entire in the space rocket interior because now they would not cause any aerodynamic braking. Moreover, here are well visible the corner beams 52 on the space rocket fuselage because all spreadable arms 5 are lifted somewhat. Such arrangement of all components and sub-assemblies of this entire booster space rocket 1 will occur during its descent in the second time period at average speed in the Earth's atmosphere. This average speed of the space rocket descent enables tiny lifting of all spreadable arms 5 as on the current views. On FIGS. 215A, and 215B on the space rocket fuselage, the large arrows show the space rocket's descent direction in the Earth's atmosphere. Whereat the remaining arrows show in several places what happens with the space rocket and its sub-assemblies in such situation. These arrows show from what direction comes flying atmospheric air and consequently in what way this atmospheric air strongly crowds into sliding engines cover 7, into six spreadable arms 5, which are lifted somewhat, into four flaps 6, which are a lot deflected out of the space rocket fuselage. Simultaneously the arrows also show the deflection directions of the flaps 6 for steering the descent direction. During the space rocket descent and at the same time lifting of each spreadable arm 5, airflow exerts very large pressure on two lateral beams 56 and the middle beam 55 with the long plate 64. The long plate 64 permanently fastened on the middle beam 55 causes that pressure exerted on them even out with pressure exerted on two lateral beams 56. Without the long plate 64 pressure exerted on two lateral beams 56 would be probably twice bigger than on one middle beam 55, and it might too strongly push the entire spreadable arm 5 upward.

The final arrangement status of all components and sub-assemblies of this entire space rocket will occur during its descent in the third time period at slow speed in the Earth's atmosphere and which is shown on the further FIG. 262-267. Then slow speed of the space rocket descent in the Earth's atmosphere will enable total lifting of all spreadable arms 5.

FIG. 217, 218, 219, 220 show the views of one entire main space rocket 2, which has revolvingly installed the sectional load cover 4 and, which is dividable into two sections by gradually folding out on two opposite sides. And the sectional load cover 4 is adapted to gradually folding up by pooling together both sections to total shutting. This sectional load cover 4 serves for covering inside the payload 100 and this way creates its thermal protection during the space rocket ascent and descent in the Earth's atmosphere. Thus, inside the sectional load cover 4 can be fastened the payload 100, which will be carried out on the Earth's orbit and later can be fastened the return load 106, that will be carried down on the Earth. The sectional load cover 4 is revolvingly installed on the main space rocket 2 upper part and can be situated over the second stage rocket 3. The sectional load cover 4 can be completely lowered to the main space rocket 2 upper part as well. This sectional load cover 4 is attached to the main space rocket 2 by means of four long cog beams 93. Currently, to the main space rocket 2 is also directly attached the second stage rocket 3. Here, the sectional load cover 4 is shut up, and all cog beams 93 are outside and on both sides of the second stage rocket 3. While, inside the sectional load cover 4 is placed the payload 100, which will be carried out on the Earth's orbit. This payload 100 is attached to the second stage rocket 3. Whereas, FIG. 217 shows the side view of one entire main space rocket 2, which is ready for launch. And FIG. 218 shows the front view of the same main space rocket 2. Whereat FIG. 219 is the same as FIG. 217 albeit contains the payload 100 sketches inside the shut up sectional load cover 4 and the second stage rocket 3 sub-assemblies sketches, which are veiled by a plurality of other modules. Whereat FIG. 220 is the same as FIG. 218 albeit contains the same sketches as FIG. 220. Moreover, on FIGS. 217 and 219 the external arrows show the spreading directions of the sectional load cover 4 into two sections on two sides.

FIG. 221 is the side view of the second stage rocket 3 whereon is attached the payload 100, which will be carried out on the Earth's orbit. Here, the second stage rocket 3 has one nozzle 85, which is foldable.

FIG. 222 is the side view of the second stage rocket 3 where-from ascends freely the payload 100.

FIG. 223, 224 show the enlarged views of the main space rocket 2 upper part, which were earlier shown on FIG. 219-220. Here, the main space rocket 2 upper part has revolvingly installed the sectional load cover 4, which is dividable into two sections and gradually foldable out on two opposite sides. And later this sectional load cover can be gradually pooled together up to total shutting. This sectional load cover 4 is revolvingly installed to the main space rocket 2 by means of four cog beams 93. Now to the main space rocket 2 is also directly attached the second stage rocket 3. Here, the sectional load cover 4 is shut up, and all cog beams 93 are outside and on both sides of the second stage rocket 3. While, inside the sectional load cover 4 is placed the pia load 100, that will be carried out on the Earth's orbit. This payload 100 is attached to the second stage rocket 3. And FIG. 223 shows the side view of the main space rocket 2 upper part and contains the payload 100 sketches inside the shut up sectional load cover 4 and contains the second stage rocket 3 fragments sketches, which are veiled by other modules. Here, the external arrows also show the spreading directions of the sectional load cover 4 into two sections on two sides. This view shows that the sectional load cover 4 can divide into two sections and can fold out on two opposite sides, because it is two-sectional and is installed to the main space rocket 2 by means of four cog beams 93. And FIG. 224 shows the front view of the main space rocket 2 upper part and contains the same fragments as FIG. 223. Here, is visible that to the main space rocket 2 upper part are installed four rotating heads 94 of the cog beams 93. These rotating heads 94 are in this space rocket interior and are in two opposite sides of this space rocket fuselage. Each rotating head 94 is driven by one servomotor with one reduction gear, which rotate one rotating axle 95. The rotating axles 95 of the rotating heads 94 are permanently fastened to the cog beams 93, which are outside the space rocket fuselage. Therefor all four cog beams 93 can incline on the sides and with them also both sections of the sectional load cover 4. Each one section of the sectional load cover 4 is held up and incline by two cog beams 93. The cog beams 93 are long and are outside on both sides of the second stage rocket 3. All cog beams 93 come up and enter inwards both sections of the sectional load cover 4. While, inside the sectional load cover 4 each cog beam 93 is held up by means of one hoisting gear 96. Each one section of this sectional load cover 4 has installed its own two hoisting gears 96, namely of lifting itself. Each hoisting gear 96 is driven by one servomotor with one reduction gear, which rotates one cog wheel 97, which is fitted in with one cog beam 93. All cog beams 93 protrude suitably up over the hoisting gears 96 so that it would be possible to initially lift the entire sectional load cover 4. The cog beams 93 protruding up inside the sectional load cover 4 are visible on the current views and are indicated with the large exclamatory sign.

FIG. 225, 226 show the enlarged views of the main space rocket 2 upper part shown also earlier on the similar FIG. 223-224. Currently, the sectional load cover 4 is lifted maximally on four long cog beams 93. This enables spreading it out on two sides. On the current FIG. 225, the external arrows show spreading directions of the sectional load cover 4 into two sections on two sides. Whereas, FIG. 225 is the side view, FIG. 226 is the front view. Here, is visible vacant space between the sectional load cover 4 bottom edge and the second stage rocket 3 upper edge. This vacant space is visible on the current views and is indicated with the large exclamatory sign. In this vacant space is already visible a fragment of the payload 100, that will be carried out on the Earth's orbit. The sectional load cover 4 became lifted maximally on four cog beams 93 because rotating four cog wheels 97 climbed up on four cog beams 93. Four cog wheels 97 are driven by four hoisting gears 96.

FIG. 227 shows enlarged side view of the main space rocket 2 upper part shown earlier on FIG. 223-225. Here, the sectional load cover 4 is already spread a little out on two sides. It is possible because there is vacant space between the sectional load cover 4 bottom edge and the second stage rocket 3 upper edge. This vacant space is visible on the current view and is indicated with two large exclamation marks. This view well shows, in what way the sectional load cover 4 can be folded out on two sides because it is two-sectional and is installed to the main space rocket 2 by means of four cog beams 93. Simultaneously it is visible that the cog beams 93 are rotatably installed to the main space rocket 2 fuselage. These cog beams 93 are permanently fastened to the rotating axles 95, which are rotated by the rotating heads 94. All rotating axles 95 became rotated tiny angle, and it rotated the same tiny angle all entire cog beams 93 and with them also both sections of the sectional load cover 4. Here, the entire cog beams 93 are continuously outside and on both sides of the second stage rocket 3. Currently, is already a lot uncovered the payload 100, which will be carried out on the Earth's orbit.

FIG. 228 shows very diminished the side view of one entire main space rocket 2, that has entirely folded out on two sides the sectional load cover 4 and shows the sketch its intermediate folding out. Because of total folding out on two sides the sectional load cover 4 there is entirely uncovered the pia load 100, which is attached to the second stage rocket 3.

FIG. 229 shows the side view of the main space rocket 2 upper part, which has entirely folded out on two sides the sectional load cover 4 and the sketch its intermediate folding out. Because of total folding out on two sides the sectional load cover 4, there is entirely uncovered the payload 100, which is attached to the second stage rocket 3. While, this second stage rocket 3 is still attached to the main space rocket 2.

FIG. 230 shows the side view of the main space rocket 2 upper part, which has also the entirely folded out sectional load cover 4. And here, the second stage rocket 3 with attached the payload 100 ascend together because they already separated from the main space rocket 2. All earlier views well show in what way the sectional load cover 4 can be folded out on two sides because it is two-sectional and is installed to the main space rocket 2 by means of four cog beams 93. Simultaneously it is visible that the cog beams 93 are rotatably installed to the main space rocket 2 fuselage.

FIG. 231 shows the side view of the main space rocket 2 upper part, which has entirely folded out on two sides the sectional load cover 4. Here, the second stage rocket 3 with attached the return load 106 approach together to the main space rocket 2 in order to dock with it. The second stage rocket 3 has the nozzle 85, which is folded for more safely docking.

FIG. 232 shows the side view of the main space rocket 2 upper part whereto is already docked the second stage rocket 3 with attached the return load 106. Here, the sectional load cover 4 is already a little shut up. Sequentially the sectional load cover 4 will be shut totally up and consequently will hide inside the entire return load 106 from the Earth's orbit.

FIG. 233, 234, 235, 236 show the views of alone main space rocket 2 upper part ergo without docked the second stage rocket 3. Whereas, FIG. 233 shows the side view of alone main space rocket 2 upper part, which has entirely folded out on two sides the sectional load cover 4. And FIG. 234 shows the top view of alone main space rocket 2 upper part, which has entirely folded out on two sides the sectional load cover 4. And FIG. 233-234 well show in what way the sectional load cover 4 can be folded out on two sides because it is two-sectional and is installed to the main space rocket 2 by means of four cog beams 93. Simultaneously it is visible that the cog beams 93 are rotatably installed to the main space rocket 2 fuselage. And here is clearly visible emplacement of four uncovered hoisting gears 96 of the sectional load cover 4 both sections. Moreover, it is clearly visible emplacement of four uncovered rotating heads 94 of the cog beams 93. And FIG. 235 shows the side view of the main space rocket 2 upper part, which has a little shut up sectional load cover 4. And FIG. 236 shows the side view of the main space rocket 2 upper part, which has even more shut up sectional load cover 4.

FIG. 237-243 show the views of alone main space rocket 2 upper part ergo without docked the second stage rocket 3. Whereas, FIG. 237 shows the side view of the main space rocket 2 upper part, which is very close to shutting up the sectional load cover 4. This view and the earlier views from FIG. 232 well show in what way both sections of the sectional load cover 4 can be gradually pooled together up to total shutting. And FIG. 238, 239 show the side view and the front view of the main space rocket 2 upper part, which has the sectional load cover 4 entirely shut up. This sectional load cover 4 is maximally distant upward from the main space rocket 2, and it is held up by means of four long cog beams 93. The entire cog beams 93 are by themselves over the main space rocket 2 and are under the sectional load cover 4. Here, the arrows under the sectional load cover 4 show the direction its lowering to the main space rocket 2. This entire sectional load cover 4 will be lowered further on four cog beams 93. And FIG. 240, 241 show the side view and the front view of the main space rocket 2 upper part, which has also the entirely shut up sectional load cover 4. This sectional load cover 4 is already a lot lowered on four cog beams 93. After lowering the sectional load cover 4, four cog beams 93 upper ends entered a lot inwards this sectional load cover 4. Here, the arrows under the sectional load cover 4 show the direction its further lowering to the main space rocket 2. And FIG. 242, 243 show the side view and the front view of the main space rocket 2 upper part, which has also the entirely shut up sectional load cover 4. This sectional load cover 4 is already entirely lowered on four cog beams 93. Consequently, this sectional load cover 4 touched on with the main space rocket 2 fuselage. Therewith four entire cog beams 93 entered entirely inwards this sectional load cover 4. Lowering of the sectional load cover 4 targets its fastening with the main space rocket 2 fuselage, which is necessary for landing without the second stage rocket 3.

FIG. 244, 245, 246, 247 show the enlarged views of the totally shut up sectional load cover 4, which is revolvingly installed to the main space rocket 2 upper part. This sectional load cover 4 was earlier lowered on four cog beams 93 to the main space rocket 2 fuselage as it were shown on previous FIG. Therewith four entire cog beams 93 entered entirely inwards the sectional load cover 4. For this reason these entire cog beams 93 are sketched with the dashed lines. Here, is visible in what way are installed four hoisting gears 96 of the sectional load cover 4 and four rotating heads 94 of four cog beams 93. And FIG. 244 is the side view. And FIG. 245 is the top view of the horizontal sectional view according to the S1-S1 line on FIG. 244. Here, are visible only components inside the sectional load cover 4 thus, its four hoisting gears 96. Each one hoisting gear 96 is driven by one servomotor with one reduction gear, which rotates one cog wheel 97, which is fitted in with a plurality of cogs in each cog beam 93. All cog beams 93 have plenty internal cogs in their internal insides. All cog beams 93 are rectangular in cut-view and are placed slidingly inside four rectangular tubes 99. These rectangular tubes 99 are permanently fastened to both bottoms of the sectional load cover 4. All cog beams 93 and all rectangular tubes 99 must be rectangular in cut-view so that there would not occur angular con-torsion of any section of the sectional load cover 4. And FIG. 246 is the top view of the horizontal sectional view according to the S2-S2 line on FIG. 247. Here, are visible only components inside the main space rocket 2 thus, four rotating heads 94 of the cog beams 93 whereby incline the sectional load cover 4. These rotating heads 94 are in the space rocket interior and are on two opposite sides of this space rocket fuselage. Each one rotating head 94 is driven by one servomotor with one reduction gear, which rotates the rotating axles 95. The rotating axles 95 are permanently fastened to the cog beams 93, which are outside the space rocket fuselage. Therefor all four cog beams 93 can incline on the sides and with them also both sections of this sectional load cover 4. And FIG. 247 is the front view of FIG. 244 in the same arrangement and situation.

FIG. 248, 249 show the enlarged views of fragments of the entirely shut up sectional load cover 4 and of the main space rocket 2 upper part. Whereas, FIG. 248 is the side view. And FIG. 249 is the front view. Here, the sectional load cover 4 is a bit lifted on four cog beams 93 and therefor a little protrude from the main space rocket 2. For this reason all four cog beams 93 upper ends are situated inside the sectional load cover 4. And inside the sectional load cover 4 are visible its four hoisting gears 96. Furthermore, inside the main space rocket 2 are visible four rotating heads 94 of the cog beams 93.

FIG. 250, 251, 252 show very plenty enlarged and detailed views of two hoisting gears 96 in the fragments of the entirely shut up sectional load cover 4 that is lifted. And FIG. 250 is the side view, FIG. 251 is the top view, FIG. 252 is the front view. Here, is well visible installation way and construction of one entire hoisting gear 96, which is driven by one servomotor with one reduction gear, which rotates one cog wheel 97 and, which is fitted in with the cog beam 93. All cog beams 93 have plenty internal cogs in their internal insides. All four cog beams 93 are rectangular in cut-view and are placed slidingly inside four rectangular tubes 99. There are two rectangular tubes 99 permanently fastened to each one section bottom of the sectional load cover 4.

FIG. 253, 254, 255 show very plenty enlarged and detailed views of two rotating heads 94 of the cog beams 93 in the fragments of the main space rocket 2 fuselage. And FIG. 253 is the side view, FIG. 254 is the top view, FIG. 255 is the front view. Here, is visible installation way and construction of these entire rotating heads 94 of the cog beams 93. All four rotating heads 94 are installed to two thick plates 98, which are permanently fastened to the fuselage upper part of this main space rocket 2. Each rotating head 94 is driven by one servomotor with one reduction gear, which rotates one rotating axle 95.

Each rotating axle 95 is placed in a hole in one thick plate 98.

Each rotating axle 95 is permanently fastened to one cog beam 93, which is outside the space rocket fuselage. Therefor all four cog beams 93 will incline while the rotating axles 95 will somewhat rotate. And together with the cog beams 93 will incline also suitable sections of this sectional load cover 4. Here, the arrows show the moving directions of a few components.

FIG. 256, 257, 258, 259 show the views of the entire main space rocket 2, which is attached in two variants with the payload module 103 and the crew module 102 and, which were not shown on any earlier views. The payload module 103 has two gates with a cargo bay while the crew module 102 has a few windows. Here, the main space rocket 2 is also equipped with ten spreadable arms 5 so that this space rocket with current assemblage could land aboard the specific sea ship 10, which has the deck mounted landing station. Whereas, FIG. 256-257 show the attaching variant wherein on the main space rocket 2 top is mounted the assemblage, which consist of the second stage rocket 3 whereon is attached the payload module 103 and whereto is attached the crew module 102. Whereat FIG. 256 is the side view, FIG. 257 is the front view. This attaching variant will be applied while on the Earth's low orbit this assemblage will separate from the main space rocket 2. Separating purpose can be that this assemblage will schedule ascend toward the Earth's high orbit. Later this entire separated assemblage will be able to come back and dock to the same main space rocket 2 so that afterward together return on the Earth. Whereas, FIG. 258-259 show the attaching variant wherein on the main space rocket 2 top is mounted the assemblage, which only consists of the payload module 103 with attached the crew module 102. And FIG. 258 is the side view, FIG. 259 is the front view. Such attaching variant will be applied while on the Earth's orbit this assemblage will not separate from the main space rocket 2. Thus, here is not the second stage rocket 3.

FIG. 260 is the side view of the separated assemblage, which consist of the second stage rocket 3 with attached the payload module 103 whereto is attached the crew module 102. It is the same assemblage, that is attached to the main space rocket 2 on FIG. 256-257.

FIG. 261 is the side view of alone crew module 102, which in such status would be used only for emergency separation from the assemblage and thus, from the space rocket.

Purposes of the views on FIG. 256-261 are presentations that the main space rocket 2 equipped with ten spreadable arms can have mounted on its top a plurality of various assemblages or modules and together with them can also land aboard the specific sea ship 10, that has the deck mounted landing station. Shown here, the attaching variants of the main space rocket 2 with the payload module 103 and with the crew module 102 enable the same possibilities of utilization as had earlier applied Space Shuttles.

FIG. 262-267 show examples of descending in the Earth's atmosphere of one booster space rocket 1 and of the main space rocket 2 with on its top mounted various assemblages and in various variants. These space rockets descend in the Earth's atmosphere during the third so the last time period at slow speeds and therefor all space rockets could already entirely lift their all spreadable arms 5 and entirely deflected out their all steering flaps 6. All space rockets still have totally shut down their sliding engines cover 7. On all space rocket fuselages the large arrows show their descent direction in the atmosphere. Whereat the external arrows show from what direction comes flying atmospheric air. Therefore, these arrows show in what way atmospheric air strongly crowds into all sub-assemblies, sections, assemblages and modules of these space rockets. Whereas, FIG. 262-263 show the side view and the top view of one booster space rocket 1, which has entirely lifted (spread out) its all six spreadable arms 5. This booster space rocket 1 has not attached any module. Whereas, FIG. 264-265 show the side view and the top view of one main space rocket 2, which has entirely lifted (spread out) its all ten spreadable arms 5. This main space rocket 2 has on its top attached the sectional load cover 4. This attaching and landing variant of the main space rocket 2 could be while the second stage rocket 3 will remain on the Earth's orbit. This attaching and landing variant can also occur if the sectional load cover 4 is installed in different way, for example by a plurality of hinges to the main space rocket 2. Whereas, FIG. 266 shows the side view of one main space rocket 2, which has also entirely lifted (spread out) all ten spreadable arms 5. Here, is the attaching variant wherein on the main space rocket 2 top is mounted the assemblage, that consist of the second stage rocket 3 with the sectional load cover 4. Here, is visible that all cog beams 93 are outside and on both sides of the second stage rocket 3. This attaching and landing variant of the main space rocket 2 will be while the second stage rocket 3 will be taken back from the Earth's orbit. And this attaching variant causes that inside the sectional load cover 4 can be the load taken back from the Earth's orbit. For example, a large satellite taken back for repair. Whereas, FIG. 267 shows the side view of one main space rocket 2, which has also entirely lifted (spread out) all ten spreadable arms 5. The view shows the attaching variant wherein on the main space rocket 2 top is mounted the assemblage, that consist of the second stage rocket 3 with attached the payload module 103 and the crew module 102. This attaching variant of the main space rocket 2 will be while the second stage rocket 3 will be taken back from the Earth's orbit with attached the payload module 103 and the crew module 102. This attaching variant causes that inside the payload module 103 can be the load taken back from the orbit.

FIG. 268, 269 show the front views of one main space rocket 2, which is joined on both sides with two booster space rockets 1. And FIG. 268 is the diminished front view of three joined space rockets. And FIG. 269 is the enlarged front view of the upper parts of the same three joined space rockets, which are on FIG. 268. On the main space rocket 2 top is mounted the assemblage, which consist of the second stage rocket 3 with sectional load cover 4. Whereat the sectional load cover 4 is attached to the second stage rocket 3 and is revolvingly installed to the main space rocket 2 by means of the cog beams 93. And inside the sectional load cover 4 is fastened the payload 100, which will be carried out on the Earth's orbit. In such status and arrangement these three joined space rockets are entirely ready for launch toward space. These views target presentation that the spreadable arms 5 fastened to the main space rocket 2 and to two booster space rockets 1 do not hinder joining them with themselves. These three space rockets are joined with themselves by means of a plurality of foldable crossbars without any numbers.

FIG. 270 shows the enlarged side view of the entire specific sea ship 10, which has the deck mounted landing station for individual, vertical landing and also for fastening of three space rockets equipped with the plurality of spreadable arms 5. And alongside is just such space rocket. This view is the same as FIG. 11 albeit is enlarged. On the current view are the best visible two edge bars 50, which are permanently fastened on two long side hulls 11. Both edge bars 50 lead all wheels 16 of both movable decks 15 while they roll on the main-decks 14. Accurate description of this view is the same as previous FIG. 11 and therefor is not quoted here.

FIG. 271 shows the enlarged top view of the entire specific sea ship 10, which has the deck mounted landing station for individual, vertical landing and also for fastening of three space rockets equipped with the plurality of spreadable arms 5. And alongside is just such space rocket. This view is the same as FIG. 12 albeit is enlarged. On the current view are the best visible two edge bars 50, which are permanently fastened on two long side hulls 11. Both these edge bars 50 lead all wheels 16 of both movable decks 15 while they roll on the main-decks 14. Accurate description of this view is the same as previous FIG. 12 and therefor is not quoted here.

FIG. 272 shows the enlarged front view of the entire specific sea ship 10, which has the deck mounted landing station for individual, vertical landing and also for fastening of three space rockets equipped with the plurality of spreadable arms 5. And alongside is just such space rocket. This view is the same as FIG. 13 albeit is enlarged. On the current view are the best visible two edge bars 50, which are permanently fastened on two long side hulls 11. Both these edge bars 50 lead all wheels 16 of both movable decks 15 while they roll on the main-deck 14. Accurate description of this view is the same as previous FIG. 13 and therefor is not quoted here.

FIG. 273 is prospectus presentation, which shows for example several drawing statuses of one main space rocket 2, which lifted-off and its further traveling trajectory while unexpectedly happened failure of some main engine. The current presentation shows process of this entire main space rocket 2 salvation and its emergency landing aboard the specific sea ship 10 at open sea. On this space rocket drawing statuses and alongside the arrows show the directions of its traveling trajectory. As result of such method, in some circumstances there is possible total salvage of the main space rocket 2 together with the entire assemblage. And this view display also that each space rocket equipped with the spreadable arms 5 can in some other emergency land aboard the specific sea ship 10.

The views on FIG. 274, 275 show for example one booster space rocket 1, which slips by through the giant open interior of the specific sea ship 10 at open sea. And FIG. 274 is the side view, FIG. 275 is the top view. According to the plan, this booster space rocket 1 was supposed to land on this specific sea ship 10. However, during this space rocket descent happened some failure of the main engines, which were supposed to bring total stop of the space rocket descent and make possible landing aboard the specific sea ship 10. In order to prevent any strike of this space rocket onto the specific sea ship 10 there were quick and entirely spread apart in two directions both horizontally movable decks 15. Both movable ship gantries 20 were already earlier entirely spread apart in two directions of the specific sea ship 10. As result, inside the specific sea ship 10 multi-hull arose the giant open interior where-into there is only sea surface. Accurately into this giant open interior filled with sea-water struck hard this booster space rocket 1 and plunged in sea-water. Therefore, this booster space rocket 1 did not strike into any member of the specific sea ship 10. This space rocket became lost but the entire specific sea ship 10 survived and that is giant economic profit. Moreover, this specific sea ship 10 and the landing station are immediately ready for landing the next space rocket, because there will only be enough to push together both horizontally movable decks 15. On the views are distinctly visible water splashes, which arose after the space rocket stroke onto sea surface.

INFORMATION about the present invention. While, the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention.

REFERENCE NUMBERS

Main Numbers.

1 booster space rocket, 2 main space rocket, 3 second stage rocket, 4 sectional load cover (dividable into two sections), 5 spreadable arm (six or ten), 6 flap (four), 7 sliding engines cover flat underneath (one), 8 sliding engines cover wedge shaped underneath (one), 9 exhaust fume (gushing from the space rocket main engines), 10 specific sea ship.

Sub-Assemblies of the Specific Sea Ship 10.

11 long side hull (two), 12 short central hull (two), 13 copular hull (four), 14 deck, 15 horizontally movable (two), 16 wheel (lots in both movable decks 15), 17 tunnel (two inside the specific sea ship 10 multi-hull), 18 ballasting wagon (two in tunnels 17), 19 deck rail (two fastened on both long side hulls 11).

Sub-Assemblies of the Movable Ship Gantries 20.

20 movable ship gantry (two), 21 wheel (lots), 22 bumper (two), 23 upper long rail (two on each movable ship gantry 20).

Sub-Assemblies of the Hangers 24.

24 hanger (four), 25 rotating wedge (two in each hangers 24), 26 upper short rail (two on each hangers 24), 27 rotary actuator (two), 28 support axle (one), 29 rotating axle (one for each rotary actuator 27).

Sub-Assemblies of the Damping Wagons 30 and 31.

30 damping wagon (four), 31 large damping wagon (two), 32 flexible layer, 33 wedge shaped fender, 34 leading shafts, 35 main plate, 36 high leading tube, 37 low leading tube, 38 middle plate, 39 conic spring, 40 top plate, 41 driving wheel, 42 leading wheel, 43 battery.

Sub-Assemblies of the Grasping Wagons 44.

44 grasping wagon (two), 45 rotating poles (two in each grasping wagon 44), 46 wheel (lots).

Sub-Assemblies of the Specific Sea Ship 10.

47 long transverse rail (two on each movable 15), 48 short transverse rail (four on the pillars 49), 49 pillar (lots on the deck 14), 50 edge bar (two fastened on both long side hulls 11).

Sub-Assemblies of the Space Rockets.

51 space rocket fuselage (one), 52 corner beam (lots on the space rocket fuselage).

Sub-Assemblies of the Spreadable Arms 5 and in Each One.

53 slider (one), 54 blocking bar (one), 55 middle beam (one), 56 lateral beam (two).

Sub-Assemblies of the Steering Flaps 6 and their Deflection Mechanisms.

57 ample bracket, 58 rotary actuator, 59 torsional triangle, 60 linear actuator.

Sub-Assemblies of the Space Rockets.

61 pressure tank, 62 limiter.

Sub-Assemblies of the Spreadable Arms 5.

63 bearing axle, 64 long plate, 65 common long axle, 66 holding axle, 67 T-bar, 68 frictional brake.

Sub-Assemblies of the Pushing Mechanisms of the Blocking Bars 54.

69 large C-shaped beam, 70 linear actuator, 71 vertical low bar.

Sub-Assemblies of the Spreadable Arms 5 and their Moving Mechanisms.

72 flat bar (has oval opening), 73 servomotor, 74 worm gear, 75 threaded pipe, 76 special nut, 77 cylindrical peg, 78 common roller, 79 bearing seat, 80 bearing bracket (with the hole), 81 distance block.

Sub-Assemblies of the Frictional Brakes 68.

82 brake block, 83 linear actuator, 84 ending bracket (with the hole).

Sub-Assemblies of the Space Rockets.

85 nozzle (of the space rocket main engine).

Sub-Assemblies of the Sliding Engines Covers 7 and 8.

86 flat carrying plate (four), 87 U-shaped rail (two), 88 jalousie (two), 89 side plate (two), 90 angle profile (four), 91 rounded plate (two), 92 stiffening beam (two).

Sub-Assemblies of the Sectional Load Cover 4.

93 cog beam (four), 94 rotating head (four), 95 rotating axle (four), 96 hoisting gear (four), 97 cog wheel (four), 98 thick plate (two), 99 rectangular tube (four in the sectional load cover 4).

Other Numbers.

100 payload (will be carried on the Earth's orbit), 101 Earth's globe, 102 crew module, 103 payload module, 104 movable ground gantry (two), 105 movable specific ground crane (one), 106 return load (from the Earth's orbit).

The invention claimed is:

1. A system for multiple use of space rockets equipped with spreadable arms and sliding engines covers, and the system includes that said space rockets vertically land on two movable ship gantries situated on a specific sea ship or land on two movable ground gantries and said system comprising:
- a plurality of space rockets, each comprising:
  - a fuselage;
  - the plurality of spreadable arms;
  - a plurality of pushing mechanisms;
  - a plurality of steering flaps having torsional triangles;
  - the sliding engine cover having two jalousies and two rounded plates; and
  - one of the space rockets further comprising a dividable sectional load cover;
- the specific sea ship comprising:
  - a plurality of joined hulls which create a specific multi-hull;
  - two horizontally movable decks; and
  - a plurality of tunnels with installed a plurality of ballasting wagons;
- a landing station on the specific sea ship and comprising:
  - two movable ship gantries having installed a plurality of damping wagons;
  - two pairs of hangers each having two rotating wedges; and
  - two grasping wagons each having two rotating poles;
- a multi-task station situated on a solid ground and comprising:
  - two movable ground gantries;
  - a specific movable ground crane;
  - wherein each space rocket is configured for vertical landing by lifting its spreadable arms and descending until at least two of the spreadable arms contact two damping wagons on two movable gantries, whereby said space rocket hangs on two movable gantries.

2. The system according to claim 1,
- wherein each space rocket comprises: at least two spreadable arms located on the opposite sides of the fuselage;
- wherein all spreadable arms are mounted on each fuselage top part;
- wherein all spreadable-arms are suitably spaced out on each fuselage so that they could spread out on two sides;
- wherein all spreadable arms are completely spread out and are transverse to the space rocket fuselage when are entirely lifted;
- wherein all spreadable arms are alongside and adjacent the space rocket fuselage when are entirely lowered;
- wherein all spreadable arms are configured to be lowered during an ascent phase of the space rocket;
- wherein the at least two spreadable arms are configured to be at least partially lifted during a descent phase of the space rocket such that the spreadable arms provide aerodynamic braking to the space rocket;
- wherein the at least two spreadable arms are configured to be fully lifted during a landing phase of the space rocket such that the at least two spreadable arms support said space rocket on two gantries, whereby said space rocket hangs on two gantries.

3. The system according to claim 1,
- wherein each spreadable arm comprises:
- at least two lateral beams;
- a middle beam having a T-bar;
- a moving mechanism having one servomotor driving simultaneously two worm-gears;
- a frictional brake;
- two corner beams fastened on the space rocket fuselage; and
- a slider movable between two corner beams;
- wherein both lateral beams top ends are bent and are inside the space rocket fuselage;
- wherein both lateral beams in both bent corners are rotatably joined with the space rocket fuselage by two bearing axles which are situated in four bearing brackets;
- wherein both lateral beams top ends are rotatably joined with the moving mechanism;
- wherein the moving mechanism is installed inside the space rocket fuselage;

wherein each moving mechanism is adapted for moving together both lateral beams top bent ends and in consequence for moving the entire spreadable arm;
wherein both lowest ends of both lateral beams are rotatably joined with a top end of the middle beam;
wherein a lowest end of the middle beam is rotatably joined with the slider;
wherein inside the lowest end of the middle beam is installed the frictional brake; and
wherein on one side of the middle beam is permanently fastened the T-bar adapted to fit with a T-groove in a blocking bar.

4. The system according to claim 1,
wherein each pushing mechanism comprises:
a C-shaped beam;
a linear actuator;
a vertical low bar; and
the blocking bar having the T-groove;
wherein each pushing mechanism is installed inside the space rocket fuselage, and over each spreadable-arm;
wherein inside each C-shaped beam is slidingly installed the blocking bar;
wherein each blocking bar is permanently fastened by the vertical low bar with the linear actuator;
wherein each linear actuator is adapted for pushing and pulling the blocking bar;
wherein each blocking bar has the T-groove which is adapted to fit with the T-bar on the middle beam in the spreadable arm;
wherein said blocking bar is configured to block the middle beam in all directions once the spreadable arm is entirely lifted;
wherein the blocking bar fulfills blocking function when it is maximally slid outside the fuselage;
wherein the blocking bar causes that the middle beam after its blocking gains possibility of carrying burdens in all directions.

5. The system according to claim 1,
wherein the steering flaps are cardinally installed on an upper part of each space rocket fuselage by means of a plurality of hinges;
wherein each steering flap is deflected by a deflection mechanism having one linear actuator and two ample brackets;
wherein the steering flaps are adapted to steer the space rocket during its descent in the atmosphere;
wherein the steering flaps on their top parts have rotary fastened the torsional triangles which are configured to torsion-ally steer the space rocket as needed before landing on two movable gantries;
wherein each torsional triangle is grasped and axially steered by a rotary actuator fastened on the steering flaps; and
wherein the torsional triangles installing way and triangular shapes are adapted for use at various speeds of the space rocket descent in the atmosphere.

6. The system according to claim 1,
wherein the dividable sectional load cover comprises:
four cog beams that are rectangular in a cut-view;
two sections of load cover each comprising;
two rectangular tubes;
two hoisting gears each comprising;
one servomotor with a reduction gear; and
one cog wheel fitted with all cogs on the cog beam;
two rotating heads each comprising;
one servomotor with a reduction gear; and
one rotating axle;
wherein all cog beams are rectangular in the cut-view and are placed slidingly inside the rectangular tubes;
wherein inside the sectional load cover each cog beam is held up by means of one hoisting gear;
wherein each hoisting gear is mounted adjacent the rectangular tubes and inside the sectional load cover;
wherein all cog beams protrude suitably up over the hoisting gears inside the sectional load cover to enable its initial lifting;
wherein each hoisting gear is driven by one servomotor with one reduction gear which rotates the cog wheel that is fitted with all cogs on the cog beam;
wherein each cog beam is revolvingly installed to the space rocket fuselage by means of the rotating head;
wherein each rotating head is mounted inside the space rocket;
wherein each rotating head is driven by one servomotor with one reduction gear which rotates the rotating axle;
wherein to each rotating axle is permanently fastened one cog beam;
wherein each one section of the sectional load cover is held up and inclined by two cog beams;
wherein all cog beams are situated outside of the space rocket and outside of a second stage rocket;
wherein two cog beams are situated on one side of the space rocket and two other cog beams are situated on the opposite side of the space rocket;
wherein the entire dividable sectional load cover is configured to be revolvingly installed on the space rocket upper part and being situated over the second stage rocket;
wherein the dividable sectional load cover is configured to open by parting into two sections by folding outward, and is configured to close by folding up both sections, and is configured to cover a payload when closed, thereby creating thermal protection during the space rocket ascent and descent in the atmosphere;
wherein the dividable sectional load cover is adapted to be suitably lifted over the second stage rocket before folding out on two opposite sides; and
wherein the dividable sectional load cover is adapted to be thoroughly lowered to the space rocket upper part when the second stage rocket is not used.

7. The system according to claim 1,
wherein the sliding engines cover comprises:
four flat carrying plates;
two jalousies;
two side plates;
two U-shaped mils;
two stiffening beams;
four angle profiles; and
two rounded plates;
wherein the sliding engines cover is installed to the space rocket fuselage bottom by means of permanently fastened four flat carrying plates and four angle profiles;
wherein both U-shaped rails are permanently fastened to all four flat carrying plates;
wherein both U-shaped rails extend out from the space rocket fuselage one side to its bottom and further to the space rocket fuselage opposite side;
wherein the opposite U-shaped rails upper ends are permanently fastened with themselves and with the space rocket fuselage by means of two stiffening beams;

wherein in both U-shaped rails are placed two jalousies wherewith each one is joined by hinges with one side plate;
wherein both jalousies with the side plates are placed on two opposite sides of the space rocket fuselage;
wherein both jalousies with the side plates are adapted to move slidingly in two U-shaped rails;
wherein both jalousies are adapted to come to each other, touch on themselves and then tighten up to each other in the U-shaped rails bottom and in their middle;
wherein after lowering of both jalousies underneath the space rocket arises a square flat surface or a wedge shaped surface which covers the space rocket main engines underneath;
wherein both rounded plates are situated on two opposite sides of the space rocket fuselage;
wherein each rounded plate moves slidingly down and up in two angle profiles;
wherein both rounded plates after their lowering are adapted to shield the main engines on their both sides which are not entirely covered by the jalousies;
wherein the sliding engines cover is adapted to cover the space rocket main engines by sliding down or uncover them by sliding up; and
wherein the sliding engines cover is adapted to cover the space rocket main engines during atmospheric reentry to provide their thermal protection, and is adapted to uncover the main engines during the space rocket liftoff and during braking action at space rocket landing.

8. The system according to claim 1,
wherein the landing station comprises:
two movable ship gantries having installed the plurality of damping wagons;
two pairs of hangers; and
two grasping wagons;
wherein the landing station is adapted to be deck mounted on the specific sea ship;
wherein the landing station is adapted for landing the space rockets equipped with the spreadable arms;
wherein both movable ship gantries are adapted to be installed on a central part of the specific sea ship;
wherein one pair of hangers is adapted to be installed on each side of the movable ship gantries; and
wherein both grasping wagons are adapted to be installed underneath both ship gantries.

9. The system according to claim 8,
wherein both movable ship gantries comprise:
at a chassis bottom a plurality of driving wheels to precisely roll on two deck rails along the specific sea ship length-ways; and
on a chassis top two upper long rails with placed the plurality of damping wagons;
wherein both movable ship gantries are adapted to suitably approach each over before landing of the space rocket;
wherein both movable ship gantries are adapted to place themselves precisely under the landing space rocket equipped with the spreadable arms; and
wherein both movable ship gantries are adapted to approach each over and touch on themselves with bumpers.

10. The system according to claim 8,
wherein each hanger comprises:
two upper short rails on its top; and
two rotating wedges;
wherein both upper short rails are fitted with the upper long rails on the movable ship gantries tops;
wherein one pair of hangers is adapted for hanging one space rocket equipped with the spreadable arms and fastening said space rocket at bottom by means of four rotating wedges;
wherein one pair of hangers is permanently fastened on each side of the ship gantries;
wherein all hangers are permanently fastened on a deck of both long side hulls of the specific sea ships;
wherein one pair of hangers is adapted for passing of two damping wagons from both movable ship gantries;
wherein between one pair of hangers on the deck are permanently fastened four short transverse rails fitted with four long transverse rails on both movable decks;
wherein all rotating wedges are adapted for swinging suppressing and strong fastening of one space rocket equipped with the spreadable arms; and
wherein each rotating wedge has its own a rotating axle and a rotary actuator adapted to be rotated apart the other rotating wedges.

11. The system according to claim 8,
wherein each damping wagon comprises:
a main plate;
one or a plurality of middle plates;
a top plate;
one or a plurality of layers with conic springs in a vertical setting;
a plurality of tubes;
a plurality of leading shafts;
a plurality of driving wheels; and
a thick flexible layer;
wherein the main plate has on both sides permanently fastened the plurality of tubes;
wherein over the main plate are permanently fastened all bottoms of the plurality of conic springs in vertical setting which are adapted to be compressed;
wherein the plurality of conic springs tops are permanently fastened to being situated over them the middle plate or the top plate;
wherein to the top plate on both sides are permanently fastened the plurality of leading shafts;
wherein all leading shafts are adapted to fit with the plurality of tubes in the middle plates and the main plate;
wherein all lowered leading shafts are adapted to not hook up and not collide with any components of the hangers and of the movable ship gantries;
wherein the thick flexible layer is placed over the top plate;
wherein each thick flexible layer is adapted for direct contacts with the spreadable arms of the space rocket;
wherein all damping wagons are adapted to precisely roll on the upper long rails on both movable ship gantries tops;
wherein all damping wagons are adapted to place themselves under the landing space rocket;
wherein the damping wagons are adapted to be in various sizes;
wherein two damping wagons are adapted to one vertically landing space rocket which hangs itself on its spreadable arms;
wherein the damping wagons are adapted to be compressed after the space rocket hangs itself;
wherein the compressed damping wagons are adapted to roll by from two movable ship gantries tops onto one pair of hangers tops;

wherein all damping wagons constructions are adapted with constructions and function of the hangers and of the movable ship gantries;

wherein all damping wagons are adapted to have suitable damping range during hanging the space rockets equipped with the spreadable arms;

wherein all damping wagons are adapted to maintain unshaken and stable top surfaces during their compression by the space rocket; and wherein two compressed damping wagons with one hanged space rocket and both grasping wagons having grasped said space rocket bottom, all together are adapted to roll sideways and between one pair of hangers.

12. The system according to claim 8, wherein each grasping wagon comprises:

at least two rotating poles having spherical ends with flexible coatings; and a plurality of driving wheels;

wherein the spherical ends with flexible coatings are adapted for direct contacts with the space rockets;

wherein the grasping wagons are adapted to completely lower all rotating poles on the sides to the horizontal setting;

wherein the grasping wagons are adapted to roll under bottom of the space rocket which hangs itself on two ship gantries;

wherein the grasping wagons are adapted for swinging suitable suppressing of the landed space rocket bottom by means of four rotating poles;

wherein the grasping wagons are also adapted for strong fastening of the landed space rocket bottom by means of four rotating poles;

wherein each grasping wagon is adapted to roll on two long transverse rails on one movable and thus transverse to the specific sea ship length-ways;

wherein each grasping wagons is adapted to roll on two short transverse rails between one pair of hangers;

wherein each grasping wagon is adapted to roll by from two long transverse rails onto two short transverse rails.

13. The system according to claim 1, wherein the specific sea ship comprises:

two long side hulls;

two short central hulls;

four over water copular hulls;

two horizontally movable decks;

the plurality of tunnels inbuilt in all hulls;

the plurality of ballasting wagons installed in the tunnels; and a deck rail on each long side hull all along the specific sea ship length-ways;

wherein two long side hulls and two short central hulls are permanently fastened with four over water copular hulls;

wherein all joined hulls create the specific multi-hull;

wherein inside the central part of the specific multi-hull there are not any hull parts;

wherein all top surfaces of all hulls create the deck;

wherein on each long side hull surface is permanently fastened one deck rail all along the specific multi-hull length-ways;

wherein both deck rails are adapted for rolling both movable ship gantries;

wherein the horizontally movable decks are installed over the central part of the specific sea ship;

wherein the horizontally movable decks are adapted to completely spread apart in two directions;

wherein after the horizontally movable decks have been completely spread apart there inside the specific sea ship multi-hull is exposed its central part without any hull parts and as result arises there a open space where-into there is only a sea surface;

wherein spreading apart of both movable decks is adapted to prevent them from strike of the space rocket which failed to stop its descent from the space;

wherein on each horizontally movable deck are permanently fastened two long transverse rails that are transverse to the specific sea ship length-ways;

wherein on each horizontally movable two long transverse rails is installed one grasping wagon;

wherein the plurality of tunnels are inbuilt inside the specific multi-hull;

wherein the tunnels are transverse to the specific sea ship length-ways;

wherein the tunnels have a plurality of rails with installed the plurality of ballasting wagons;

wherein the ballasting wagons are adapted for quick and precise ballasting this specific sea ship to the perfectly horizontal position during landing each space rocket and during moving each one on one pair of hangers, wherein the ballasting wagons are also adapted for continuous, quick and precise ballasting this specific sea ship during seafaring; and wherein the entire specific sea ship is adapted to the deck mounted landing station for landing the space rockets equipped with the spreadable arms.

14. The system according to claim 1, wherein the multi-task station comprises:

two movable ground gantries; and the specific movable ground crane;

wherein both movable ground gantries at a chassis bottom have installed a plurality of driving wheels to precisely drive on the solid ground and turn on it;

wherein both movable ground gantries on their tops have fastened the rails for possible installing the damping wagons;

wherein the multi-task station is adapted to be situated on the solid ground;

wherein the multi-task station is adapted for hanging up, reload, launch and vertical landing of the space rockets equipped with the spreadable arms;

wherein both movable ground gantries are adapted to approach each over before landing of the space rocket;

wherein both movable ground gantries are adapted to place themselves precisely under landing space rocket equipped with the spreadable arms;

wherein the specific movable ground crane is adapted to play along with both movable ground gantries;

wherein the specific movable ground crane at a chassis bottom has installed a plurality of driving wheels to precisely drive on the solid ground and turn on it;

wherein the specific movable ground crane is adapted to be installed at a sea harbor for reloading the space rockets from the specific sea ships having deck mounted landing station;

wherein the specific movable ground crane has a plurality of beams which reach up over the specific sea ship; and wherein the specific movable ground crane is adapted to lift one space rocket from the specific sea ship and subsequently shift it on both movable ground gantries.

* * * * *